US012649536B2

(12) United States Patent (10) Patent No.: US 12,649,536 B2
Novak et al. (45) Date of Patent: Jun. 9, 2026

(54) TWO-WHEELED VEHICLE

(71) Applicant: Indian Motorcycle International, LLC, Medina, MN (US)

(72) Inventors: Andrew J. Novak, Stillwater, MN (US); Ryan P. Lenton, Buffalo, MN (US); Brian K. Langlois, Stacy, MN (US); Jonathon P. Oakden-Graus, Stacy, MN (US); Donald W. Kahl, Vadnais Heights, MN (US)

(73) Assignee: INDIAN MOTORCYCLE INTERNATIONAL, LLC, Medina, MN (US)

( * ) Notice: Subject to any disclaimer, the term of this patent is extended or adjusted under 35 U.S.C. 154(b) by 278 days.

(21) Appl. No.: 18/233,573

(22) Filed: Aug. 14, 2023

(65) Prior Publication Data

US 2023/0406434 A1 Dec. 21, 2023

Related U.S. Application Data

(62) Division of application No. 15/883,231, filed on Jan. 30, 2018, now Pat. No. 11,767,074, which is a
(Continued)

(51) Int. Cl.
*F02D 41/24* (2006.01)
*B60K 13/02* (2006.01)
(Continued)

(52) U.S. Cl.
CPC ............... *B62J 17/02* (2013.01); *B60K 13/02* (2013.01); *B60K 13/04* (2013.01); *B62J 6/022* (2020.02);
(Continued)

(58) Field of Classification Search
None
See application file for complete search history.

(56) References Cited

U.S. PATENT DOCUMENTS 2,230,120 A 1/1941 Walter
2,538,175 A 1/1951 Thomas, Jr.
(Continued)

FOREIGN PATENT DOCUMENTS

CA 2890734 A1 5/2014
CN 2385958 Y 7/2000
(Continued)

OTHER PUBLICATIONS

Polaris Purchases Indian Motorcycles, will compliment Victory brand, Chris Shunk, dated Apr. 20, 2011, http://www.autoblog.com/2011/04/20/polaris-purchases-indian-motorcycles-will-complem . . . ; 2 page.
(Continued)

*Primary Examiner* — Stephanie E Bloss
*Assistant Examiner* — Diana Hancock
(74) *Attorney, Agent, or Firm* — SCHWEGMAN LUNDBERG & WOESSNER, P.A.

(57) ABSTRACT

A two-wheeled vehicle is provided including a frame, front and rear ground-engaging members each supporting the frame, a straddle-type seat, a handlebar for steering the vehicle, at least one light device configured to operate in a hazard mode, an engine supported by the frame and operably coupled to the ground-engaging members, a tilt sensor, and a vehicle control unit in communication with the tilt sensor. The vehicle control unit is operative to detect a tilt angle of the vehicle based on output from the tilt sensor. The vehicle control unit is operative to determine a tip-over condition of the vehicle based on the detected tilt angle exceeding a threshold tilt angle. The vehicle control unit activates the
(Continued)

hazard mode of the at least one light in response to the determination of the tip-over condition.

9 Claims, 156 Drawing Sheets

Related U.S. Application Data division of application No. 14/078,510, filed on Nov. 12, 2013, now Pat. No. 9,908,577.

(60) Provisional application No. 61/773,708, filed on Mar. 6, 2013, provisional application No. 61/725,440, filed on Nov. 12, 2012.

(51) Int. Cl.

| | |
|---|---|
| *B60K 13/04* | (2006.01) |
| *B62J 6/022* | (2020.01) |
| *B62J 9/00* | (2020.01) |
| *B62J 9/27* | (2020.01) |
| *B62J 15/00* | (2006.01) |
| *B62J 17/02* | (2006.01) |
| *B62J 17/04* | (2006.01) |
| *B62J 25/00* | (2020.01) |
| *B62K 11/02* | (2006.01) |
| *B62K 11/04* | (2006.01) |
| *B62K 21/04* | (2006.01) |
| *B62K 23/00* | (2006.01) |
| *B62M 7/02* | (2006.01) |
| *F01L 13/08* | (2006.01) |
| *F01N 13/10* | (2010.01) |
| *F02D 41/06* | (2006.01) |
| *F02M 35/02* | (2006.01) |
| *F02M 35/10* | (2006.01) |
| *F02M 35/16* | (2006.01) |
| *F02N 11/08* | (2006.01) |
| *F16B 13/08* | (2006.01) |
| *B62J 9/23* | (2020.01) |
| *B62K 21/02* | (2006.01) |

(52) U.S. Cl.

CPC . *B62J 9/00* (2013.01); *B62J 9/27* (2020.02); *B62J 15/00* (2013.01); *B62J 17/04* (2013.01); *B62J 25/00* (2013.01); *B62K 11/02* (2013.01); *B62K 11/04* (2013.01); *B62K 21/04* (2013.01); *B62K 23/00* (2013.01); *B62M 7/02* (2013.01); *F01L 13/085* (2013.01); *F01N 13/10* (2013.01); *F02D 41/062* (2013.01); *F02D 41/24* (2013.01); *F02M 35/02* (2013.01); *F02M 35/10013* (2013.01); *F02M 35/162* (2013.01); *F02N 11/0803* (2013.01); *F02N 11/0807* (2013.01); *F16B 13/0841* (2013.01); *B62J 9/23* (2020.02); *B62K 21/02* (2013.01); *F01L 2305/00* (2020.05)

(56) References Cited

U.S. PATENT DOCUMENTS

| | | | |
|---|---|---|---|
| 4,019,774 A | 4/1977 | Tsukahara et al. |
| 4,066,291 A | 1/1978 | Hickman |
| 4,216,574 A | 8/1980 | Feist |
| 4,278,285 A | 7/1981 | Cummings et al. |
| 4,396,085 A | 8/1983 | Inoue et al. |
| 4,495,773 A | 1/1985 | Inoue et al. |
| 4,550,794 A | 11/1985 | Inoue et al. |
| 4,597,466 A | 7/1986 | Yamada |
| 4,657,299 A | 4/1987 | Mahan |
| 5,301,767 A | 4/1994 | Shiohara |
| 5,375,677 A | 12/1994 | Yamagiwa et al. |
| 5,560,446 A | 10/1996 | Onishi |
| D388,366 S | 12/1997 | Nishino |
| 5,857,727 A | 1/1999 | Vetter |
| D416,215 S | 11/1999 | Hanlon et al. |
| 6,409,783 B1 | 6/2002 | Miyajima et al. |
| 6,609,488 B2 | 8/2003 | Nagae et al. |
| 6,633,090 B2 | 10/2003 | Harter et al. |
| 7,007,998 B2 | 3/2006 | Toyofuku |
| D524,192 S | 7/2006 | Sugimoto |
| 7,222,582 B1 | 5/2007 | Whiting et al. |
| 7,264,072 B2 | 9/2007 | Yoshikawa et al. |
| 7,281,750 B1 | 10/2007 | Wise |
| 7,311,232 B2 | 12/2007 | Watanabe et al. |
| 7,339,461 B2 * | 3/2008 | Orita ................... B60C 23/0401 |
| | | | 340/447 |
| D567,148 S | 4/2008 | Inose et al. |
| 7,358,849 B1 | 4/2008 | Pesina |
| 7,380,624 B2 | 6/2008 | Momosaki |
| D588,503 S | 3/2009 | Idei et al. |
| D597,892 S | 8/2009 | Andoh |
| D605,088 S | 12/2009 | Tanaka et al. |
| D610,044 S | 2/2010 | Sugimoto |
| 7,658,395 B2 | 2/2010 | Bagnariol et al. |
| 7,669,682 B2 | 3/2010 | Holroyd et al. |
| 7,690,668 B2 | 4/2010 | Holroyd |
| 7,748,746 B2 | 7/2010 | Beiber et al. |
| 7,779,950 B2 | 8/2010 | Hoeve et al. |
| D624,853 S | 10/2010 | Song et al. |
| 7,832,371 B2 | 11/2010 | Fujita et al. |
| 7,975,640 B1 | 7/2011 | Whiting et al. |
| 8,042,648 B2 | 10/2011 | Akimoto et al. |
| 8,096,381 B2 | 1/2012 | Castellani et al. |
| D656,068 S | 3/2012 | Song et al. |
| 8,151,925 B2 | 4/2012 | Aramayo et al. |
| 8,181,729 B2 | 5/2012 | Hiramatsu et al. |
| 8,201,654 B2 | 6/2012 | Niijima et al. |
| 8,267,214 B2 | 9/2012 | Arnold |
| 8,272,460 B2 | 9/2012 | Song et al. |
| 8,525,368 B2 | 9/2013 | Perhats, Sr. |
| 8,579,169 B2 | 11/2013 | Racz et al. |
| 8,590,654 B2 | 11/2013 | Kerner et al. |
| 8,593,011 B2 | 11/2013 | Windeler |
| 8,596,941 B2 | 12/2013 | Marlow et al. |
| 8,714,138 B2 | 5/2014 | Uchiyama et al. |
| D716,702 S | 11/2014 | Song et al. |
| D722,538 S | 2/2015 | Song et al. |
| 9,381,803 B2 | 7/2016 | Galsworthy et al. |
| 9,421,860 B2 | 8/2016 | Schuhmacher et al. |
| 9,908,577 B2 | 3/2018 | Novak et al. |
| 9,958,111 B2 | 5/2018 | Oltmans |
| 10,189,524 B2 | 1/2019 | Schafer et al. |
| 11,767,074 B2 | 9/2023 | Novak et al. |
| 2002/0027497 A1 | 3/2002 | Sumada et al. |
| 2003/0011166 A1 | 1/2003 | Wargin et al. |
| 2003/0151307 A1 | 8/2003 | Klinger et al. |
| 2005/0150921 A1 | 7/2005 | Schneider |
| 2005/0247287 A1 | 11/2005 | Kondo et al. |
| 2005/0257978 A1 | 11/2005 | Sigfrid |
| 2006/0002120 A1 | 1/2006 | Grigg et al. |
| 2006/0042601 A1 | 3/2006 | Hotta et al. |
| 2006/0106525 A1 | 5/2006 | Hata |
| 2007/0228829 A1 | 10/2007 | Konno et al. |
| 2007/0240925 A1 | 10/2007 | Kobayashi |
| 2008/0169134 A1 | 7/2008 | Tomolillo et al. |
| 2008/0190683 A1 | 8/2008 | Hoeve |
| 2008/0224824 A1 | 9/2008 | Yoshizawa |
| 2009/0008181 A1 | 1/2009 | Pedersen et al. |
| 2009/0194351 A1 | 8/2009 | Murasawa et al. |
| 2010/0096201 A1 | 4/2010 | Nagao et al. |
| 2010/0206020 A1 | 8/2010 | Chen et al. |
| 2010/0294581 A1 | 11/2010 | Niijima et al. |
| 2010/0307852 A1 | 12/2010 | Aramayo et al. |
| 2011/0118961 A1 | 5/2011 | Koenen et al. |
| 2011/0297462 A1 | 12/2011 | Grajkowski et al. |
| 2012/0241237 A1 | 9/2012 | Holroyd et al. |
| 2012/0241239 A1 | 9/2012 | Holroyd et al. |
| 2013/0110376 A1 | 5/2013 | Surnilla et al. |
| 2014/0136076 A1 | 5/2014 | Novak et al. |

(56) References Cited

U.S. PATENT DOCUMENTS

| | | | |
|---|---|---|---|
| 2015/0129342 A1 | 5/2015 | Bagnariol et al. |
| 2015/0130209 A1 | 5/2015 | Hamlin et al. |
| 2016/0318569 A1 | 11/2016 | Zellmer et al. |
| 2018/0162474 A1 | 6/2018 | Novak et al. |

FOREIGN PATENT DOCUMENTS

| | | | | |
|---|---|---|---|---|
| CN | 2488800 Y | 5/2002 | | |
| EP | 1921287 A1 | 5/2008 | | |
| EP | 2230120 A1 | 9/2010 | | |
| EP | 2917094 A2 | 9/2015 | | |
| JP | 55-008100 | 1/1980 | | |
| JP | 2007-254962 A | 10/2007 | | |
| JP | 2010-149686 A | 7/2010 | | |
| KR | 20060054768 A | * 5/2006 | ............. | G01G 17/04 |
| KR | 20070102138 A | * 10/2007 | ........... | B60K 15/077 |
| KR | 20110043316 A | * 4/2011 | ........... | B60K 15/077 |
| WO | 2006/119459 A1 | 11/2006 | | |
| WO | WO-2011004319 A1 | * 1/2011 | ........... | G01F 23/804 |
| WO | 2014/075091 A2 | 5/2014 | | |

OTHER PUBLICATIONS

Brochure for Polaris' 2013 Indian Kings Mountain, 29 pages, copyright 2012, available at htts://www.indianmotorcycles.com/en-us/pages/catalogs.aspx.

Communication Pursuant to Article 94(3) EPC issued by the European Patent Office, dated Feb. 27, 2018, for European Patent Application No. 13798820.0; 5 pages.

Communication Pursuant to Rules 161(1) and 162 EPC issued by the European Patent Office, dated Jun. 26, 2015, for European Patent Application No. 13798820.0; 2 pages.

EBay, 2002 Honda VTR 1000 RC51 RVT1000R SP2 main frame chassis straight oem slvg, May 6, 2016, 4 pages, available at http://www.ebay.com/itm/2002-Honda-VTR-1000-RC51-RVT1000R-SP2-main-frame-chassis-straight-oem-slvg-/391409193614?hash=item5b21ce528e:g:q8IAAOSw2ENW-63u6&vxp=mtr.

EPO Machine Translation for JP2007254962. Printed May 13, 2017.

Examination Report issued by the Canadian Intellectual Property Office, dated Jan. 4, 2019, for Canadian Patent Application No. 2,890,734; 4 pages.

Indian picured on p. 1 of 4, dated Aug. 16, 2013 [Retrieved on Feb. 4, 2014} . . . Retrieved from the Internet <URL: http://robbreport.com/automobiles/indian-motorcycle-relauches-new line—bikes.>.

Indian picured on p. 1 of 8, dated Dec. 27, 2013 .[Retrieved on Feb. 4, 2014} . . . Retrieved from the Internet <URL: http://ultimatemotorcycling.com/indian-motorcycle-big-chief-custom-showcase-accessories . . . >.

International Preliminary Report on Patentability received for PCT Patent Application No. PCT/US13/69726, mailed on Feb. 23, 2015, 36 pages.

International Search Report and Written Opinion received for PCT Patent Application No. PCT/US13/69726, mailed on Jul. 24, 2014, 29 pages.

Mk2top: "Ariel Square Four," http://www.draganfly.co.uk/images/shop/14/mk2top.jpg, retrieved Jul. 15, 2014, 1 page.

New MadStad adjustable windshield system for the Victory Cross Country is coming soon, Cross County, May 13, 2011, 1 page, available at http://www.madstad.com/s.nl/sc.7/category.2446/.f.

Photo of EDGE Brackets Quick Release Saddlebag System Installation with Mustang Hard Bags, available at https://www.youtube.com/watch?v=2CP_f3cTQeU, May 28, 2009, 1 page.

Photo of Victory's Matthew Cardenas talks about new saddlebag system, available at https://www.youtube.com/watch?v=ttr0AFAzWac, Aug. 1, 2012, 1 page.

Photos of the Chief Vintage Indian Motorcycle, http://www.indianmotorcycle.com/en-us/chief/chief-vintage-le/page/photos.asmx, copyright 2013; 1 page.

Sport Rider Magazine, Honda RC51 (RVT1000R)—Great Sportbikes of the Past, Don Smith, Aug. 27, 2009, 5 pages, available at http://www.ebay.com/itm/2002-Honda-VTR-1000-RC51-RVT1000R-SP2-main-frame-chassis-straight-oem-slvg-/391409193614?hash=item5b21ce528e.g.q8IAAOSw2ENW-63u6&vxp=mtr.

"U.S. Appl. No. 14/078,510, Restriction Requirement mailed Oct. 3, 2016", 6 pgs.

"U.S. Appl. No. 15/883,231, Non Final Office Action mailed Jun. 14, 2019", 8 pgs.

"U.S. Appl. No. 15/883,231, Response filed Sep. 16, 2019 to Non Final Office Action mailed Jun. 14, 2019", 6 pgs.

"U.S. Appl. No. 15/883,231, Non Final Office Action mailed Nov. 5, 2019", 8 pgs.

"U.S. Appl. No. 15/883,231, Response filed Feb. 5, 2020 to Non Final Office Action mailed Nov. 5, 2019", 5 pgs.

"U.S. Appl. No. 15/883,231, Final Office Action mailed Apr. 7, 2020", 8 pgs.

"U.S. Appl. No. 14/078,510, Response filed Dec. 5, 2016 to Restriction Requirement mailed Oct. 3, 2016", 5 pgs.

"U.S. Appl. No. 14/078,510, Non Final Office Action mailed Jan. 30, 2017", 10 pgs.

"U.S. Appl. No. 14/078,510, Response filed May 1, 2017 to Non Final Office Action mailed Jan. 30, 2017", 8 pgs.

"U.S. Appl. No. 14/078,510, Final Office Action mailed May 18, 2017", 19 pgs.

"U.S. Appl. No. 14/078,510, Response filed Jul. 18, 2017 to Final Office Action mailed May 18, 2017", 11 pgs.

"U.S. Appl. No. 14/078,510, Advisory Action mailed Sep. 6, 2017", 3 pgs.

"U.S. Appl. No. 14/078,510, Response filed Sep. 18, 2017 to Advisory Action mailed Sep. 6, 2017", 9 pgs.

"U.S. Appl. No. 14/078,510, Notice of Allowance mailed Nov. 1, 2017", 11 pgs.

"U.S. Appl. No. 15/883,231, Pre-Appeal Brief Request filed Aug. 7, 2020", 5 pgs.

"U.S. Appl. No. 15/883,231, Decision on Pre-Appeal Brief Request mailed Nov. 27, 2020", 2 pgs.

"U.S. Appl. No. 15/883,231, Appeal Brief filed Jan. 27, 2021", 11 pgs.

"U.S. Appl. No. 15/883,231, Examiners Answer to Appeal Brief mailed Jun. 7, 2021", 7 pgs.

"U.S. Appl. No. 15/883,231, Reply Brief filed Aug. 6, 2021", 4 pgs.

"U.S. Appl. No. 15/883,231, Decision on Appeal mailed Jun. 21, 2022", 9 pgs.

"U.S. Appl. No. 15/883,231, Response filed Dec. 5, 2022 to Decision on Appeal mailed Jun. 21, 2022", 8 pgs.

"U.S. Appl. No. 15/883,231, Notice of Allowance mailed May 30, 2023", 5 pgs.

* cited by examiner

TWO-WHEELED VEHICLE

PRIORITY CLAIM AND CROSS-REFERENCE TO RELATED APPLICATIONS

The present application is a divisional of U.S. patent application Ser. No. 15/883,231, filed on Jan. 30, 2018, which is a divisional of U.S. patent application Ser. No. 14/078,510, filed on Nov. 12, 2013, which claims priority to U.S. Provisional Patent Application Ser. No. 61/773,708, filed on Mar. 6, 2013, to U.S. Provisional Patent Application Ser. No. 61/725,440, filed on Nov. 12, 2012, and to U.S. Design patent application Ser. No. 29/437,022 filed on Nov. 12, 2012, the complete disclosures of which are expressly incorporated by reference herein. The present application is related to patent application Ser. No. 14/078,491, filed on Nov. 12, 2013, patent application Ser. No. 14/078,487, filed on Nov. 12, 2013, the complete disclosures of which are expressly incorporated by reference herein.

BACKGROUND OF THE INVENTION

The present disclosure relates to an engine for a two-wheeled vehicle and, more particularly, to a motorcycle engine having improved intake and exhaust systems. One vehicle is shown in U.S. Pat. No. 7,779,950, the subject matter of which is incorporated herein by reference.

The present disclosure relates a V-twin engine for a motorcycle and, more particularly, to a V-twin engine having three cams.

Conventional two-wheeled vehicles include a frame for supporting an operator. The frame may also support a passenger rearward of the driver. An engine is typically positioned below the driver and is coupled to the frame. The front of the vehicle may include a panel or cover positioned forward of the driver for supporting additional components of the vehicle, for example a light. The rear of the vehicle may include a cargo area, for example saddle bags extending laterally outward from the frame.

The size and shape of the engine for a two-wheeled vehicle may vary on account of multiple factors. For example, the engine may have two cylinders in a straight/inline or in a "V" arrangement. Engine valve trains also may vary. For example, conventional engines may have an overhead cam configuration in which the valve train is generally in the cylinder head. Alternatively, engines may have a flathead configuration in which at least a portion of the valve train is in the cylinder block.

SUMMARY OF THE INVENTION

In an exemplary embodiment of the present disclosure, a vehicle is provided including a frame, a plurality of ground-engaging members supporting the frame, an engine supported by the frame and operably coupled to the ground-engaging members, a transmission operably coupled to the engine, and an electrical system. The electrical system includes a plurality of electrical components and at least one control unit operative to control the engine and the plurality of electrical components. The electrical system further includes a portable wireless security device detectable by the at least one control unit and first and second operator input devices electrically coupled to the at least one control unit. In response to detecting an actuation of the first operator input device and the electrical system being powered off, the at least one control unit is operative to determine whether the portable wireless security device is within a range of the vehicle and to power on the electrical system upon determining the portable wireless security device is within the range of the vehicle. In response to detecting an actuation of the second operator input device and the electrical system being powered on, the at least one control unit is operative to determine whether the portable wireless security device is within the range of the vehicle and to start the engine upon determining the portable wireless security device is within the range of the vehicle. In one example, when the at least one control unit determines that the security device is not present within the range of the vehicle after powering on the electrical system and starting the engine, and the vehicle is at a zero speed, the at least one control unit at least one of shuts down the engine and powers down the electrical system after a predetermined delay. In another example, the at least one control unit shuts down the engine after a first predetermined delay and powers down the electrical system after a second predetermined delay, and the second predetermined delay is longer than the first predetermined delay.

In still another exemplary embodiment of the present disclosure, a method of controlling the startup of a vehicle carried out by at least one control unit of the vehicle is provided. The method includes detecting an actuation of a first operator input device of the vehicle while an electrical system of the vehicle and an engine of the vehicle are each in a powered off state, determining whether a wireless security device is within a range of the vehicle in response to detecting the actuation of the first operator input device, and powering on the electrical system in response to determining the wireless security device is within the range of the vehicle following the detecting the actuation of the first operator input device. The method further includes detecting an actuation of a second operator input device of the vehicle while the electrical system is powered on and the engine is in the powered off state, determining whether the wireless security device is within the range of the vehicle in response to detecting the actuation of the second operator input device, and starting the engine upon determining the wireless security device is within the range of the vehicle following the detecting the actuation of the second operator input device.

In another exemplary embodiment of the present disclosure, a two-wheeled vehicle is provided including a frame, front and rear ground-engaging members each supporting the frame, a straddle-type seat, a handlebar for steering the vehicle, an engine supported by the frame and operably coupled to the ground-engaging members, and a storage compartment supported by the frame. The storage compartment includes an access door and a lock device configured to lock and unlock the access door an electrical system. The access door is moveable between an open position and a closed position. The vehicle includes an electrical system including a vehicle control unit and a plurality of electrical components controlled by the vehicle control unit. The vehicle control unit is operably coupled to the lock device of the storage compartment. The vehicle includes a portable wireless security device operative to communicate with the vehicle control unit. The portable wireless security device includes an operator input and a transmitter operative to transmit a wireless signal to the vehicle control unit when the electrical system is in a powered off state in response to an actuation of the operator input. The vehicle control unit is configured to control the lock device to at least one of lock and unlock the access door of the storage compartment in response to receiving the wireless signal from the portable wireless security device while the electrical system is in the powered off state. In one example, in response to the access door remaining in the closed position for a predetermined duration after unlocking the lock device in response to receiving the wireless signal, the vehicle control unit automatically controls the lock device to lock the access door in the closed position.

In yet another exemplary embodiment of the present disclosure, a two-wheeled vehicle is provided including a frame, front and rear ground-engaging members each supporting the frame, a straddle-type seat, a handlebar for steering the vehicle, at least one light device configured to operate in a hazard mode, an engine supported by the frame and operably coupled to the ground-engaging members, a tilt sensor, and a vehicle control unit in communication with the tilt sensor. The vehicle control unit is operative to detect a tilt angle of the vehicle based on output from the tilt sensor. The vehicle control unit is operative to determine a tip-over condition of the vehicle based on the detected tilt angle exceeding a threshold tilt angle. The vehicle control unit activates the hazard mode of the at least one light in response to the determination of the tip-over condition.

In still another exemplary embodiment of the present disclosure, a two-wheeled vehicle is provided including a frame, front and rear ground-engaging members each supporting the frame, a straddle-type seat, a handlebar for steering the vehicle, an engine supported by the frame and operably coupled to the ground-engaging members, a fuel tank containing fuel for use by the engine, a fuel level sensor coupled to the fuel tank, a tilt sensor, and a vehicle control unit in communication with the fuel level sensor and the tilt sensor. The vehicle control unit is operative to detect a tilt angle of the vehicle based on output from the tilt sensor and a fuel level in the fuel tank based on output from the fuel level sensor. The vehicle control unit is operative to adjust the detected fuel level based on the detected tilt angle of the vehicle. In one example, the vehicle further includes a vehicle speed sensor in communication with the vehicle control unit, and the vehicle control unit adjusts the detected fuel level further based on a detected speed of the vehicle.

In another exemplary embodiment of the present disclosure, a method of determining a fuel level of a two-wheeled vehicle is provided. The two-wheeled vehicle includes a straddle seat, a handlebar, a front ground-engaging member, and a rear ground-engaging member. The method includes detecting a fuel level in a fuel tank of the vehicle based on output from a fuel level sensor, detecting a tilt angle of the vehicle based on output from a tilt sensor, and adjusting the detected fuel level based on the detected tilt angle of the vehicle.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 113 is a side perspective view of a compensator assembly of the power train assembly of FIG. 108;

FIG. 114 is a front exploded view of the compensator assembly of FIG. 113;

FIG. 115 is a rear exploded view of the compensator assembly of FIG. 113;

FIG. 116 is a front perspective view of the power train assembly of FIG. 108 with an outer cover removed;

FIG. 117 is a rear perspective view of the windshield assembly in an up position;

FIG. 118 is a detailed view of the portion of the valve train assembly of FIG. 117;

FIG. 119 is a front perspective view of camshafts of the valve train assembly of FIG. 117;

FIG. 120A is a top view of camshaft follower members of the valve train assembly of FIG. 117;

FIG. 120B is an exploded view of the camshaft follower members and a portion of a crankcase of the powertrain assembly of FIG. 108;

FIG. 121 is an exploded view of the camshafts and follower members of FIG. 120A, including locating members;

FIG. 122 is an exploded view of the camshafts of FIG. 121, including a decompression system;

FIG. 123 is a front perspective view of the decompression system of FIG. 122;

Figure 109:
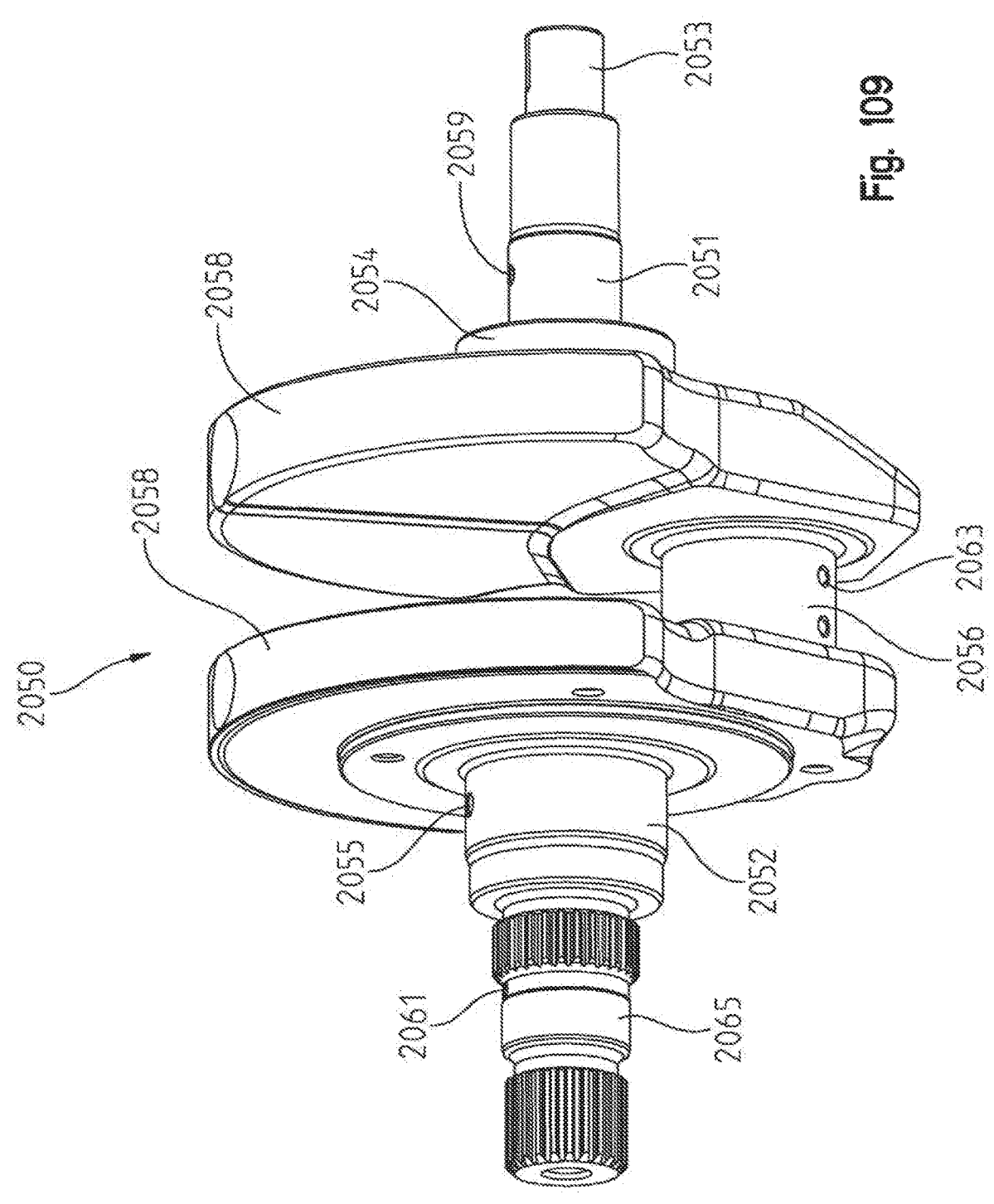
FIG. 109 is a front perspective view of a crankshaft of the power train assembly of FIG. 108.
Figure 120A:
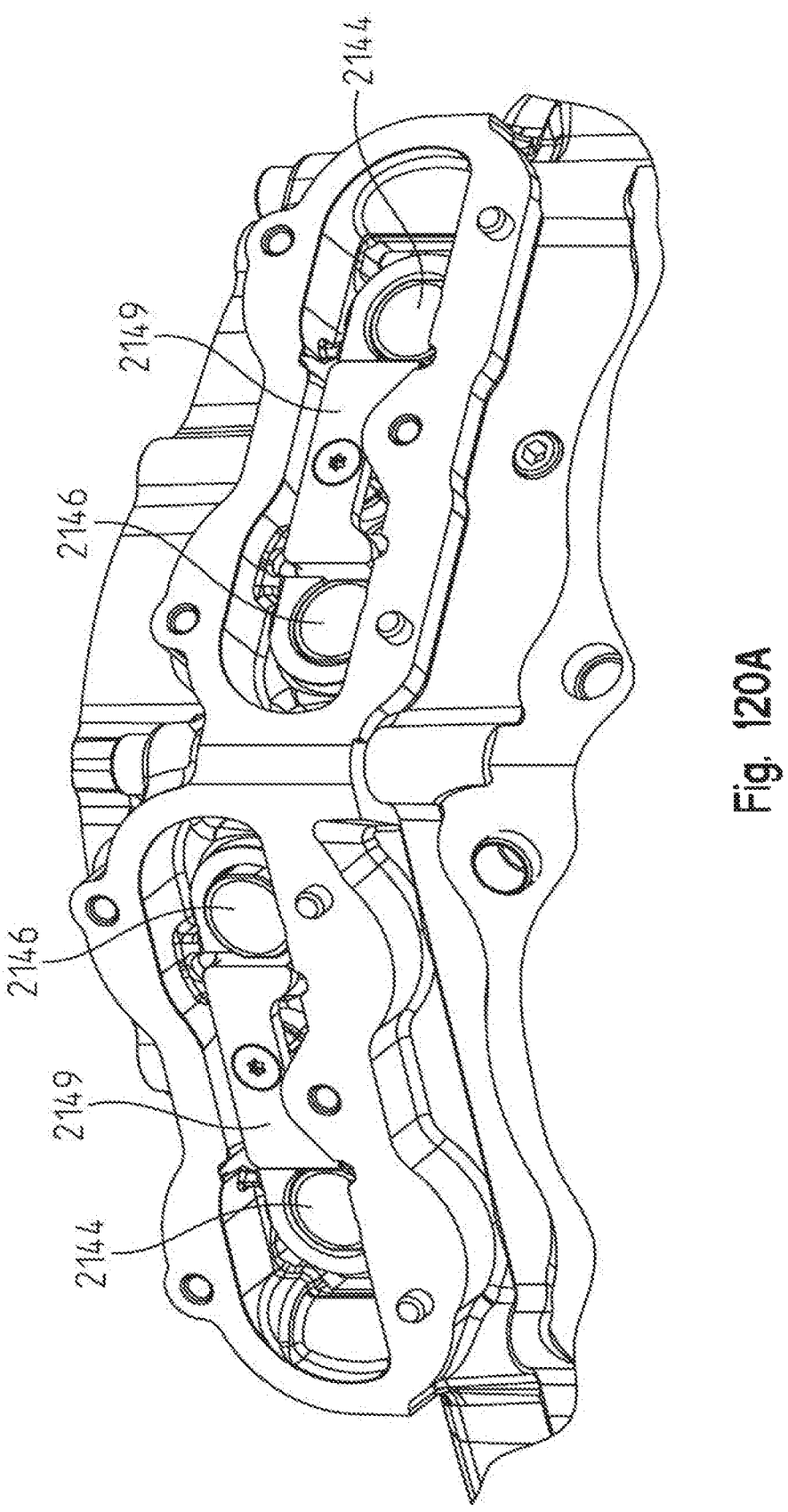
Figure 120B:
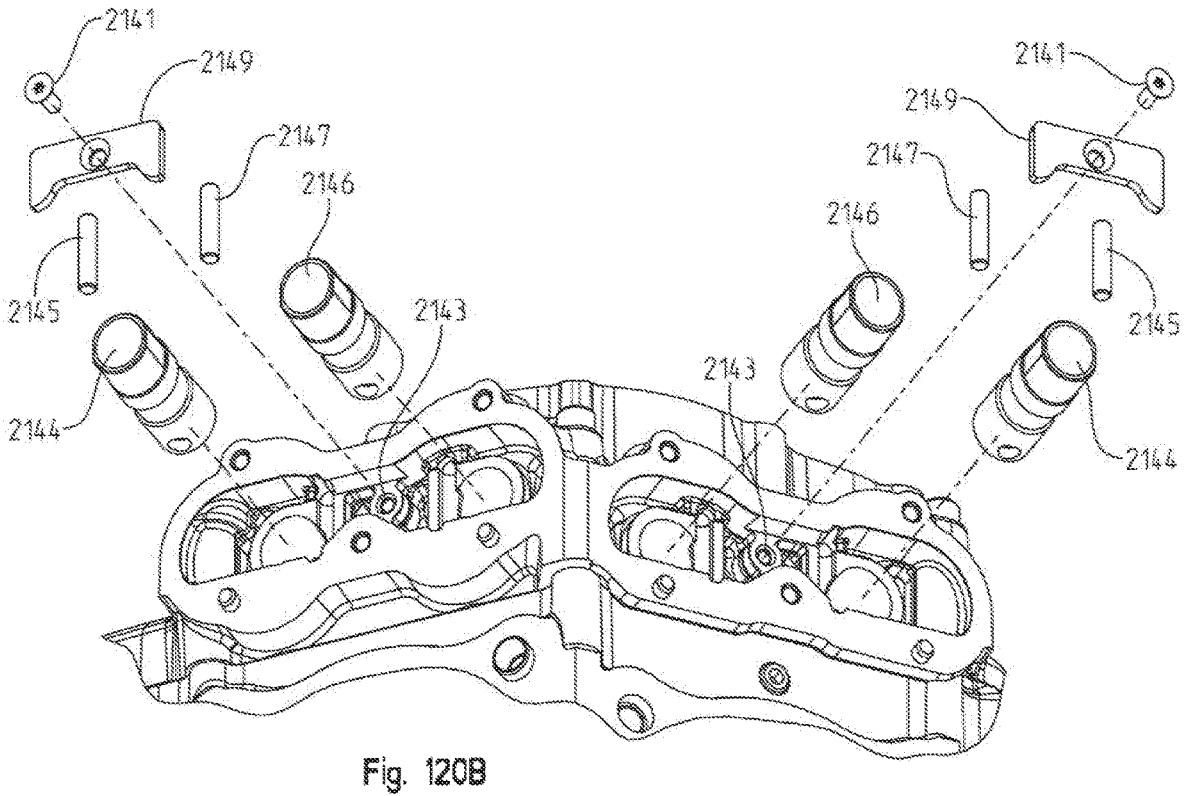
Figures 123, 124:
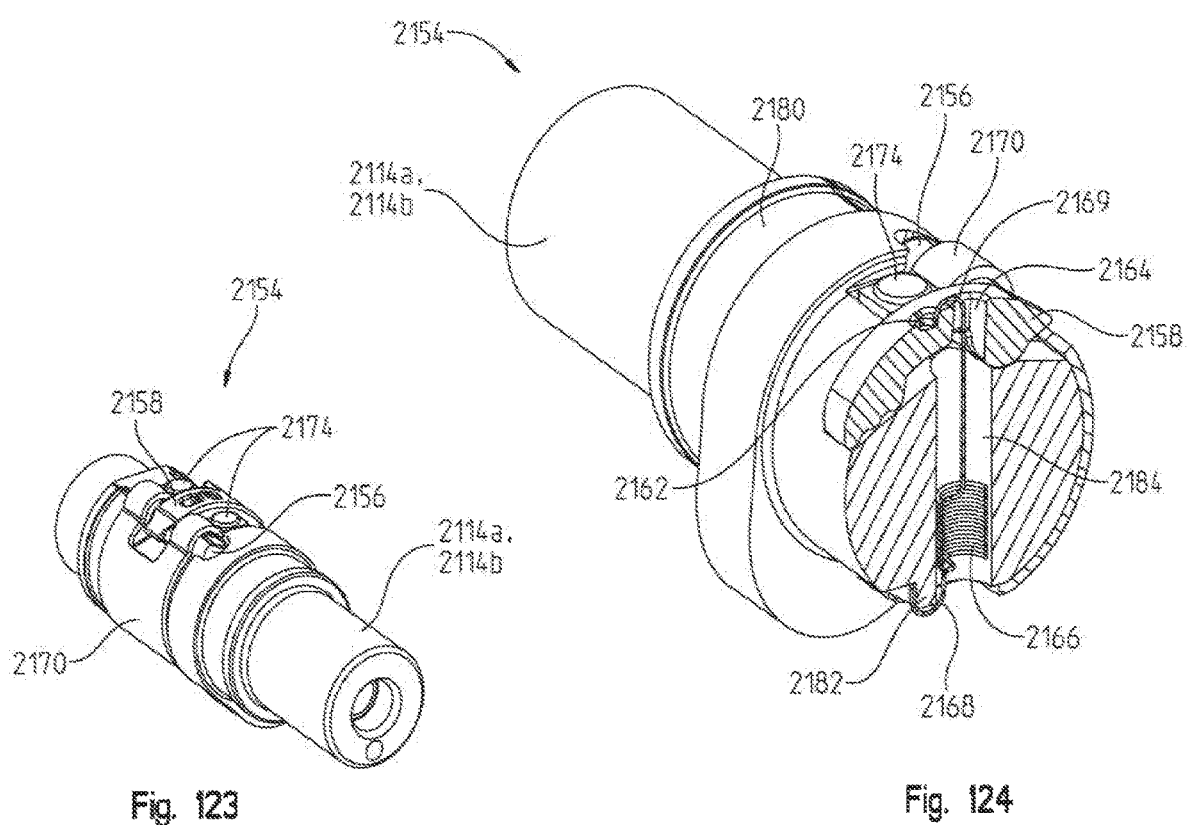
Figure 125:
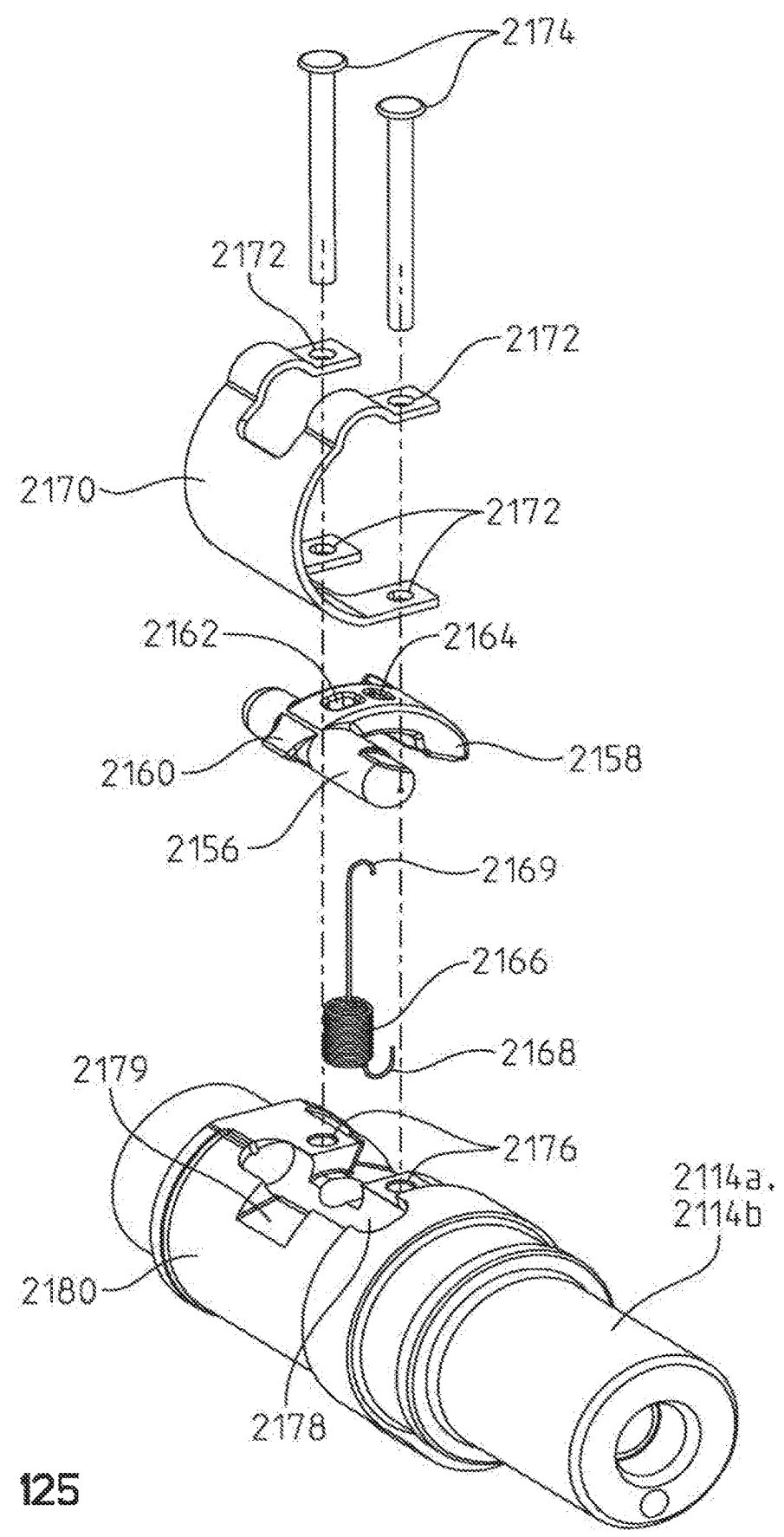
Figures 126A, 126B:
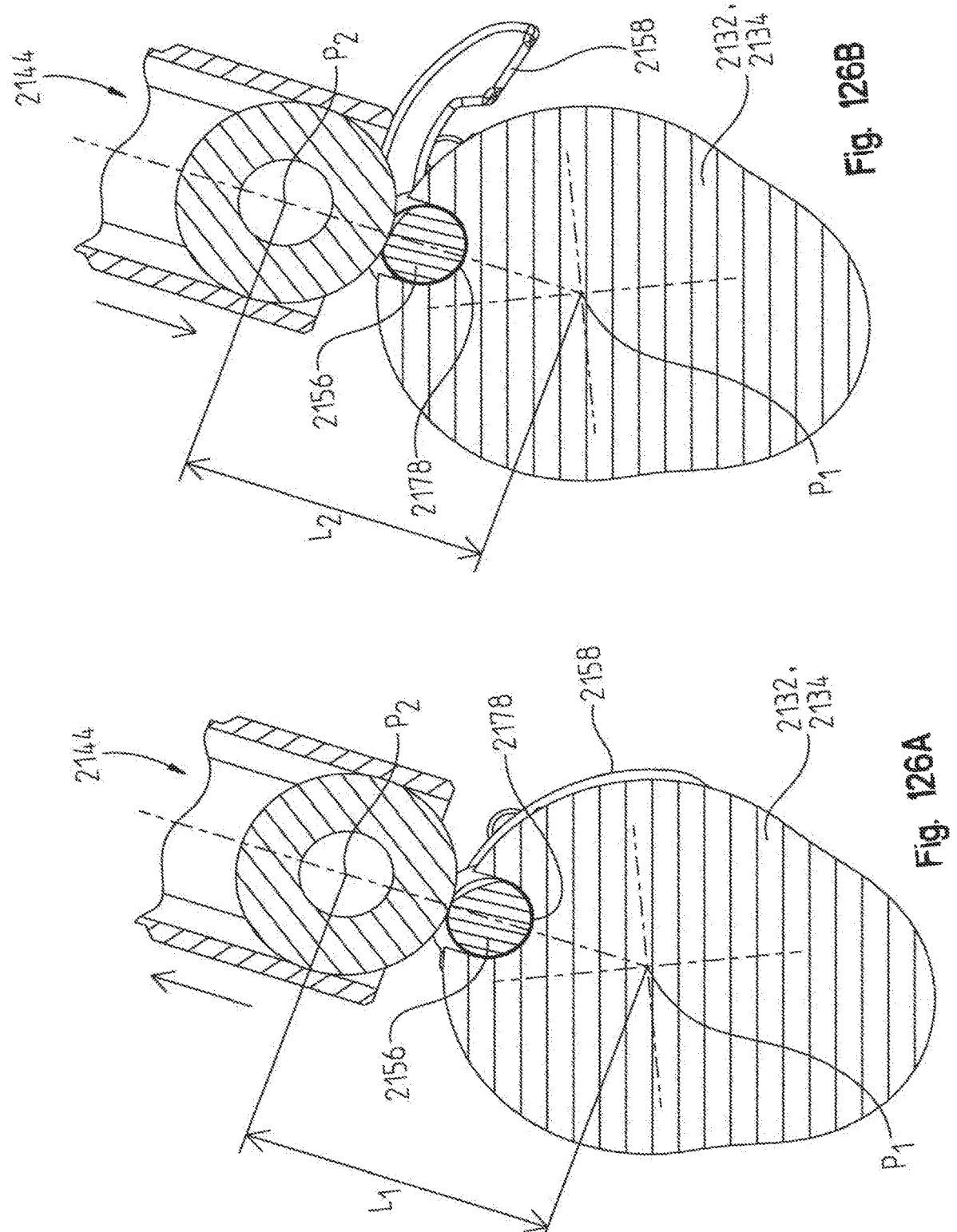
Figure 127:
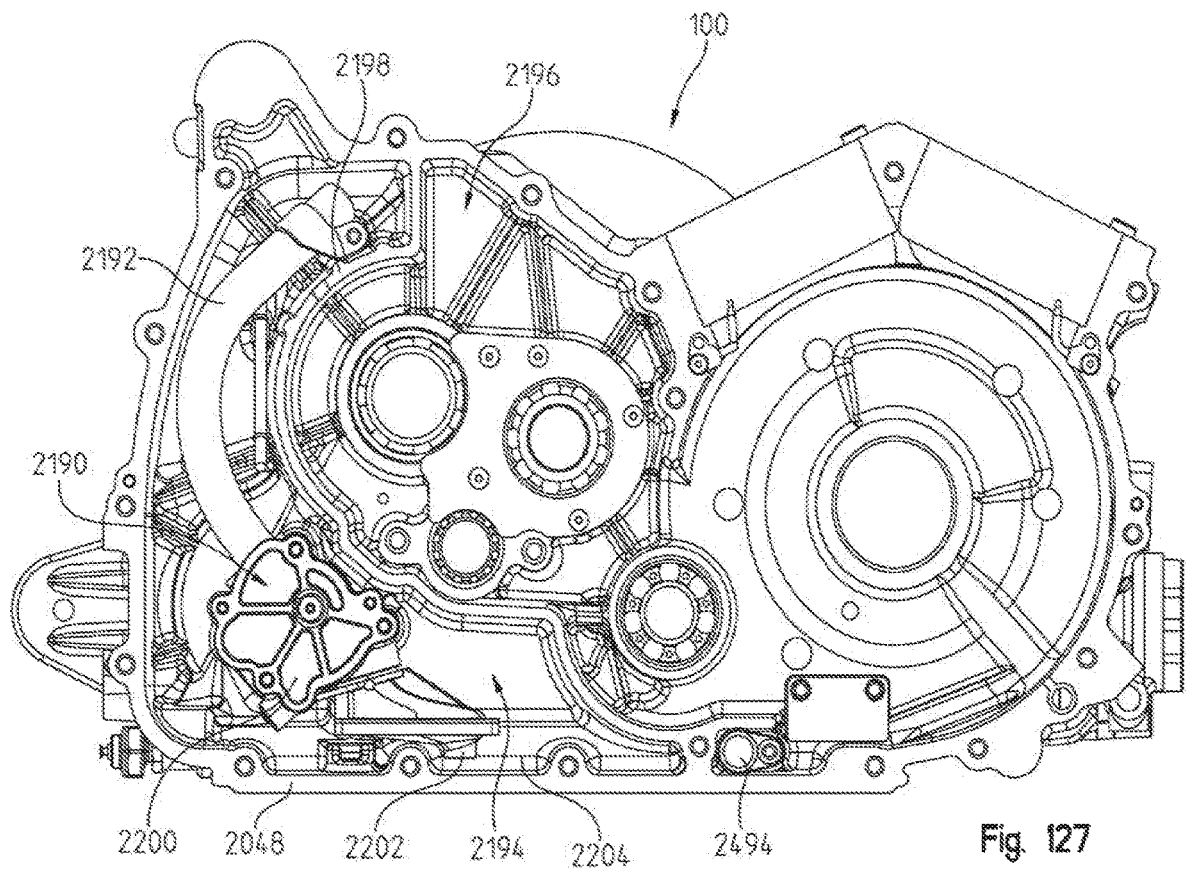
Figure 128:
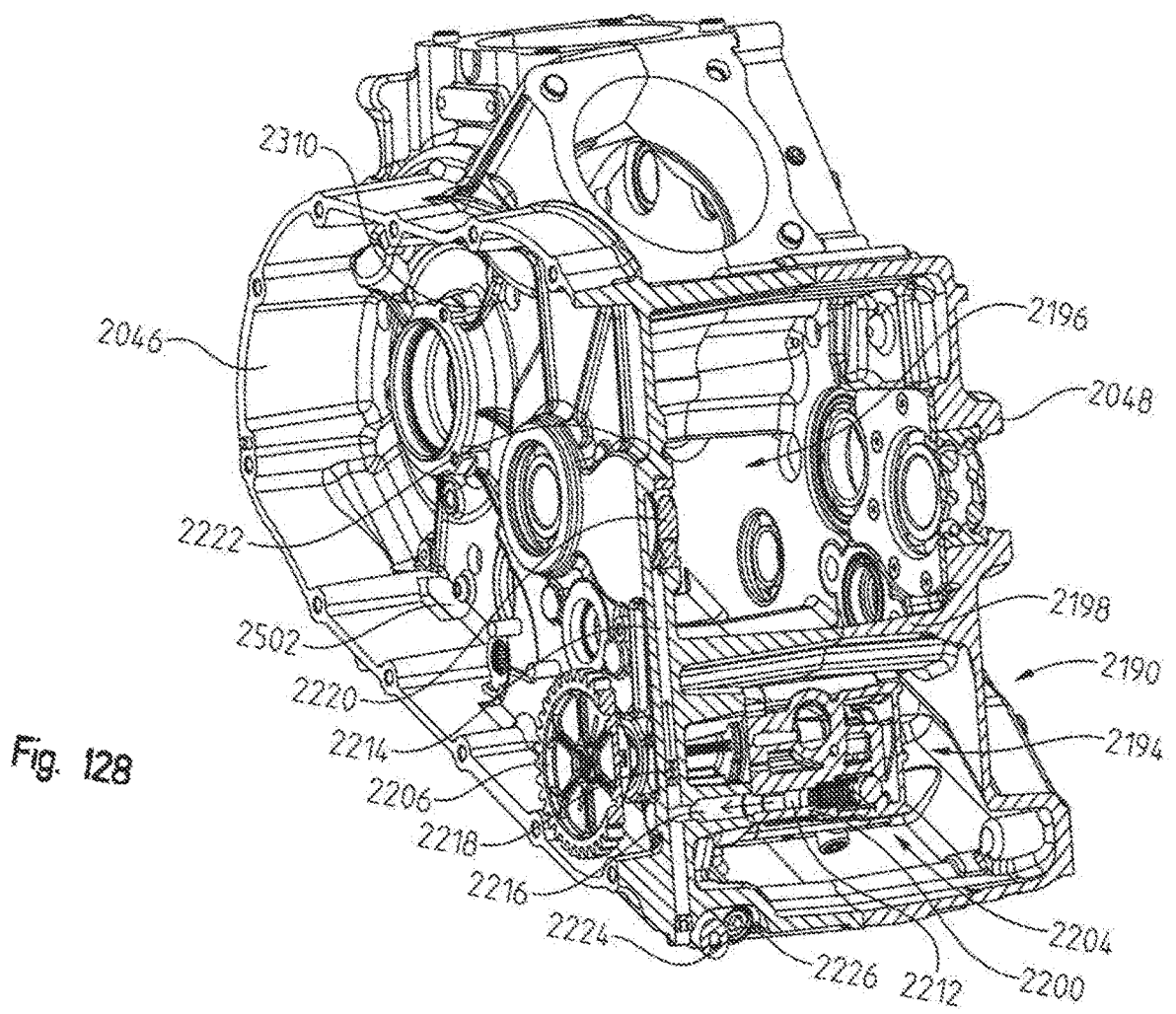
Figure 129:
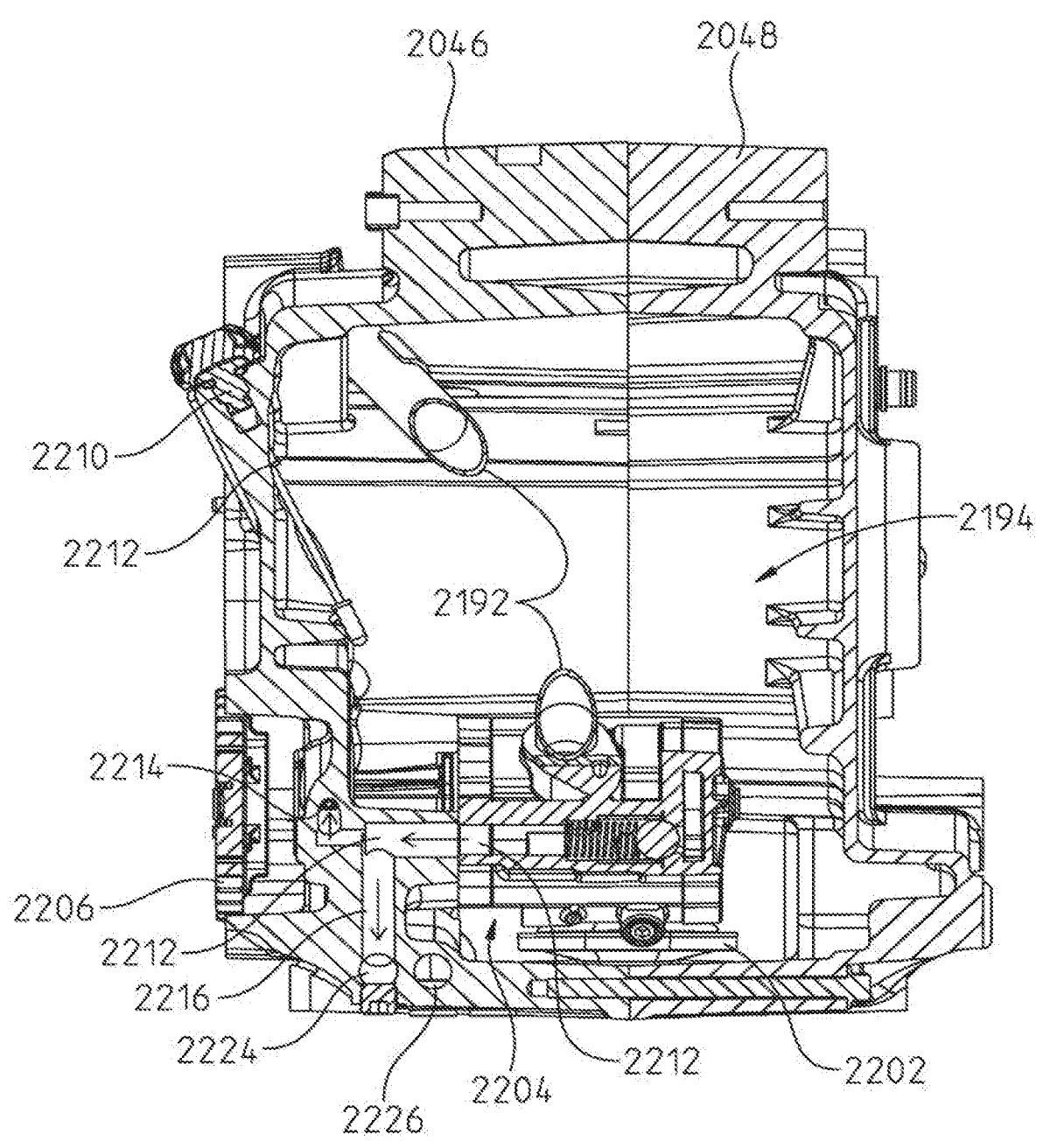
Figure 130:
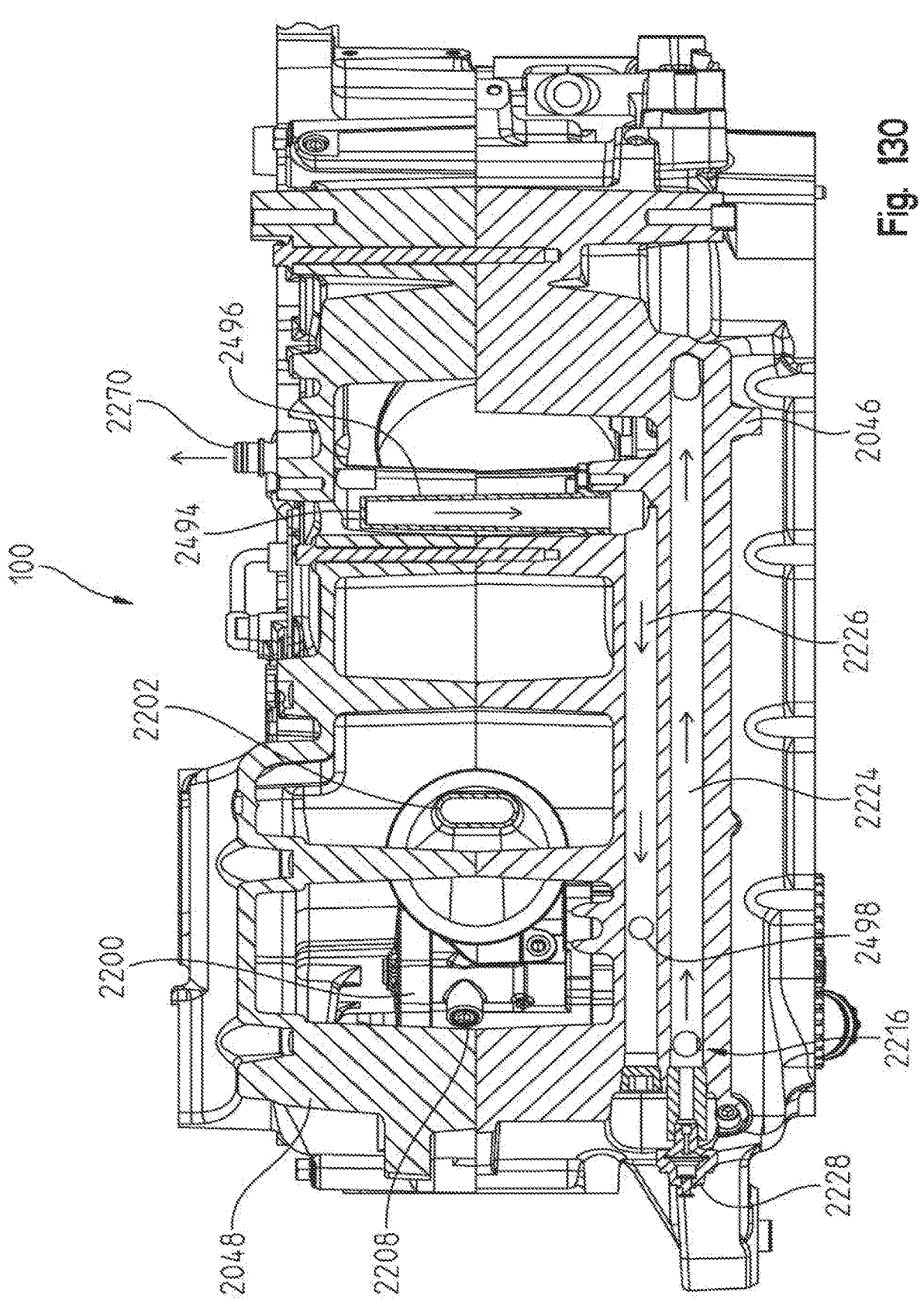
Figure 131:
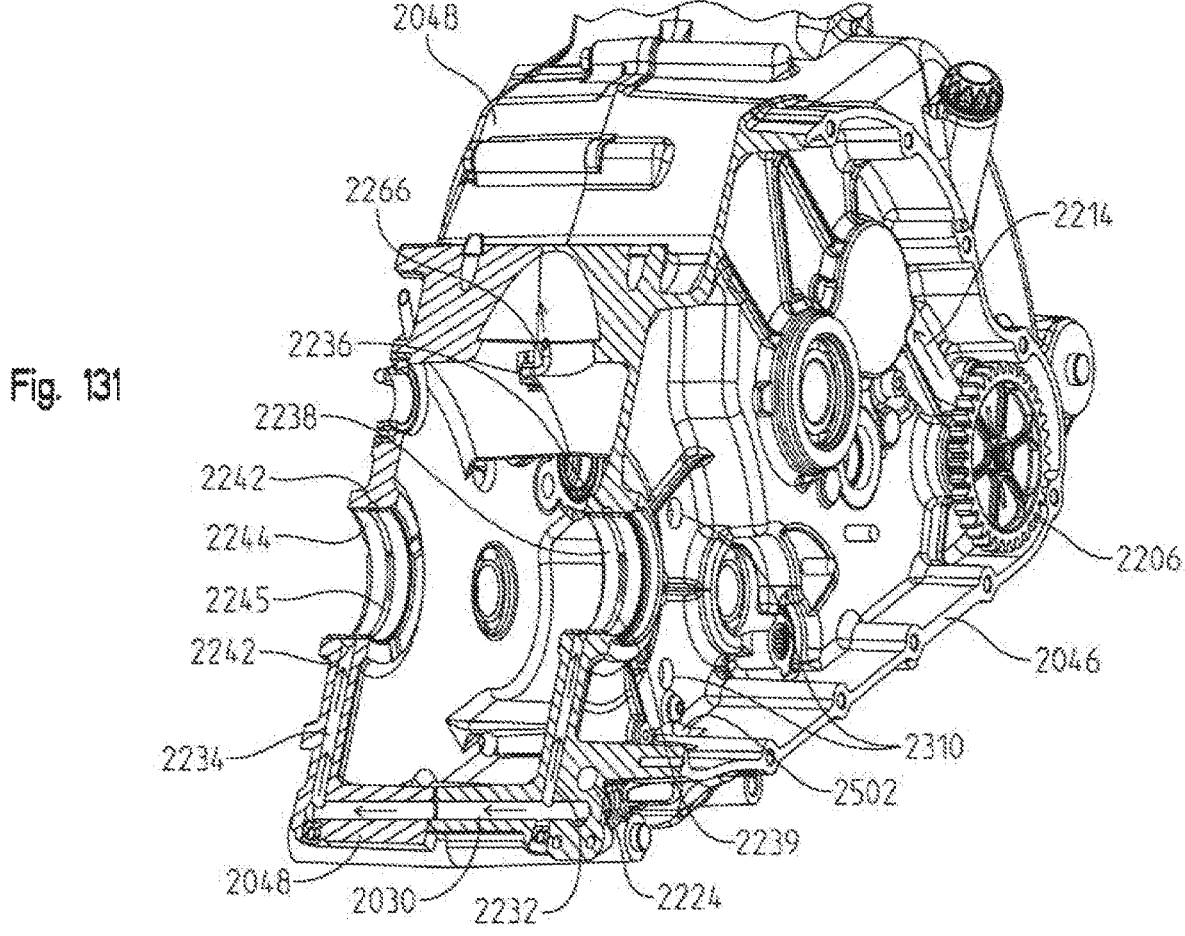
Figure 132:
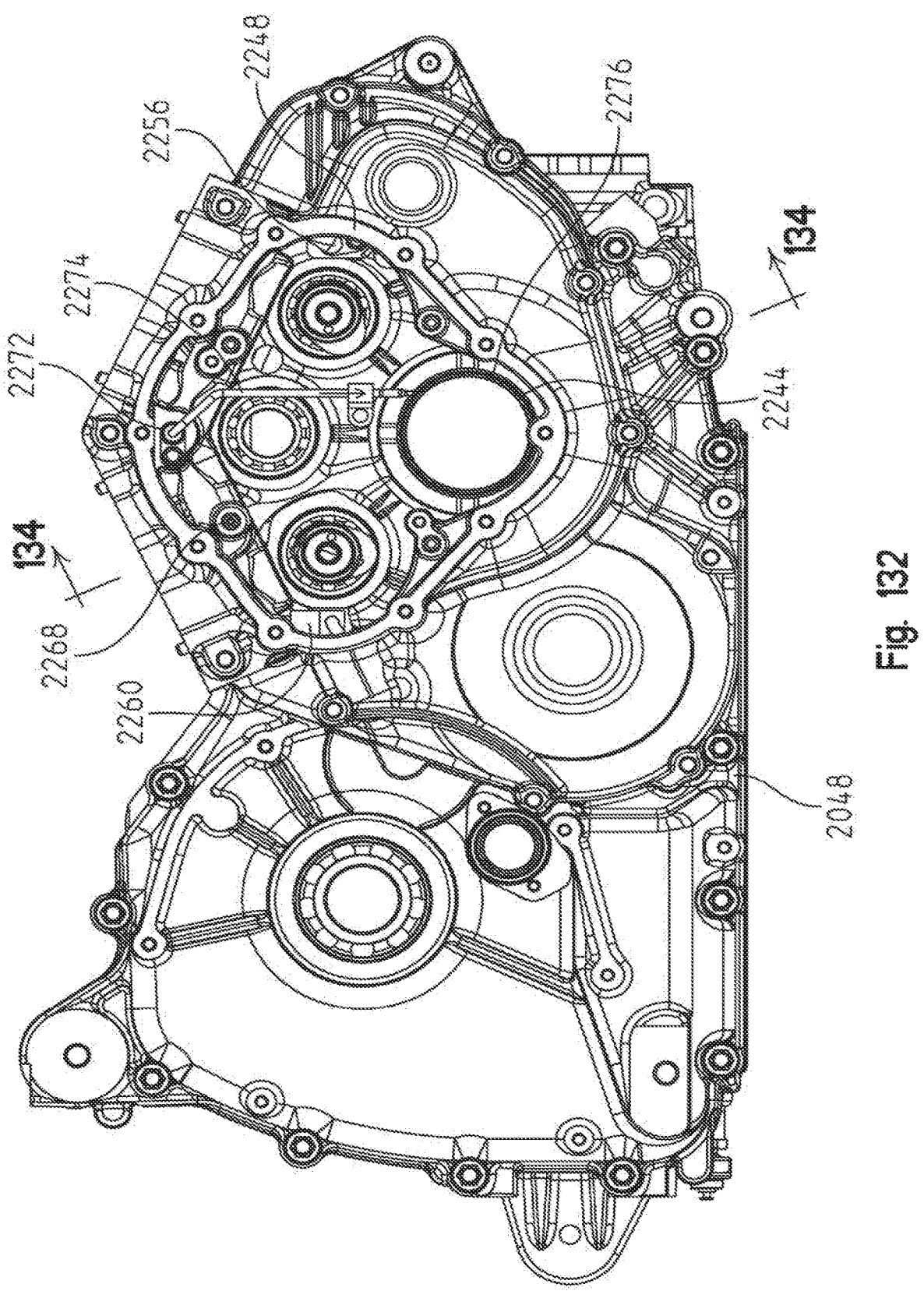
Figure 133:
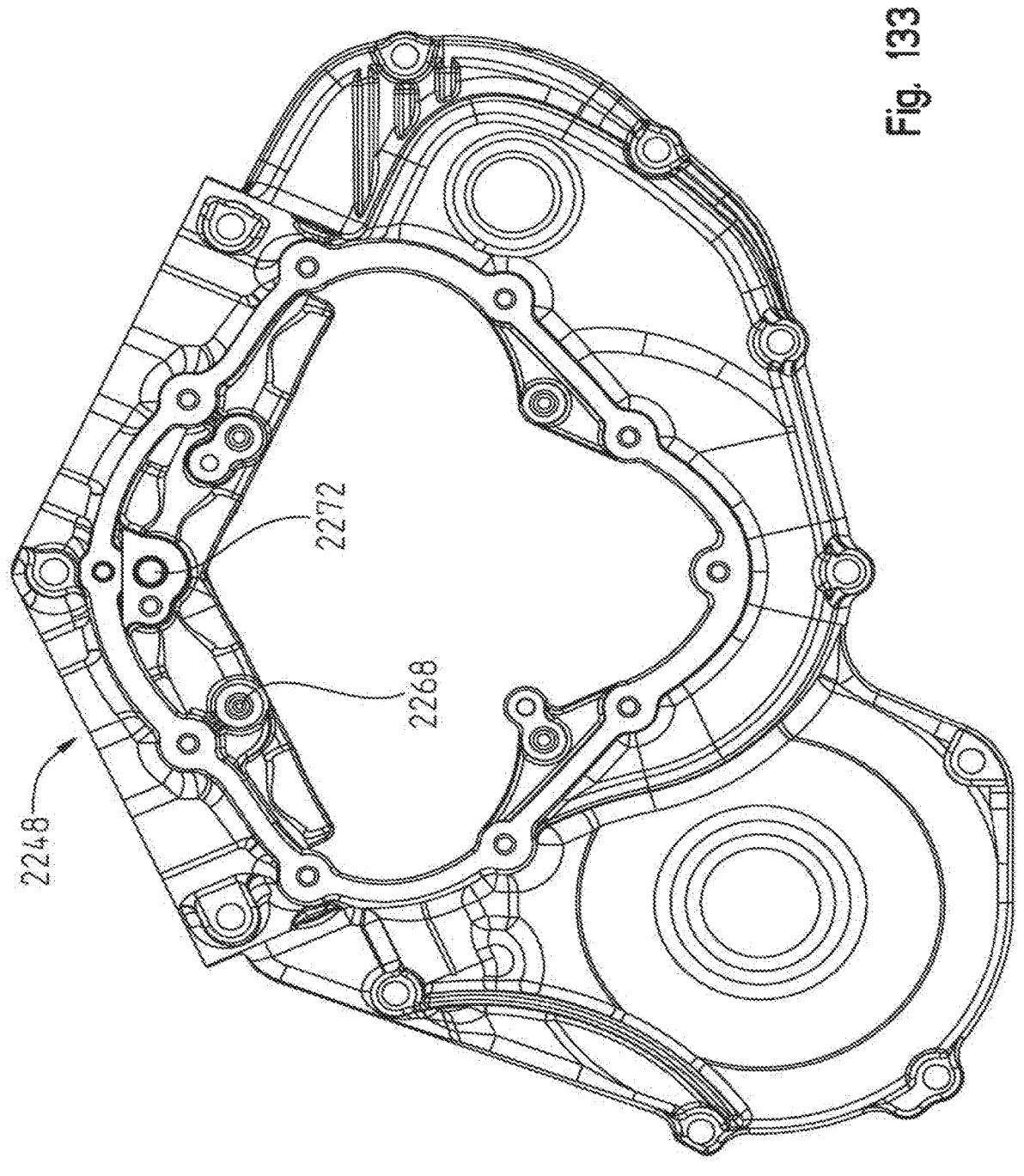
Figure 134:
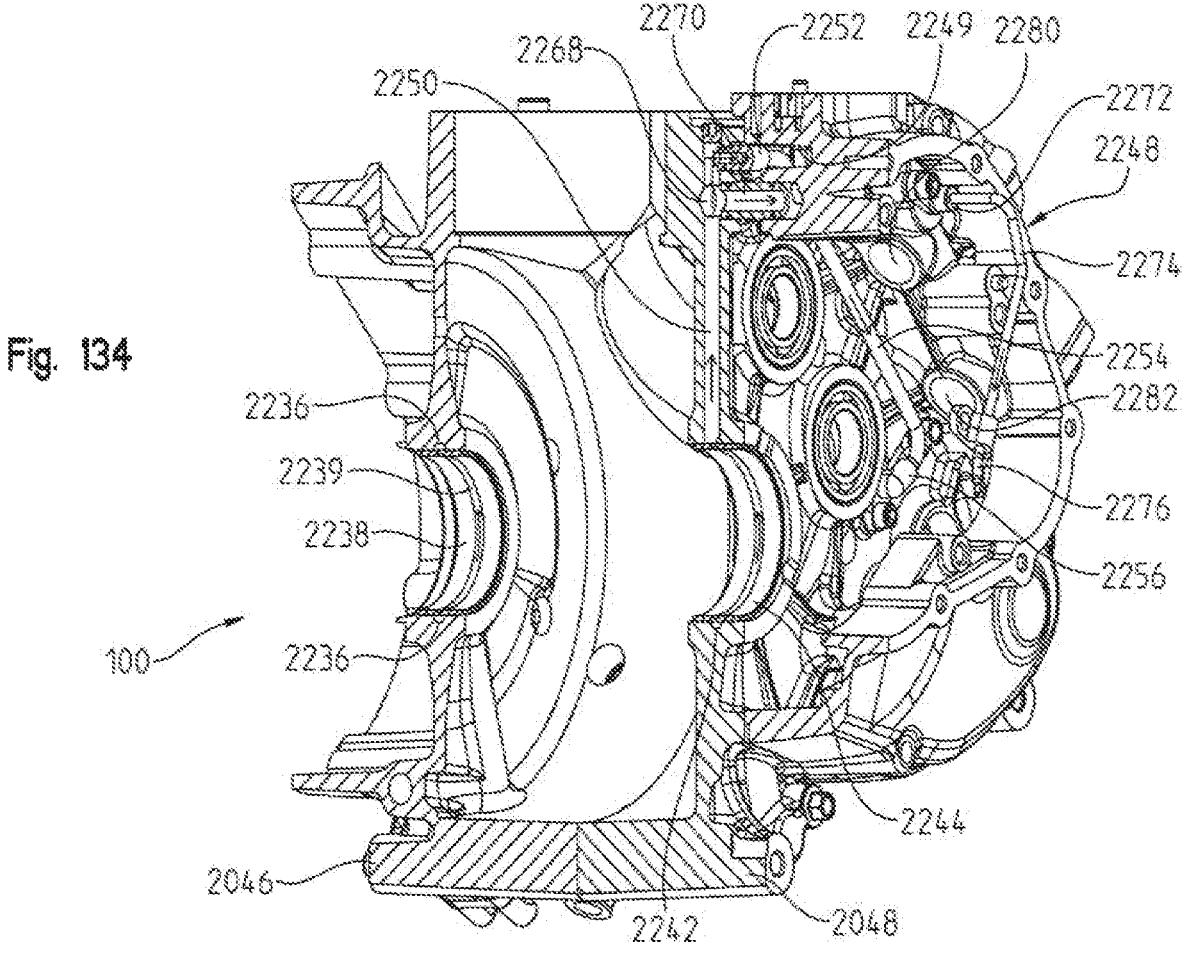
Figure 135:
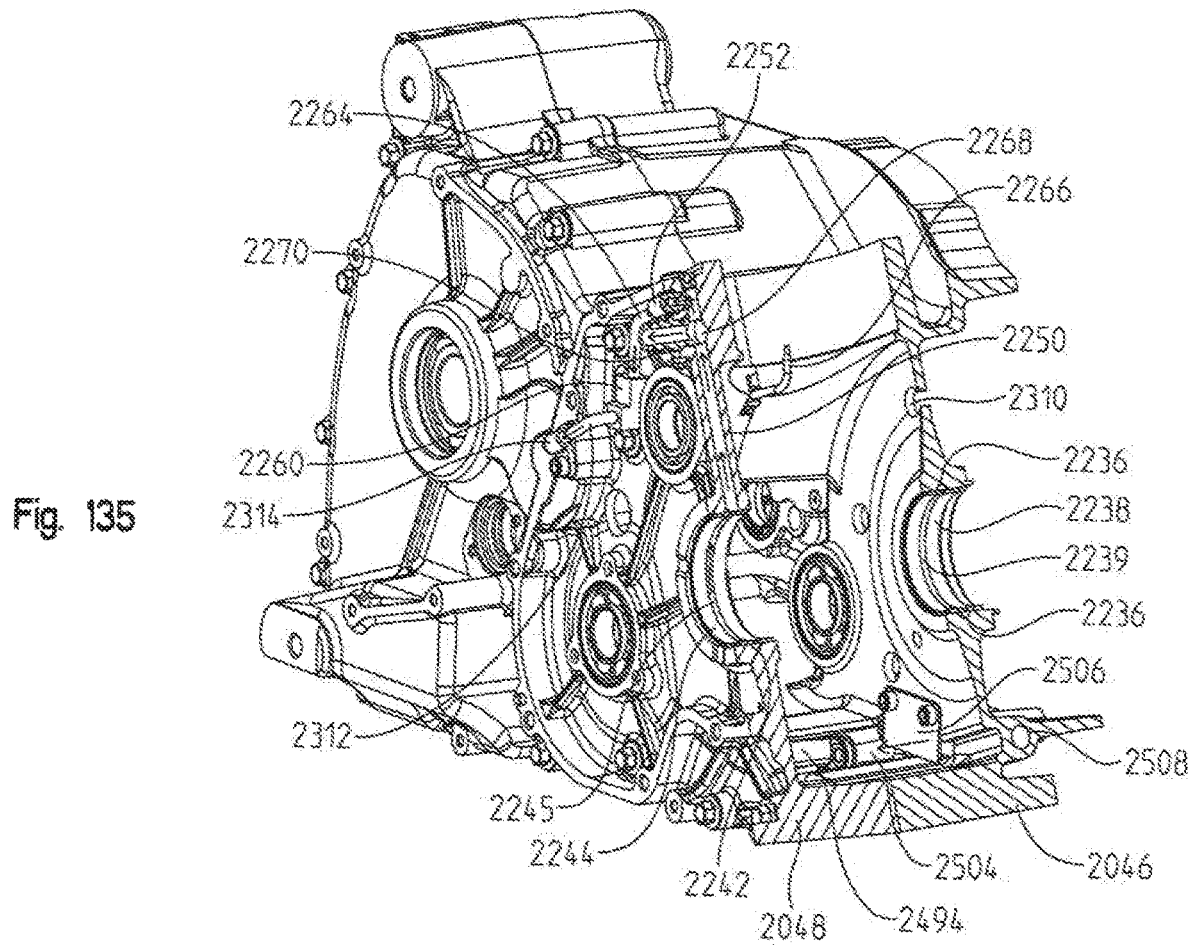
Figures 136, 137:
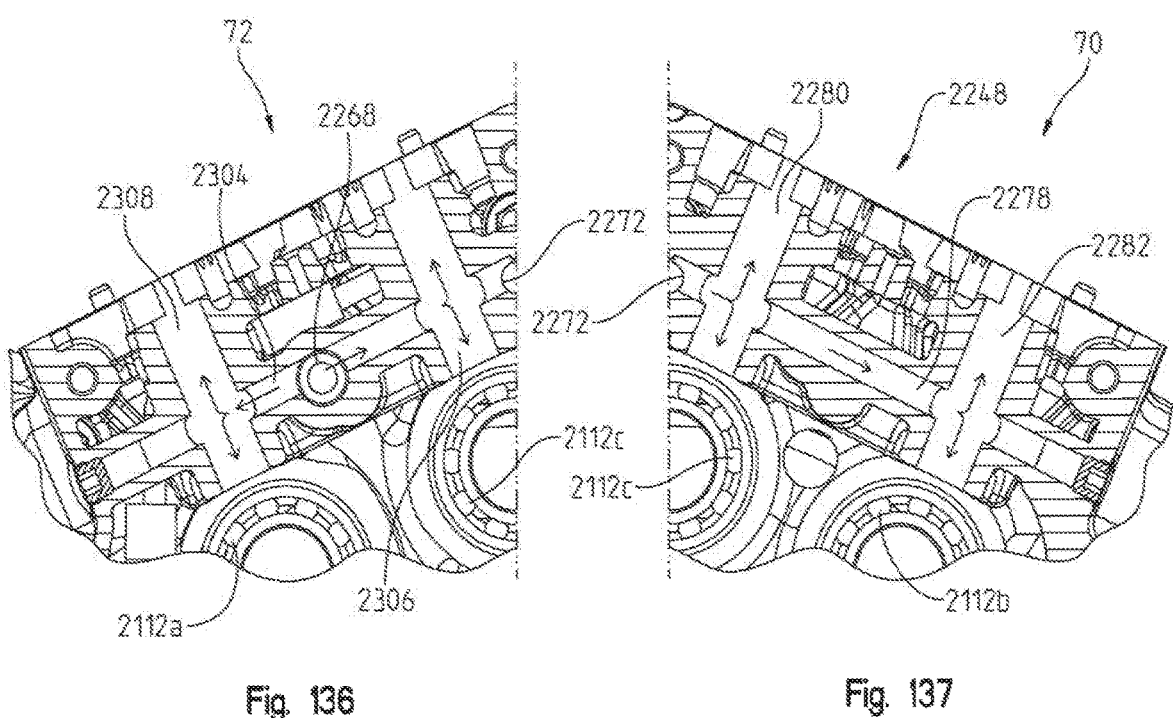
Figure 138:
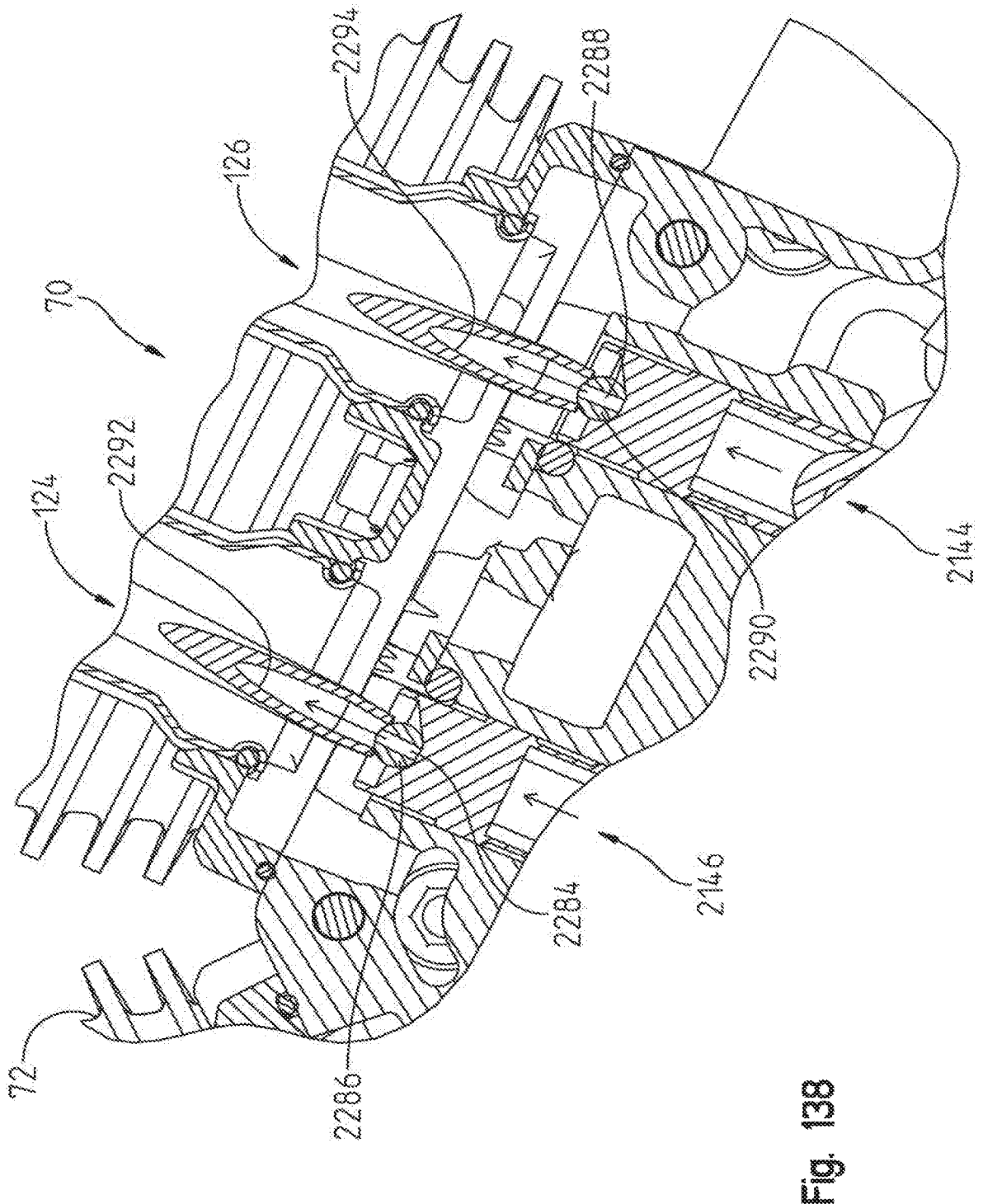
Figure 139:
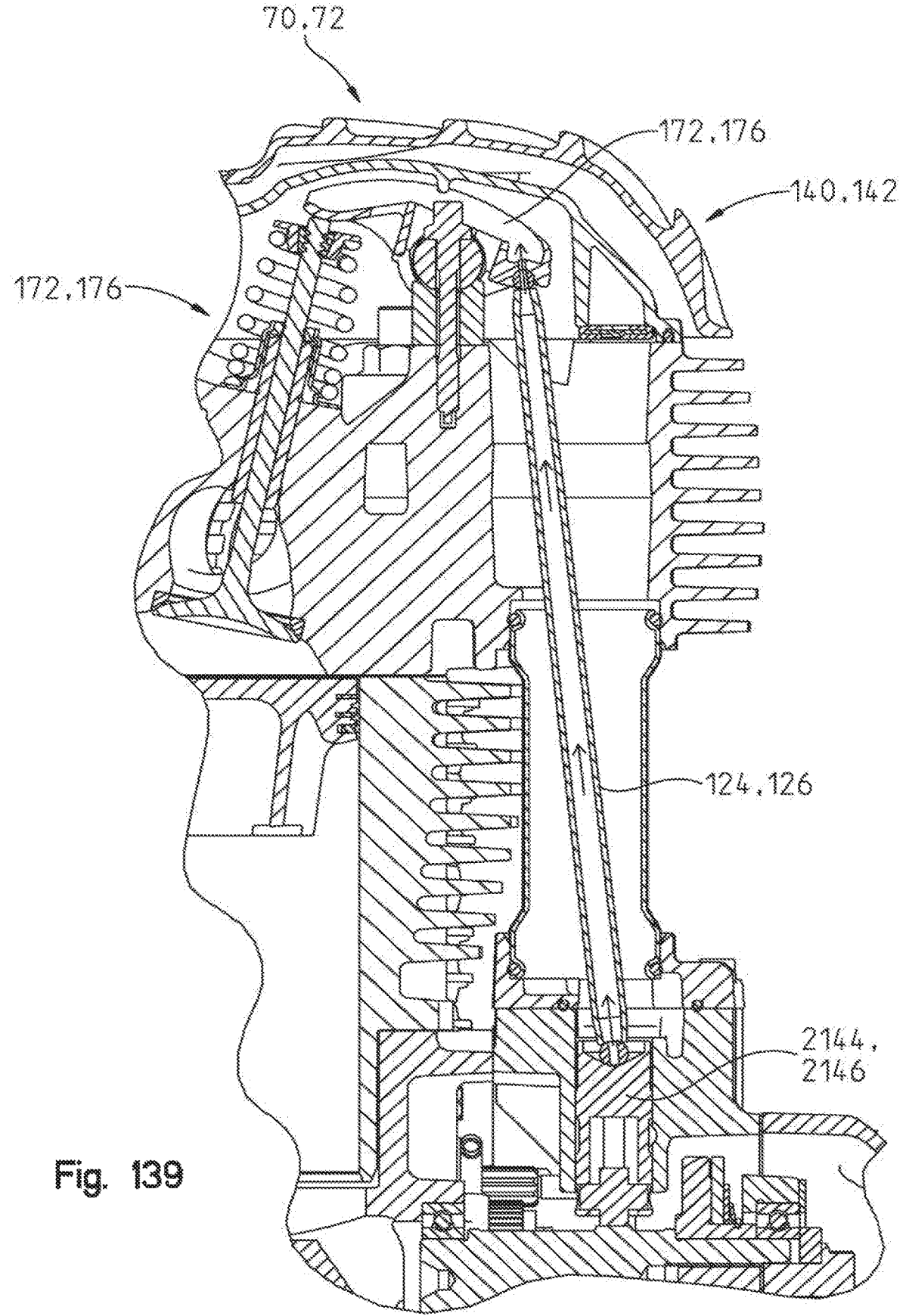
Figure 140:
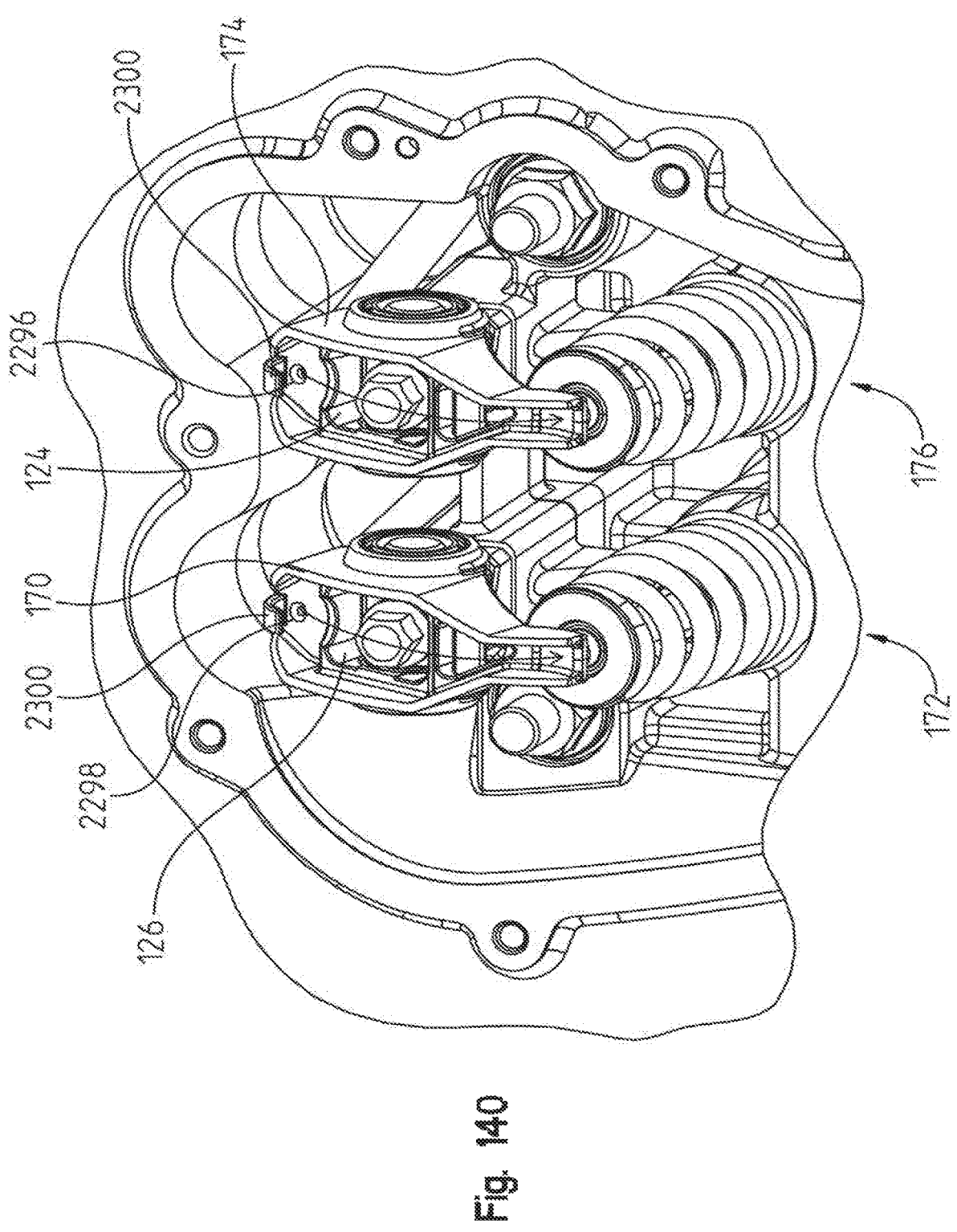
Figure 141:
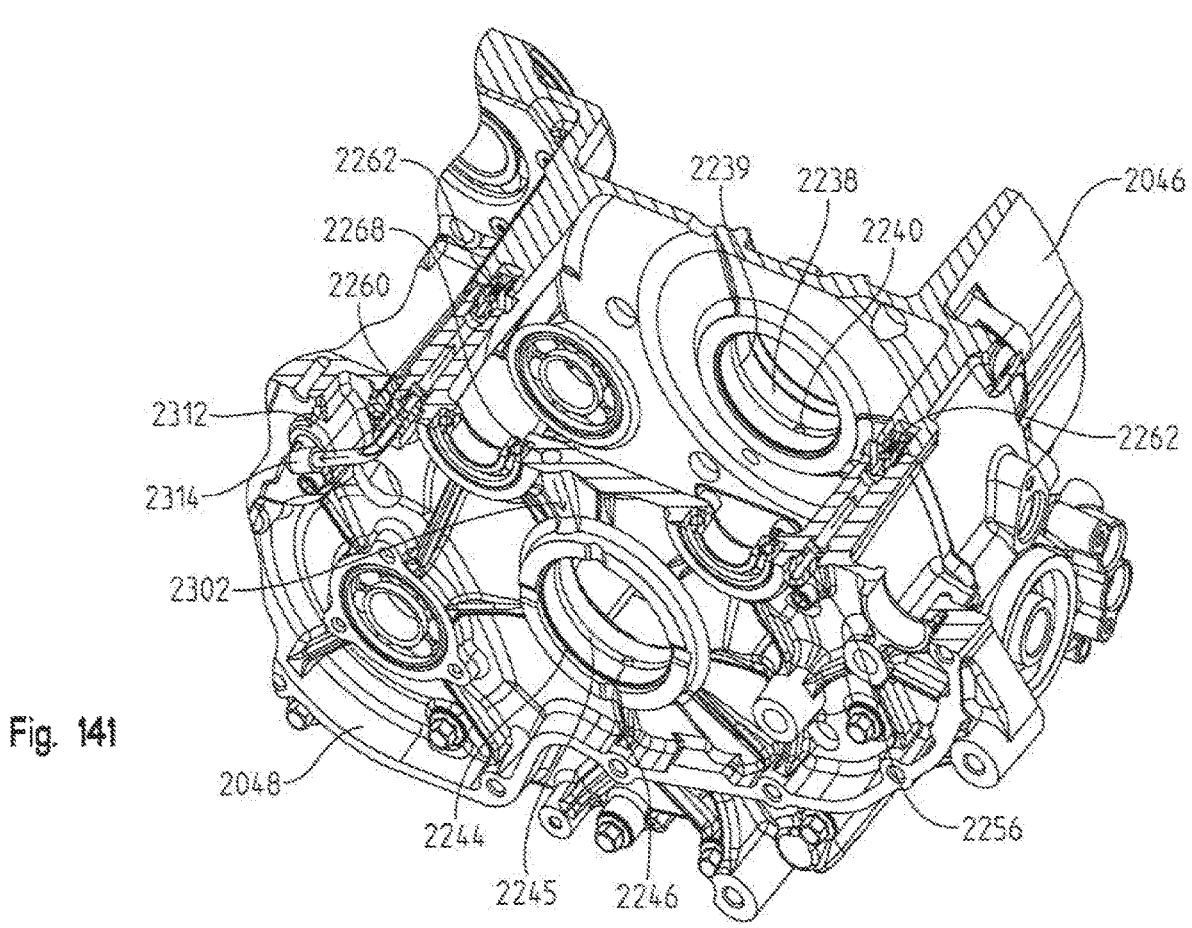
Figure 142:
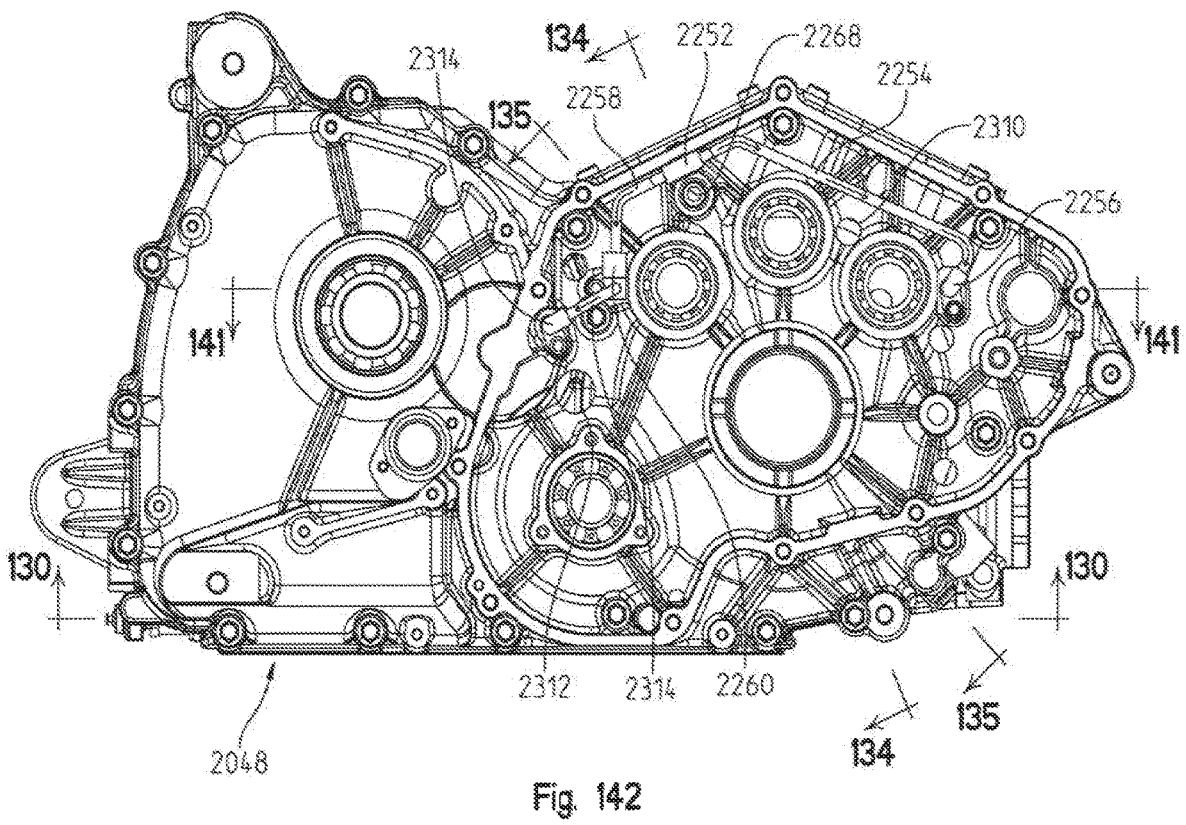
Figure 143:
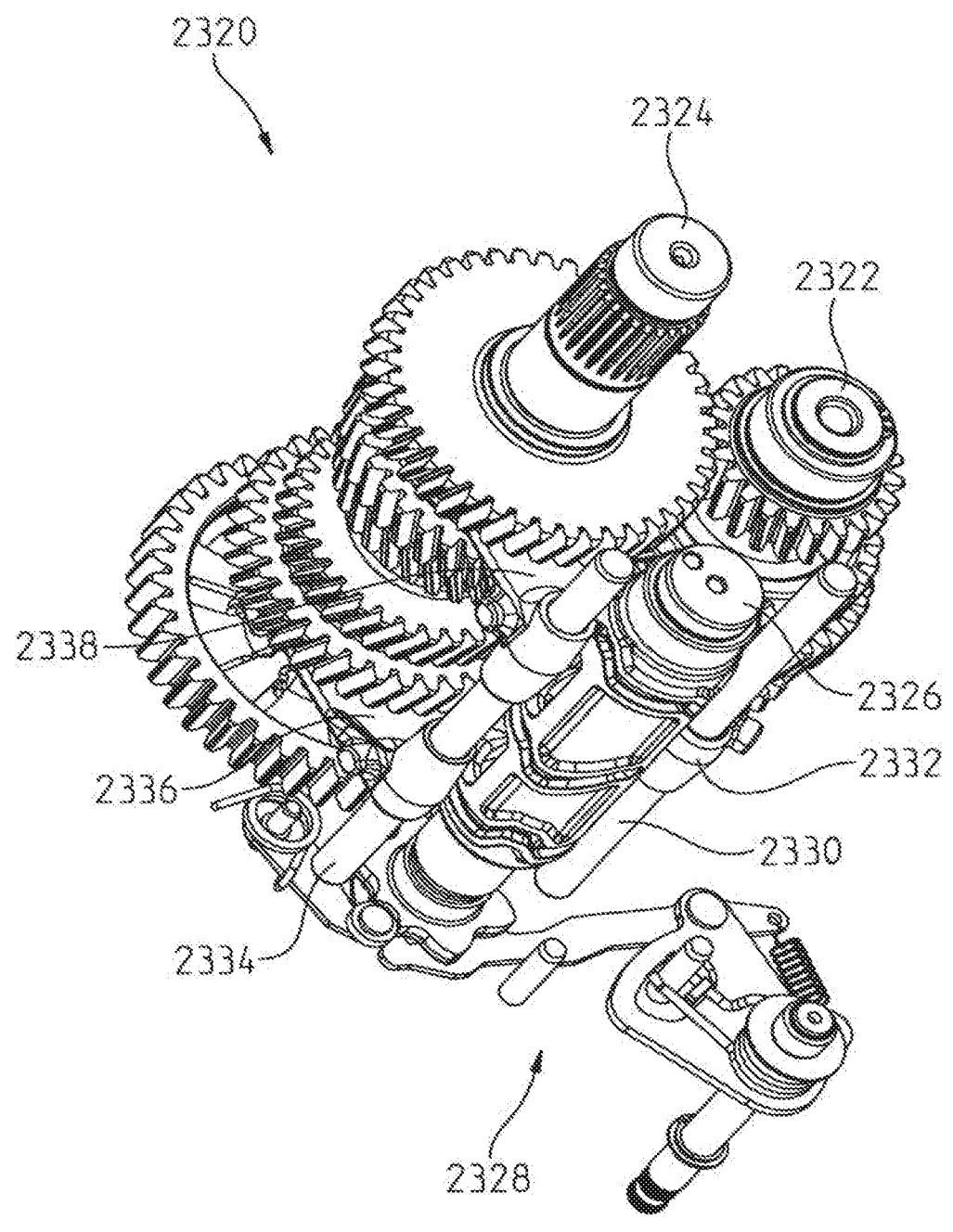
Figure 144:
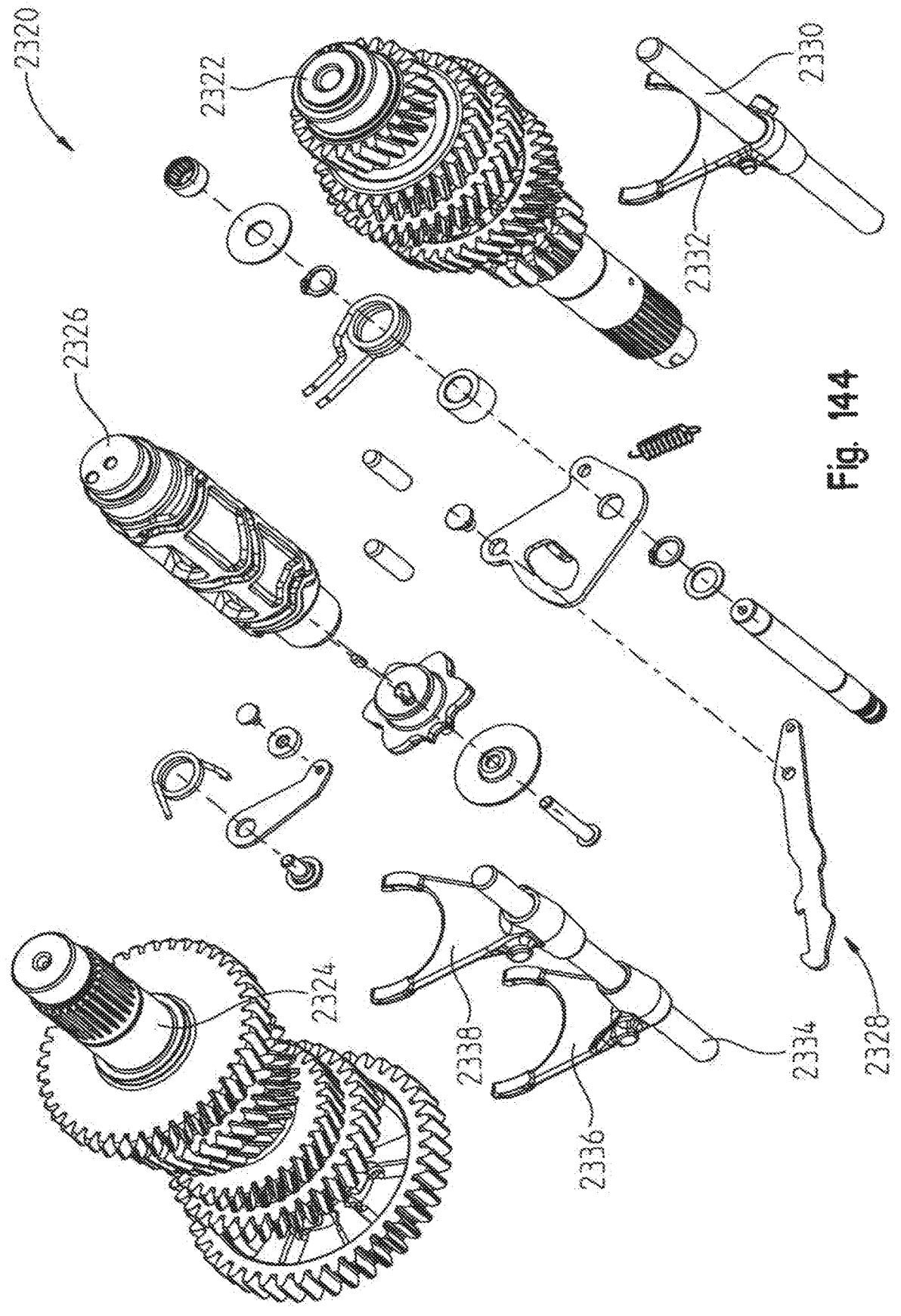
Figure 145:
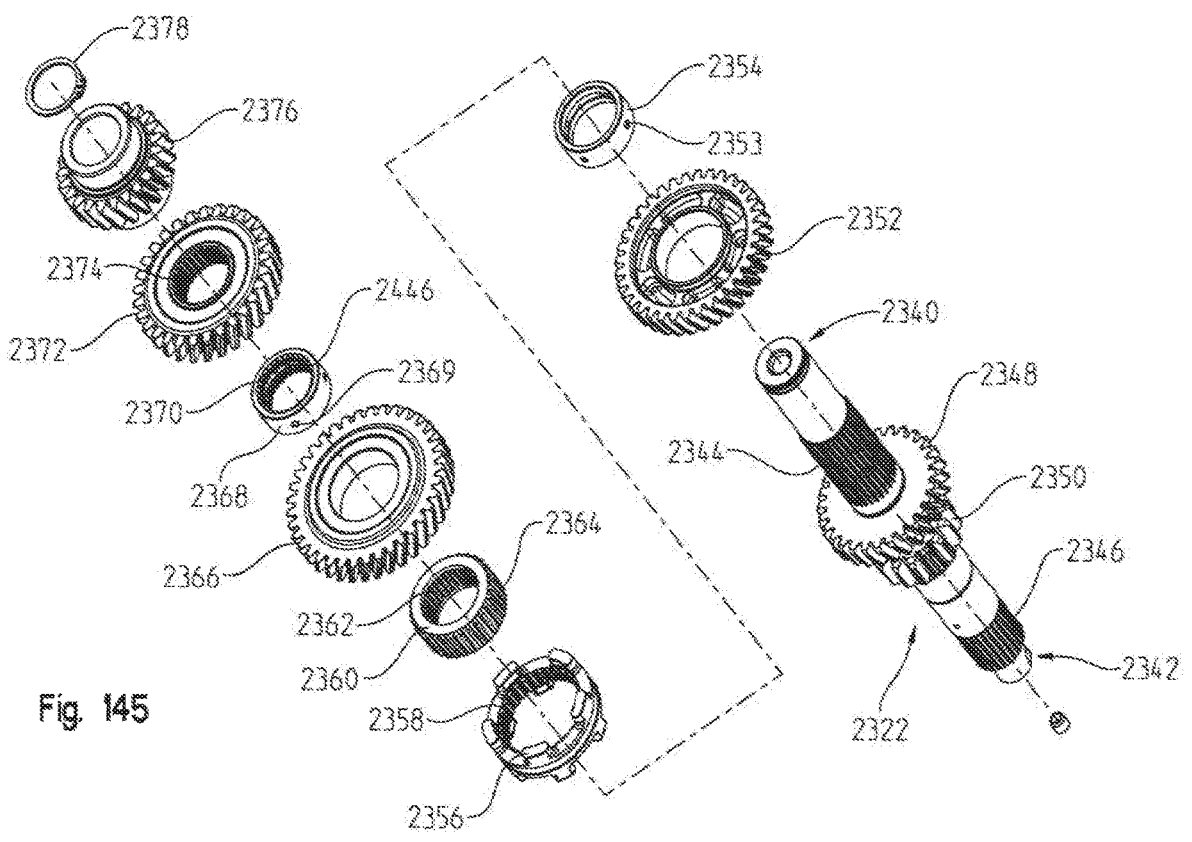
Figure 146:
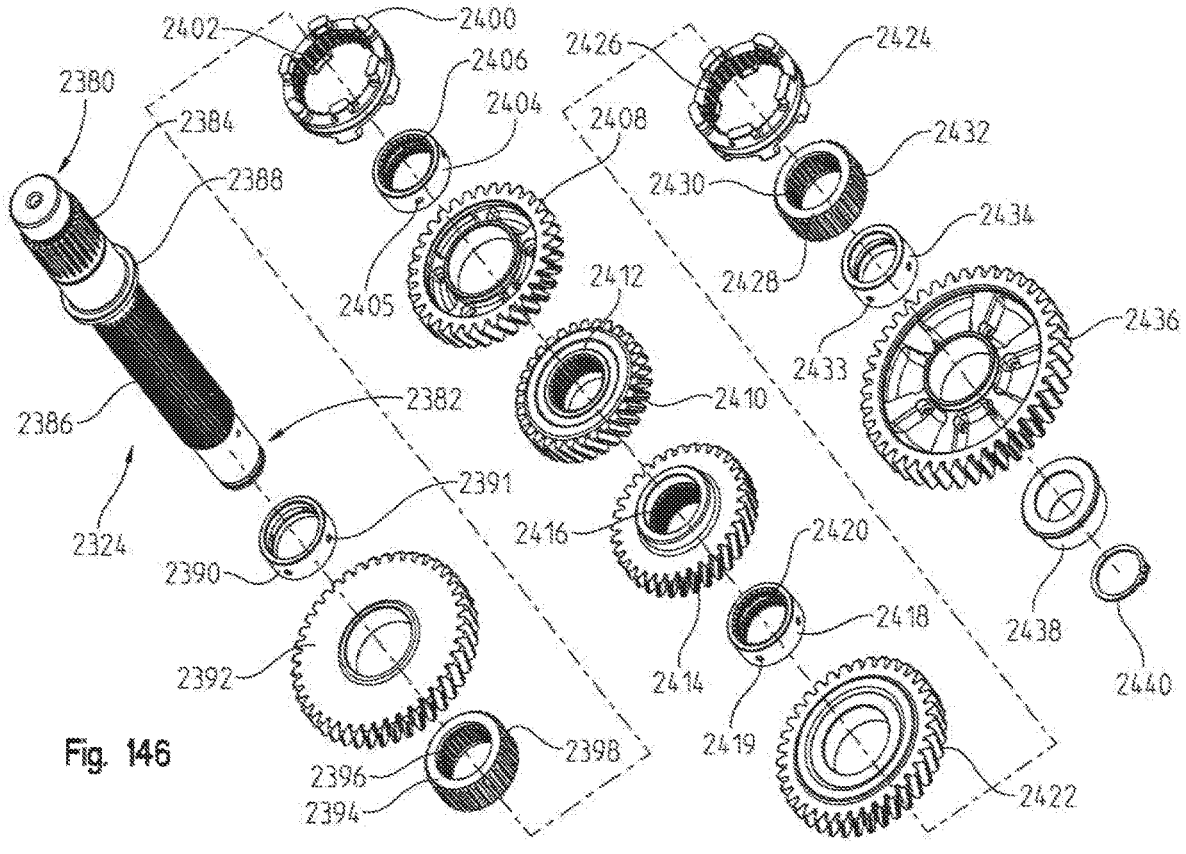
Figure 147:
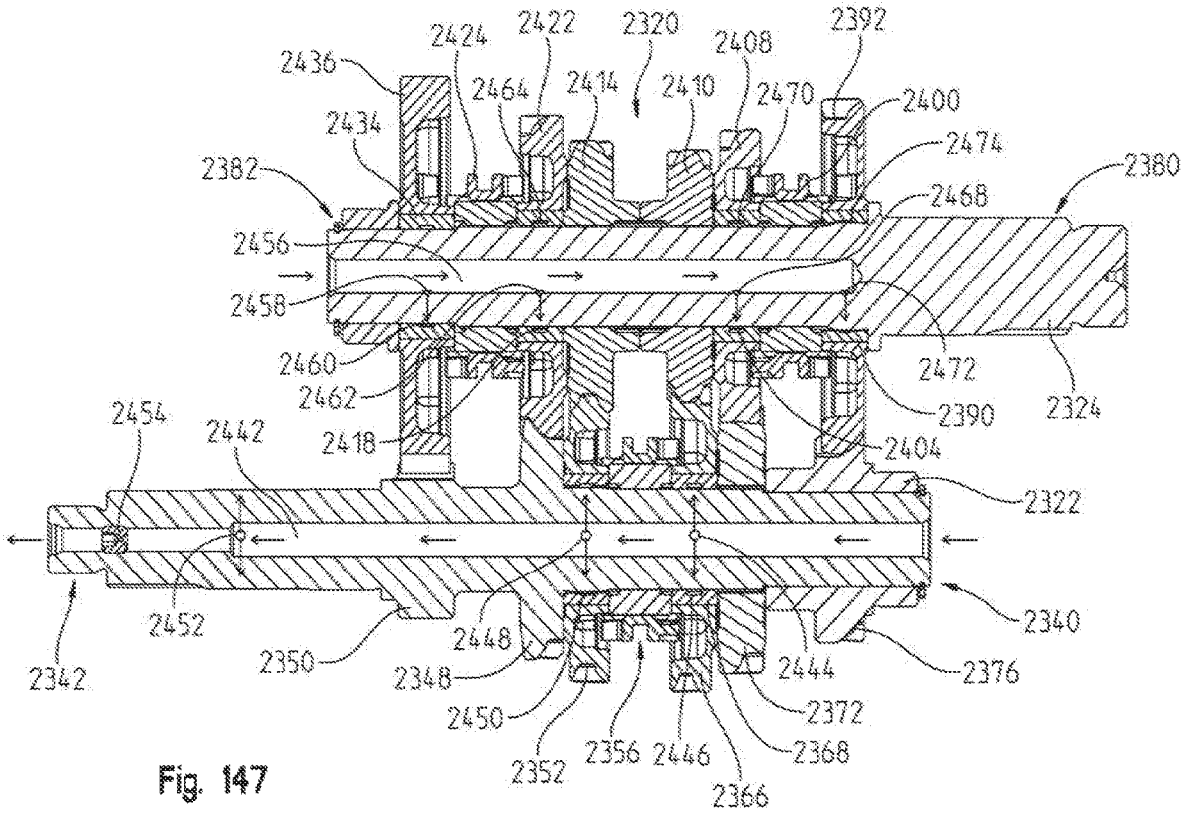
Figure 148:
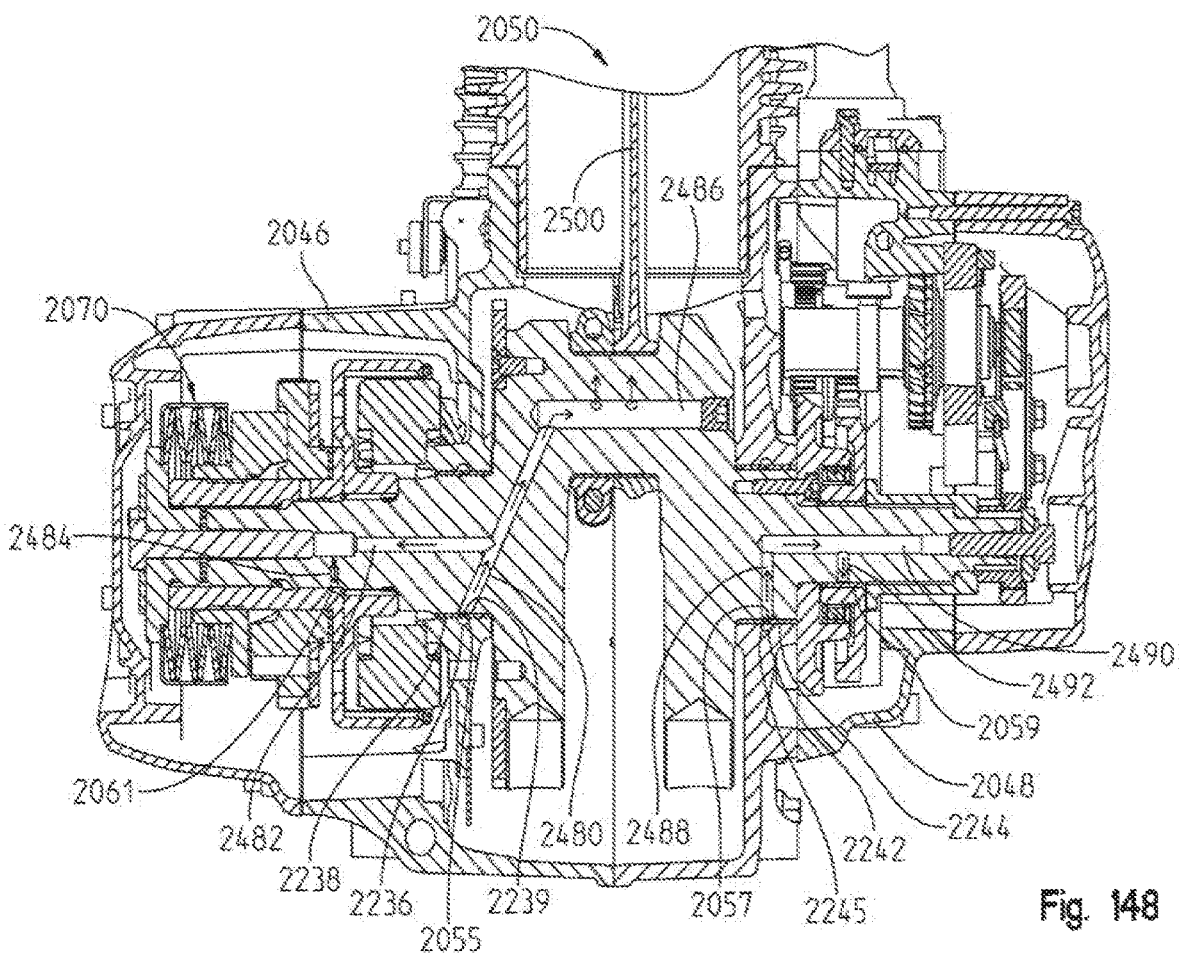
Figure 149:
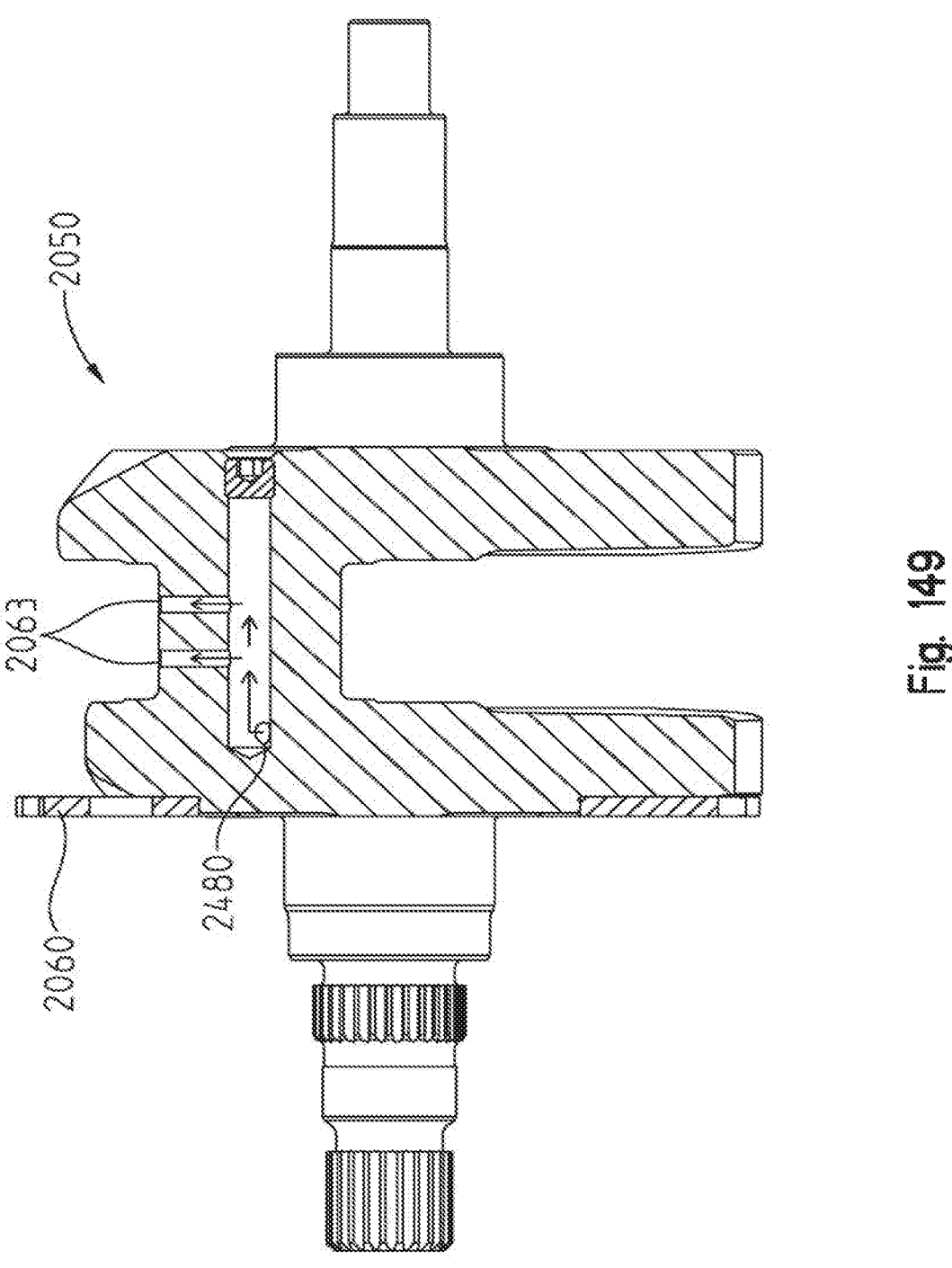
Figure 150:
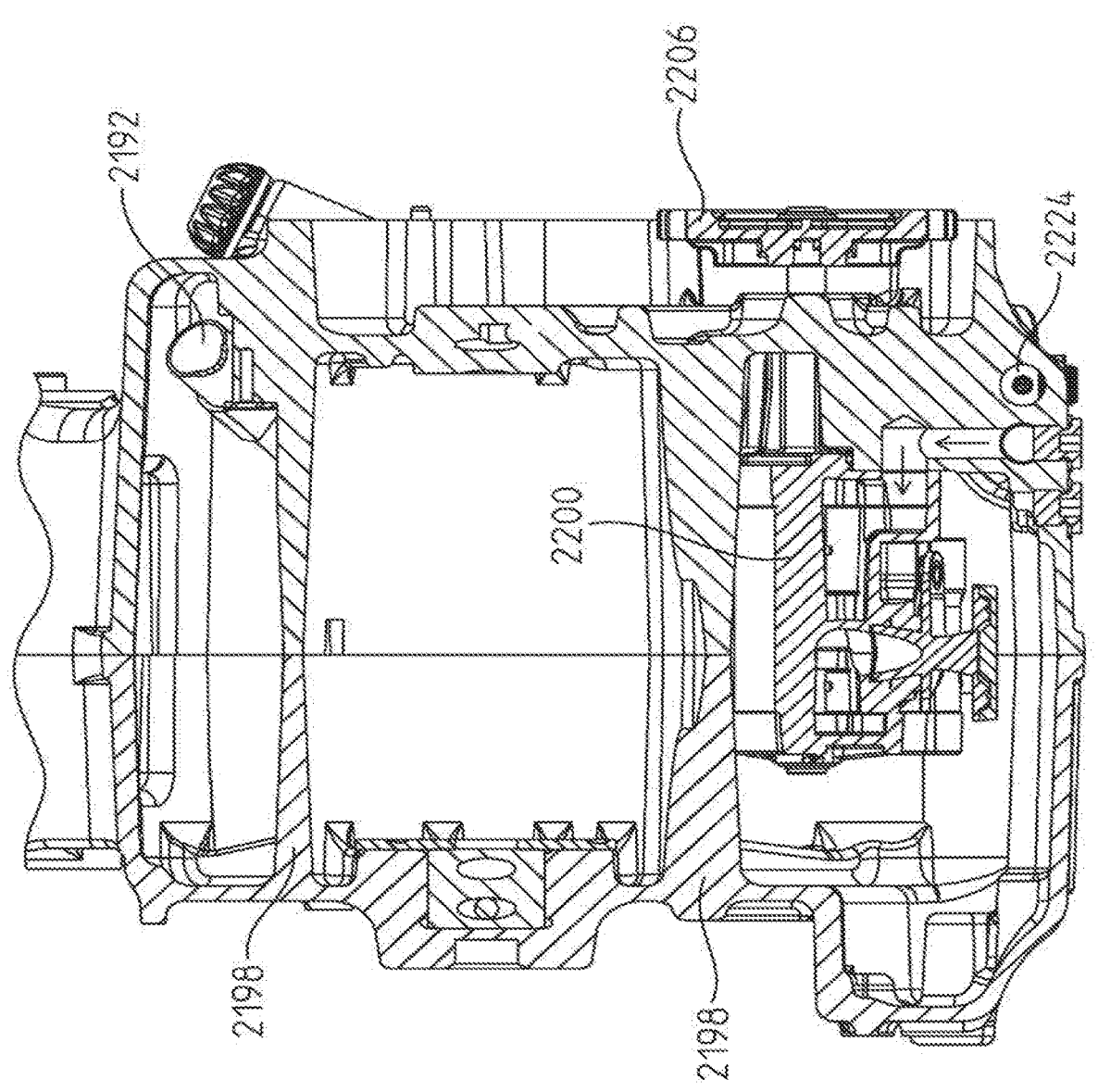
Figure 151:
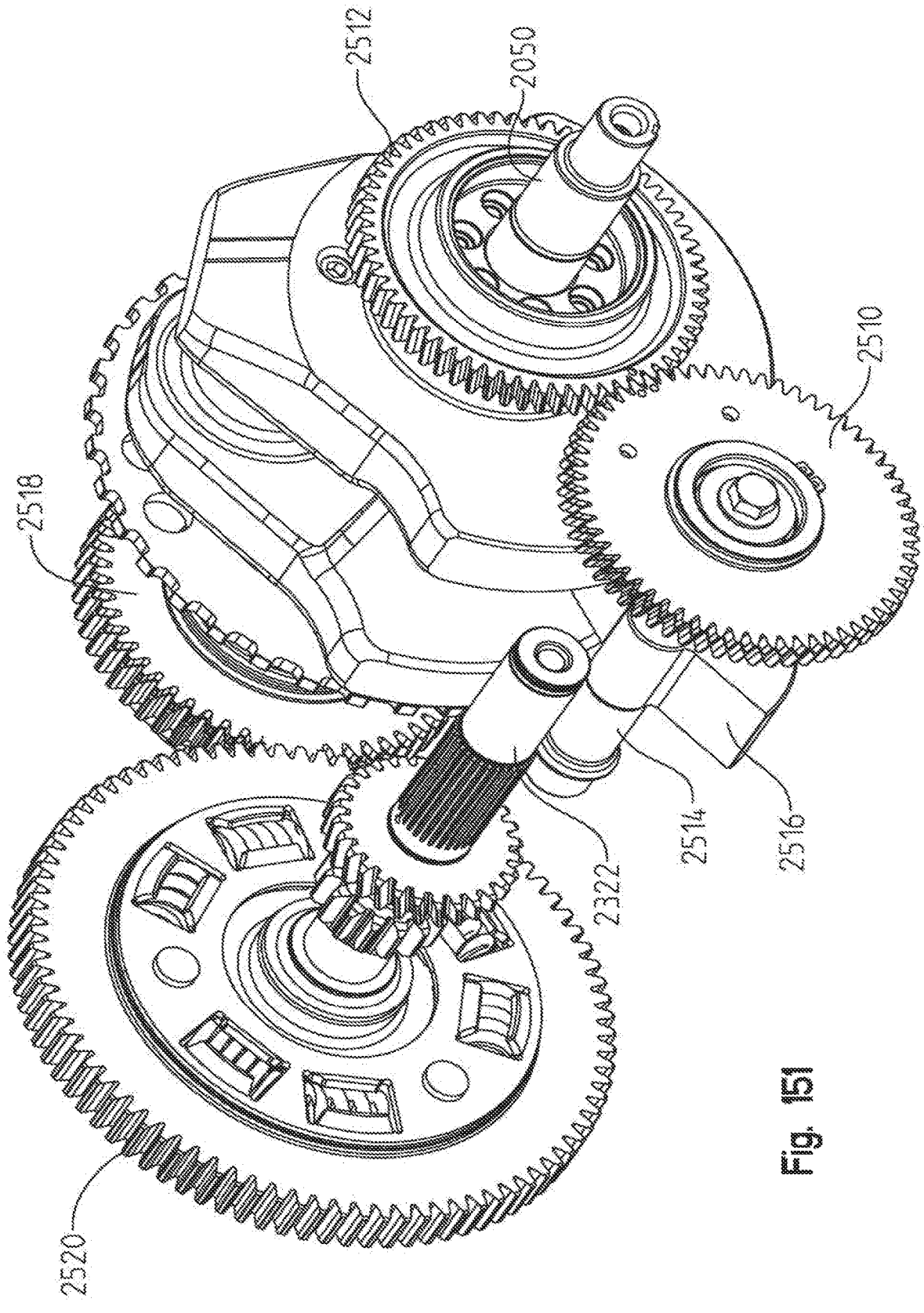
Figure 152:
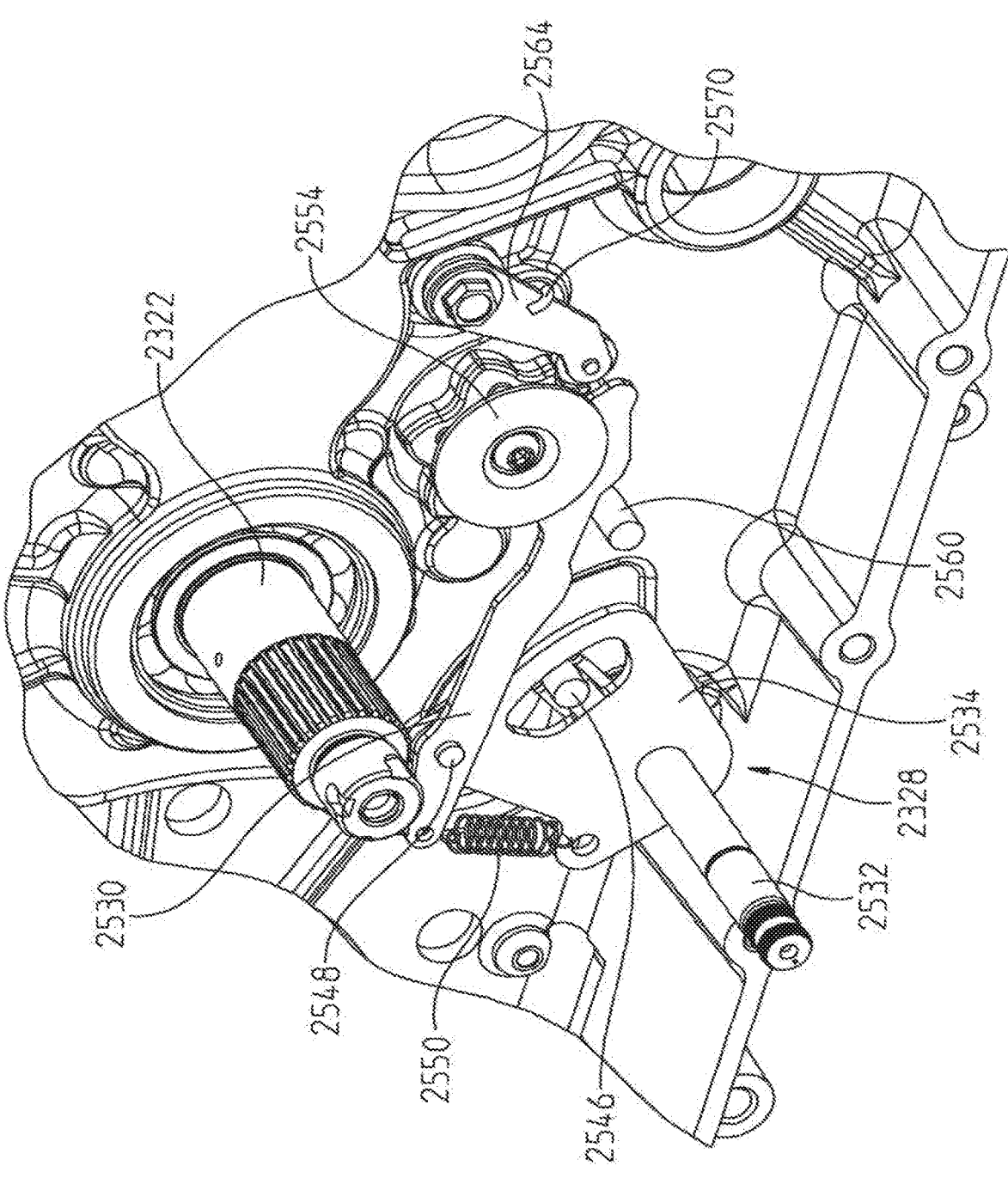
Figure 153:
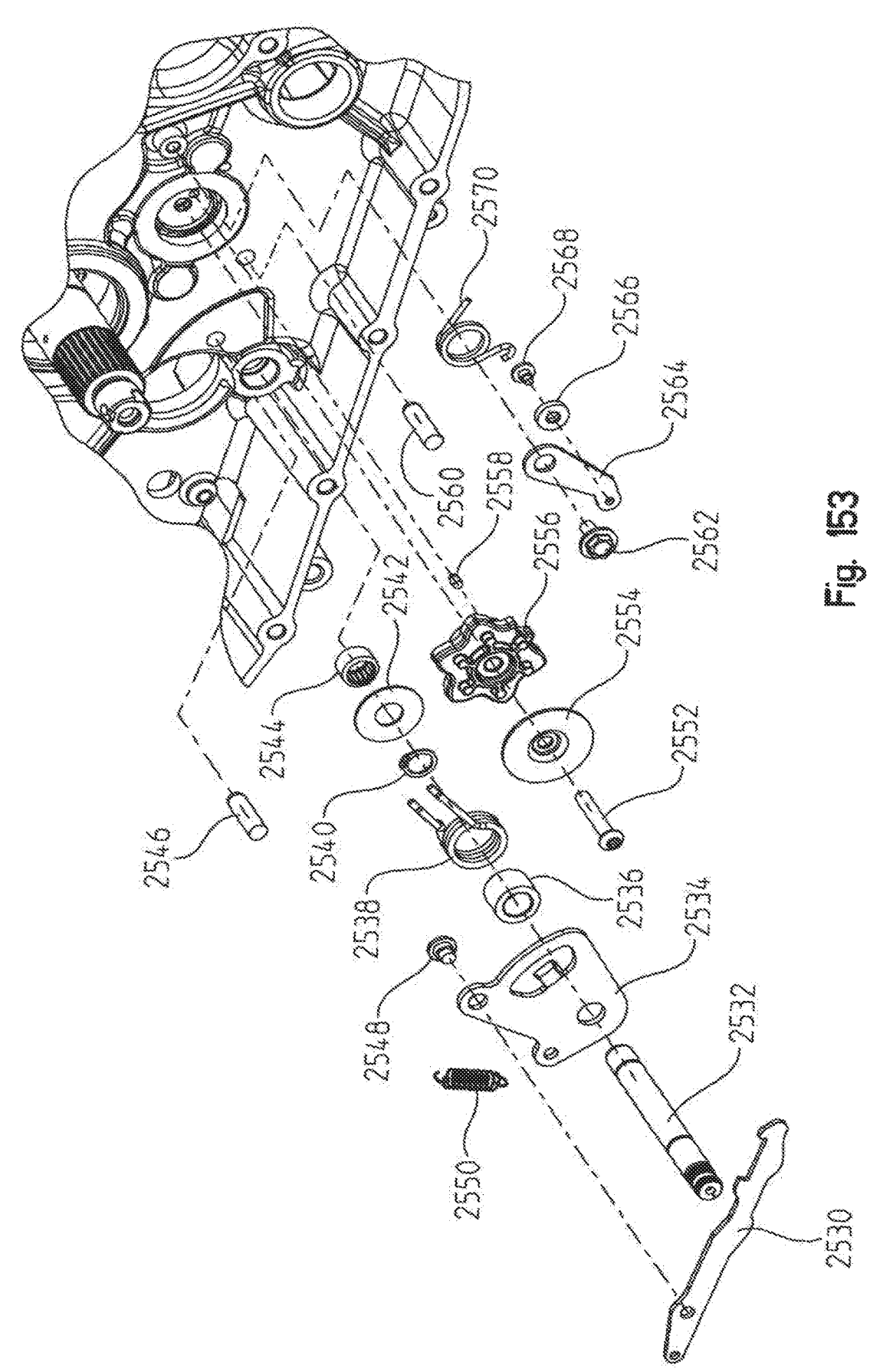

FIG. 124 Is a cross-sectional view of the decompression system of FIG. 123;

FIG. 125 is an exploded view of the decompression system of FIG. 123;

FIG. 126A is a cross-sectional view of the decompression system of FIG. 123 in an engaged state;

FIG. 126B is a cross-sectional view of the decompression system of FIG. 123 in an engaged state;

FIG. 127 is a side view of the crankcase of FIG. 120B;

FIG. 128 is a rear cross-sectional view of the crankcase of FIG. 127;

FIG. 129 is a further rear cross-sectional view of the crankcase of FIG. 127;

FIG. 130 is a bottom cross-sectional view of the crankcase of FIG. 127;

FIG. 131 is a front cross-sectional view of the crankcase of FIG. 127;

FIG. 132 is a side view of the crankcase of FIG. 127, including an oil casing;

FIG. 133 is a side view of the oil casing of FIG. 132;

FIG. 134 is a rear cross-sectional view of the crankcase and oil casing of FIG. 132;

FIG. 135 is a front cross-sectional view of the crankcase and oil casing of FIG. 132;

FIG. 136 is a side cross-sectional view of a portion of oil passagewars in the oil casing of FIG. 133;

FIG. 137 is a side cross-sectional view of another portion of oil passageways in theh oil casing of FIG. 133;

FIG. 138 is a side cross-sectional view of the cylinder of FIG. 127;

FIG. 139 is a side cross-sectional view of the cylinder of FIG. 138;

FIG. 140 is a top view of a cylinder head of the cylinder of FIG. 138;

FIG. 141 is a top cross-sectional view of the crankcase of FIG. 127;

FIG. 142 is a side view of the crankcase of FIG. 127;

FIG. 143 is a rear perspective view of a driveline assembly of the illustrative power train assembly;

FIG. 144 is an exploded view of the driveline assembly of FIG. 143;

FIG. 145 is an exploded view of an input shaft of the driveline assembly of FIG. 1443;

FIG. 146 is an exploded view of an output shaft of the driveline assembly of FIG. 143;

FIG. 147 is a top cross-sectional view of the input shaft and the output shaft of the driveline assembly of FIG. 143;

FIG. 148 is a side cross-sectional view of the crankshaft of FIG. 109;

FIG. 149 is a partial cross-sectional view of the crankshaft of FIG. 109;

FIG. 150 is a rear cross-sectional view of the crankcase of FIG. 127;

FIG. 151 is a rear perspective view of a portion of the driveline assembly of FIG. 143 coupled to the crankshaft;

FIG. 152 is a rear perspective view of a ratchet shifter assembly of the driveline assembly of FIG. 143;

FIG. 153 is an exploded view of the ratchet shifter assembly of FIG. 152; and

Figure 154:
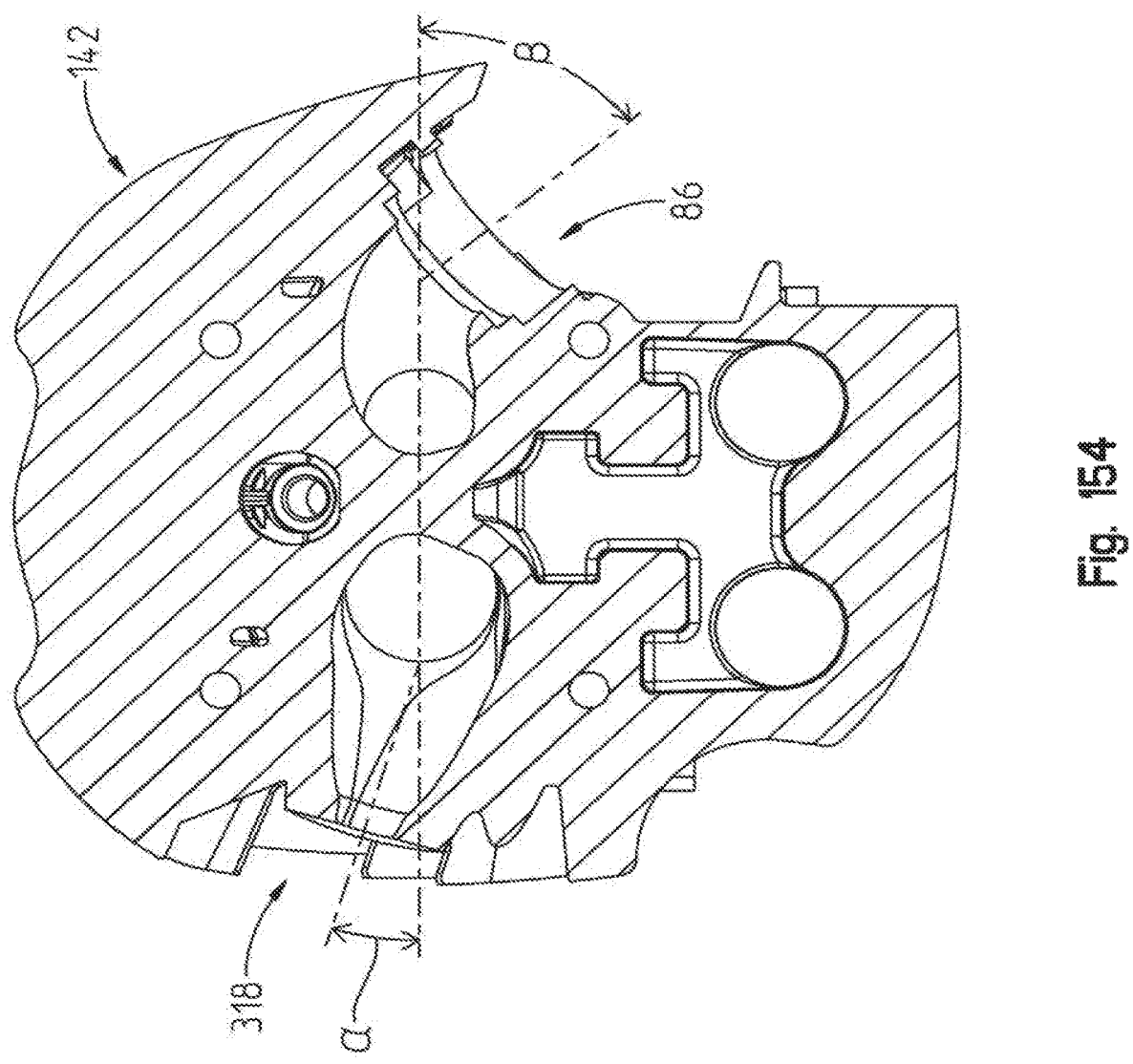

FIG. 154 is a top cross-sectional view of a cylinder head.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a touring motorcycle, it should be understood, that the invention may have application to other types of vehicles such as all-terrain vehicles, motorcycles, watercraft, utility vehicles, scooters, golf carts, and mopeds.

With reference first to FIGS. 1-7, an illustrative embodiment of a two-wheeled vehicle 2 is shown. Vehicle 2 as illustrated is a touring style motorcycle although the majority of components may be used for a cruiser style motorcycle as described herein. Vehicle 2 may also include any features known from U.S. Provisional Patent Application Ser. No. 60/880,999, filed Jan. 17, 2007, entitled "TWO-WHEELED VEHICLE", the disclosure of which is expressly incorporated by reference herein.

U.S. patent application Ser. No. 11/624,103 filed Jan. 17, 2007, entitled "FUEL TANK ARRANGEMENT FOR A VEHICLE," (now U.S. Pat. No. 7,748,746 (2010 Jul. 6)); U.S. patent application Ser. No. 11/624,142 filed Jan. 17, 2007, entitled "REAR SUSPENSION FOR A TWO WHEELED VEHICLE," (now U.S. Pat. No. 7,669,682 (2010 Mar. 2)); U.S. patent application Ser. No. 11/324,144 filed Jan. 17, 2007, entitled "TIP OVER STRUCTURE FOR A TWO WHEELED VEHICLE," (now U.S. Pat. No. 7,658, 395 (2010 Feb. 9)); and U.S. Provisional Patent Application Ser. No. 60/880,909 filed Jan. 17, 2007, entitled "TWO-WHEELED VEHICLE", are also expressly incorporated by reference herein.

Vehicle 2 includes a frame 4 (FIG. 3) supported by ground engaging members, namely a front ground engaging member, illustratively wheel 6, and a rear ground engaging member, illustratively wheel 8. Vehicle 2 travels relative to the ground on front wheel 6 and rear wheel 8.

Rear wheel 8 is coupled to a power train assembly 10, to propel the vehicle 2 through rear wheel. Power train assembly 10 includes both an engine 12 and transmission 14. Transmission 14 is coupled to engine 12 which provides power to rear wheel 8. In the illustrated embodiment, engine 12 is a 50° v-twin spark-ignition gasoline engine available from Polaris Industries, Inc. located at 2100 Highway 55 in Medina, MN 55340. In alternative embodiments, rear wheel 8 is coupled to the drive shaft through a chain drive or other suitable couplings. The drive arrangement in the illustrated embodiment is comprised of a six speed overdrive constant mesh transmission with a carbon fiber reinforced belt available from Polaris Industries, Inc. In alternative embodiments, the transmission is a continuous variable transmission.

It will be appreciated that while the vehicle 2 is illustrated as a two-wheel vehicle, various embodiments of the present teachings are also operable with three, four, six etc. wheeled vehicles. It will also be appreciated that while a spark-ignition gasoline engine is illustrated, electric motors, and other suitable torque-generating machines are operable with various embodiments of the present teachings.

Figure 6:
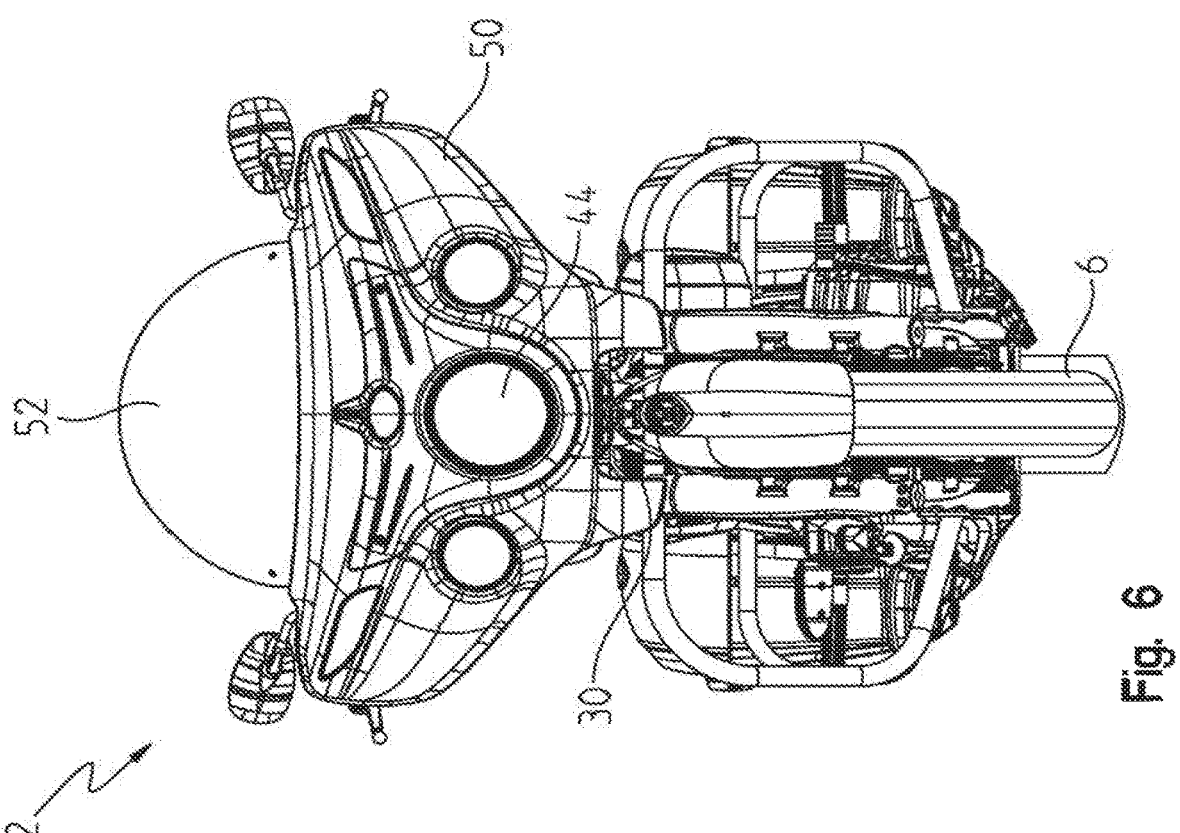
FIG. 6 is a front view of the two-wheeled vehicle of FIG. 1.

Motorcycle 2 also generally includes a steering assembly 20, front suspension 22, rear suspension 24 (FIG. 3), and seat 26. Steering assembly 20 includes handlebars 28 which may be moved by an operator to rotate front wheel 6 either to the left or the right, where steering assembly is coupled to the motorcycle through triple clamp assembly 30 (FIG. 6). Engine operating systems are also included such as an air intake system 32 and exhaust system 34. Operator controls are also provided for operating and controlling vehicle 2, which may include vehicle starting system 36, electronic throttle control (ETC) 38, vehicle speed controls 40 and vehicle braking systems 42. Safety systems may also be provided such as main lighting 44, front turn signals 46, and rear turn signals 48. Ergonomic systems may include front fairing 50, windshield assembly 52 and saddlebag assembly 54. With reference now to FIGS. 8-23, power train assembly 10 will be described in greater detail.

With reference now to FIGS. 8-11, power train 10 is generally comprised of first and second cylinders 70, 72 provided on a power train housing 74. It should be appreciated that engine and transmission are integrated into one unit with an output drive at 76 as shown best in FIG. 10. A cover 78 (FIG. 4) is provided to cover output drive 76 and belt (not shown). Cover 76 may be a cast component and may be isolated with a gasket or other isolating member to avoid vibrations. Power train 10 further comprises air cleaner assembly 80 as part of air intake system 32, oil conditioning assembly 82, and exhaust ports (see FIG. 10) as part of exhaust system 34.

Figure 12:
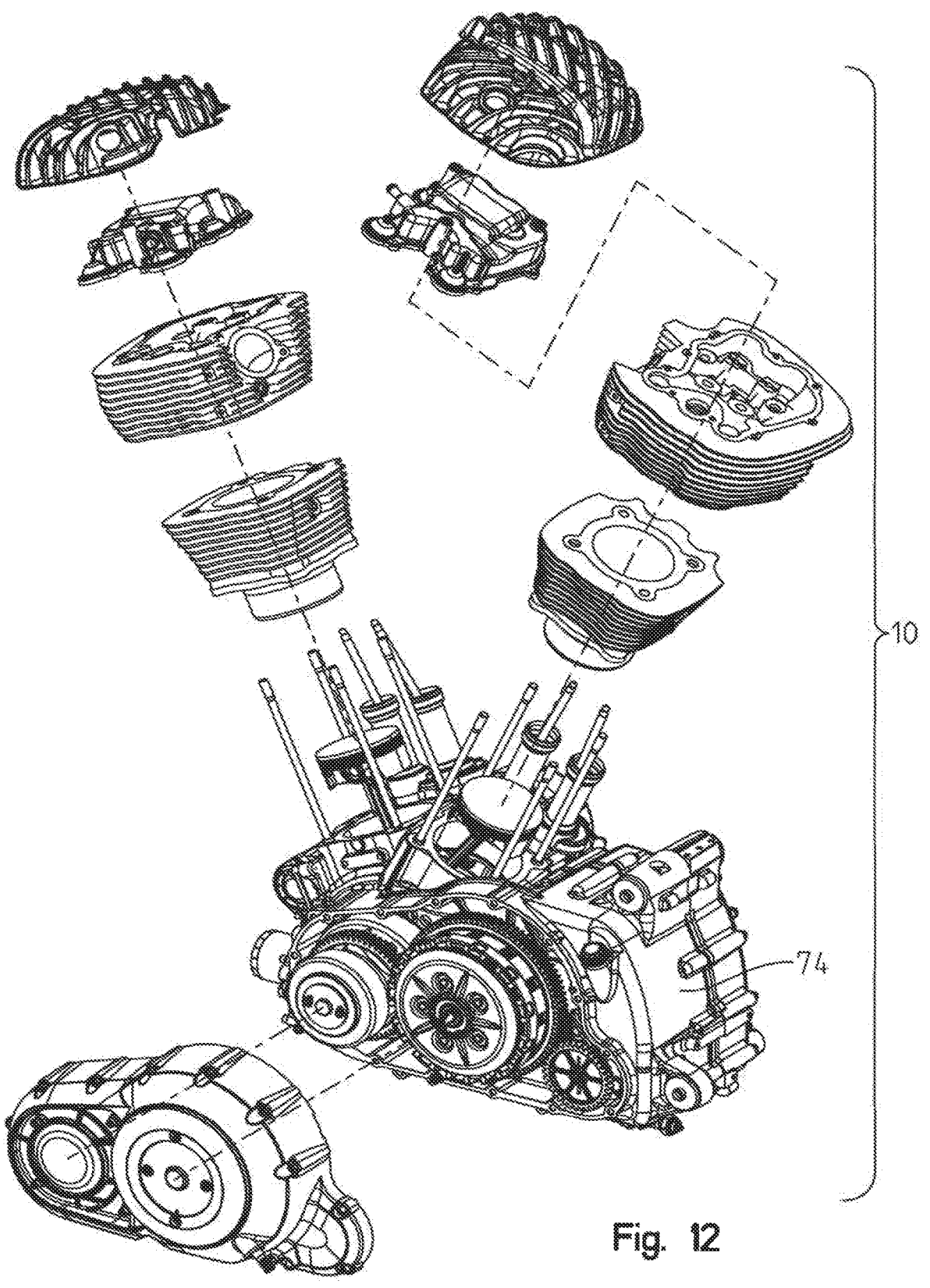
FIG. 12 is a left perspective view of the power train assembly of FIG. 8 in a partially exploded manner.
Figure 13:
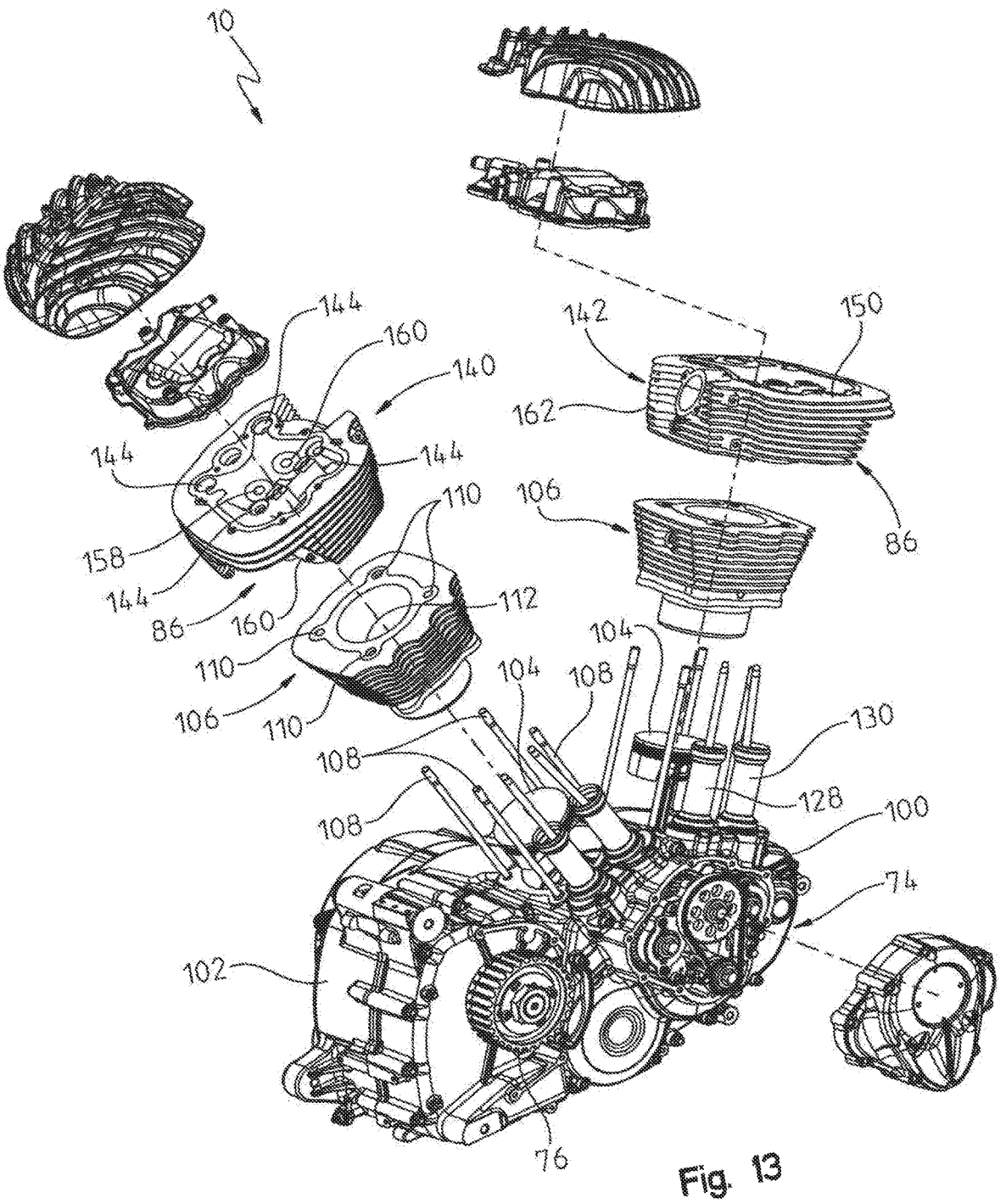
FIG. 13 is a right perspective view of the power train assembly of FIG. 8 in a partially exploded manner.
Figure 13A:
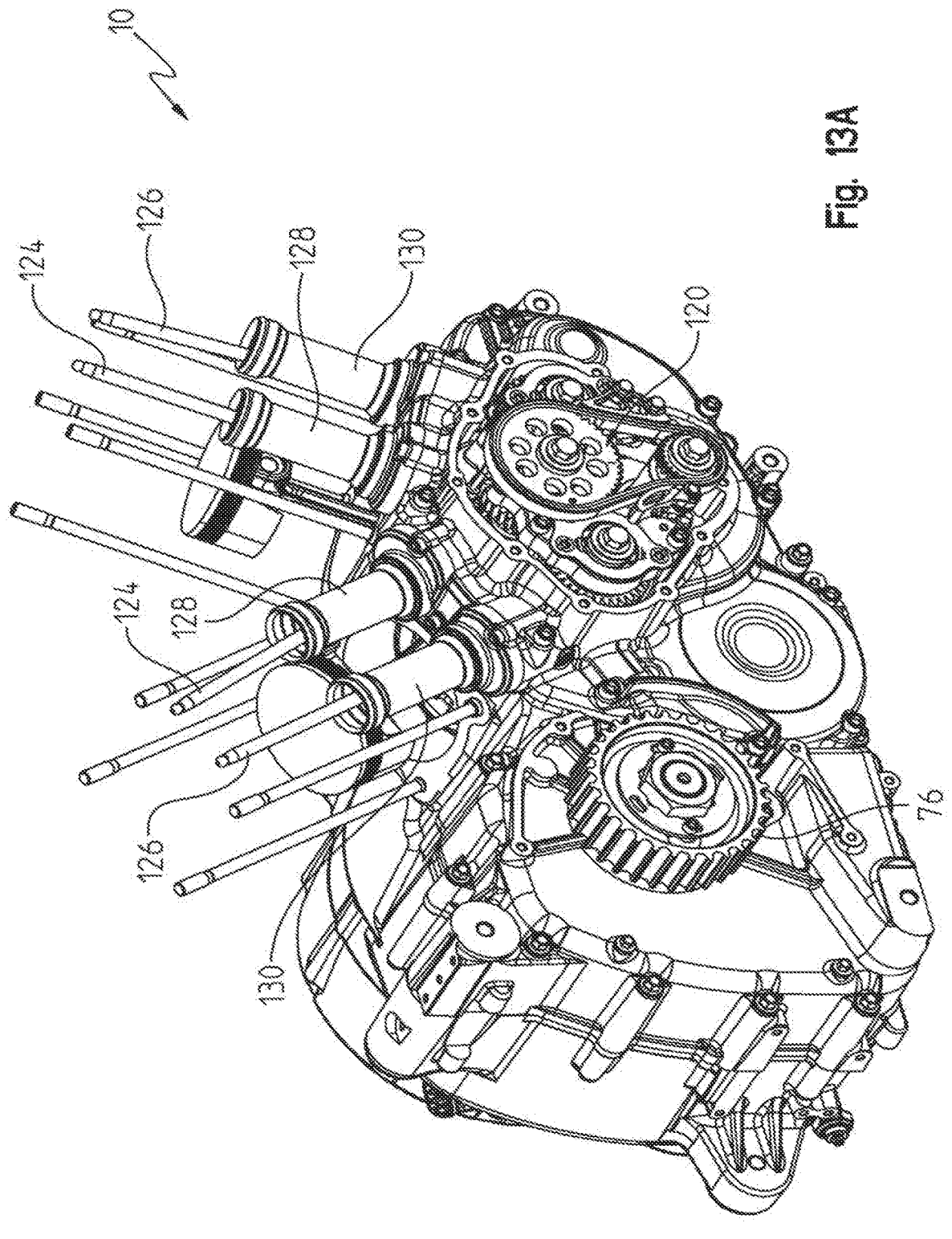
FIG. 13A is an enlarged view of a housing of the power train assembly shown in FIG. 13.

As shown in FIGS. 12 and 13, power train housing 74 defines engine crankcase 100 and a transmission housing 102. As shown in FIG. 13, power train 10 includes a crankshaft driven by pistons 104 and which reciprocate in cylinders 106 as in known in the art. Cylinders 106 may be configured to accommodate various sizes of pistons 104. As shown, four threaded studs 108 are coupled to crankcase 100 and are received in apertures 110 of the cylinder 106 and in particular within cylinder bore 112. As shown best in FIG. 13A, power train 10 further comprises cam assembly 120 comprised of a single center intake cam, which cooperates to reciprocate intake push rods 124 and two exhaust cams, which cooperate to reciprocate exhaust push rods 126. Push rods 124 extend through guides 128 whereas push rods 126 extend through guides 130.

With reference again to FIG. 13, power train further comprises heads 140 and 142 having apertures 144 for receipt of studs 108 there through. This places the head 140 and 142 over cylinders 106 and defining a combustion chamber there between. With reference still to FIG. 13, heads 140 and 142 include an extension portion shown for example at 150, which extends outwardly from cylinders 106 and couples with the guides 128, 130 and allow push rods 124, 126 to pass through heads 140, 142. As the exhaust valve push rods 126 are the outward most push rods, exhaust valves extend through apertures 158 and intake valves extend through apertures 160. Thus the outer corners of the heads 140, 142 are notched out at 160, 162 for placement of exhaust ports 86, (see also FIG. 10). The valve assembly is shown in greater detail in FIG. 14 where rocker arm 170 is coupled with push rod 126 to operate exhaust valve 172 and rocker arm 174 couples with push rod 124 to operate intake valve 176.

Figure 18:
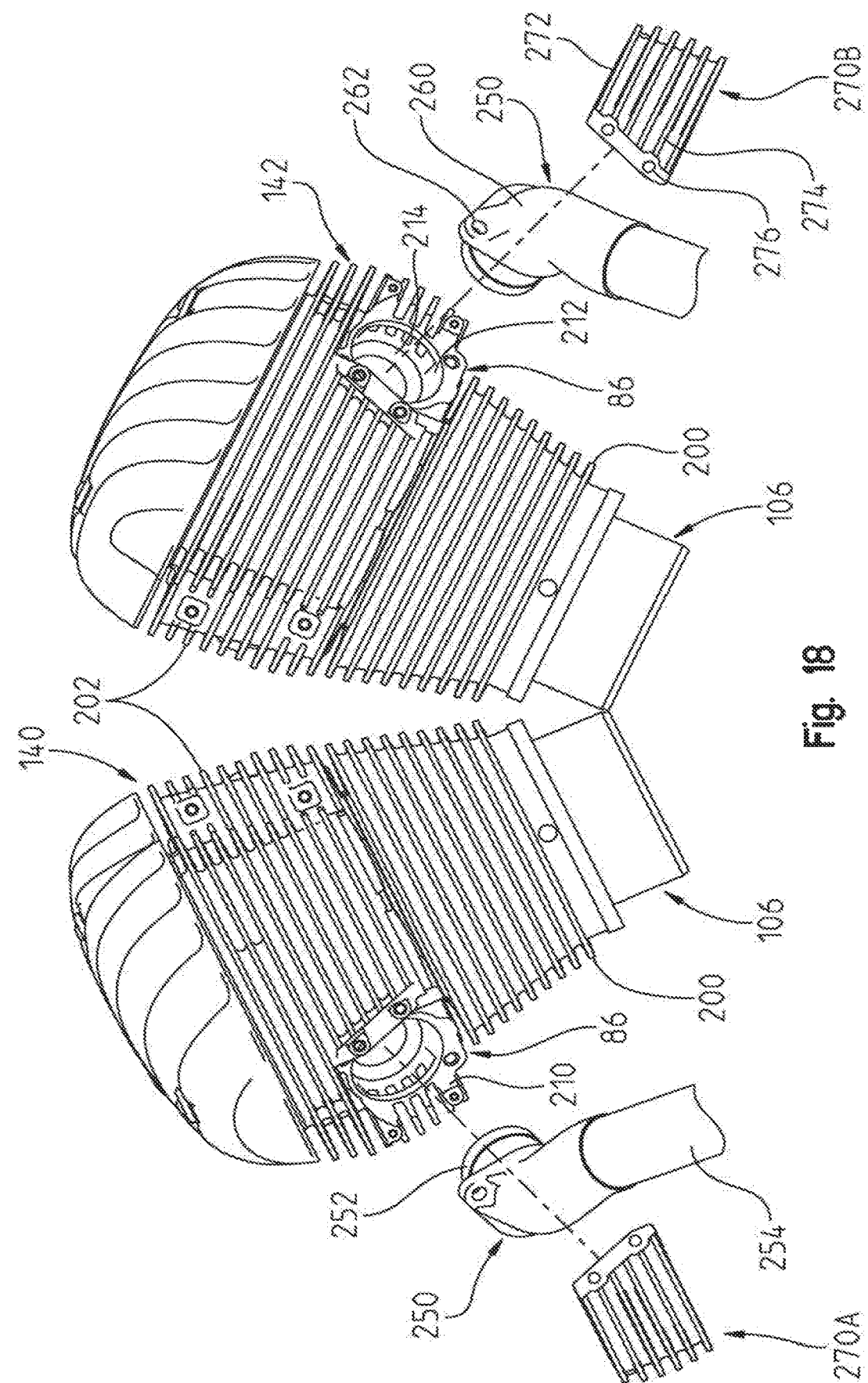
FIG. 18 is a side view showing exhaust manifolds exploded away from the heads.
Figure 19:
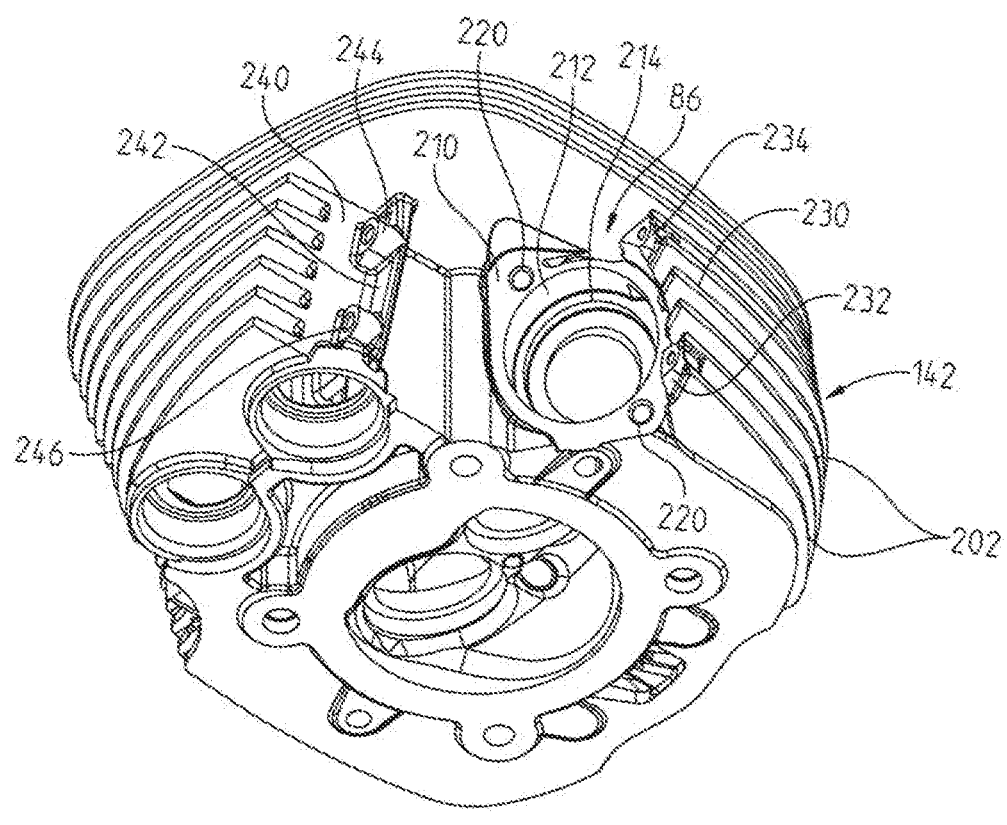
FIG. 19 is an underside perspective view showing an exhaust port.

With reference now to FIGS. 18 and 19, exhaust ports 86 are shown in greater detail as positioned in heads 140, 142. As shown, each of the combination of cylinders 106 and heads 140, 142, include a plurality of cooling fins 200, 202, which extend along a substantial length of the cylinders 106 and heads 140, 142. Exhaust ports 86 are defined as a recess within cooling fins 202 and define flat planar flange surfaces at 210; a first diameter bore at 212 and a reduced cross sectional bore at 214. Head 142 is shown in FIG. 19 with flange 210 in greater detail having threaded apertures at 220. As also shown, port 86 defines terminal ends 230 of fins 202 adjacent to flange 210 having bosses 232 defining apertures 234. Port 86 also defines a terminal edge 240 defining upstanding wall 242 having bosses 244 having threaded apertures at 246. As shown in FIG. 18, exhaust manifolds 250 define a substantial 90° bend between coupling portions 252 and exhaust pipes 254. Exhaust manifolds 250 further comprise flanges 260 which correspond with flanges 210 on the heads 140, 142 and include corresponding apertures at 262 which align with threaded apertures 220 (FIG. 19). Thus is should be understood that exhaust manifolds 250 position tightly within the interruption of the fins between surfaces 230, 242 and provide a clean look for the exhaust extending substantially downwardly from the engine and streamlined with the power train housing. Exhaust manifold covers 270a and 270b (FIG. 18) are L-shaped covers and correspond to fit between surfaces 230 and 240 including a planar wall at 272 having fins at 274. Each of the covers 270a, 270b include pegs (not shown) which correspond with apertures 234 and include apertures 276 which correspond with threaded apertures 246 (FIG. 19). Thus the combination of the 90° bend in the exhaust manifold 250 and the contoured covers 270a, 270b again provide a clean look to the engine and in fact simulate a "flat head" type retro engine for the motorcycle of the present disclosure.

Referring to FIG. 154, exhaust port 86 on cylinder head 142 of cylinder 70 is angled within cylinder head 142. Illustratively, exhaust port is positioned at an angle β. In one embodiment angle β is between approximately 00 and 50°. Illustratively, angle β is 49°. Exhaust port 86 on cylinder head 140 of cylinder 72 may be angled in the same manner.

Figure 8:
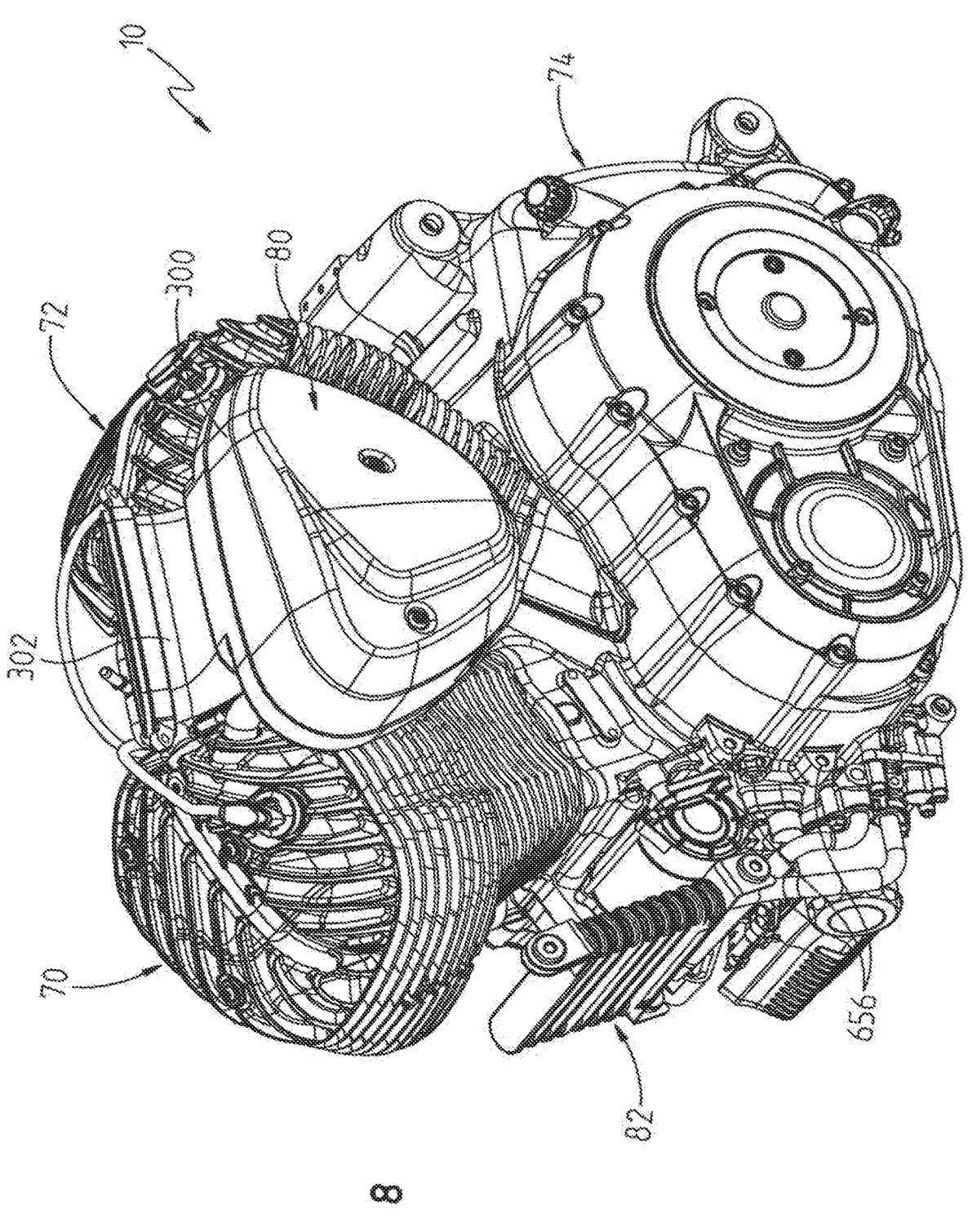
FIG. 8 is a left front perspective view of a power train assembly of the present disclosure.
Figure 9:
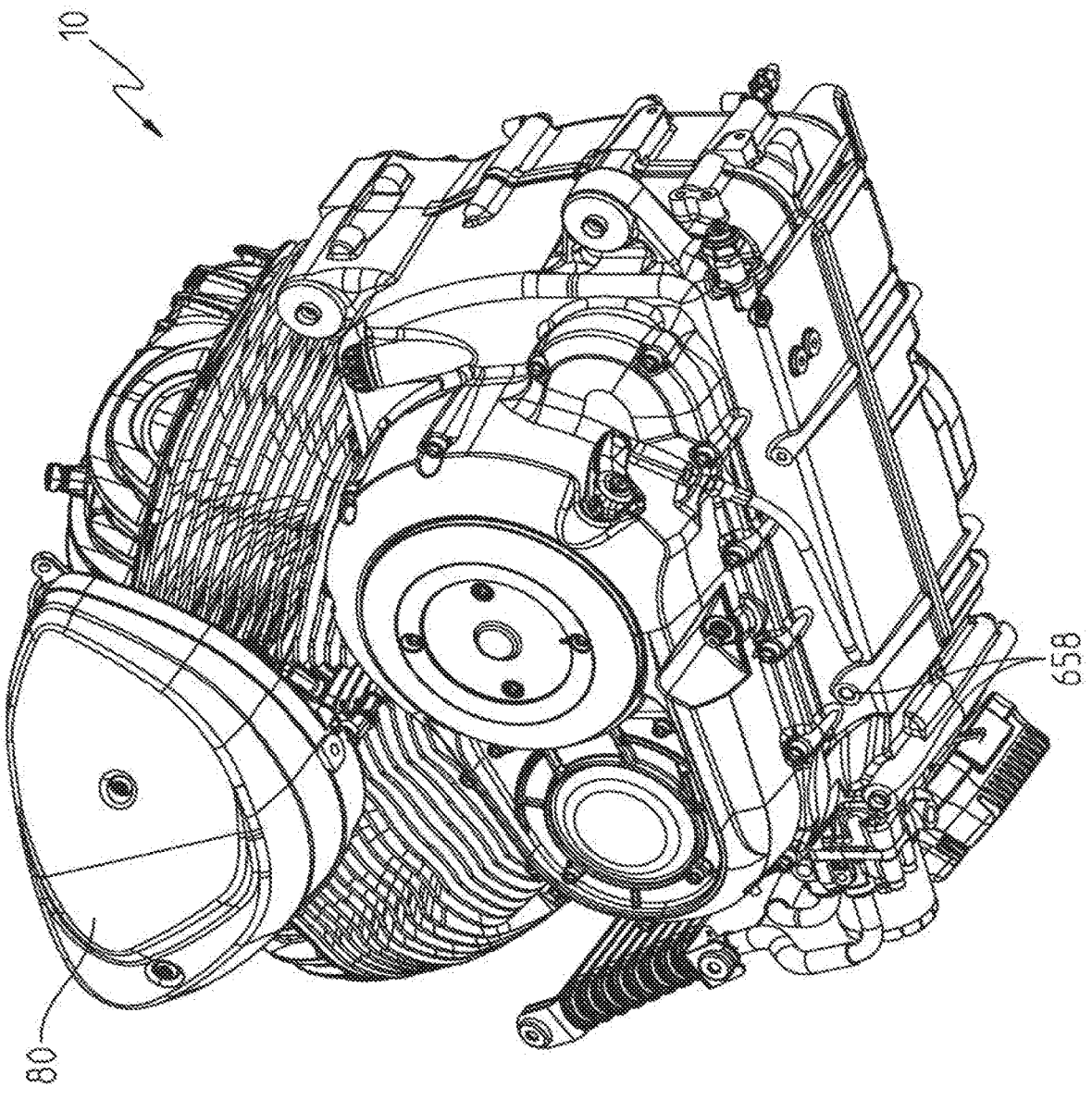
FIG. 9 is a left underside perspective view of the power train assembly of FIG. 8.
Figure 10:
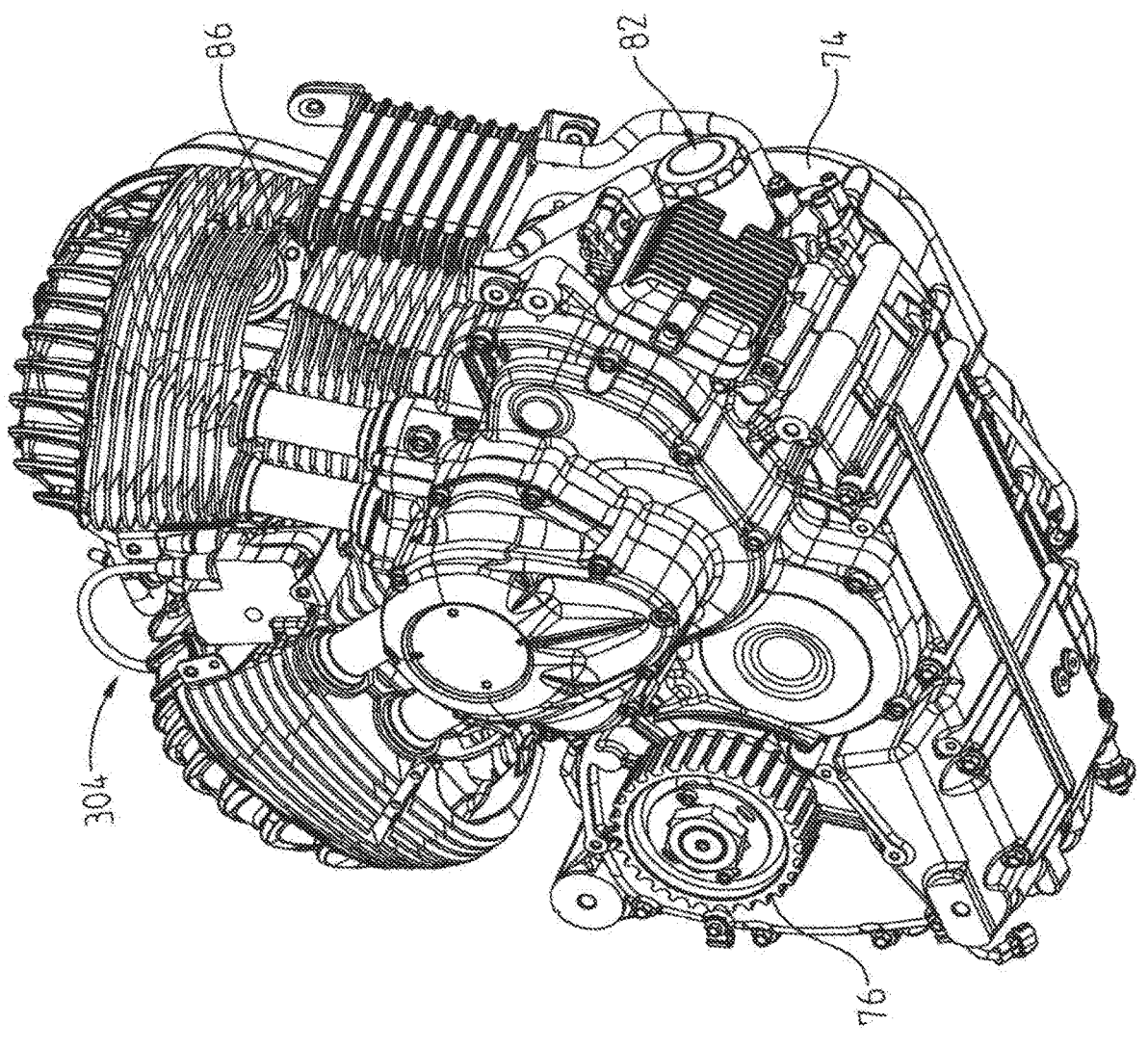
FIG. 10 is right underside perspective view of the power train assembly of FIG. 8.
Figure 11:
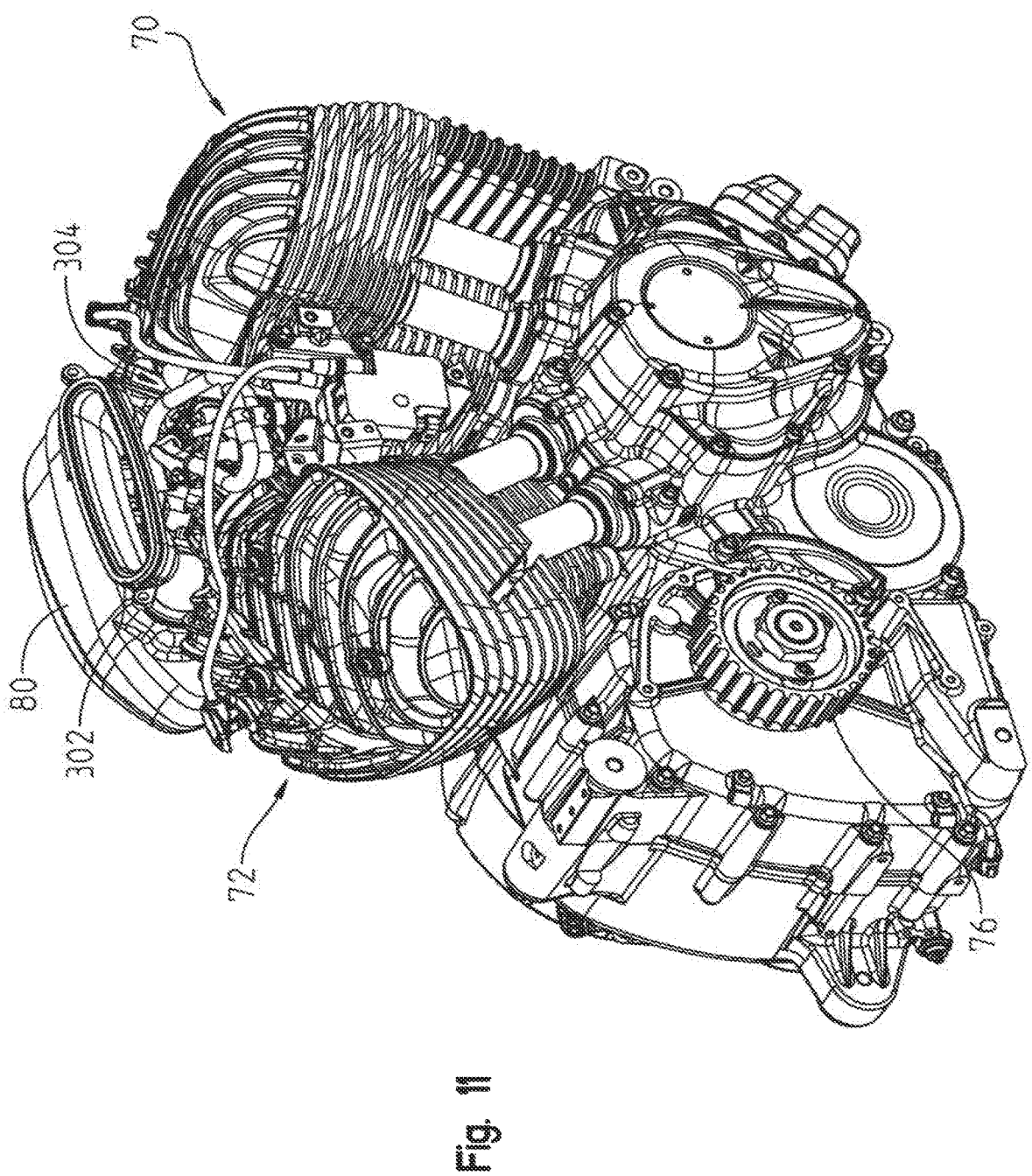
FIG. 11 is a right rear perspective view of the power train assembly of FIG. 8.
Figure 14:
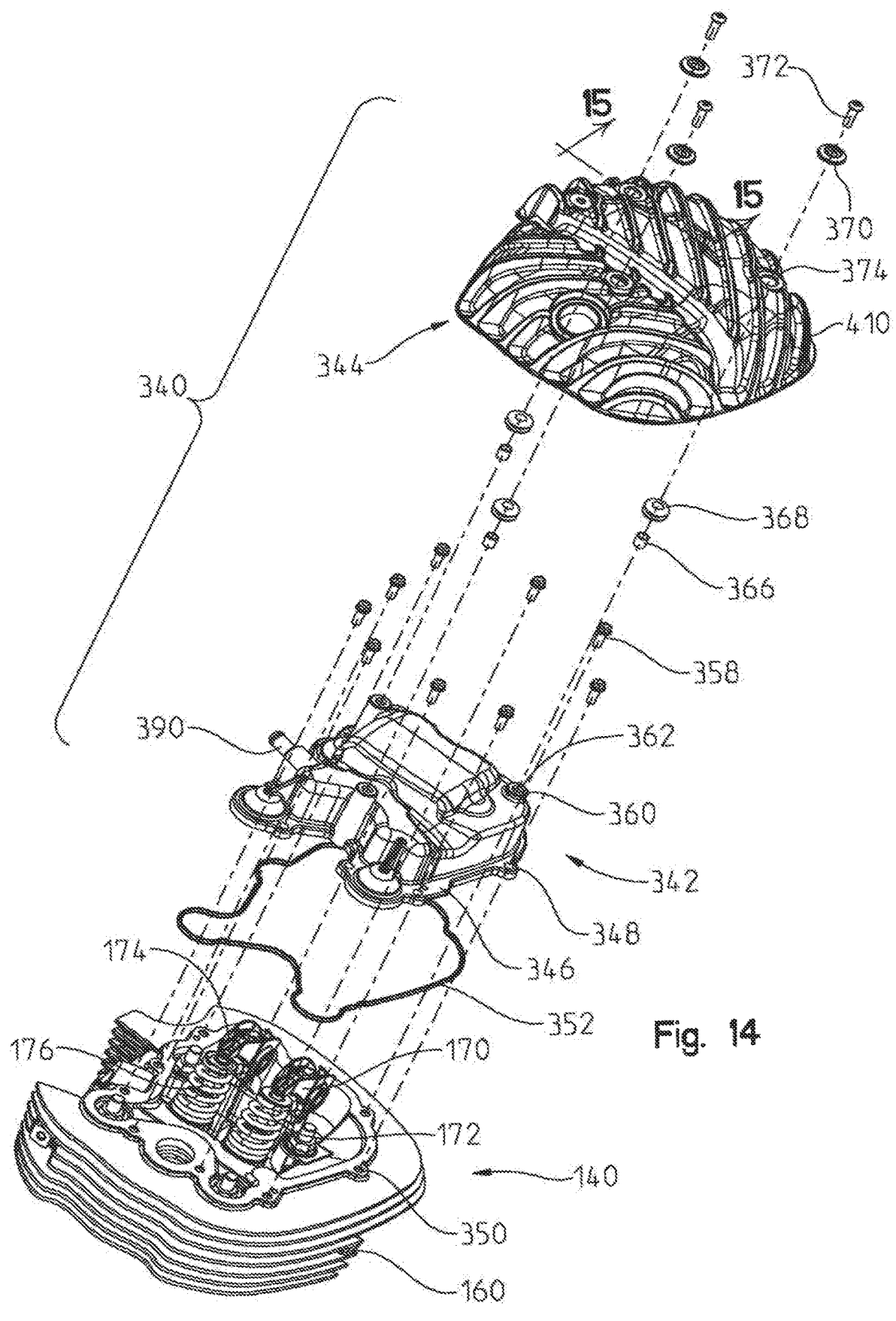
FIG. 14 shows an exploded view of a head and head cover.
Figure 15:
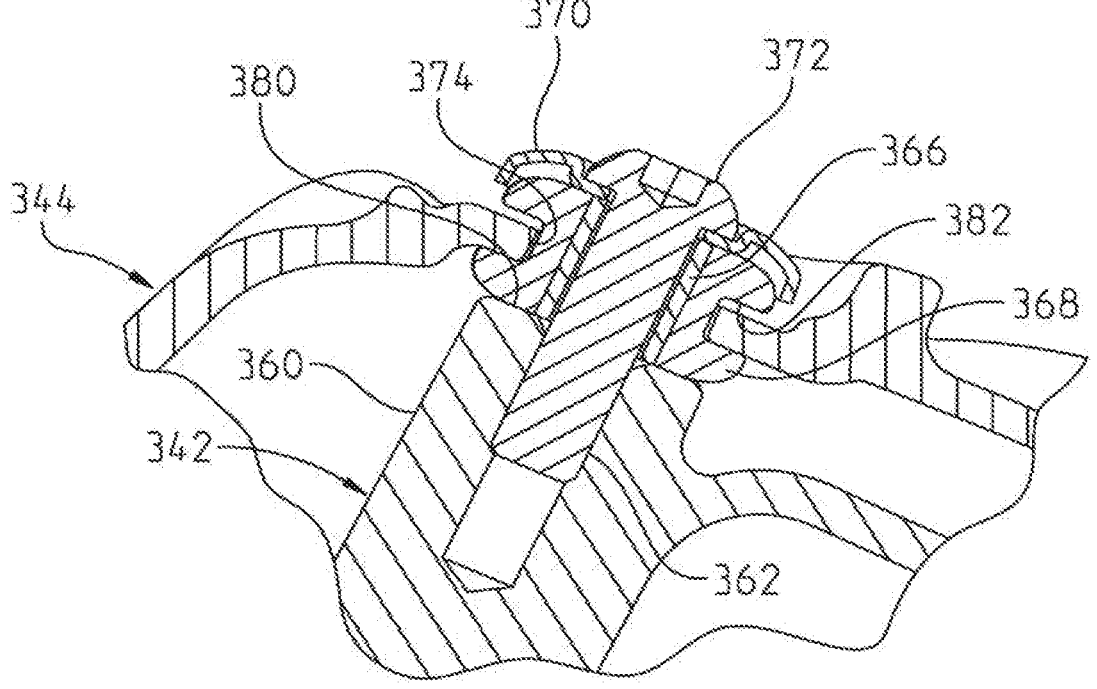
FIG. 15 is a cross-sectional view through lines 15-15 of FIG. 14.
Figure 16:
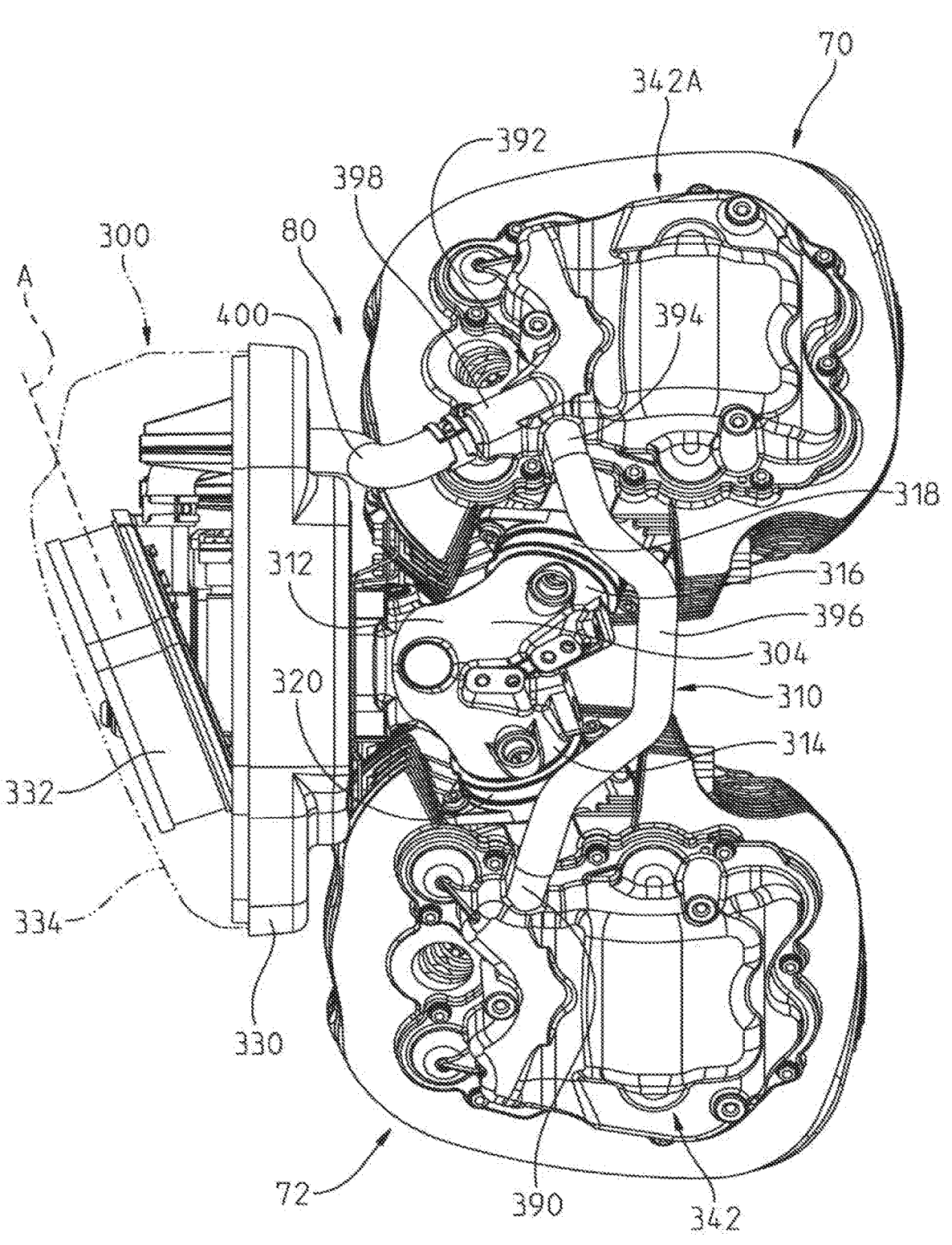
FIG. 16 is top view above the heads with the head covers removed.
Figure 17:
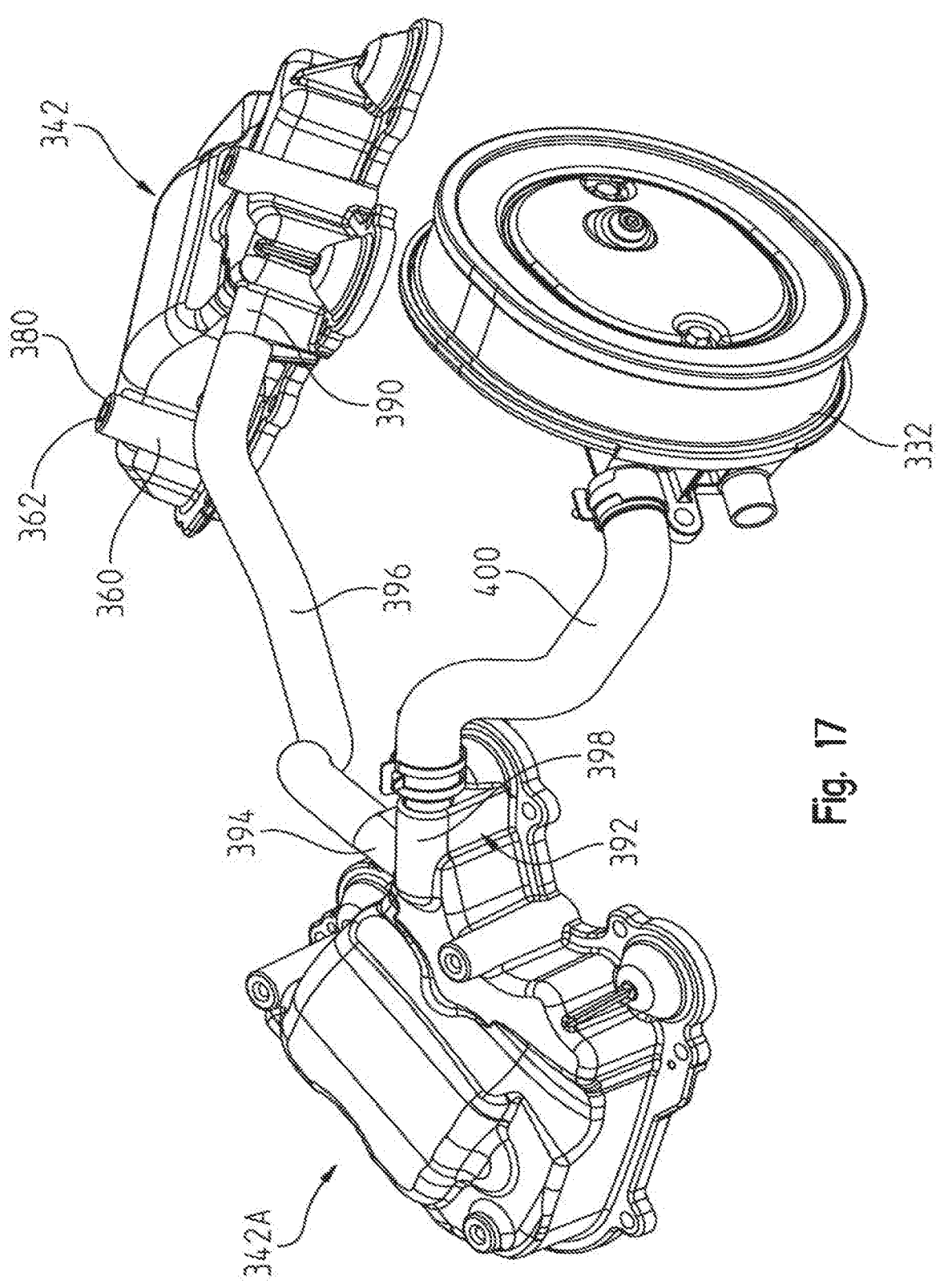
FIG. 17 is a perspective view showing an air cleaner and an inner rocker covers.

With reference now to FIGS. 8-11 and 14-17, engine air intake system 32 will be described in greater detail. As shown in FIGS. 8-9, air intake system 32 comprises an air cleaner assembly 80 having an intake duct at 302. As shown in FIGS. 10 and 11, throttle 304 is situated between the "V" of cylinders 70, 72. With reference now to FIG. 16, engine air intake system 32 is shown including the air/fuel recirculation system 310. Throttle 304 is positioned intermediate cylinders 70, 72 and includes an intake port 312 from an air cleaner 300 of air cleaner assembly 80 and first 314 and second 316 exit ports in porting air through intake ports 318, 320 of cylinder 70, 72, respectively. As shown, air cleaner 300 includes a housing portion 330 including a filter 332 and a cover 334. Recirculation system 310 provides recirculation of air/fuel back to air cleaner 300 as described herein.

Referring to FIG. 154, intake port 318 on cylinder head 142 of cylinder 70 is angled within cylinder head 142. Illustratively, intake port 318 is positioned at an angle α. In one embodiment, angle α is between approximately 0 and 20°. Illustratively, angle α is approximately 17°. Intake port 320 on cylinder head 140 of cylinder 72 may be angled in the same manner.

With reference again to FIG. 14, each cylinder 70, 72 includes a two piece rocker cover shown collectively at 340 including an inner rocker cover 342 and an outer rocker cover 344. Inner rocker cover 342 includes an outer flange portion 346 having mounting apertures 348, which correspond with mounting apertures 350 on head 140. Inner rocker cover 342 is sealed to head 140 by way of gasket 352 providing an air tight seal between head 140 and inner rocker cover 342. Inner rocker cover 342 is attached by way of a plurality of fasteners such as bolts 358, which correspond with apertures 348 and threaded apertures 350. Outer rocker cover 344 is attached to inner rocker cover 342. As shown in FIG. 15, inner rocker cover 342 includes a plurality of upstanding bosses at 360 providing a threaded aperture at 362. A fastening system includes sleeves 366, bushings 368, washers 370, and fasteners 372. Because inner rocker cover 342 is intermediate outer rocker cover 344 and the combustion chamber, inner rocker cover 342 functions as a heat shield to lessen the heat exposure to outer rocker cover 344. Additionally, given that outer rocker cover 344 is adjacent fuel tank 35 (see FIG. 4), inner rocker cover 342 also functions as a heat shield for fuel tank 35. Additionally, in one embodiment, outer rocker cover 344 may be coated with a ceramic material in order to protect the rider's legs and to shield fuel tank 35 from the heat from engine 12.

As shown best in FIG. 15, boss 360 provides an upper mounting surface 380 and sleeve 366 is positioned within bushing 368, where bushing 368 includes a circumferential groove 382, which is received within aperture 374 of inner rocker cover 344. The combination of rocker cover 344, sleeve 366 and bushing 368 is thereafter positioned on top of boss 360 with the sleeve 366 and bushing 368 in contact with surface 380 of boss 360 and fastener 372, and washer 370 may be placed over bushing 368 to bring fastener 372 into threaded engagement with threaded aperture 362. With reference to FIGS. 14 and 16, inner rocker cover 346 includes a recirculation bib 390 for recirculating air to air cleaner 300 as described herein. As also shown in FIG. 16, inner rocker cover 342A for cylinder 70 is substantially the same as inner rocker cover 342 with the exception that inner rocker cover 342A includes a manifold section 392 having a bib portion at 394 which couples to bib 390 by way of hose 396, and includes bib 398 coupling to air cleaner housing 330 by way of hose 400. Thus any unspent air/fuel released by valves 172, 176 (FIG. 14) will be recirculated through inner rocker covers 342, 342A through hoses 396, 400 back to air cleaner 300 and again back to throttle 304.

As shown in at least FIGS. 128, 131, 135, and 142, crankcase 100 includes cast or drilled openings 2310 which allow the pressure in engine 12 and transmission 14 to equalize before recirculation system 310 relieves excess pressure in crankcase 100 into air cleaner 300.

As shown best in FIG. 16, air cleaner 300 provides filter 332 at an inclined angle "A" relative to a longitudinal axis which provides more clearance for the rider's leg. This angle may also be viewed in FIG. 5. Furthermore, the outer rocker cover 344 (FIG. 14) further includes fins 410, which helps radiate heat away from throttle body 304 and the corresponding fuel injectors (not shown).

Figure 20:
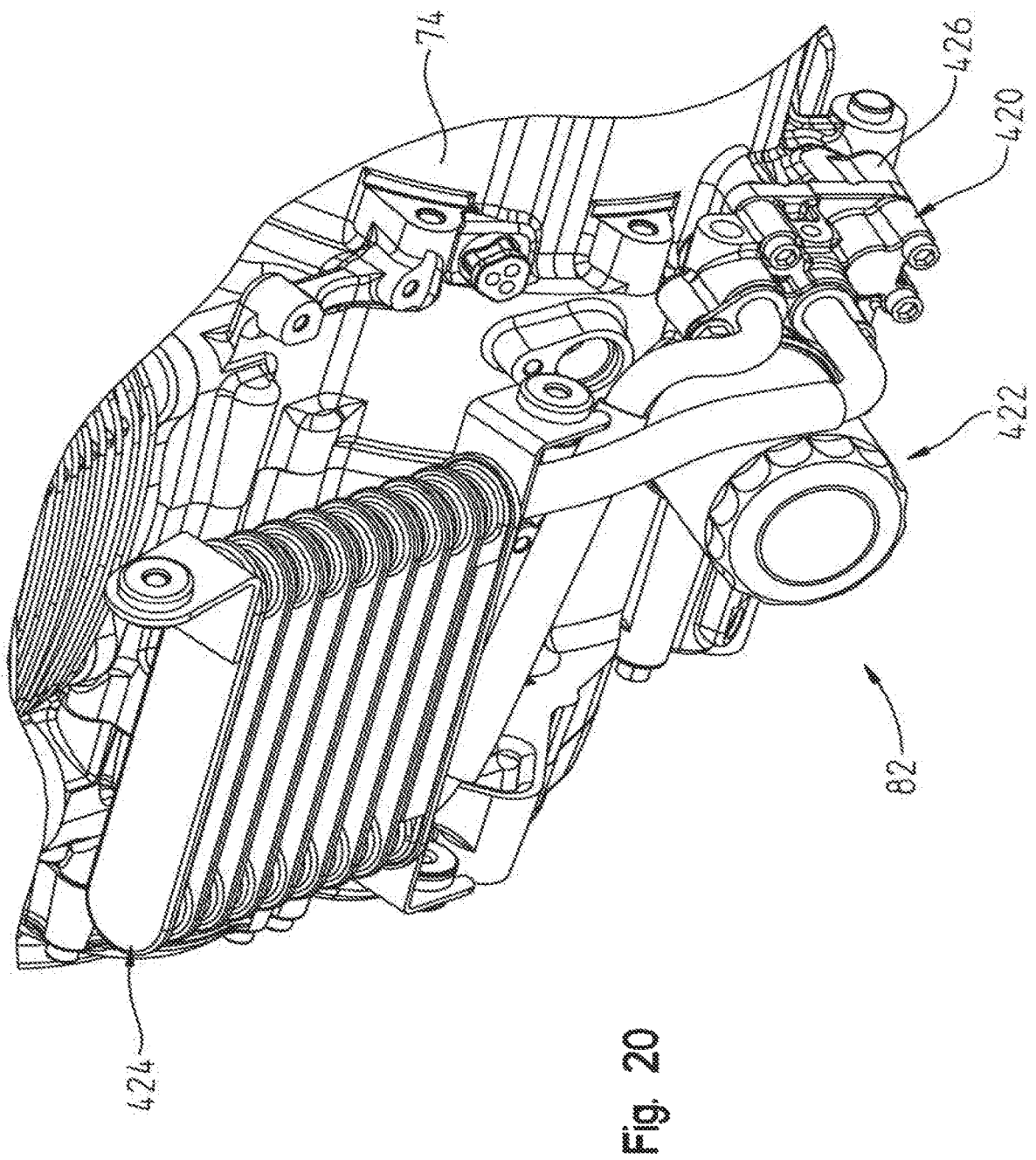
FIG. 20 is a partially fragmented frontal view of the engine showing an engine cooler and filter assembly.
Figure 21:
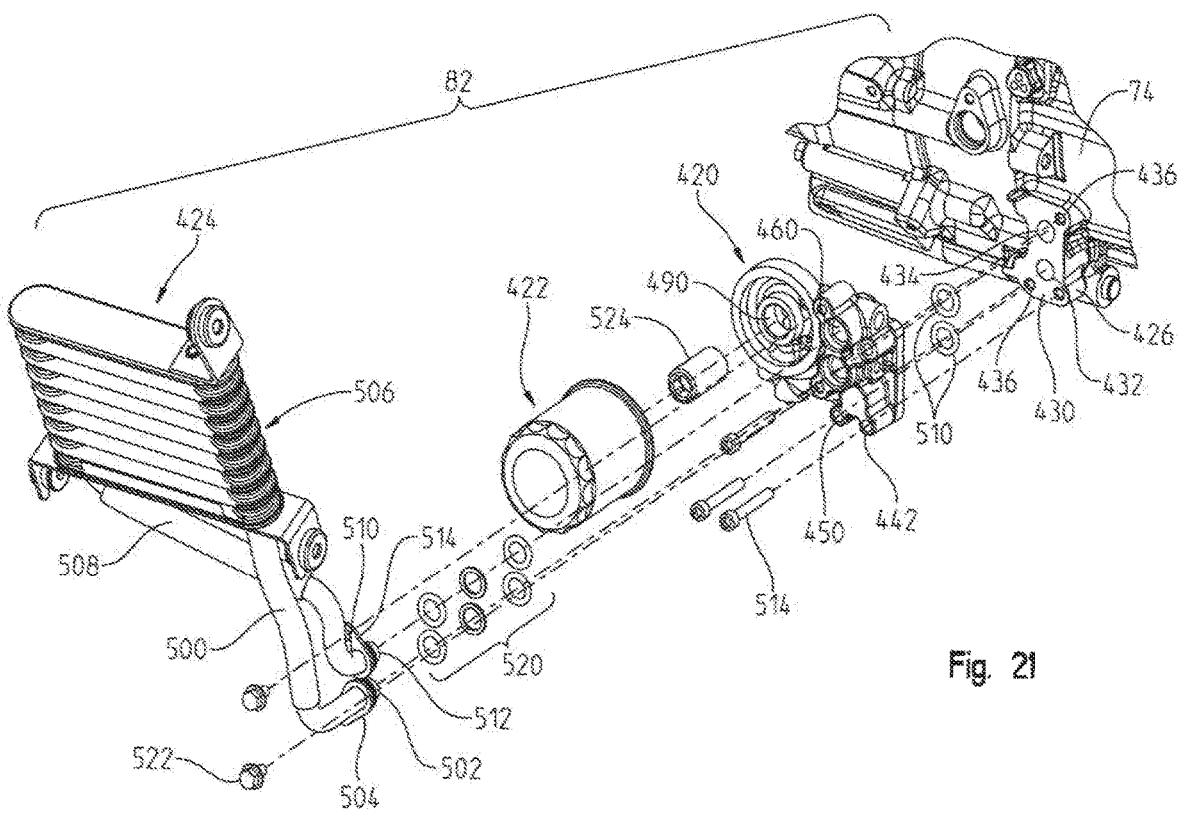
FIG. 21 shows the assembly of FIG. 20 in an exploded manner.
Figure 22:
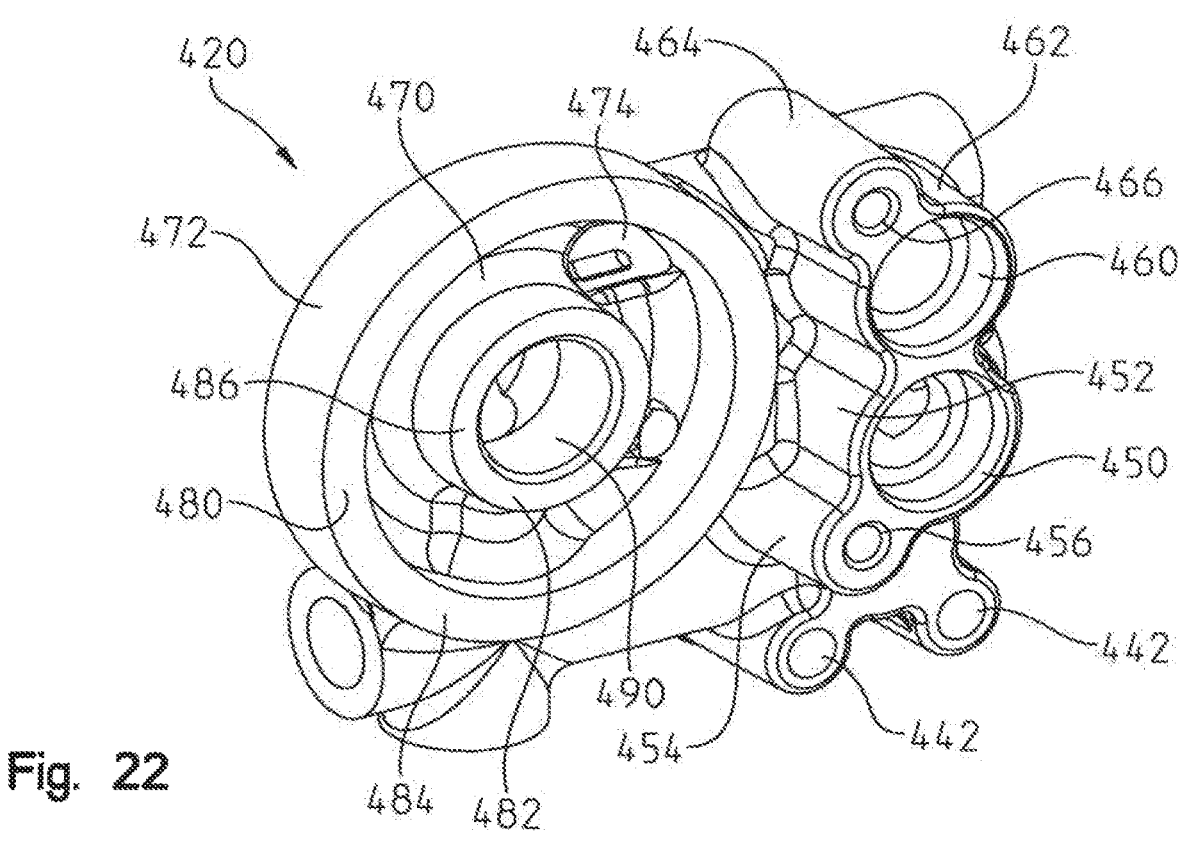
FIG. 22 shows a front perspective view of an adaptor of FIG. 21 in an enlarged view.
Figure 23:
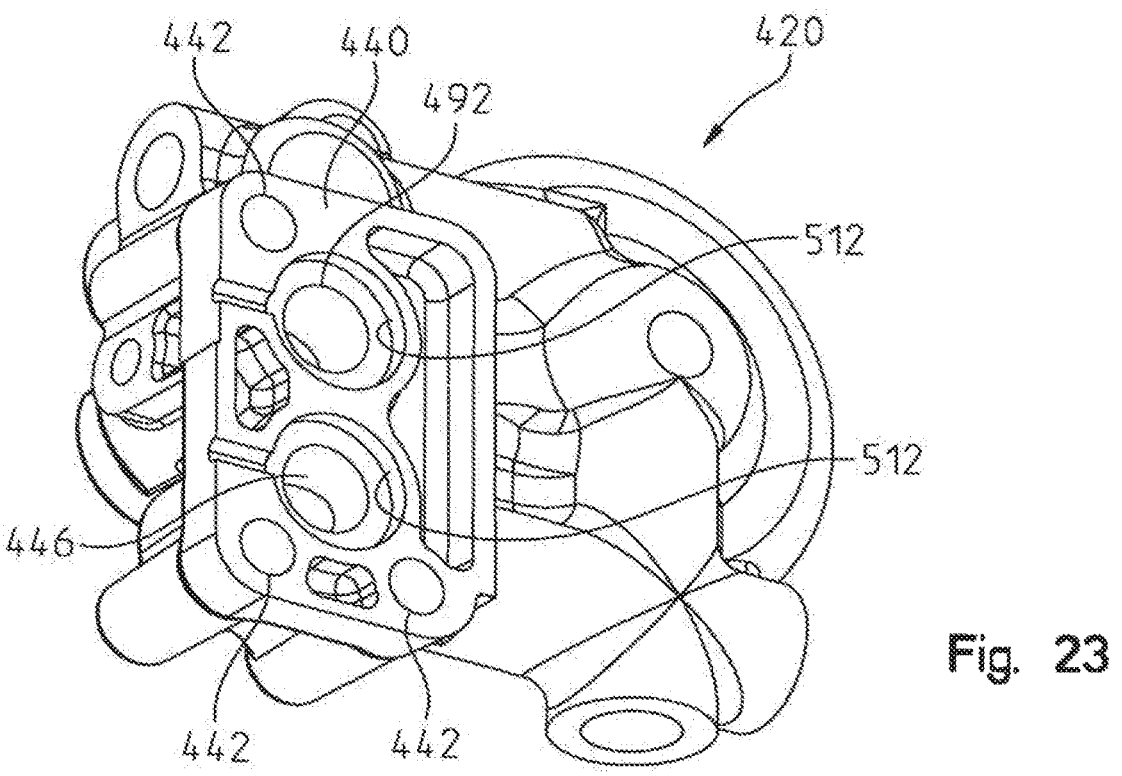
FIG. 23 shows a rear perspective view of the adaptor of FIG. 22.

With reference now to FIGS. 20-23, oil conditioning system 82 will be described in greater detail. With reference first to FIG. 20, oil conditioning system 82 is generally comprised of an adapter member 420, oil filter 422 and oil cooler 424. Adapter 420 is shown mounted to flange 426 on power train housing 74. As shown in FIG. 21, flange 426 includes planar mounting surface 430 having an outlet port 432 and a return port at 434. Planar surface 430 also includes threaded mounting apertures 436 for mounting of adapter 420 as described herein. With reference now to FIGS. 20 and 23, the detail of adapter 420 will now be described.

With reference first to FIG. 23, adapter 420 includes a rear flange at 440 having mounting apertures 442 which correspond with mounting apertures 436 on flange 426 (FIG. 21). Adapter 420 includes an inlet port at 446, which corresponds with outlet port 432 (FIG. 21) supplying oil from the engine through port 432 and into inlet port 446 into adapter 420. Inlet port 446 communicates with outlet port 450 (FIG. 22) on the front side of adapter 420. Outlet port 450 is defined by an upstanding wall 452 having a boss at 454 providing a mounting aperture at 456. Inlet port 460 is provided on the front of adapter 420 and is defined by upstanding wall 462 and has a boss 464 defining a threaded aperture at 466. Inlet port 460 communicates with circumferential opening 470 in oil filter mounting portion 472 by way of a through bore at 474. Oil filter mounting portion 472 includes an outer circumferential wall at 480 and an inner circumferential wall at 482. Outer circumferential wall 480 defines an outer planar end surface at 484, and inner circumferential wall 42 defines an outer planar end surface at 486. Outer circumferential wall 482 defines a cylindrical through port at 490 which communicates with adapter outlet 492 (FIG. 23), which in turn corresponds with return port 434 (FIG. 21).

With reference again to FIG. 21, oil cooler 424 includes an inlet tube 500 comprising a bib 502 and having a mounting flange 504. Inlet tube 500 communicates with heat exchanger portion 506 for cooling oil and discharging the oil into discharge tube portion 508. Oil cooler 424 further includes an outlet tube 510 having an outlet bib 512 and a mounting flange 514. With reference to FIGS. 21-23, the operation of the oil conditioning assembly 82 will be described.

First, adapter 420 receives 0-rings 510 (FIG. 21) in corresponding O-ring grooves 512 (FIG. 23) and fasteners 514 are thereafter positioned through apertures 442 aligning fasteners 514 with threaded apertures 436 on engine flange 426 as shown in FIG. 21. This mounts adapter 420 in a sealed relation to flange 426 and positions surfaces 430, 440 in planar engagement. This also aligns openings 432, 446 and 434, 492, respectively. Oil cooler 424 is thereafter coupled to adapter 420 as provided below. First, a combination of 0-rings and washers 520 are positioned on the ends of bibs 502, 512, and then bibs 502 and 512 are positioned in corresponding ports 450, 460 of adapter 420. Fasteners 522 are then received through flanges 404, 414 and into threaded engagement with apertures 456, 466 (FIG. 22). Oil filter 422 is a spin-on type oil filter having an outer seal (not shown) corresponding to planar surface 484 (FIG. 22) and an inner seal (not shown) corresponding to planar surface 486 (FIG. 22). A threaded nipple 524 (FIG. 21) is received in port 490, which receives a threaded center opening (not shown) in filter 422 and filter 422 is threadably received onto adapter 420 until corresponding seals on oil filter 422 are in sealed engagement against corresponding surfaces 484, 486.

Operation of the oil conditioning system 82 provides oil cooling and filtering through a single adapter 420. During engine operation, oil is supplied through port 432 of engine flange 426 (FIG. 21) into port 446 (FIG. 23) of adapter 420. This provides oil flow to port 450 and into supply tube 500 to cooler 506. The cooled oil is returned through tube 508 and back to adapter 420 through port 460. Oil then flows into circumferential opening 470 (FIG. 22) between cylindrical walls 480, 482. Oil flows into the oil filter 422 and then through threaded nipple 524 into port 490 where it is returned through port 492 and into port 434 on engine flange 426.

Thus adapter 420 provides a convenient mechanism of both mounting the oil filter and oil cooler providing an easy maintenance task for the operator. This takes complicated casting and machining out of the engine block providing for increased quality of the engine blocks. This also positions the oil filter 422 at the very front of the vehicle, as well as, providing good air flow across oil cooler 424. This also provides both of the oil cooler and oil filter in a position away from the operator's feet and legs.

Additionally, adapter 420 combines the functionality of routing oil through oil filter 422 and oil cooler 424. As such, adapter 420 eliminates additional components that would be needed to separately perform the functions of filtering and cooling the oil. Adapter 420 also may be configured with a bypass feature, which allows the oil to bypass oil cooler 424 during a "cold" engine start. The bypass function adapter 420 may prevent over-pressurization during the "cold" engine start. More particularly, the bypass function may prevent the lubrication system from being damaged during a "cold" engine start and/or when an operator suddenly increases the throttle (i.e., suddenly increases the engine RPM). Adapter 420 may be in electronic communication with a pressure sensor 2228 of an oil pump assembly 2190 in order to determine the pressure in the system and initiate the bypass function.

Figure 24:
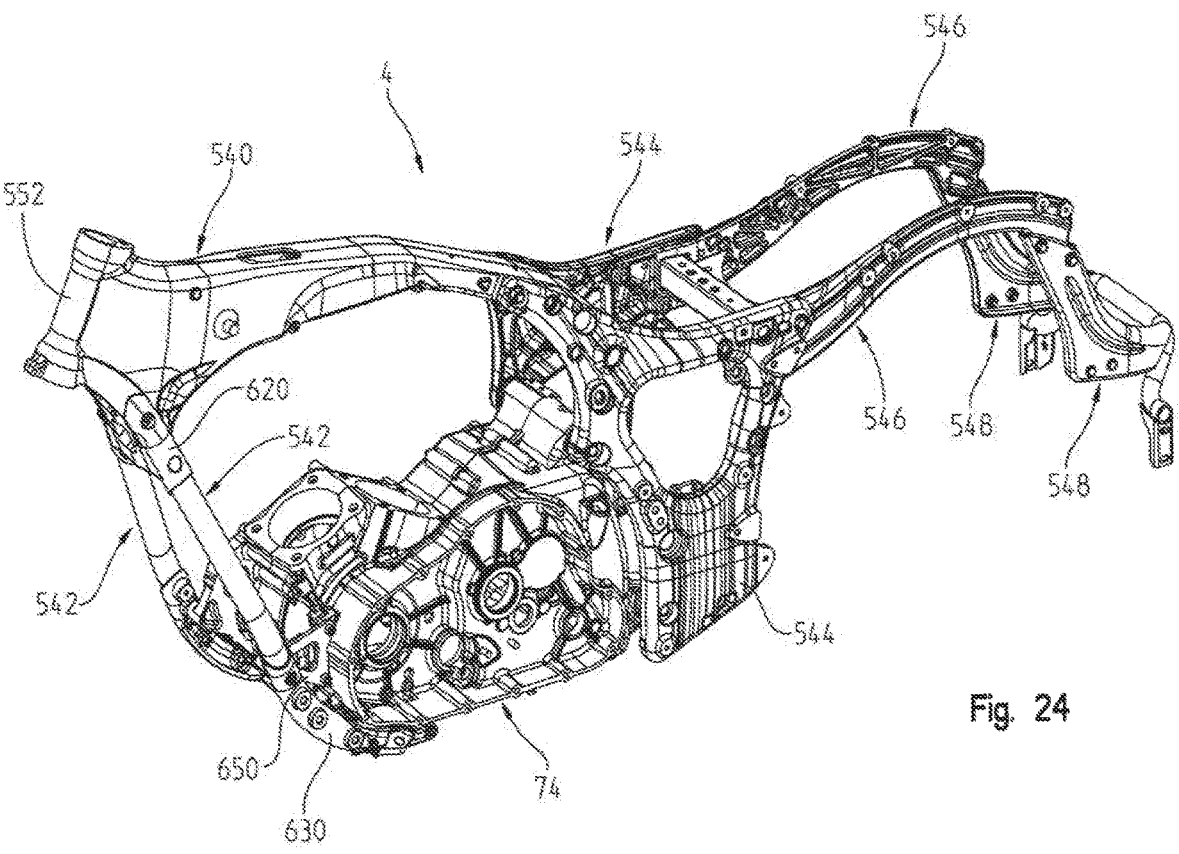
FIG. 24 shows the a frame of the vehicle in an assembled manner and coupled to the power train housing.
Figure 25:
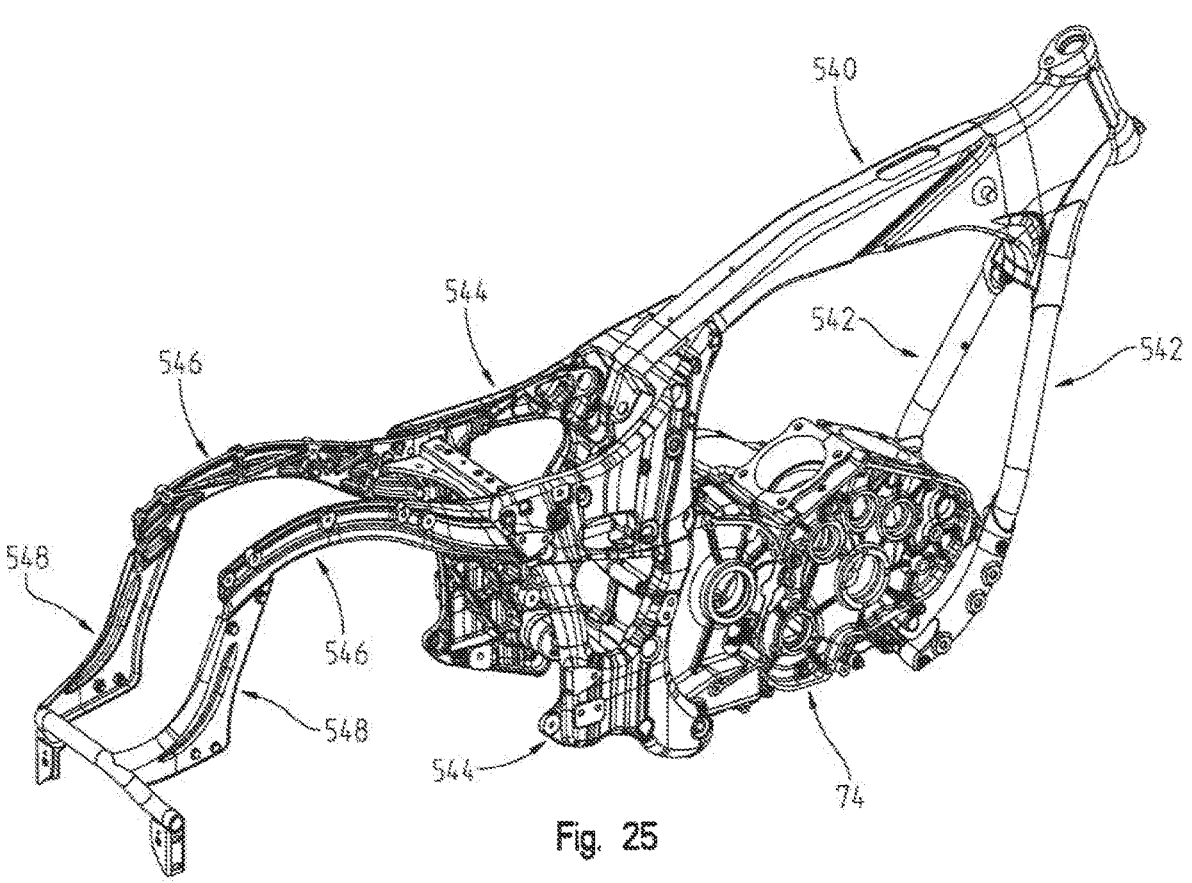
FIG. 25 is a right perspective view of the frame shown in FIG. 24.

With reference now to FIGS. 24-27, motorcycle frame 4 will be described in greater detail. With reference first to FIG. 24, frame 4 is comprised of main frame portion 540, front frame tubes 542, side frames 544, frame extension portions 546, and rear frame portion 548. As shown in FIG. 24, frame 4 is coupled to power train housing 74 and power train housing 74 becomes an integral part of frame 4 as described herein. With reference now to FIG. 26A, main frame portion 540 will be described in greater detail.

Figure 28:
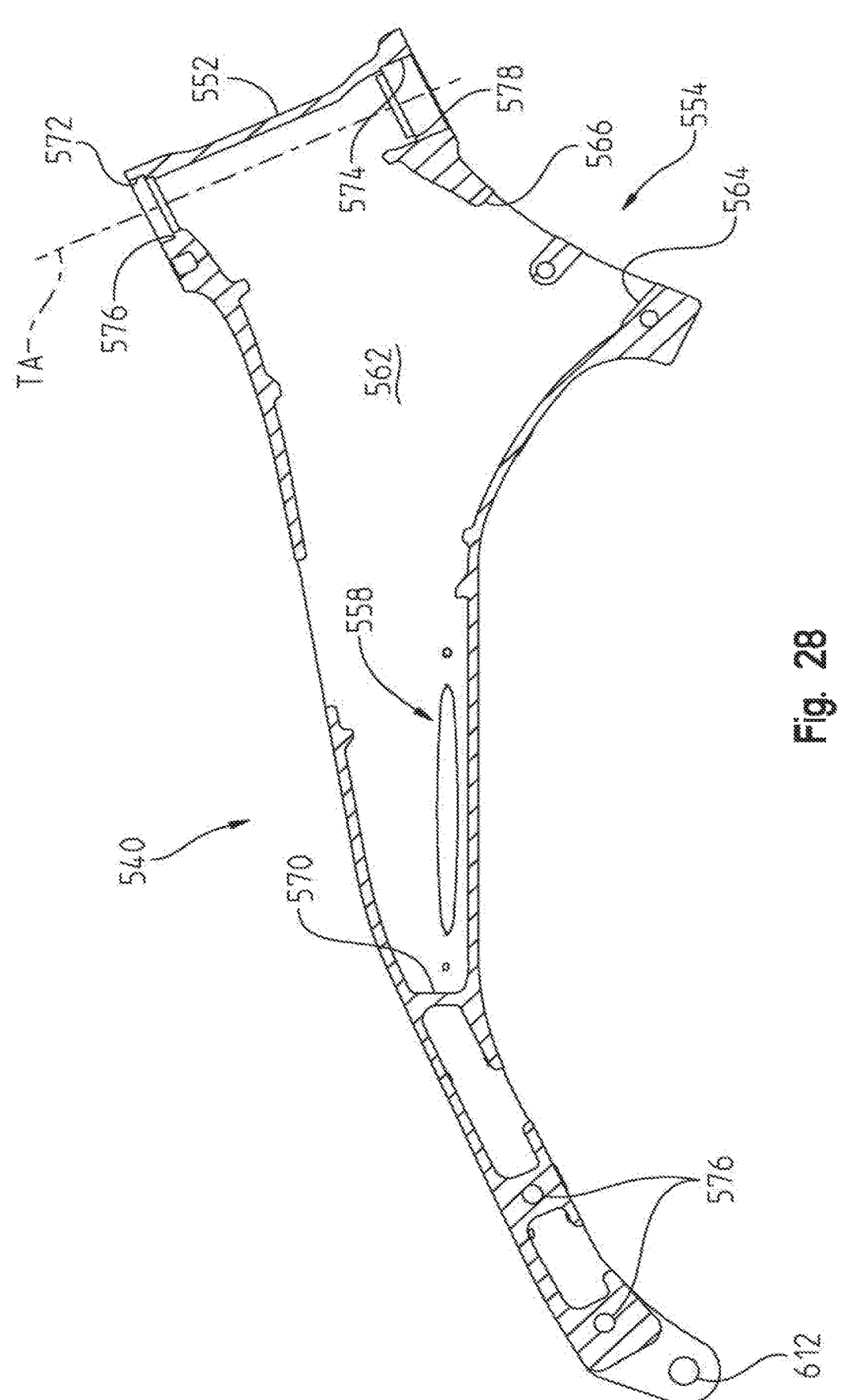
FIG. 28 shows a longitudinal cross-section of the main frame portion showing the air box.

Main frame portion 540 includes a generally cast body of uniform construction. Main frame portion 540 may include any of the features of U.S. Pat. No. 7,779,950, the disclosure of which is incorporated herein by reference. Main frame portion 540 includes a body portion shown at 550 and generally includes head tube 552, air inlet 545, mounting brackets 556, air outlet 558, and mounting flange 560. As shown in FIG. 28, which is a longitudinal section of main frame portion 540, it is shown that main frame portion 540 is generally hollow to include an integral air box at 562, such that air can be drawn through air intake 554, through individual apertures 564 and 566, and go rearwardly into the air box 562 (right-to-left as viewed in FIG. 28) toward air outlet 558. Any air not discharging through outlet 558 hits return wall 570 and returns toward outlet 558 and is drawn through outlet 558.

As shown in FIG. 28, head tube 552 extends at a rake angle for a touring motorcycle having an angle "TA" relative to horizontal. As is known, head tube 552 includes circular bores 572 and 574 defining shoulders 576 and 578 as is known for bearings for a steering system described herein. With reference again to FIG. 26A, body portion 550 also comprises mounting pegs 580, 582, and opening 584. Mounting bracket 556 includes a planar mounting surface 590 having threaded apertures 592 while bracket 560 includes a planar surface 594 having threaded apertures 596. Air outlet 558 includes mounting bosses 600 having threaded apertures at 602 as described herein. Finally, main tube 540 includes a mounting boss 610 at an opposite end having aperture at 612 as described herein.

Figure 26:
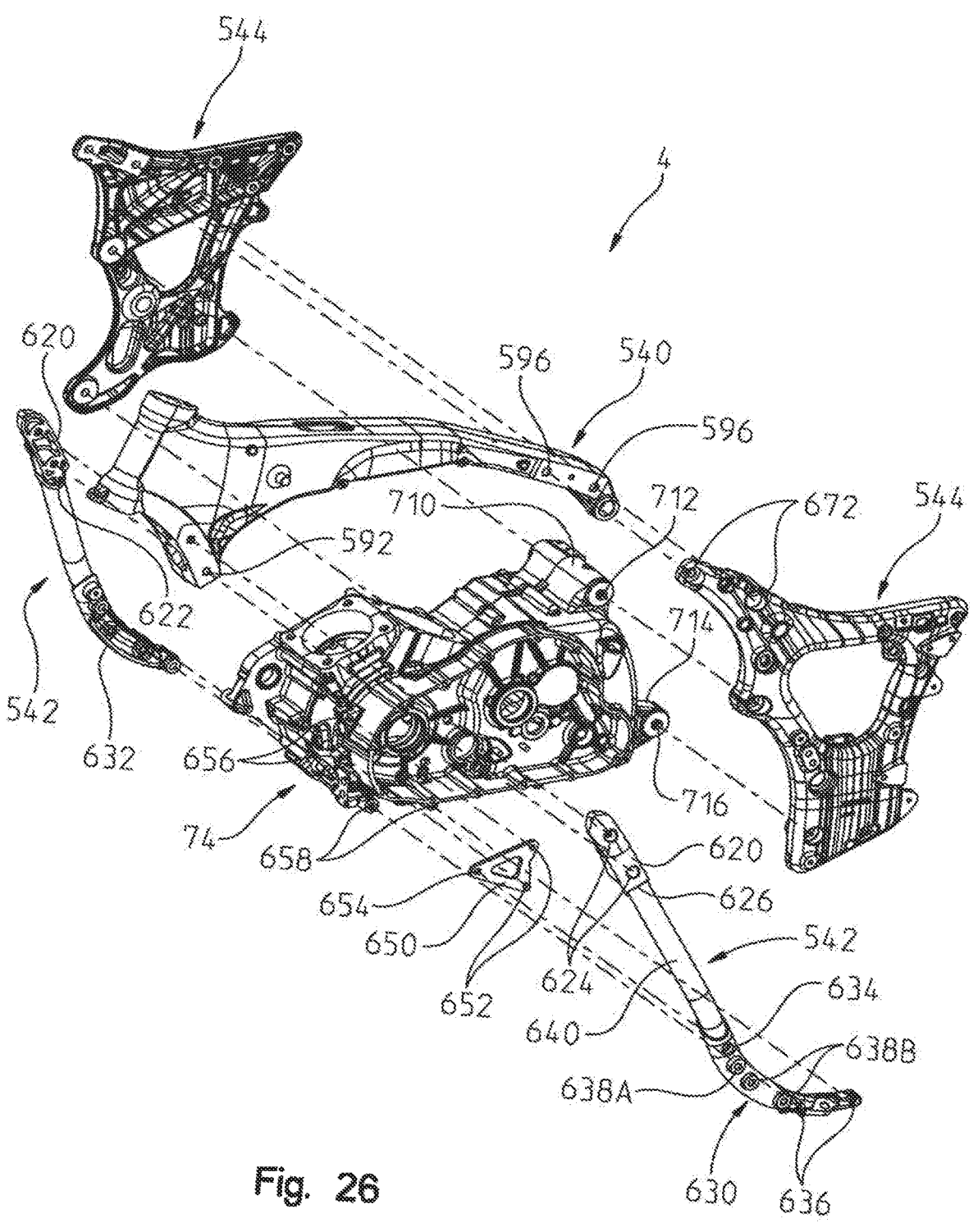
FIG. 26 is similar to the frame shown in FIG. 24 in an exploded manner.
Figure 26A:
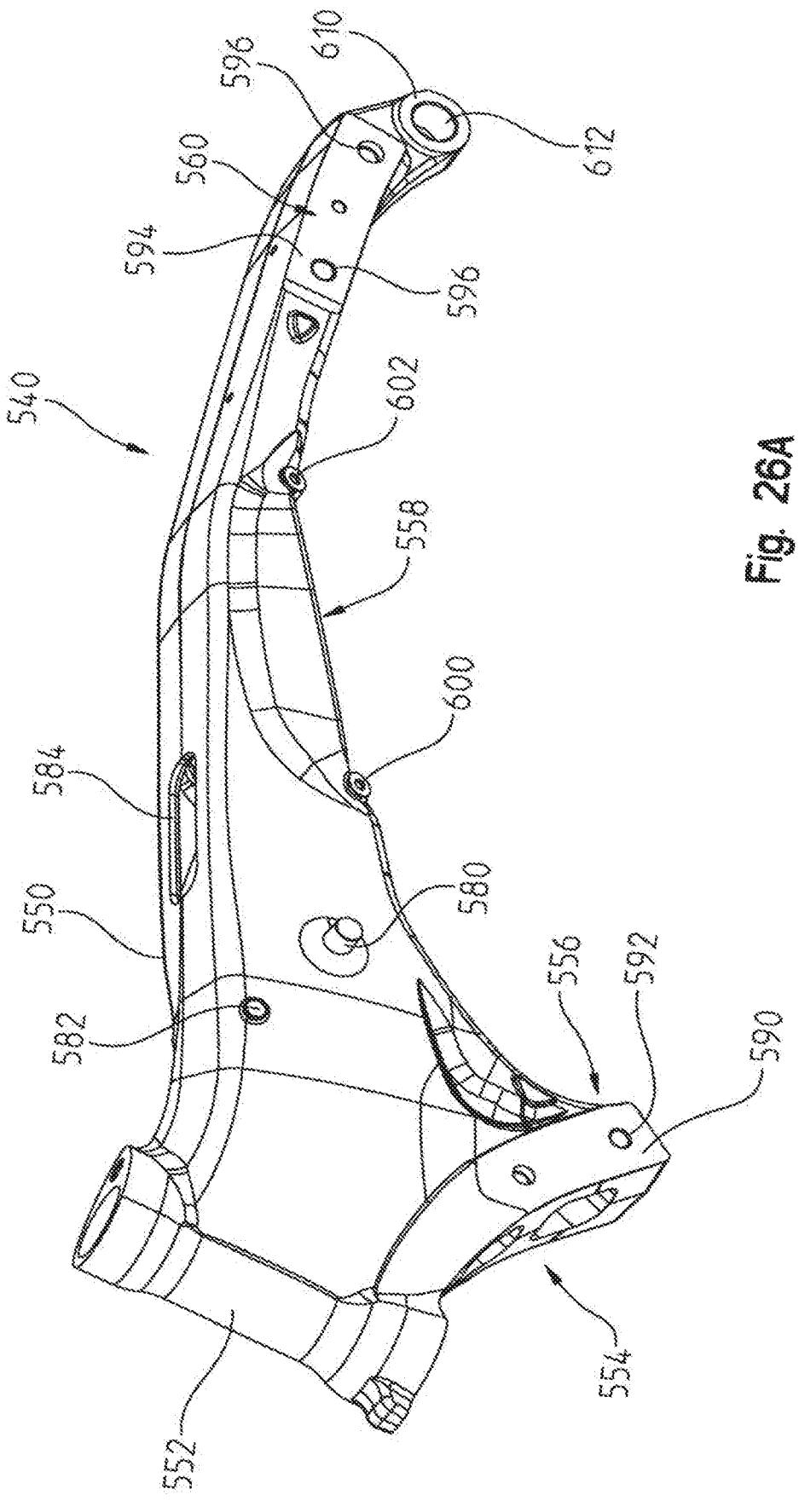
FIG. 26A is an enlarged view of a main frame portion shown in FIG. 26.

With reference now to FIG. 26, frame tubes 542 include upper frame couplers 620 having a planar mounting surface 622, mounting apertures at 624, and a tubular opening at 626. Frame tube 542 also includes a lower tube coupler 630 having a mounting surface 632 and mounting apertures 634, 636, 638A and 638B. It should be understood that couplers 620 and 630 may be cast members adhesively fixed to tube portions 640 in a similar manner described in U.S. patent application Ser. No. 13/027,116 entitled "SNOWMOBILE", the subject matter of which is incorporated herein by reference. As shown in FIG. 26, frame 4 also comprises a coupling plate 650 having two mounting apertures 652 and a front single mounting aperture at 654. As shown in FIG. 26, (see also FIG. 8), power train housing 74 includes mounting apertures at 656 and 658 (see also FIG. 9). Thus, assembling the front end of frame 4 includes the steps of mounting couplers 620 to bracket 556 (FIG. 26A) and providing fasteners (not shown) through apertures 624 into threaded apertures 592. Additionally, power train housing 74 is coupled to frame tubes 542 by way of fasteners (not shown) through apertures 636 into threaded bosses 658 on power train housing 74. Also additionally, fasteners (not shown) are positioned through apertures 652 of coupling plate 650 and into threaded bosses 656. A fastener (not shown) is then positioned through apertures 634 and through aperture 654 on coupling plate 650. This final assembly is shown best in FIG. 24.

Figure 27:
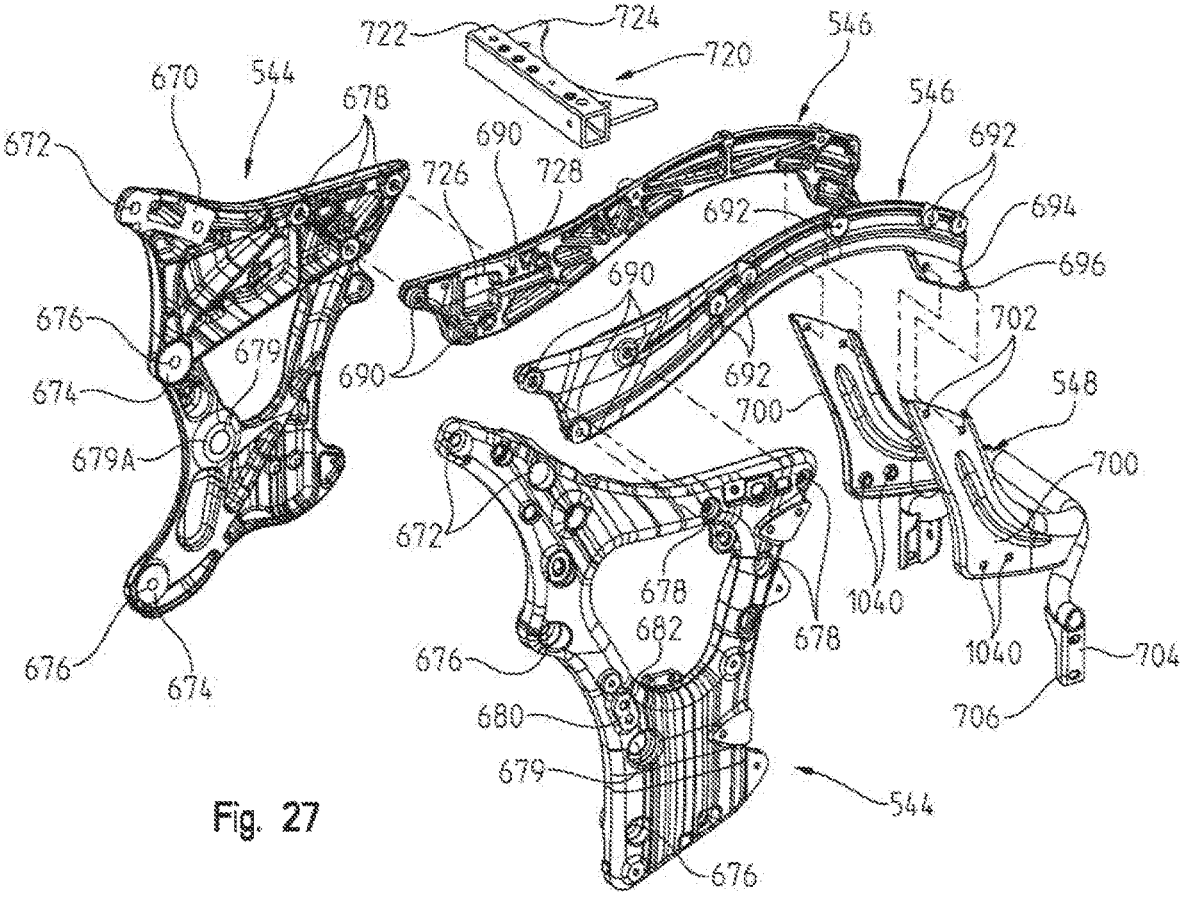
FIG. 27 shows an exploded view of a rear frame portion.

With reference now to FIG. 27, side frames 544 are generally cast members and include planar surfaces 670 having mounting apertures 672, and bosses 674 having mounting apertures 676. Side frames 544 also include mounting apertures 678 and boss 680 having threaded apertures 682 as described herein.

With respect still to FIG. 27, frame extensions 546 generally include mounting apertures 690 and threaded apertures 692 for mounting saddle bags 54 as described herein. Extension members 546 also include rear flanges 694 having threaded apertures 696.

Finally, rear frame portions 548 includes frame sidewalls 700 having mounting apertures at 702 and mounting brackets at 704 having mounting apertures at 706. As shown in FIG. 26, power train housing 74 includes an upper boss 710 having a mounting aperture 712 and a lower boss 714 having mounting aperture 716.

With reference to FIGS. 26 and 27, side frames 544 are thereby coupled to power train housing 74 and to main frame tube 540 by way of fasteners (not shown) through apertures 676 into threaded apertures 712, 716; and by way of fasteners through apertures 672 into threaded apertures 596. Frame extensions 546 are coupled to side frames 544 by way of fasteners through apertures 678 into threaded apertures 690. A cross tube 720 is provided having a substantially square tube portion 722 and a depending plate portion 724 which is received in complementary square opening 726 and slot 728 respectively. Rear frame portion 548 is thereafter coupled to frame extensions 546 by way of fasteners (now shown) through apertures 702 into threaded apertures 696.

Figure 29:
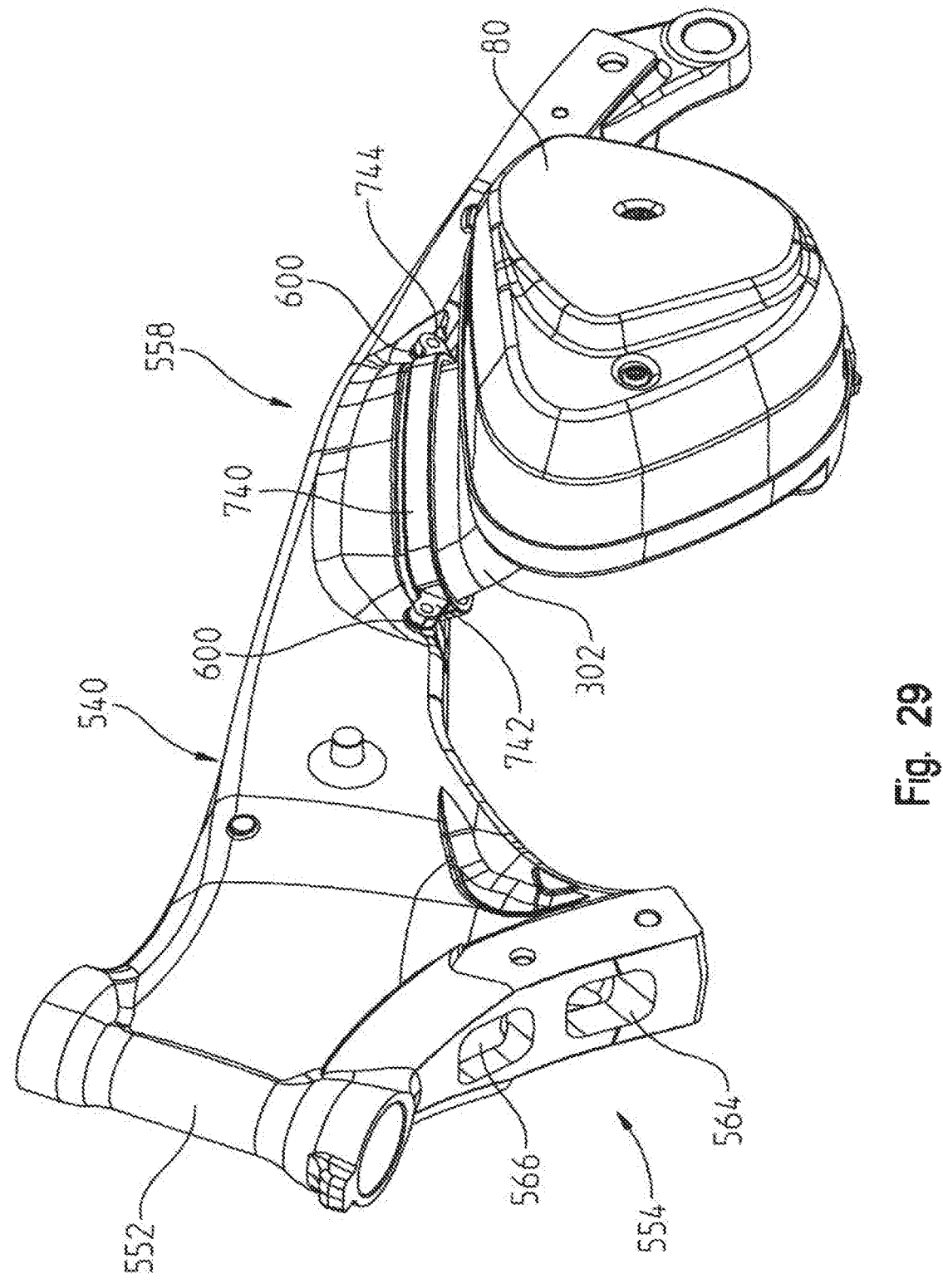
FIG. 29 shows the main frame portion coupled to the air cleaner.
Figure 30:
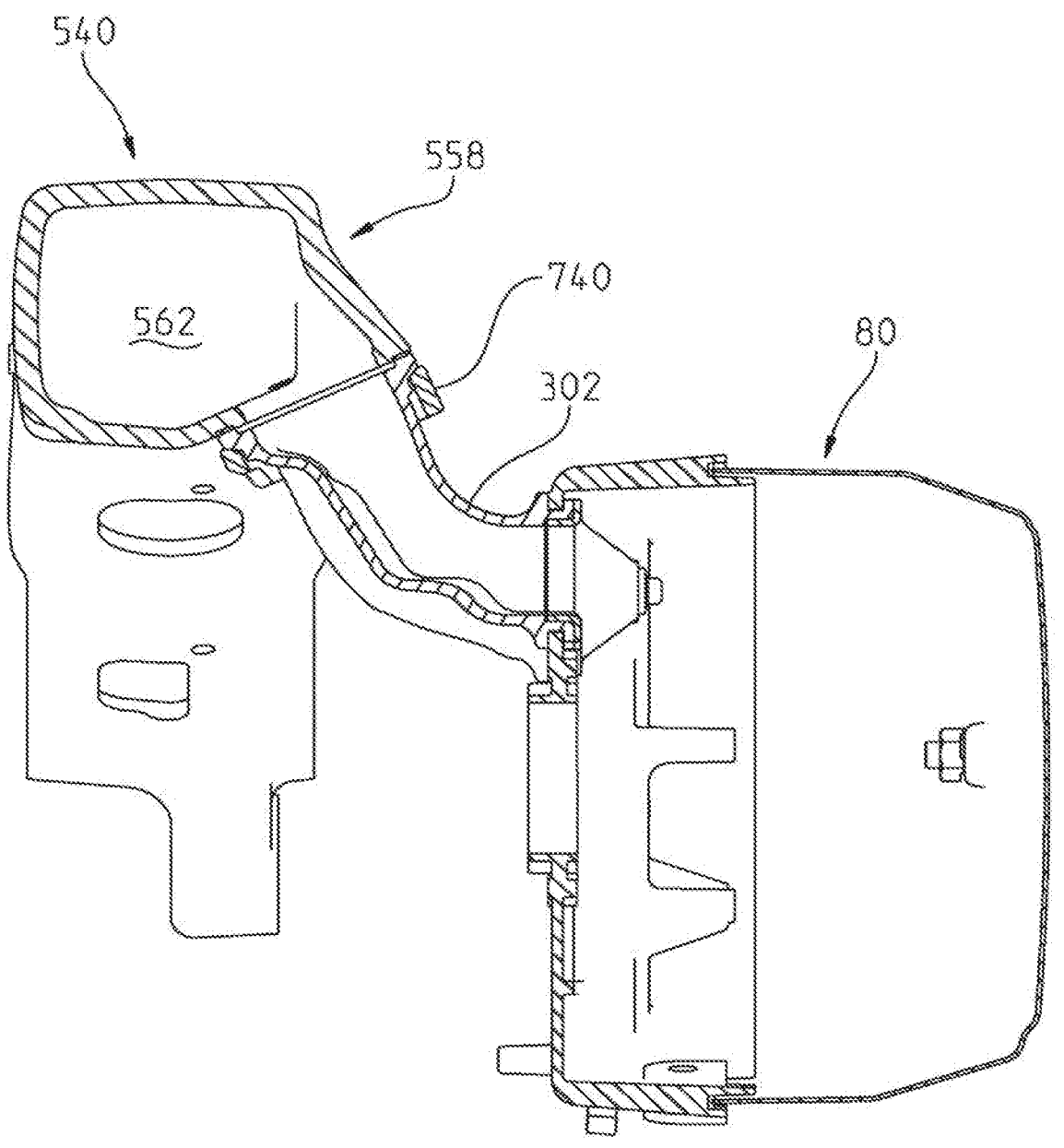
FIG. 30 shows a cross-sectional view through the air cleaner and air coupler.

FIGS. 29 and 30 show an interface between main frame portion 540 and air cleaner assembly 80. As shown, a retaining sleeve 740 is provided having mounting bosses at 742 such that fasteners may be received through apertures 744 into threaded apertures 602 (FIG. 26A). Thus as mentioned above, air is received through apertures 564, 566 and travels through the main frame portion 540 into air cleaner assembly 80 through duct 302. More particularly, outside air, which may have particles, dirt, or other debris therein, flows into air box 562 and then into air cleaner 300 through duct 302 before flowing into intake port 312 of engine 12. When the air flows into air cleaner 300, filter 332 removes any dirt or debris in the air before the air enters intake port 312.

Figure 31:
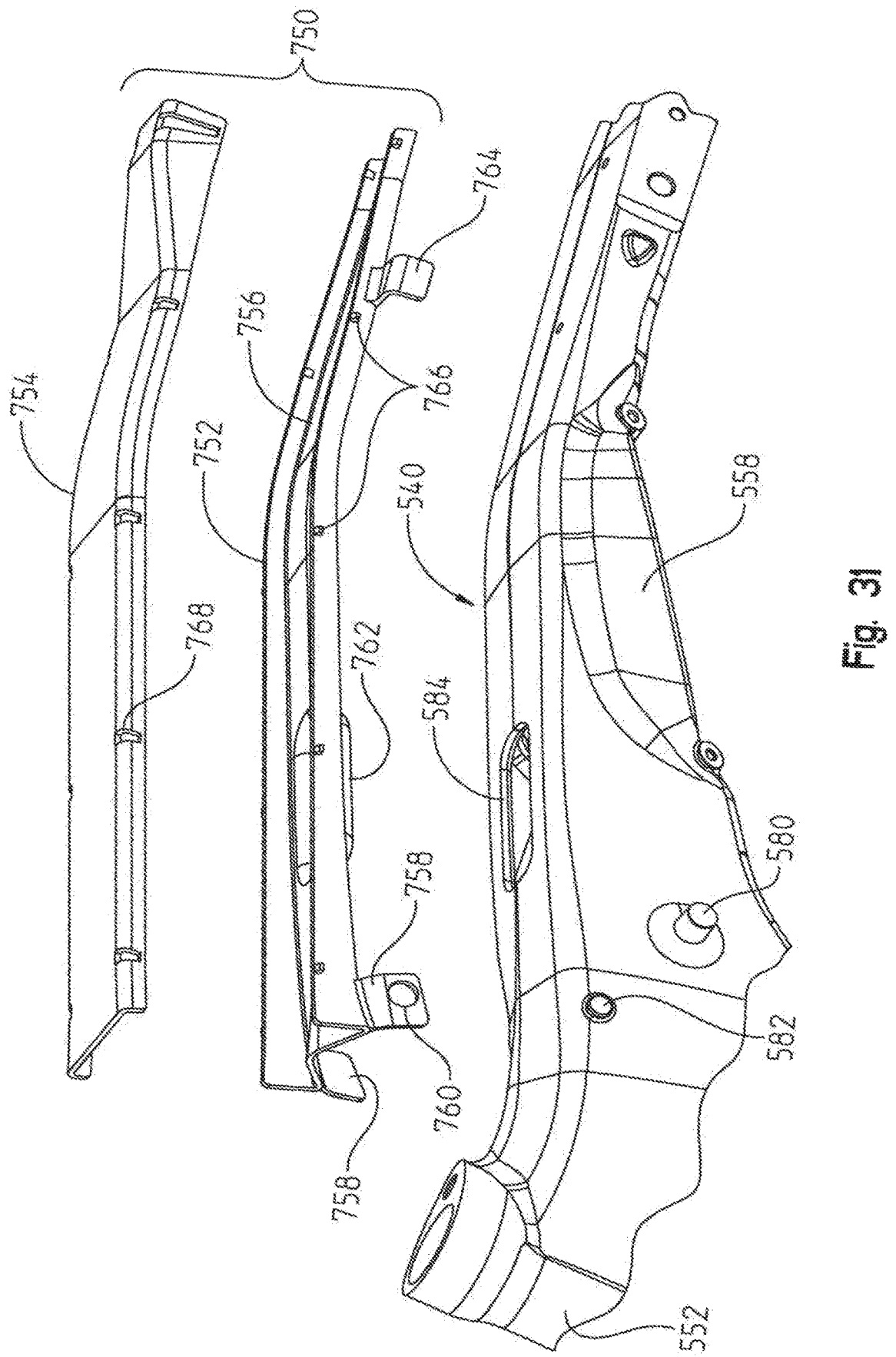
FIG. 31 shows the main frame portion with a wire harness channel poised for receipt over the top of the frame.

FIG. 31 shows a wire harness channel 750 including a channel portion 752 and a cover 754. Channel portion 752 includes a lower base wall 756 contoured to lie flush against a top wall of main frame portion 540. Channel portion 752 includes mounting tabs 758 having apertures 760 cooperable with bosses 582. Channel portion 752 includes a down tube portion 762 feeding into opening 584 into the air box 562. Mounting tabs 764 cooperate with main frame portion 540 along sidewalls thereof. Channel portion 752 further includes latching bosses 766 cooperable with latch openings 768 to latchably close cover 754 to channel portion 752. Thus, wire harness channel 750 may be used to route wires from the front of the motorcycle to the rear of the motorcycle and/or to the engine through opening 584.

Figure 32:
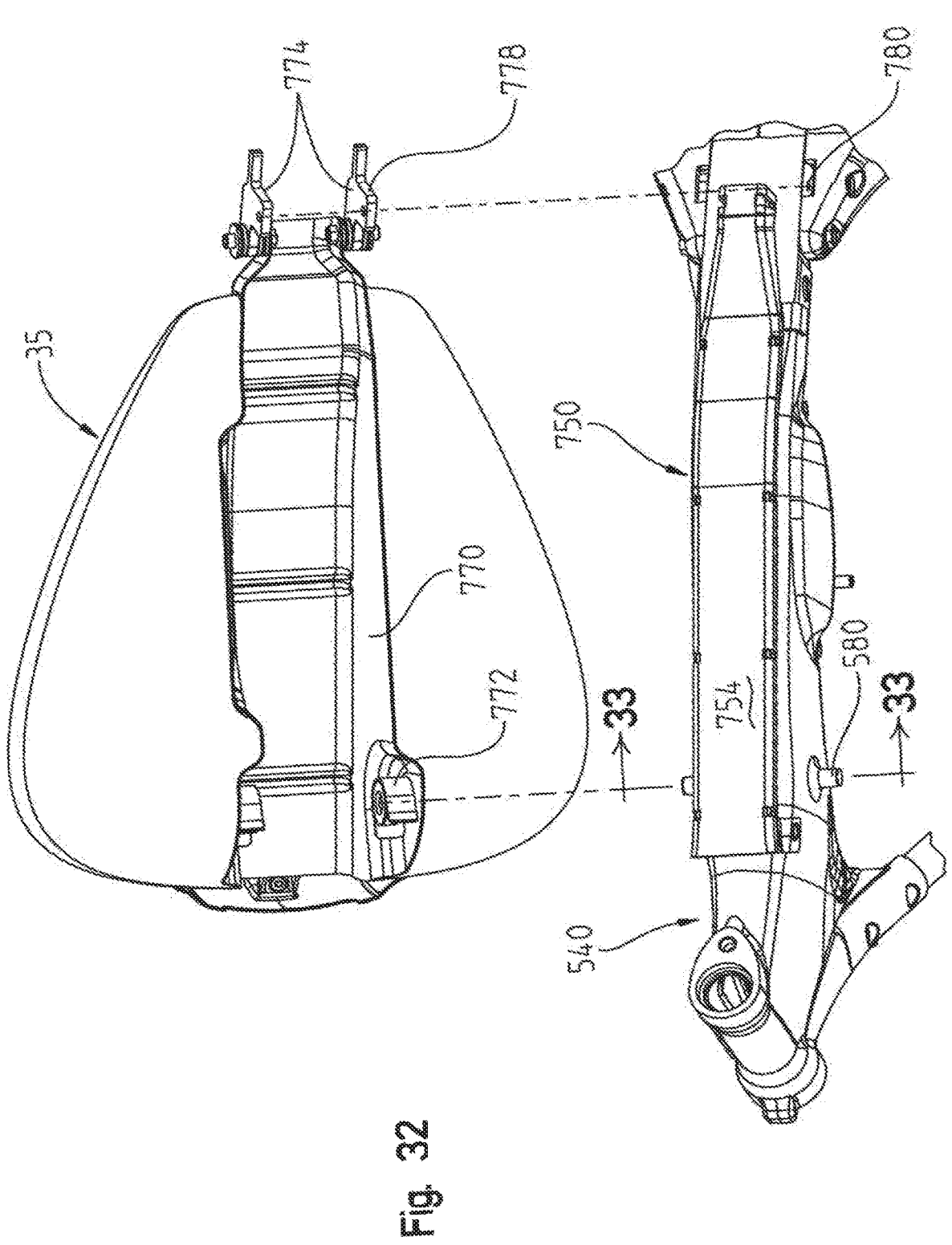
FIG. 32 shows a fuel tank poised for receipt over the top of the main frame portion and wire harness channel.
Figure 33:
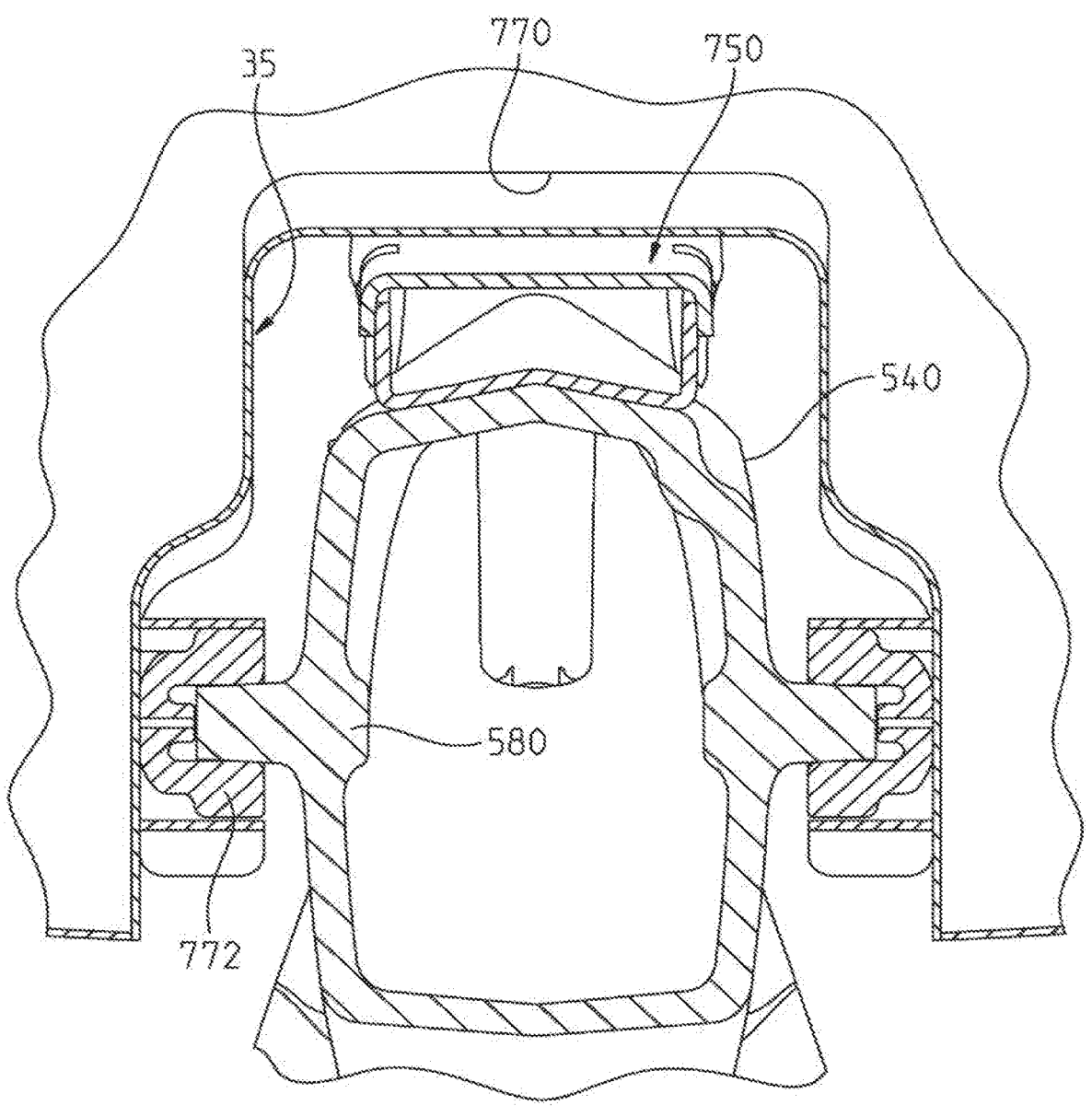
FIG. 33 shows a cross-sectional view through lines 33-33 of FIG. 32 where the wire harness channel is in an assembled position.

With respect now to FIGS. 32 and 33, fuel tank 35 is shown coupled to main frame portion 540 and overlapping wire harness channel 750. As shown best in FIG. 32, fuel tank 35 includes an integrated channel at 770 including mounting bushings 772 and a rear mounting bracket 774. FIG. 33 shows fuel tank 35 in position with bushing 772 overlapping mounting lugs 580 retaining fuel tank 35 to main frame portion 540. Brackets 774 have tabs 778 fastened through holes 780 (FIG. 32)

Figure 34:
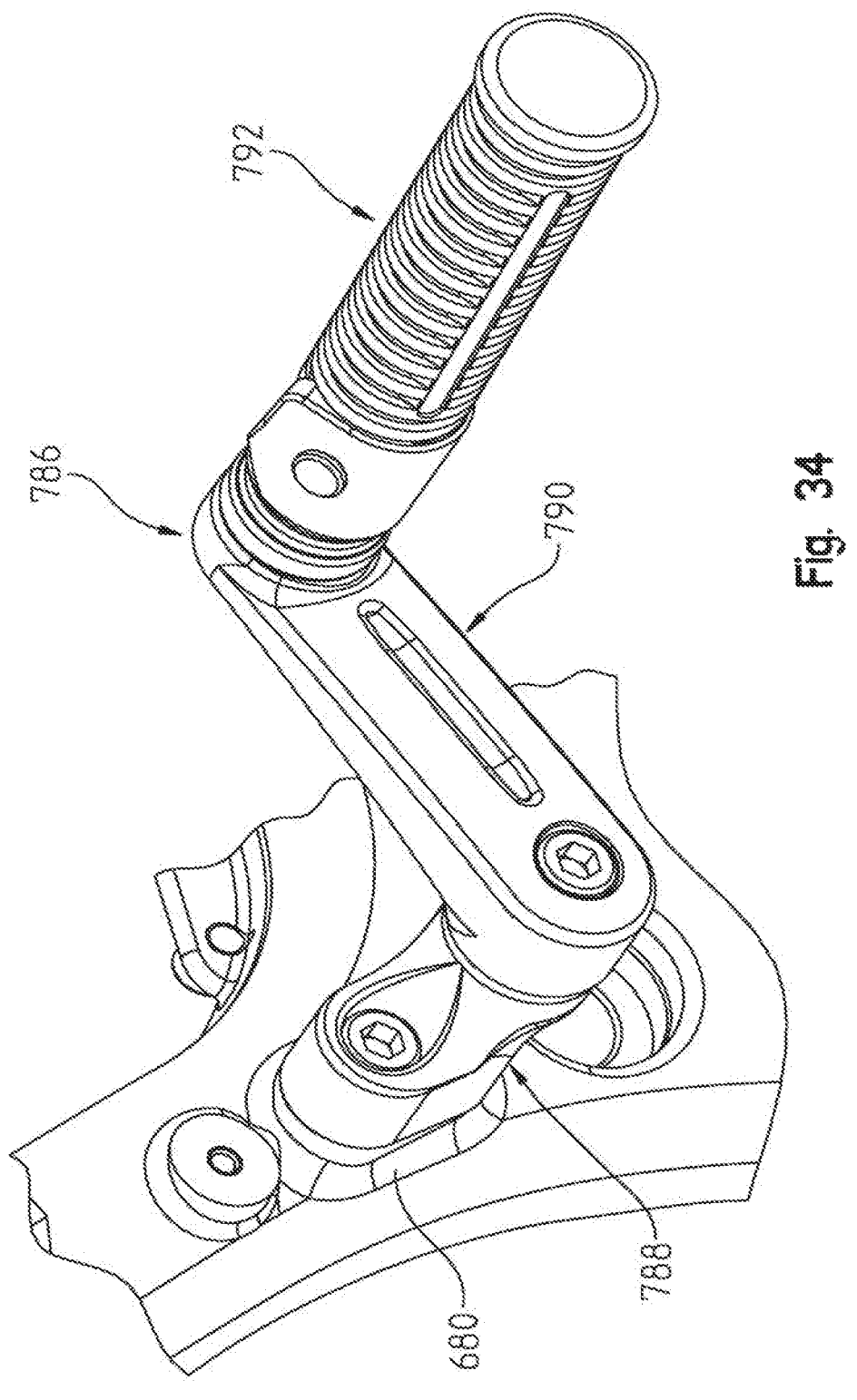
FIG. 34 shows a rear passenger foot peg coupled to the vehicle frame.
Figure 35:
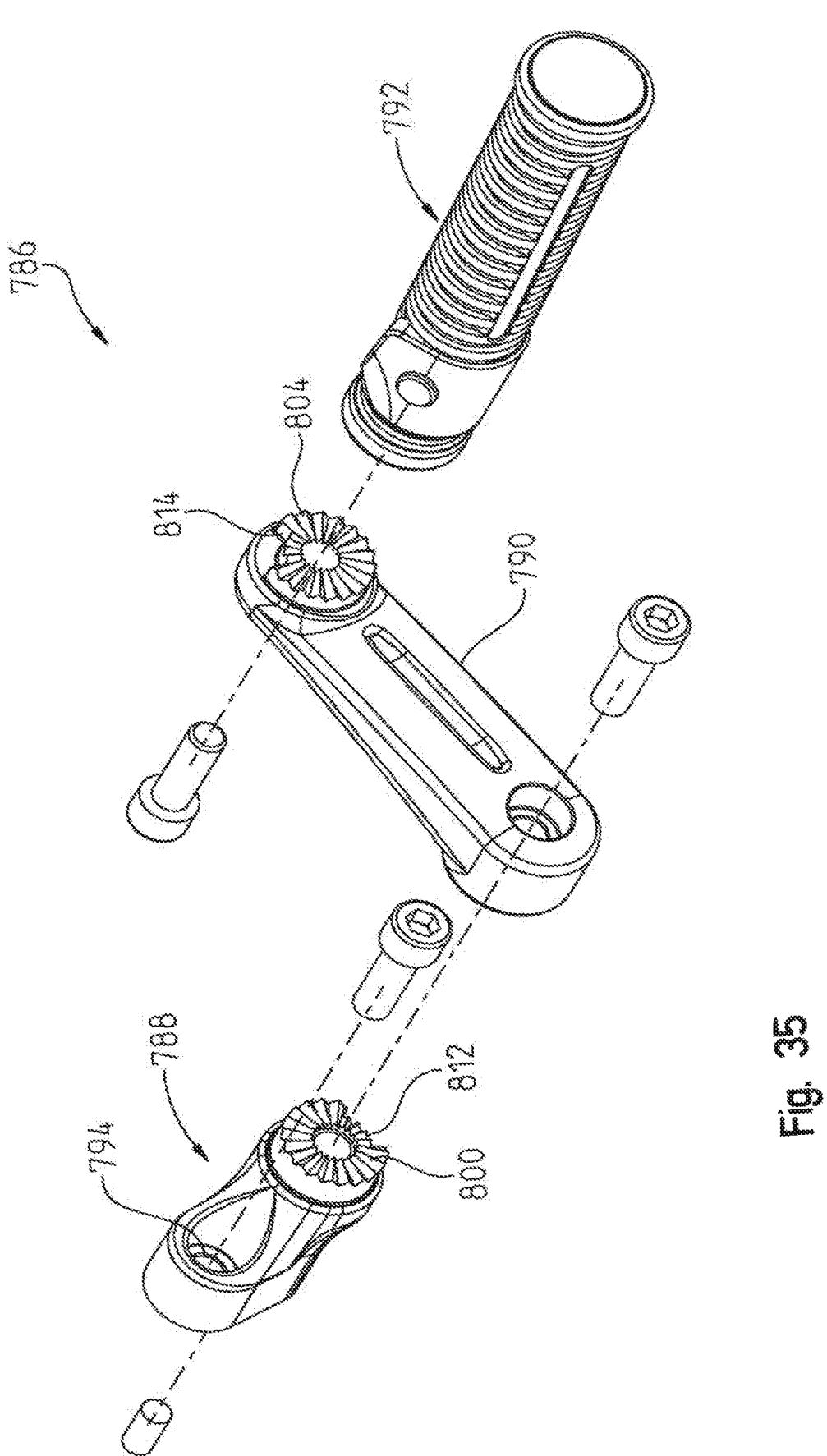
FIG. 35 shows an exploded view of the assembly in FIG. 34.
Figure 36:
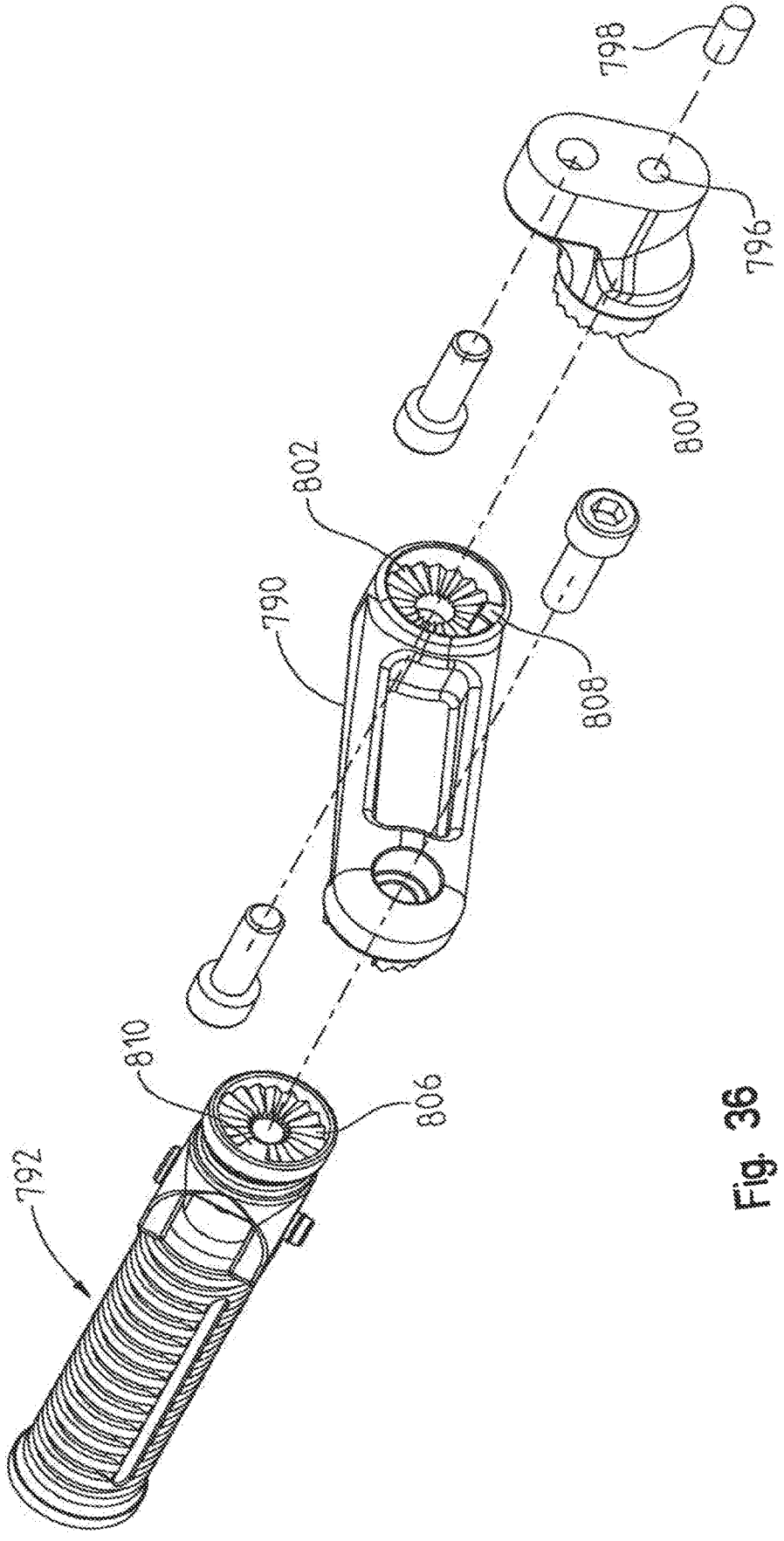
FIG. 36 shows the assembly of FIG. 35 from the opposite view.

With reference now to FIGS. 34-36, passenger footrest will be described. (see also FIG. 1 for location of footrest 786). As shown in FIG. 34, footrest 786 generally includes posts 788, arm 790, and foot peg 792. Post 788 includes a mounting aperture 794 and aperture 796 (FIG. 36) for receiving mounting pin 798. Post 788 further includes a coupling face at 800 profiled as a "hirth" coupling and arm 790 includes a mating coupling face at 802 (FIG. 36) profiled to cooperate with face 800. Arm 790 includes a second face at 804, which cooperates with an inner face 806 of foot peg 792. As designed, the arm 790 and peg 792 are rotatably mountable in a plurality of positions such that footrest 786 may be adjusted to various heights and positions; however, limit stops are included such as 808 and 810 (FIG. 36), which cooperate within recesses 812 and 814 respectively.

Figure 37:
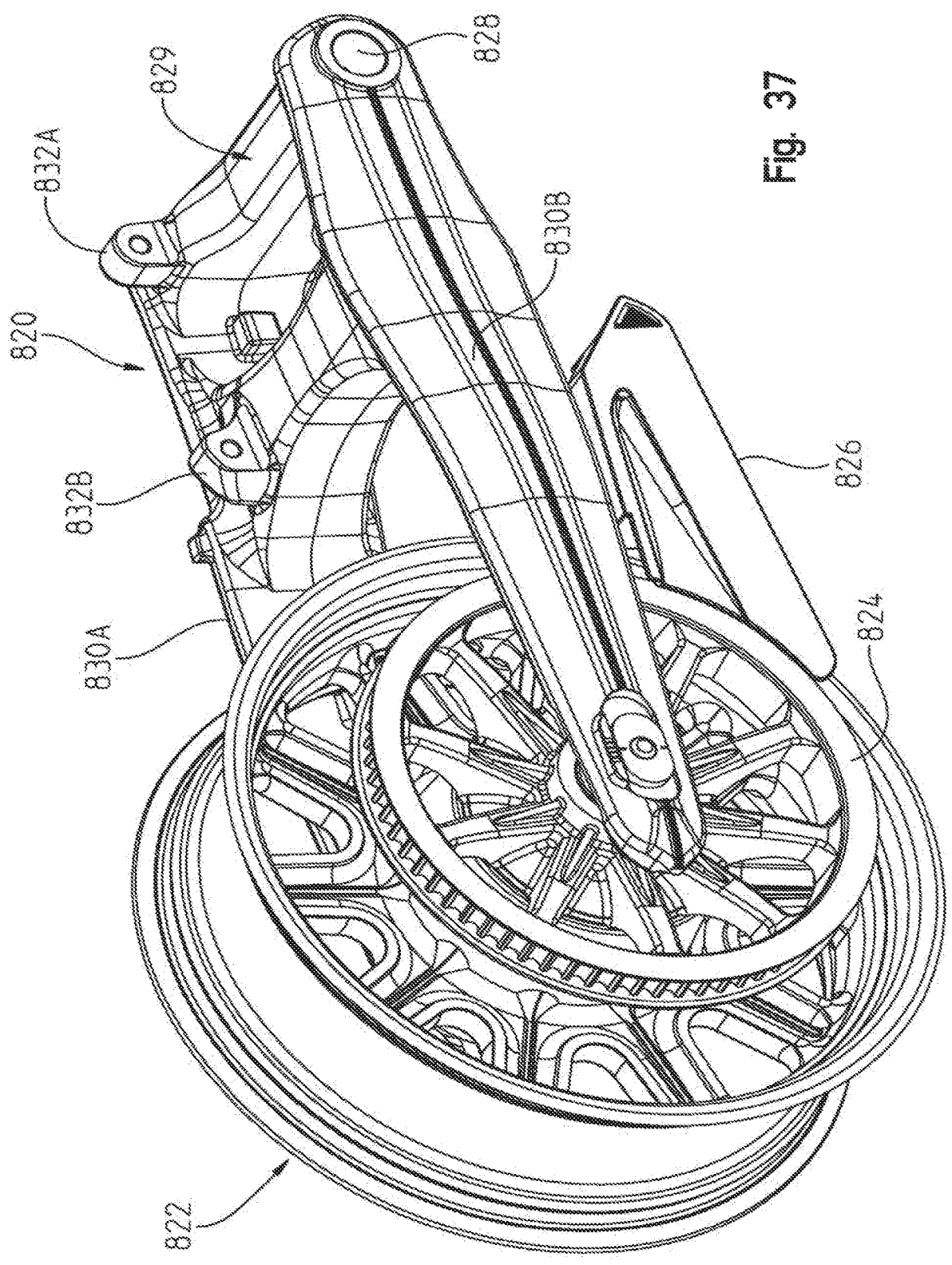
FIG. 37 shows an assembled view of a swing arm and rear wheel.

With reference now to FIG. 37-40, rear swing arm and drive assembly will be described. As best shown in FIG. 37, the rear drive includes a swing arm 820 to which wheel 822 and sprocket 824 are rotatably coupled. It should be understood that the connection of swing arm 820 to frame 4 may be similar to that shown in U.S. Application Publication Nos. 2012/0241237 and/or 2012/0241239, the subject matter of which is incorporated herein by reference. A belt guard 826 is positioned adjacent to and below sprocket 824 as described herein. Swing arm 820 includes a pivot position at 828, a middle portion 829 and rearwardly extending arms 830A and 8308. Rear wheel 822 is received in the area between left arm 830A and right arm 8308 and rearward of middle portion 829. In one embodiment, swing arm 820 is a one-piece casting. In one example, swing arm 820 is cast through a lost core process. Swing arm 820 further includes mounting lugs 832A and 8328 for mounting suspension as described herein.

Figure 38:
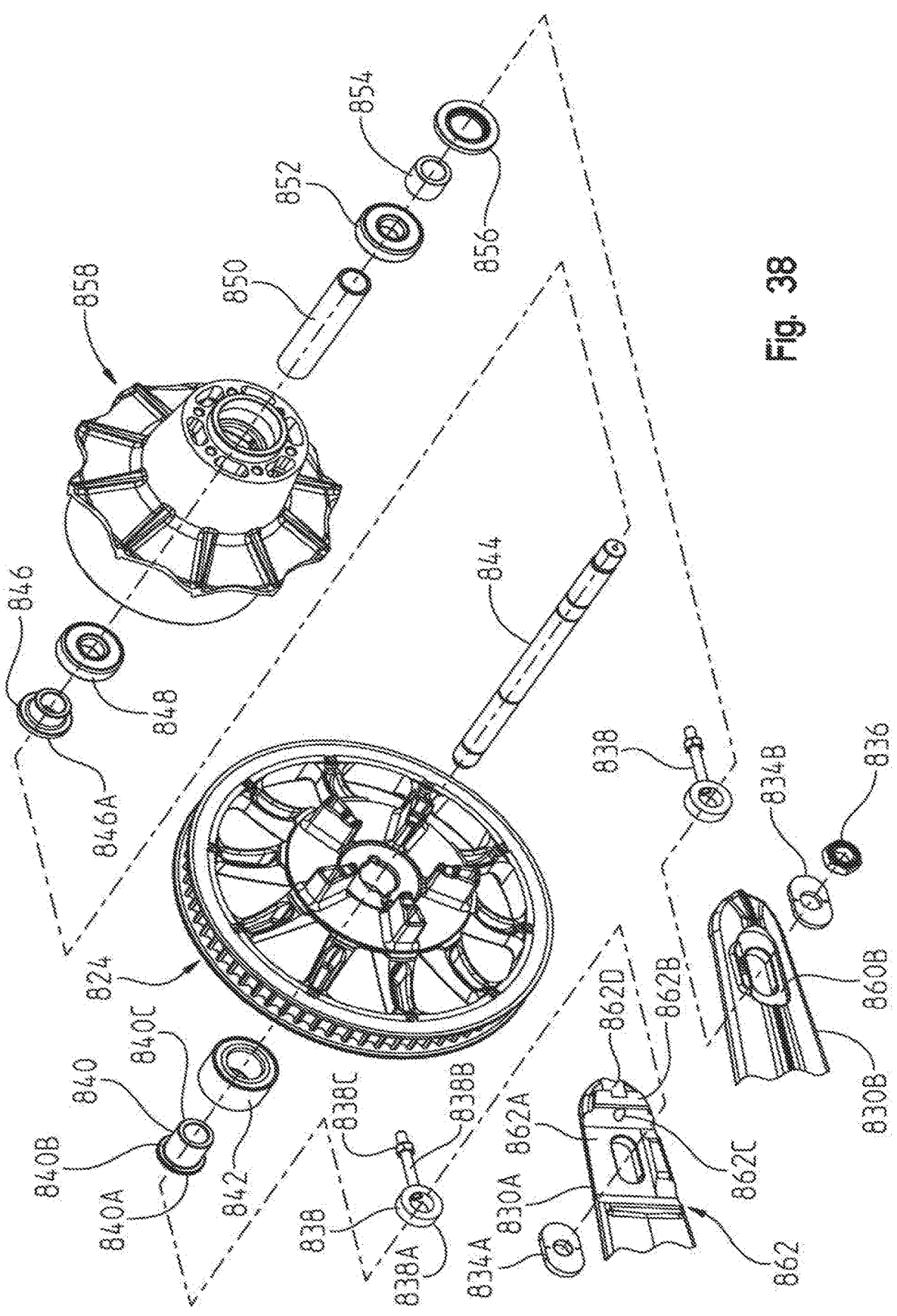
FIG. 38 shows an exploded view of a belt drive system.

With reference now to FIG. 38, the various components of the drive include positioning washers 834, fasteners 836, and axle positioning yokes 838. The washers 834 and their operation may be in accordance with U.S. Pat. No. 7,690, 668, the subject matter of which is incorporated herein by reference. Further components include sleeve 840, bearing 842, axle 844, sleeve 846, bearing 848, sleeve 850, bearing 852, sleeve 854, seal 856, and wheel hub 858. With reference still to FIG. 38, sleeve 840 includes a lip 840A having an inner edge 8408 facing sprocket 324, and sleeve 846 includes a lip 846A. Swing arm 830A includes a receiving area 862 comprised of surface 862A and wall 8628. An aperture 862C extends through wall 8628 and extends through to notched area 8620. Yoke 838A includes a cylindrical portion 838A, a threaded stud 8388 and a lock nut 838C. It should be appreciated that threaded stud 8388 extends through aperture 862C and lock nut 838C is fitted in a notched area 8620, with enough clearance to be rotated. Thus the threaded stud 8388 and lock nut 838C move the cylindrical portion 838A forwardly or rearwardly in the longitudinal direction depending on the loosening or tightening of the lock nut 838C.

Figure 39:
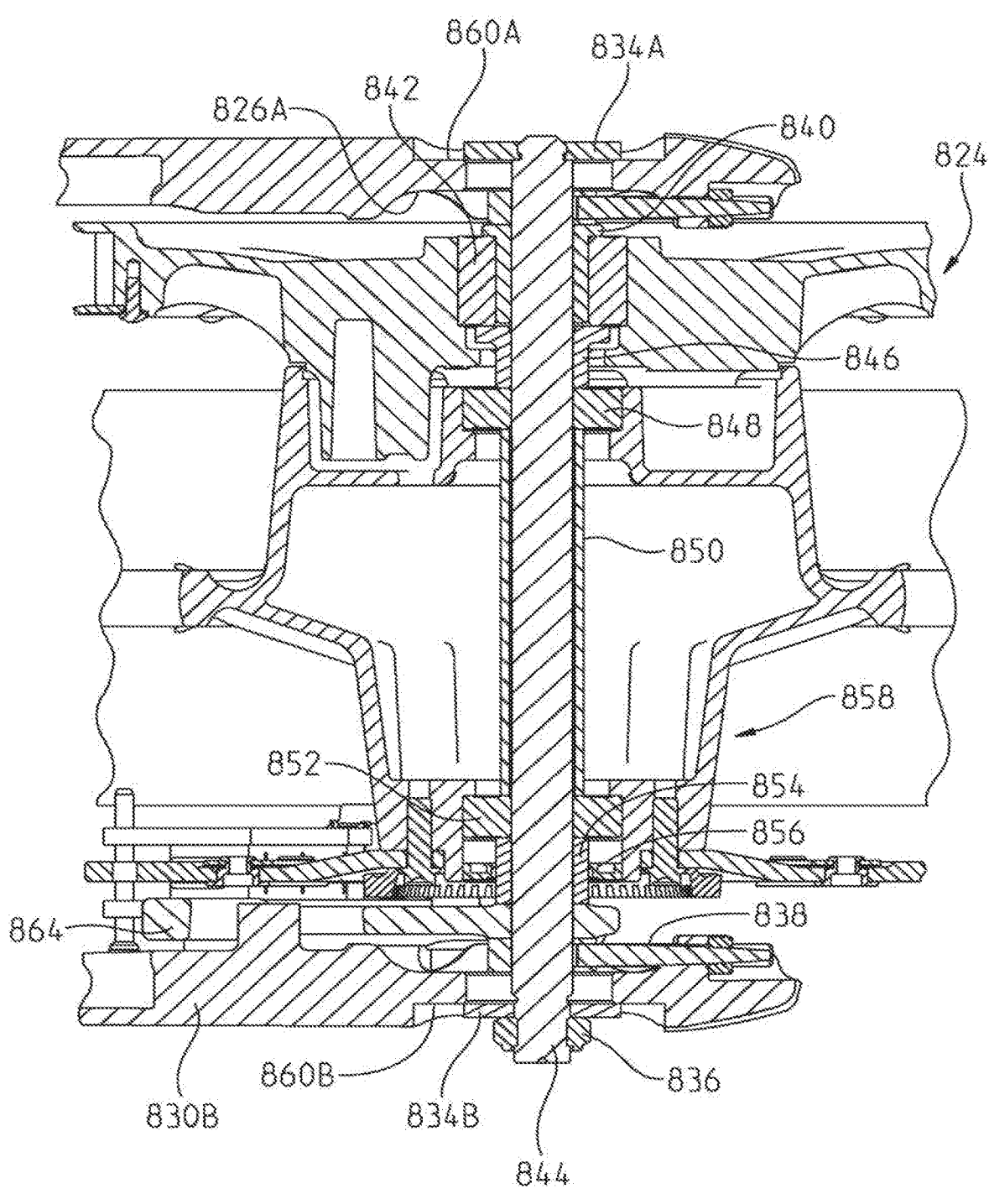
FIG. 39 shows a cross-sectional view through a rear axle.

As shown best in FIG. 39, axle 844 is shown tensioned in its longitudinal direction, whereby axle 844 is fixed to washer 834A at one end and to washer 8348 and fastener 836 at the opposite end. The stack up of the components also provides the rigid spacing of the swing arms 830A and 8308, as described below.

As shown in FIG. 39, washer 834A is positioned in groove 860A, while an outer surface of cylindrical portion 838A of yoke 838 is positioned against surface 826A, and an inner surface of cylindrical portion 838A is positioned against lip 840A. The inner edge 8408 (FIG. 38) presses against bearing 842 while bearing 842 presses against lip 846A of sleeve 846. It should be noticed that a small gap exists between end 840C (FIG. 38) and sleeve 846 to accommodate the tensioning of axle 844 and the trapping of bearing 842. Sleeve 846 thereafter presses against bearing 848 which in turn presses against sleeve 850 and bearing 852. Bearing 852 in turn presses against sleeve 854, brake caliper bracket 864, yoke 838 and swing arm 8308. Washer 8388 is trapped in groove 8608 with fastener 836. It should also be appreciated that bearings 842, 848 and 852 have an inner race and an outer race. Thus, the fixed components in the fully assembled condition include washers 834A, 8348; yokes 838; sleeves 840, 846, 850 and 854; brake caliper bracket 864; and the inner races of bearings 842, 848 and 852. Wheel hub 858 and sprocket 824 are coupled together and rotate with the outer races of bearings 842, 848 and 852. Also bearings 842 and 852 are as far out as possible, that is, as close to the swing arms 830A and 8308 as possible, which puts the load closer to the drive. Also, while other bearings are possible, as shown, bearings 842, 848 and 852 are sealed double roller bearings.

Figure 40:
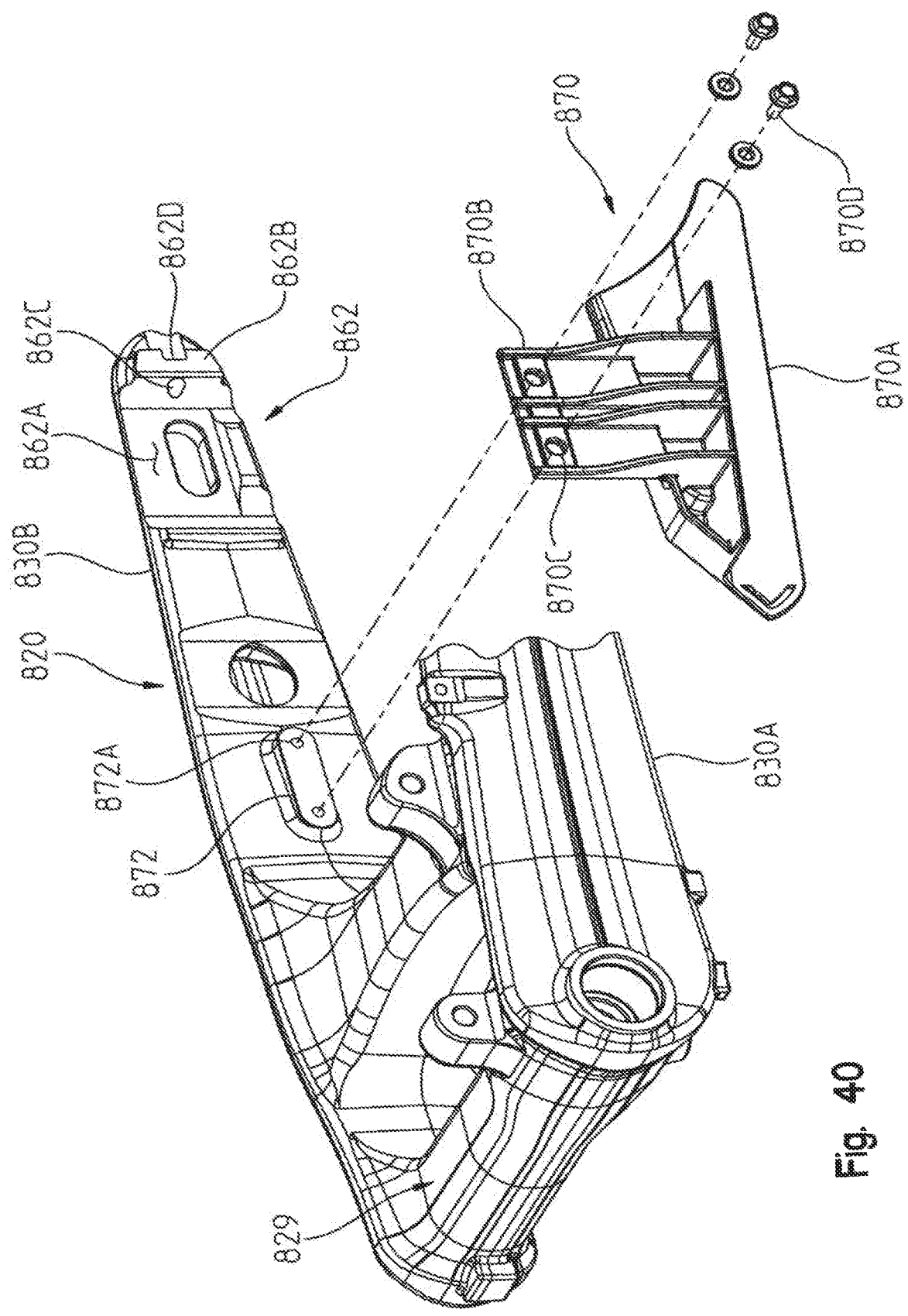
FIG. 40 shows an exploded view of a belt guard.

As shown in FIG. 40, belt guard 870 is shown coupled to arm 8308 at boss 872. Guard 870 includes a guard portion 870A and a bracket 8708. Guard 870 is coupled to arm 8308 by way of fasteners 8700 extending through apertures 870C of bracket 8708 and into apertures 872A of boss 872.

Figure 41:
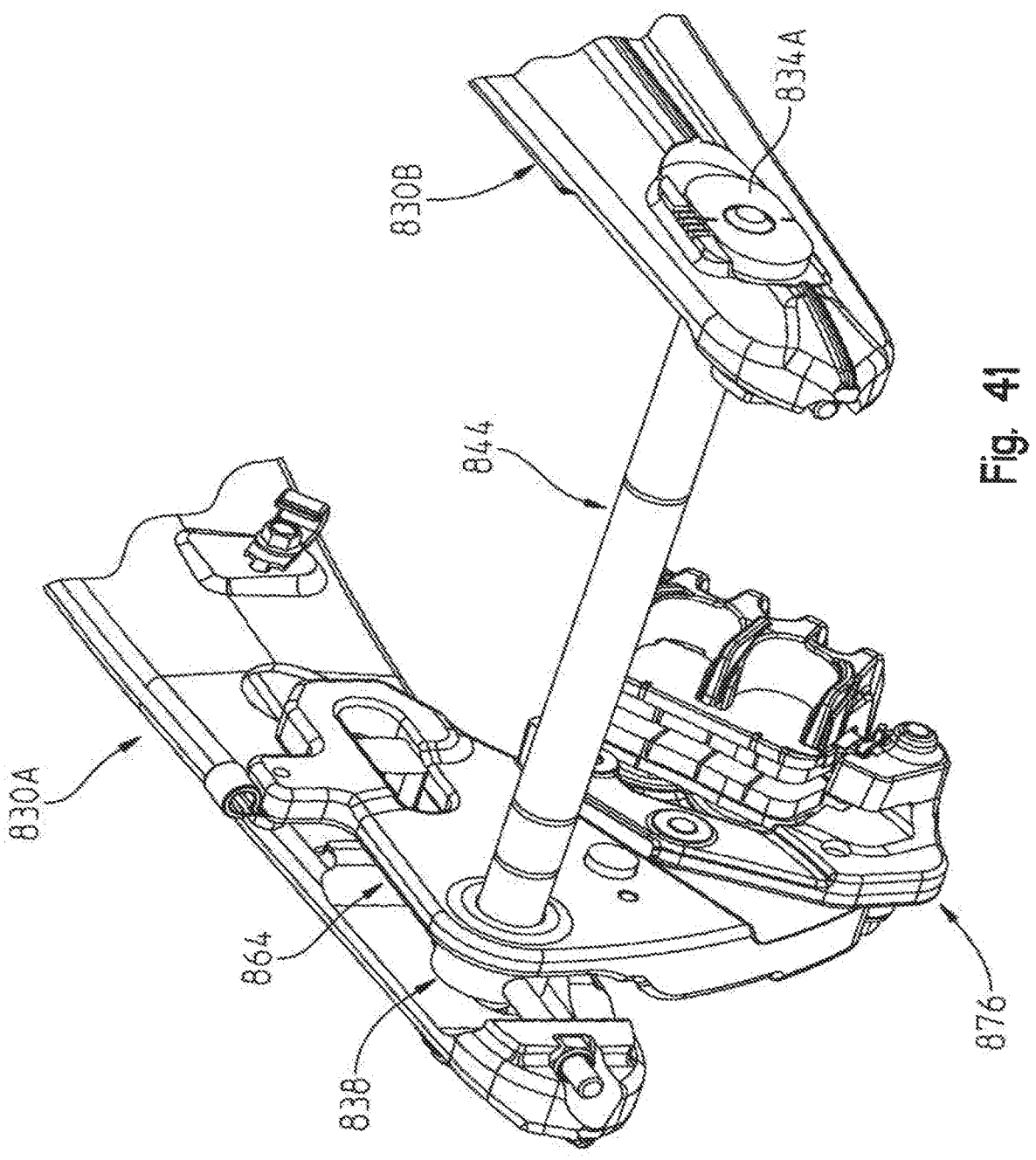
FIG. 41 shows an assembled position of a rear axle and brakes.
Figure 42:
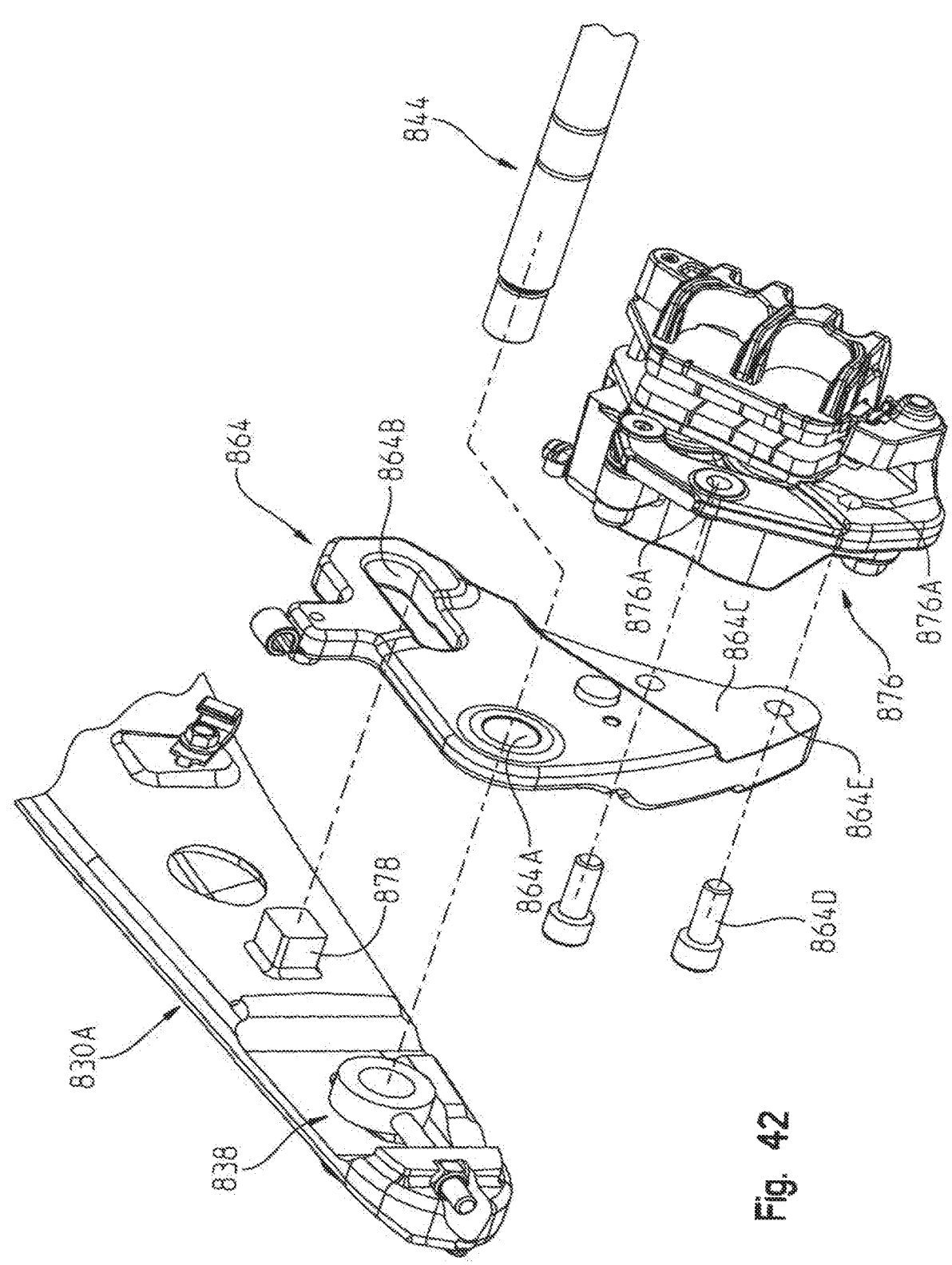
FIG. 42 shows an exploded view of the assembly 41.

With reference now to FIGS. 41 and 42, brake caliper 876 is shown which mounts to bracket 864. Bracket 864 has opening 864A through which axle 844 extends. Caliper 876 is coupled to bracket 864 by way of fasteners 8640 extending through apertures 864E, and threaded into threaded apertures 876A of caliper 876. Bracket 864 further comprises a slotted opening 864B which overlaps lug 878 on arm 830A. Thus, caliper 876 and bracket 864 are movable together longitudinally with the axle 844, as axle 844 moves with yokes 838.

Referring to FIGS. 43-46, rear suspension 24 includes a shock absorber 900, a pushrod 902, a connecting link 904, and mounting bracket 906. The linkage of pushrod 902 and connecting link 904 scale the movement of the shock absorber 900 by a multiplication factor to correlate to the movement of swing arm 820.

Figure 45:
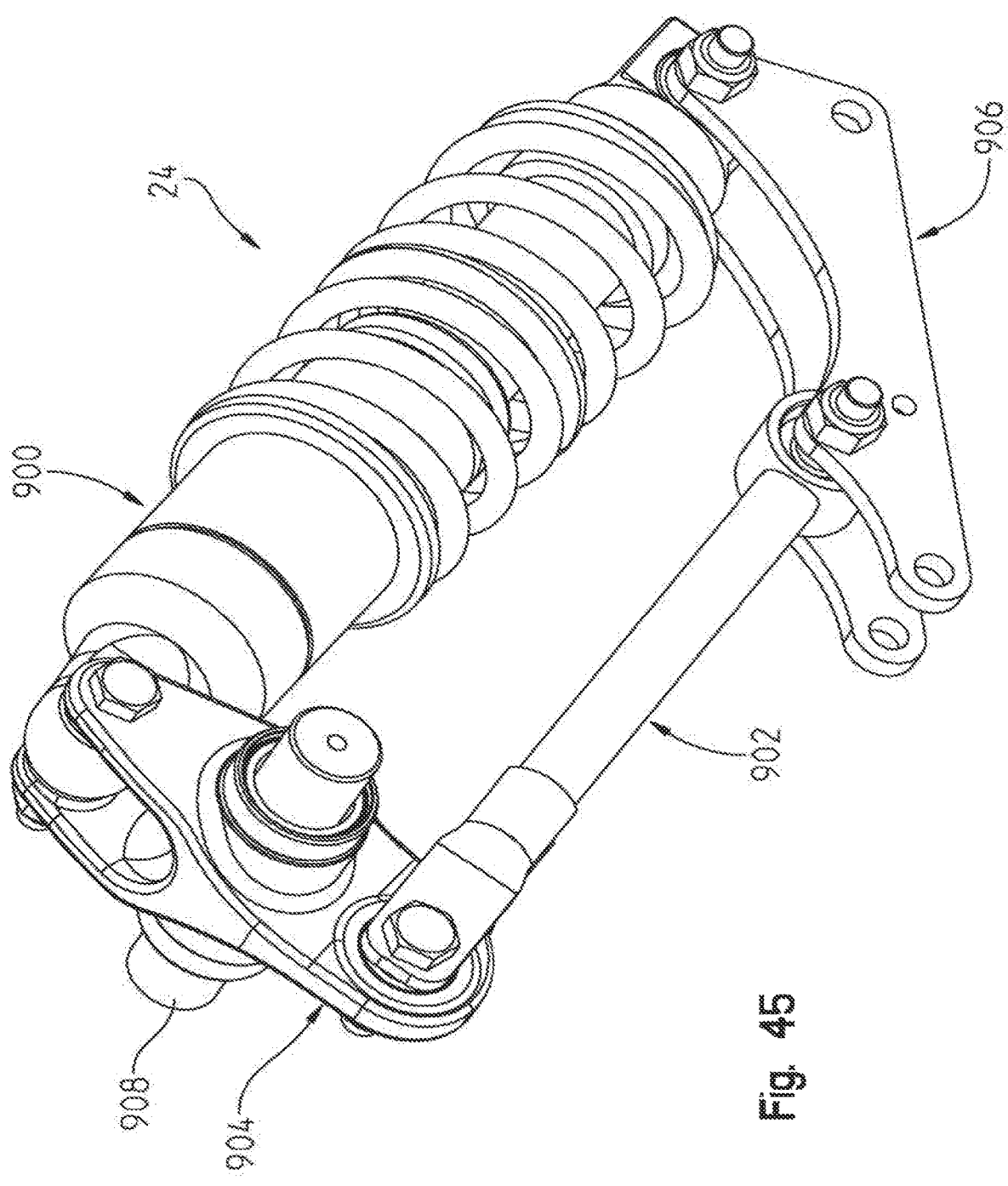
FIG. 45 shows a perspective view of the rear suspension assembly.
Figure 46:
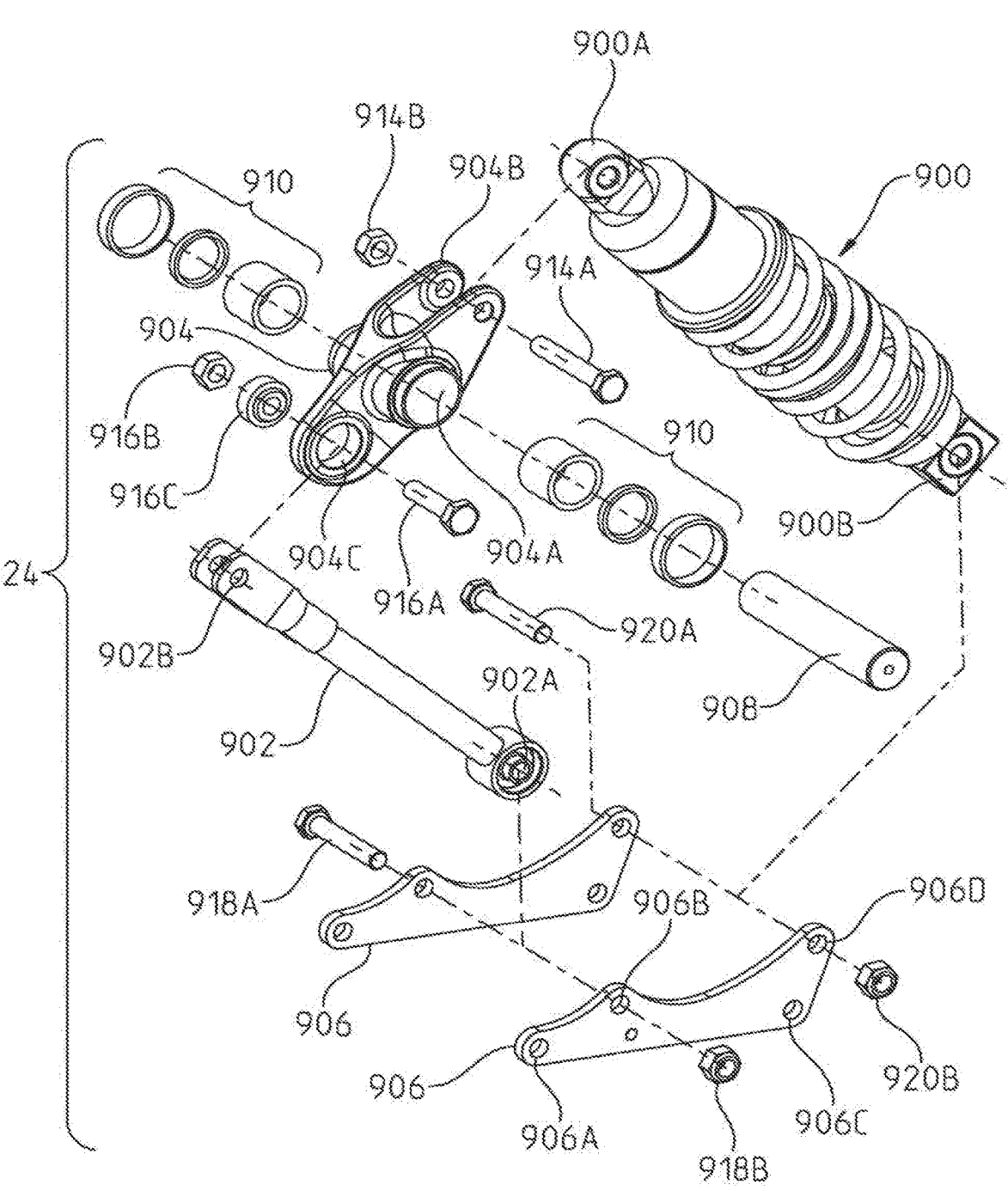
FIG. 46 shows an exploded view of the rear suspension assembly of FIG. 45.

As shown in FIG. 45, connecting link 904 is rotatably connected to main frame member 540 through a pivot pin 908 positioned in aperture 612 (FIG. 26A) of main frame member 540. As shown in FIG. 46, pin 908 may be supported by a bearing or sleeve assembly 910 in aperture 904A of link 904. A first end 900A of shock 900 is coupled to end 904B of link 904 by way of fasteners 914A and 914B. In a like manner, end 902B of pushrod 902 is coupled to end 904C of link 904 by way of fasteners 914A and 916B, and which may include a bearing such as 914C. Pushrod 902 is rotatably coupled to swing arm 820 through bracket 906 by way of fasteners 918A and 918B. Shock absorber 900 is rotatably coupled to swing arm 820 through bracket 906 by way of fasteners 920A and 920B through end 900B. Bracket 906 may be coupled to swing arm 820 by way of fasteners 922 (FIG. 43) through apertures 906A of bracket 906 and lug 832B, and by way of fasteners 922 through apertures 906C of bracket 906 and lug 832A (FIG. 37).

In one embodiment, shock absorber 900 includes double over springs 924 to provide a rigid shock for the swing arm 820. In another embodiment, shock 900 is an air adjustable shock and may have a suspension adjuster coupled thereto, such as an air line (not shown). The amount of air in shock absorber 900 may be adjusted upward or downward by adding air to shock absorber 900 or removing air from shock absorber 900, respectively. Air shock 900 may be similar to that shown in U.S. Pat. No. 7,669,682, the subject matter of which is incorporated herein by reference. By being capable to adjust the amount of air in air shock 900, an operator may adjust the ride height, and suspension control of vehicle 2 for the amount of cargo weight being carried, that is whether the saddlebags are full and whether a passenger is riding also.

Figure 43:
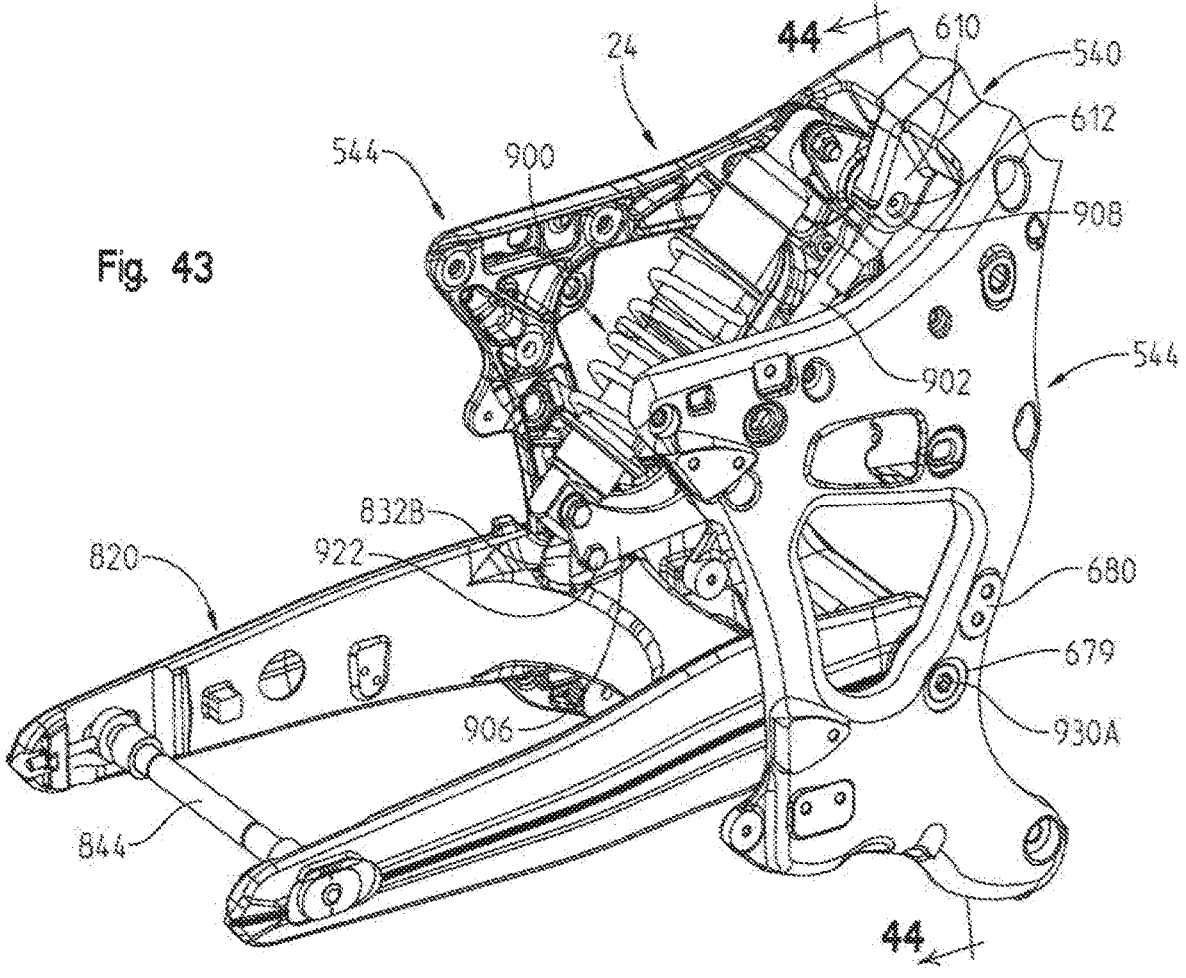
FIG. 43 shows an assembled view of a rear suspension assembly.
Figure 44:
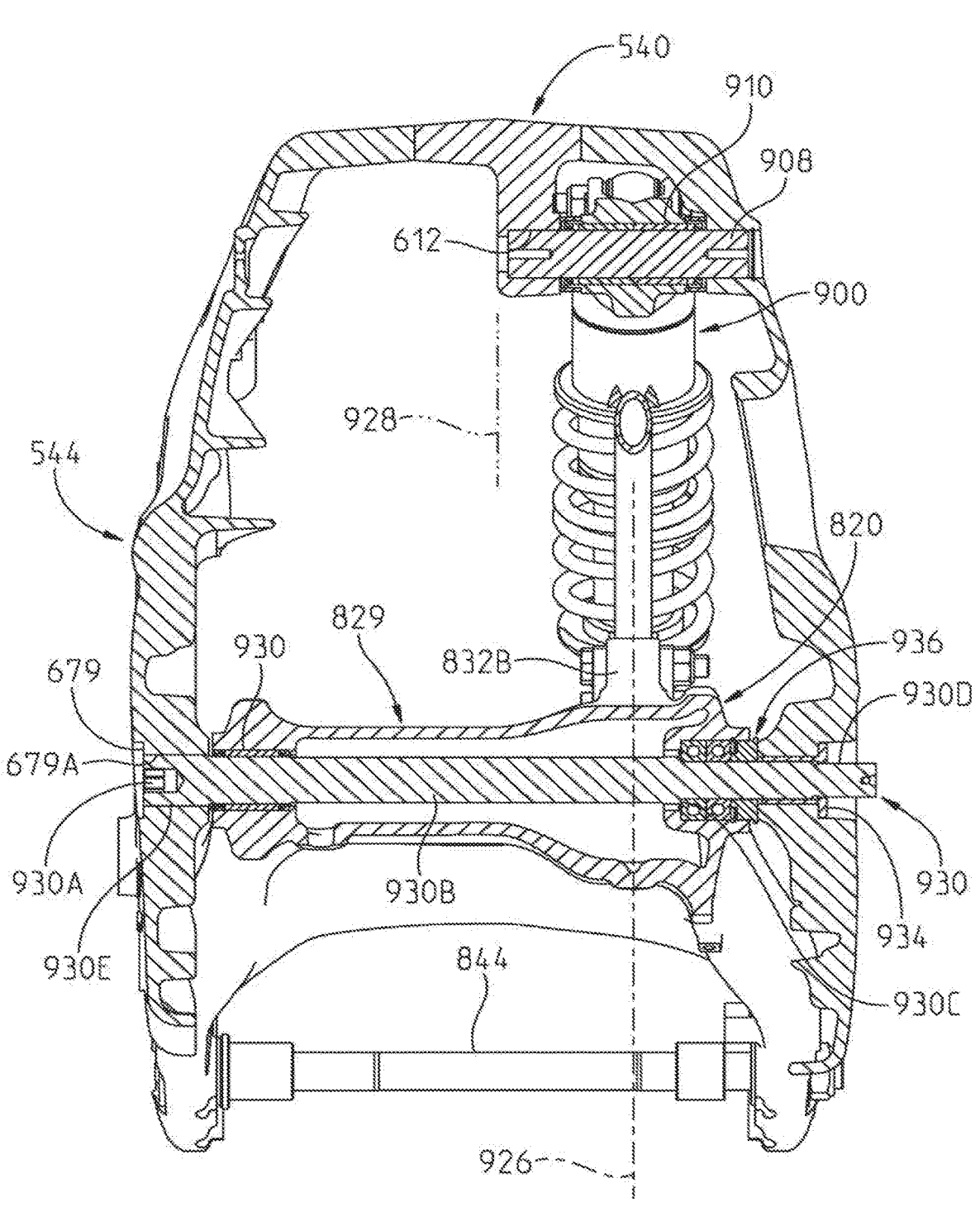
FIG. 44 shows a cross-sectional view through lines 44-44 of FIG. 43.

As shown in FIG. 44, rear suspension 24 is arranged such that pushrod 902 and connecting link 904 move in a plane 926 which is parallel to a centerline plane 928 of vehicle 2. In the illustrated embodiment, pushrod 902 and connecting link 904 move in the plane 926. As also shown in FIG. 43, shock absorber extends in a non-vertical axis, allowing the shock to be relatively progressive in rate.

With reference now to FIGS. 43 and 44, the swing arm 820 is shown pivotally coupled to the frame 540 and side frames 544. As shown an axle 930 has a drive end 930A, central shaft portion 9308, reduced diameter section 9300 which defines shoulder 930C, and threaded section 930E. Threaded section 930E threads into threaded aperture portion 679A of aperture 679 fixing shaft 930 relative to side frame 544. On the opposite side, reduced diameter portion 9300 extends through sleeve 934, which places boss 679A (FIG. 27) against bearing assembly 936. Thus, when a fastener (not shown) is threaded onto threaded section 9300 and tightened, the bearing assembly 936 is trapped against shoulder 930C, allowing middle portion 829 of swing arm 820 to freely pivot. As such, axle 930 may be removed to pivot or rotate swing arm 820 downwardly in order to access the exhaust or other components of vehicle 2. Swing arm 820 may also include sleeve 940 adjacent to end 930A of axle 930.

Figure 47:
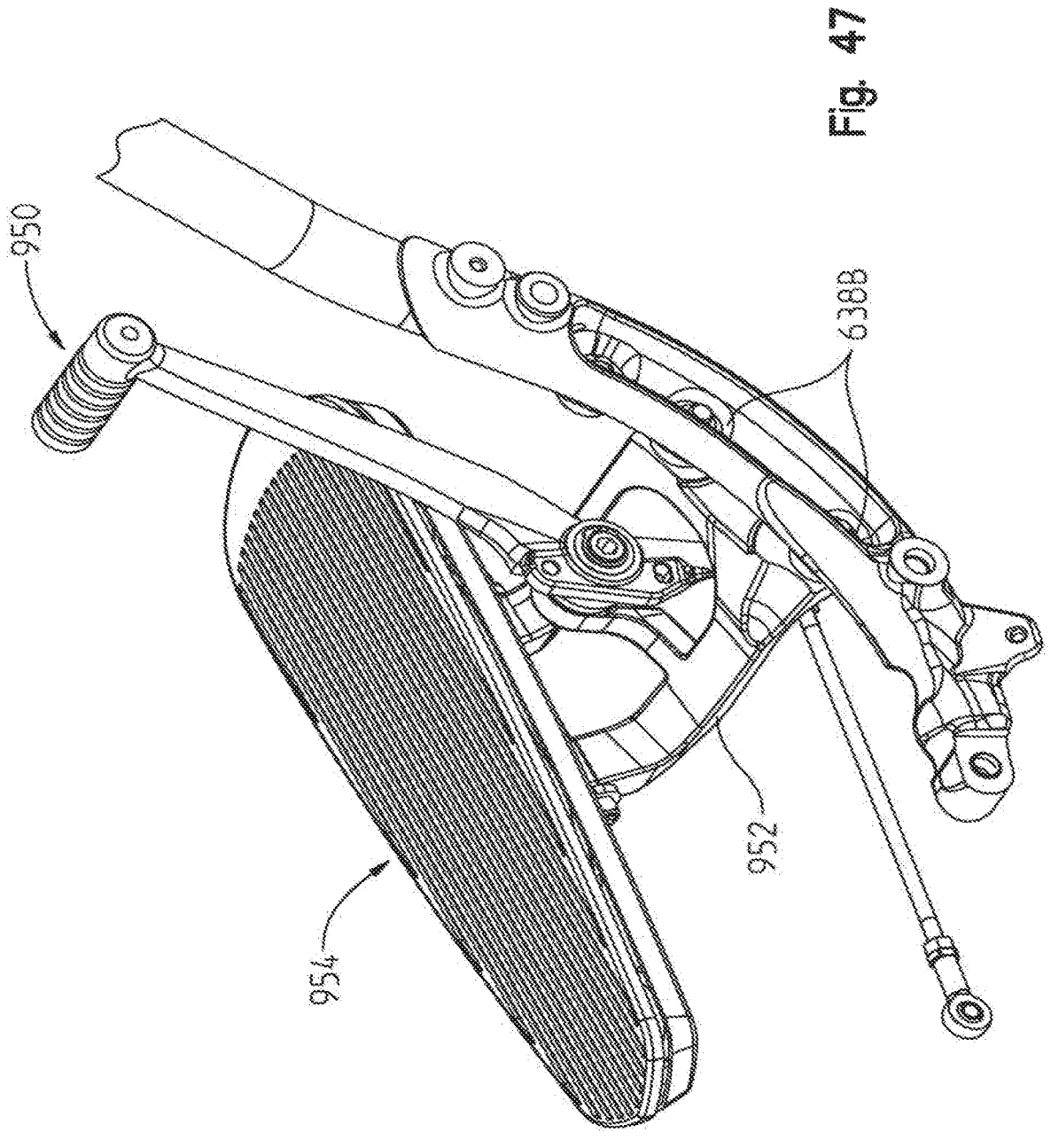
FIG. 47 shows a perspective view of a transmission shift lever.
Figure 48:
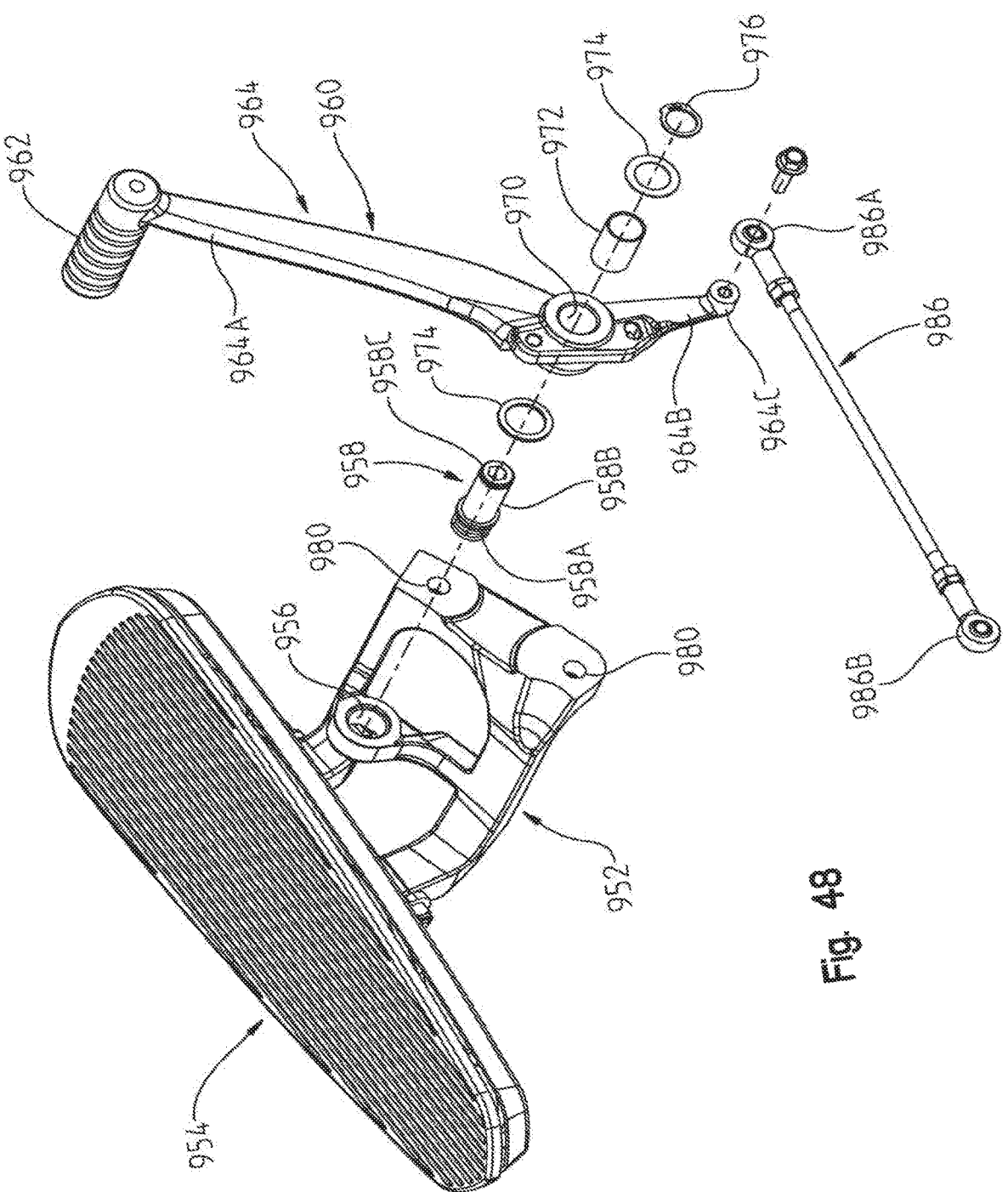
FIG. 48 shows an exploded view of the lever of FIG. 48.

With reference now to FIGS. 47 and 48, transmission shift lever assembly 950 is shown in greater detail. As shown assembly includes a bracket 952 attached to foot treadle 954. Bracket 952 includes a threaded aperture 956 which receives a coupler 958 having a threaded end 958A, shaft portion 9588, and groove 958C. Shift lever 960 includes a foot pedal portion 962, and a lever 964 having lever arms 964A and 9648, which pivot in opposite senses through pivot 970. Coupler 958 is received in threaded aperture 956 so as to couple shift lever 960 to foot treadle 954. Washer 974 and sleeve 972 are then positioned over shaft portion 9588. Lever 960 is the slidably received over sleeve 972 and a second washer 974 is applied over the end of shaft portion 9588. A snap ring 976 is then applied to groove 958C to retain the assembly in place. Bracket 952 includes apertures which align with apertures 6388 (FIGS. 26 and 47) which couples bracket and lever 960 to the frame 4. A shift link 986 has a first end 986A coupled to end 964C of lever arm 9648 and a second end 9868 coupled to the transmission.

Another feature of the motorcycle 2 include a fan 990 (FIGS. 1 and 3) which remove stagnant air from behind the rear cylinder.

Figure 1:
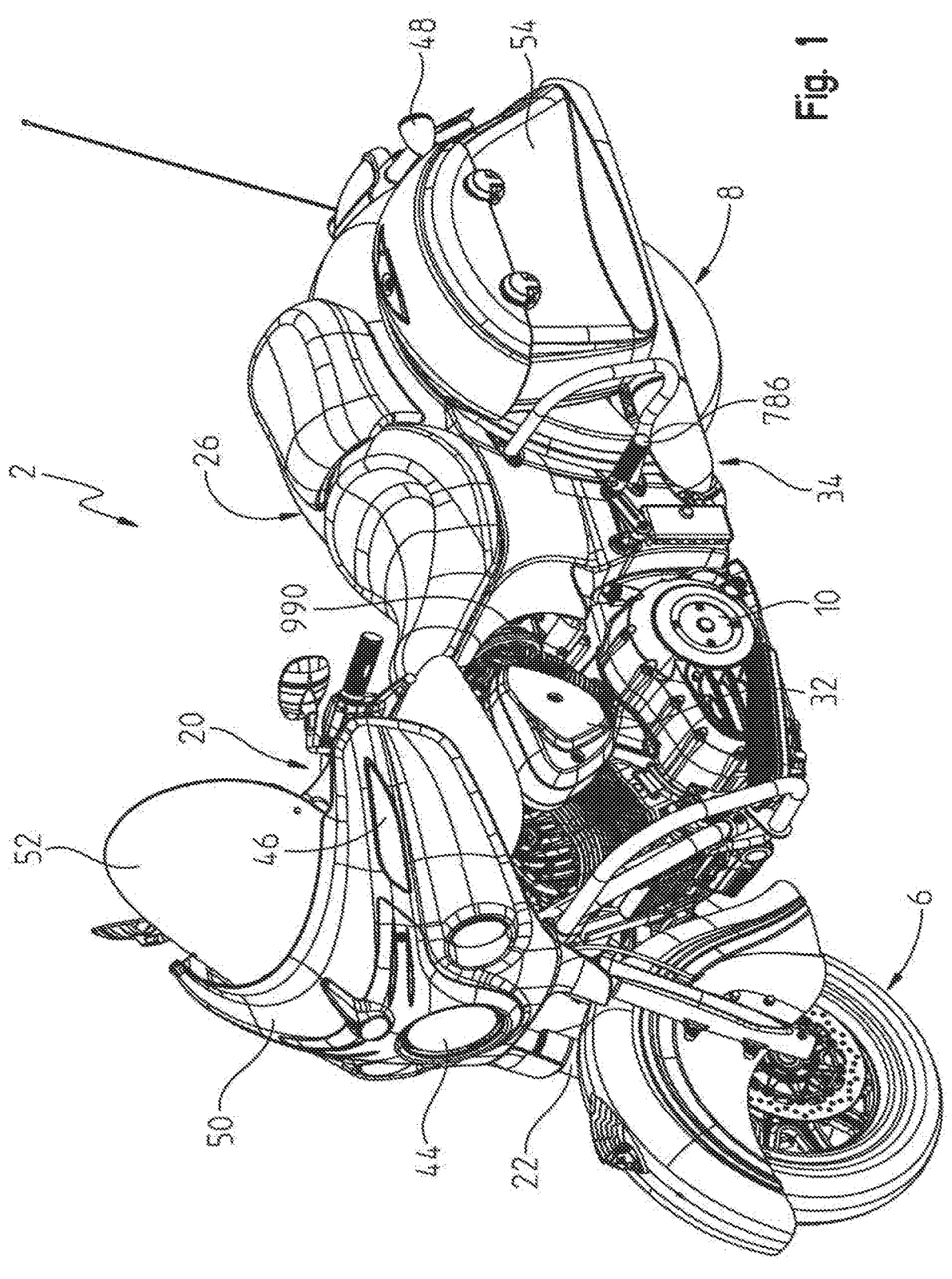
FIG. 1 is a left front perspective view of the two-wheeled vehicle.
Figure 2:
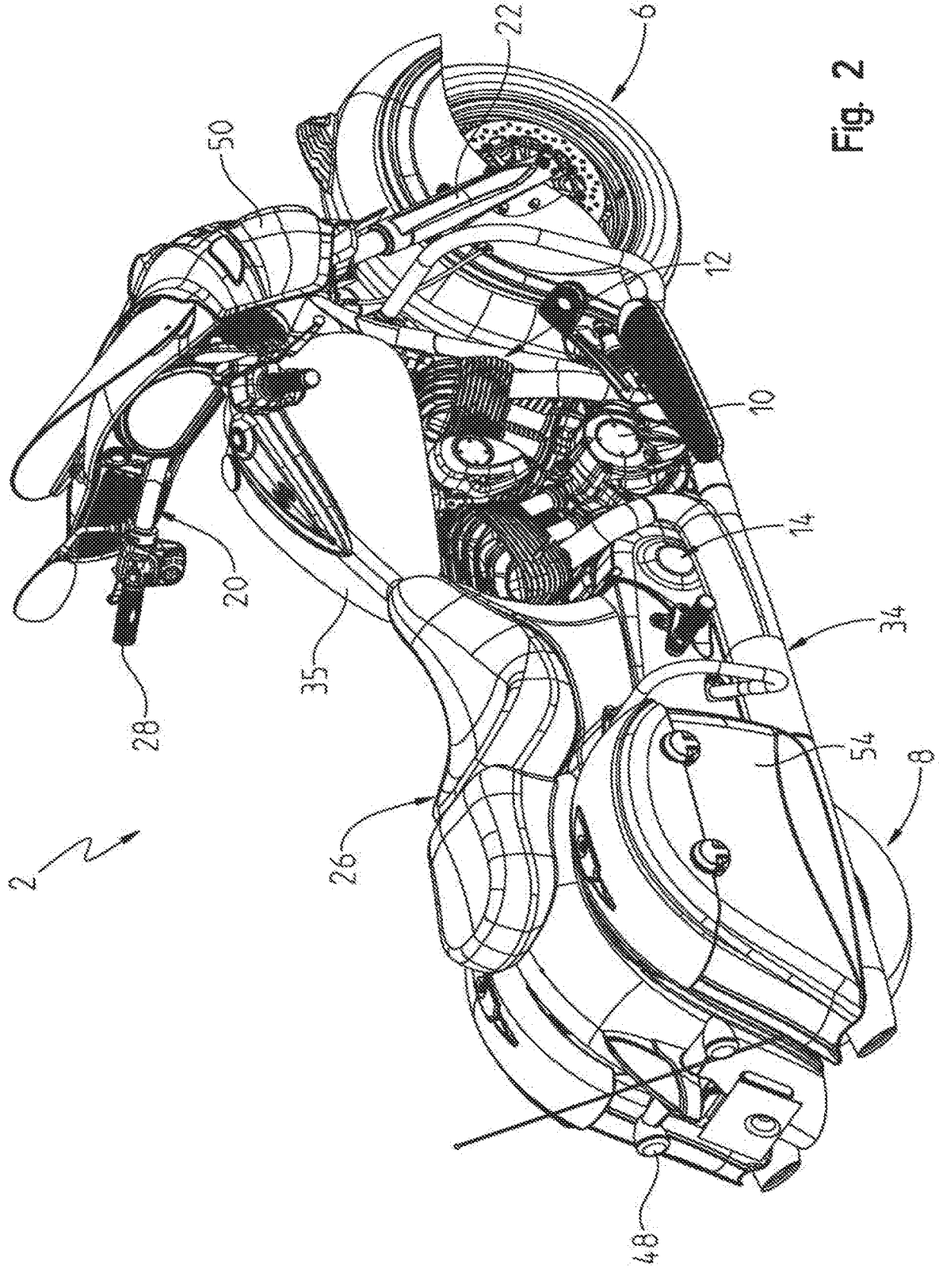
FIG. 2 is a right rear perspective view of the two-wheeled vehicle.
Figure 3:
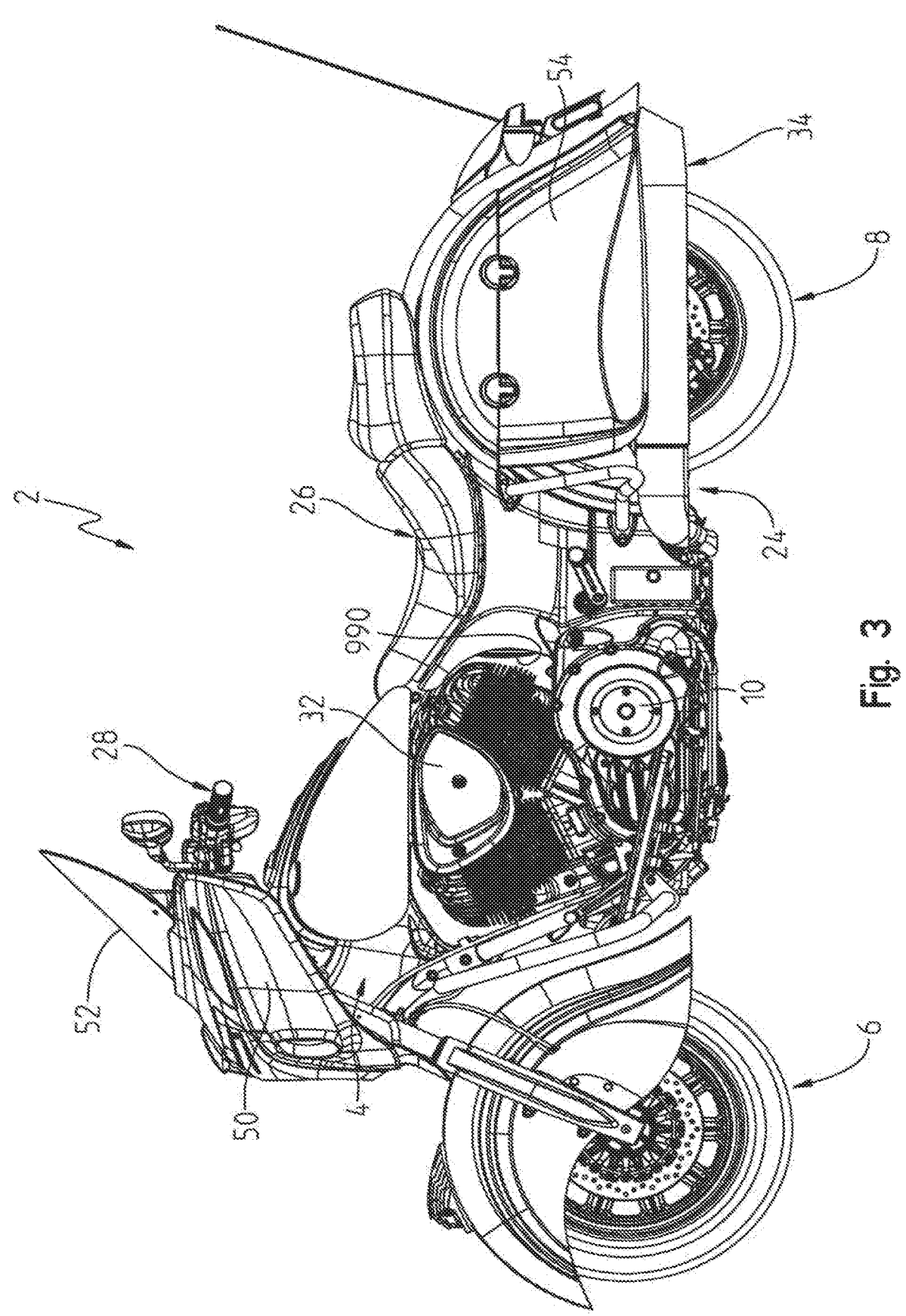
FIG. 3 is a left side view of an illustrative embodiment of the two-wheeled vehicle.
Figure 4:
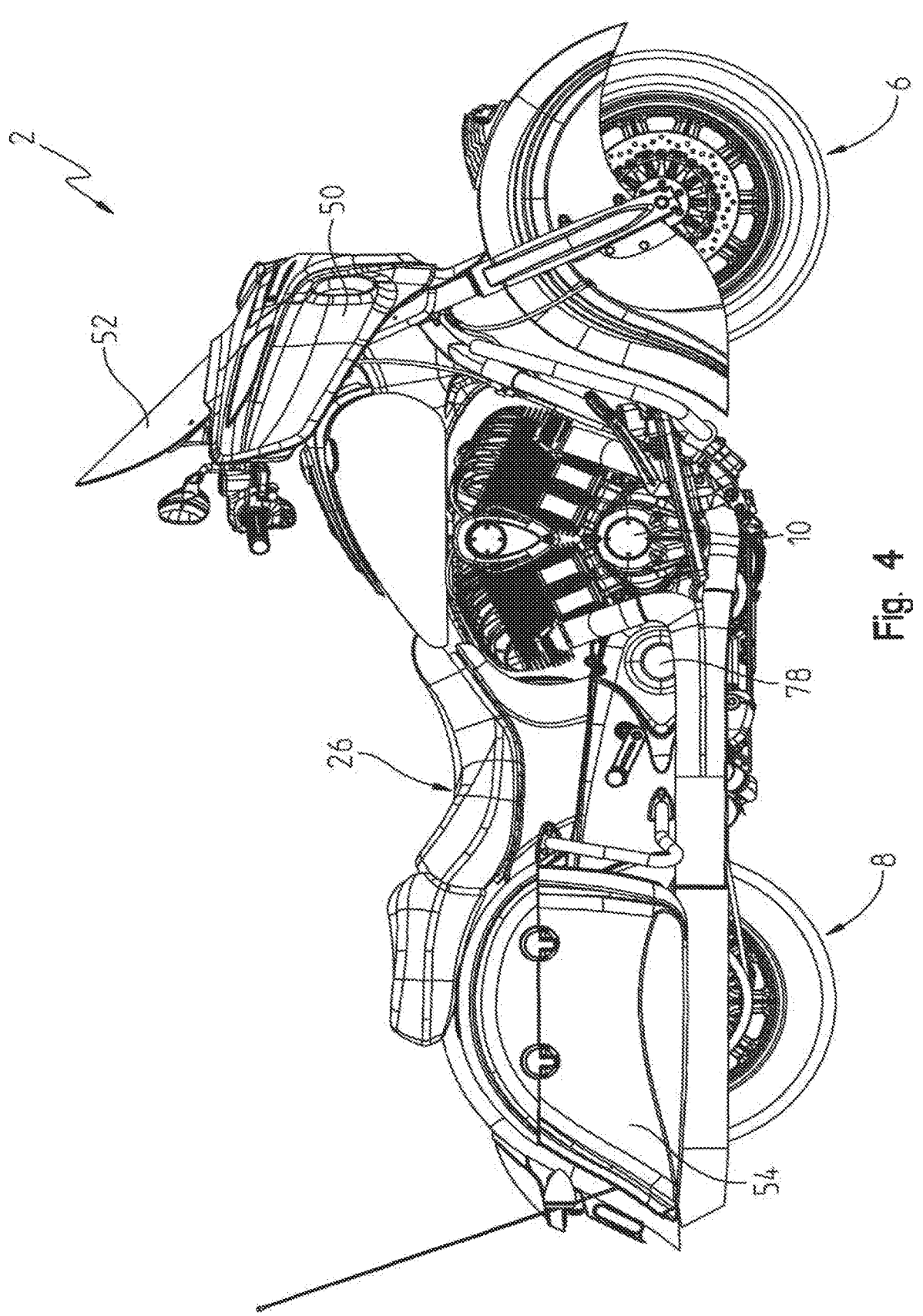
FIG. 4 is a right side view of an illustrative embodiment of the two-wheeled vehicle.
Figure 5:
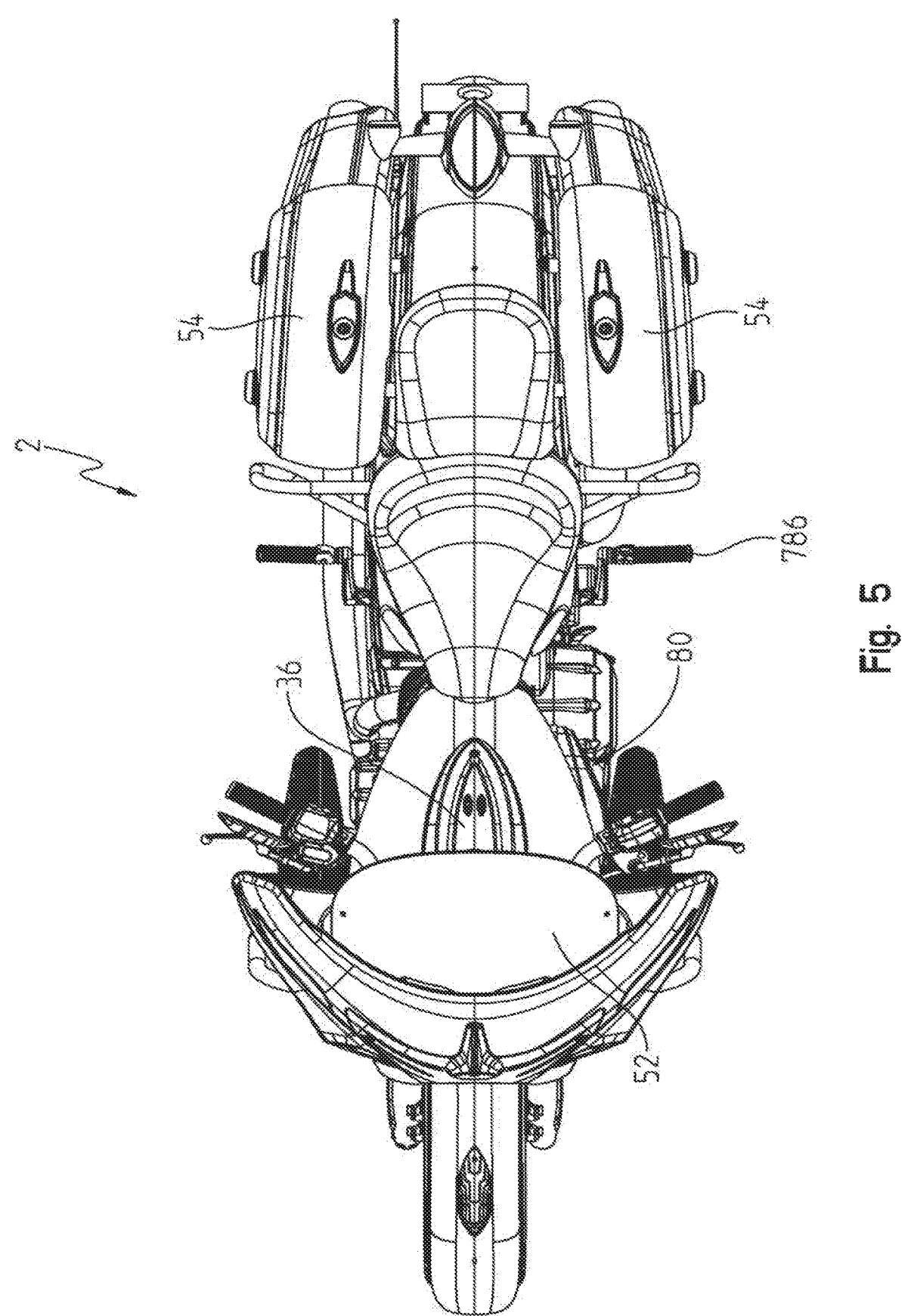
FIG. 5 is a top view of the two-wheeled vehicle of FIG. 1.
Figure 7:
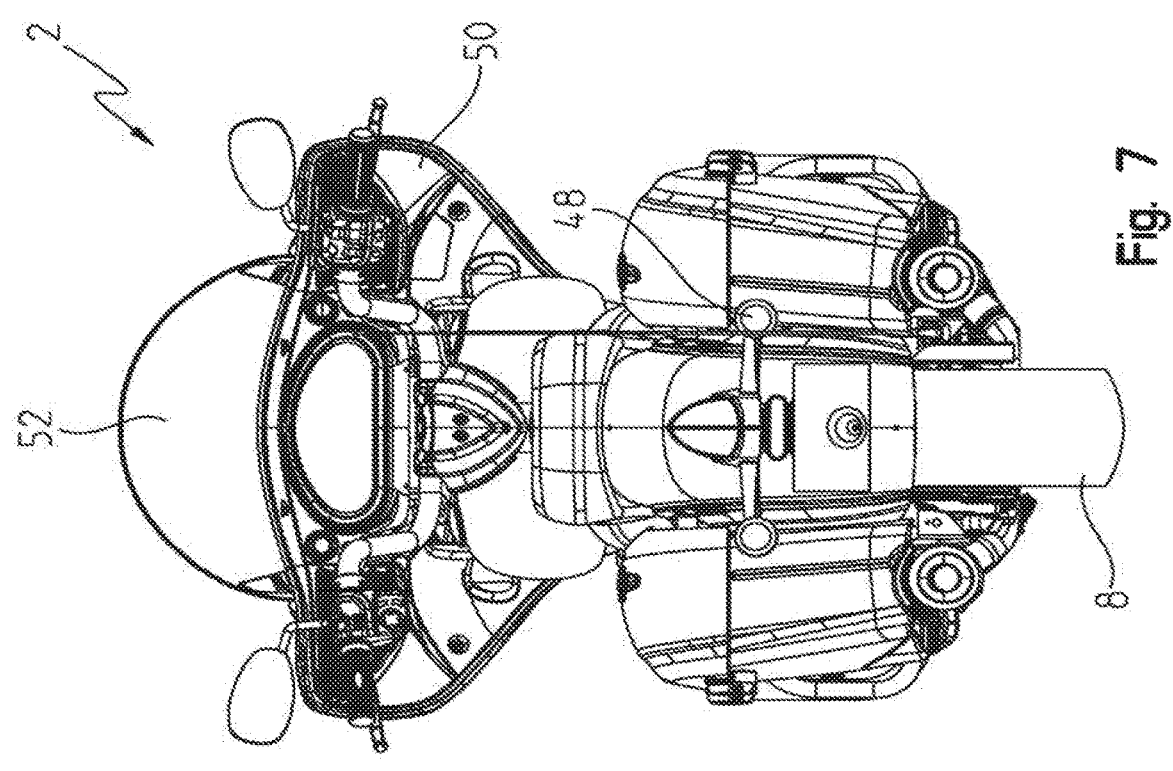
FIG. 7 is a rear view of the two-wheeled vehicle of FIG. 1.
Figure 49:
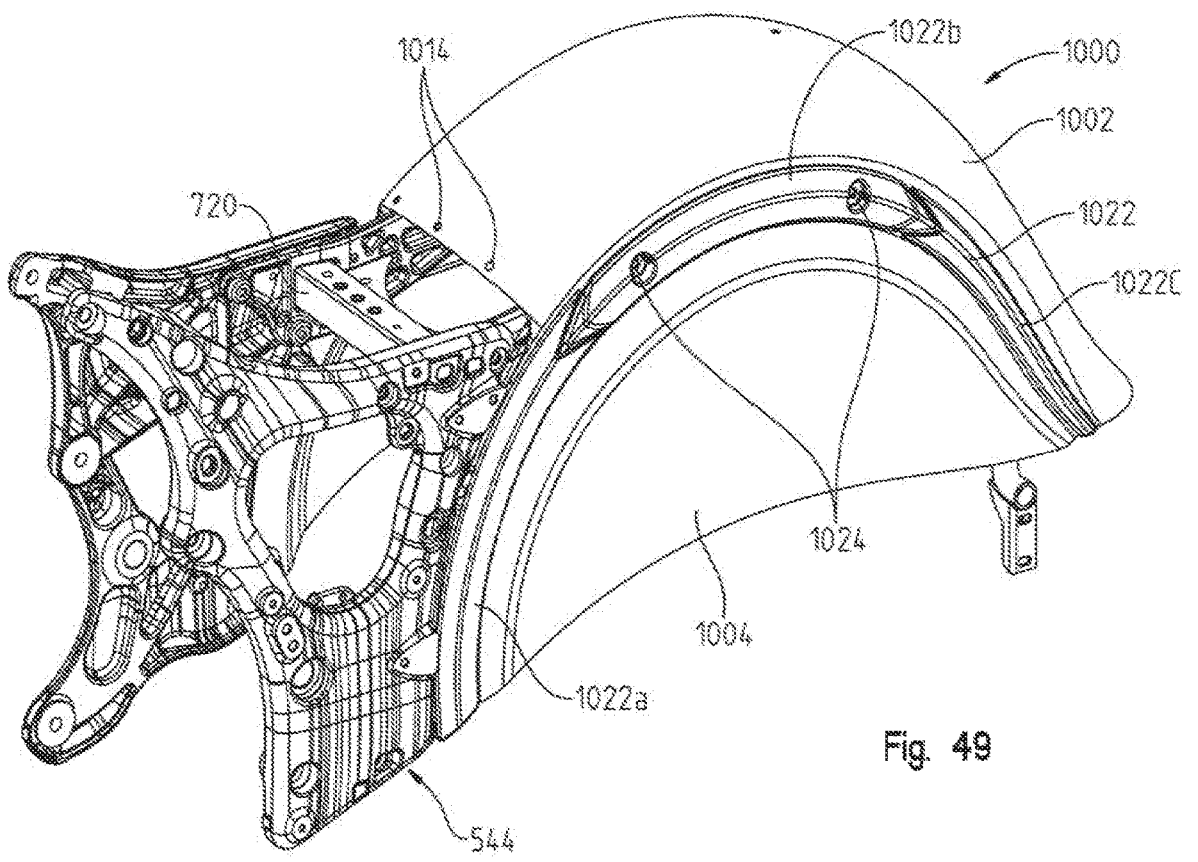
FIG. 49 is a front perspective view of a rear fender of the illustrative vehicle.
Figure 50:
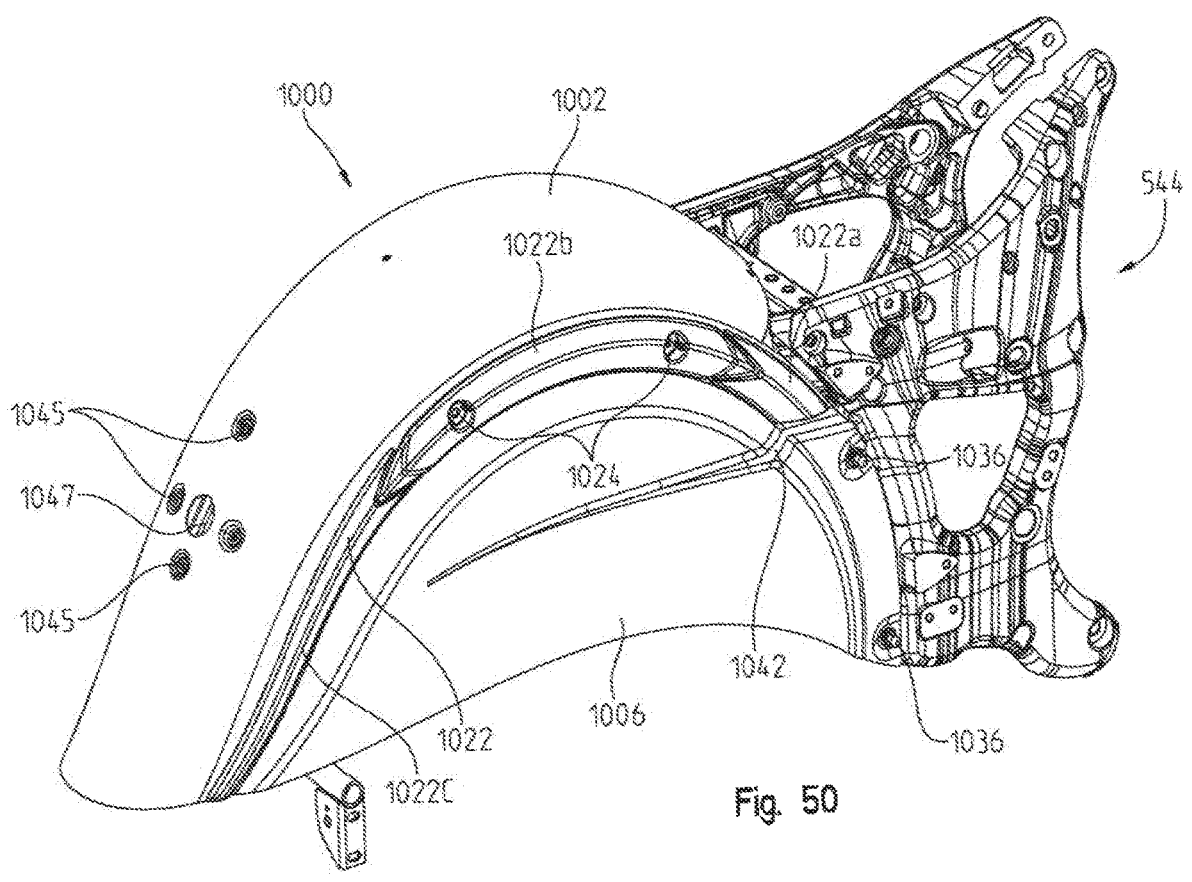
FIG. 50 is a rear perspective view of the rear fender of FIG. 49.
Figure 51:
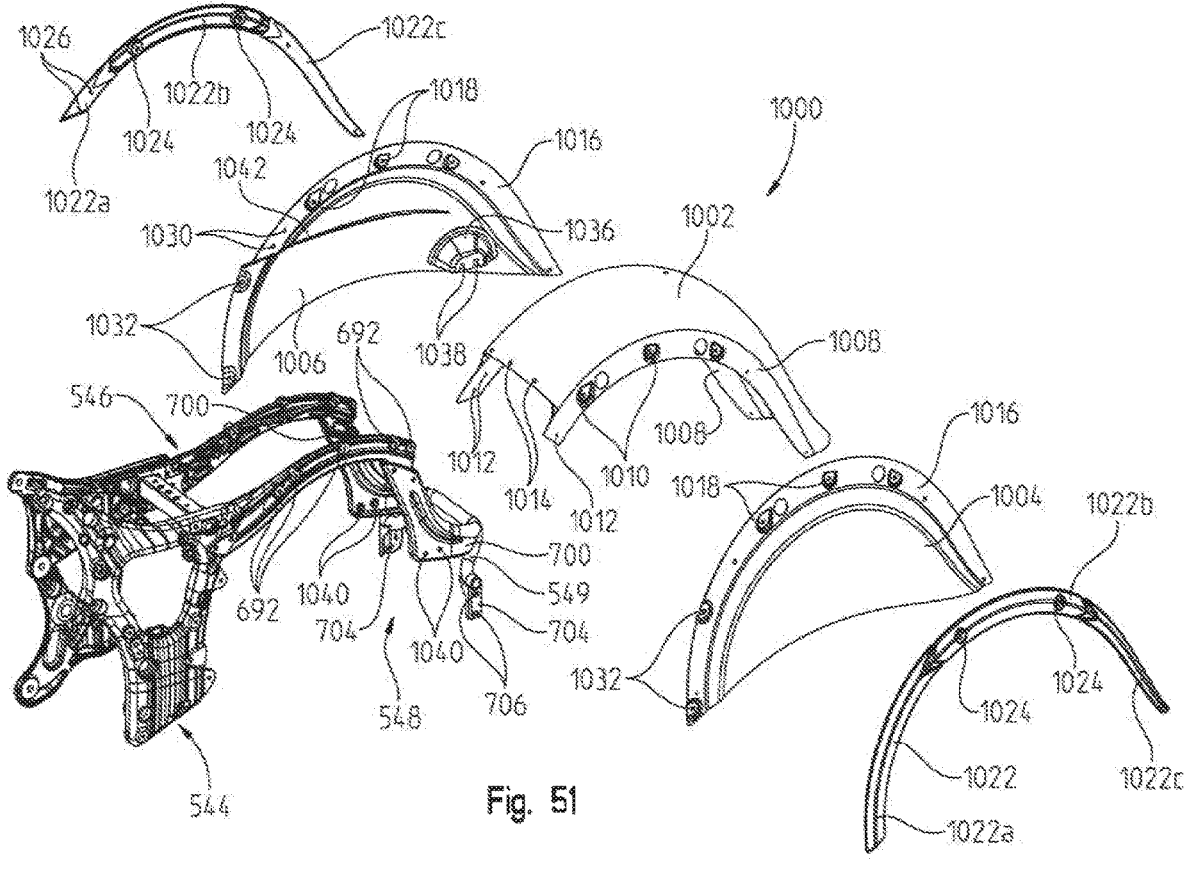
FIG. 51 is an exploded view of the rear fender of FIG. 49.
Figure 52:
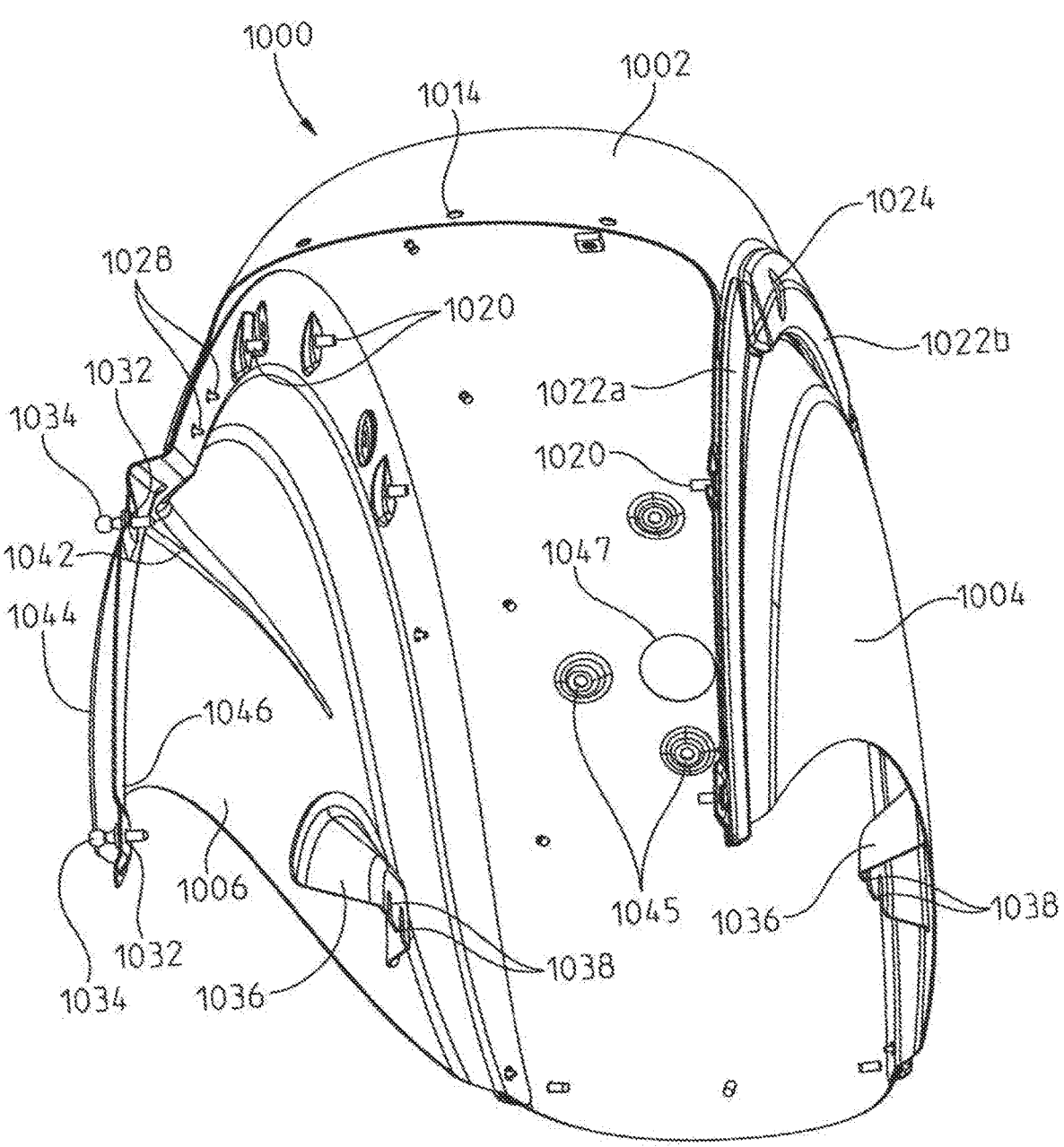
FIG. 52 is a bottom perspective view of the rear fender of FIG. 50.
Figure 52A:
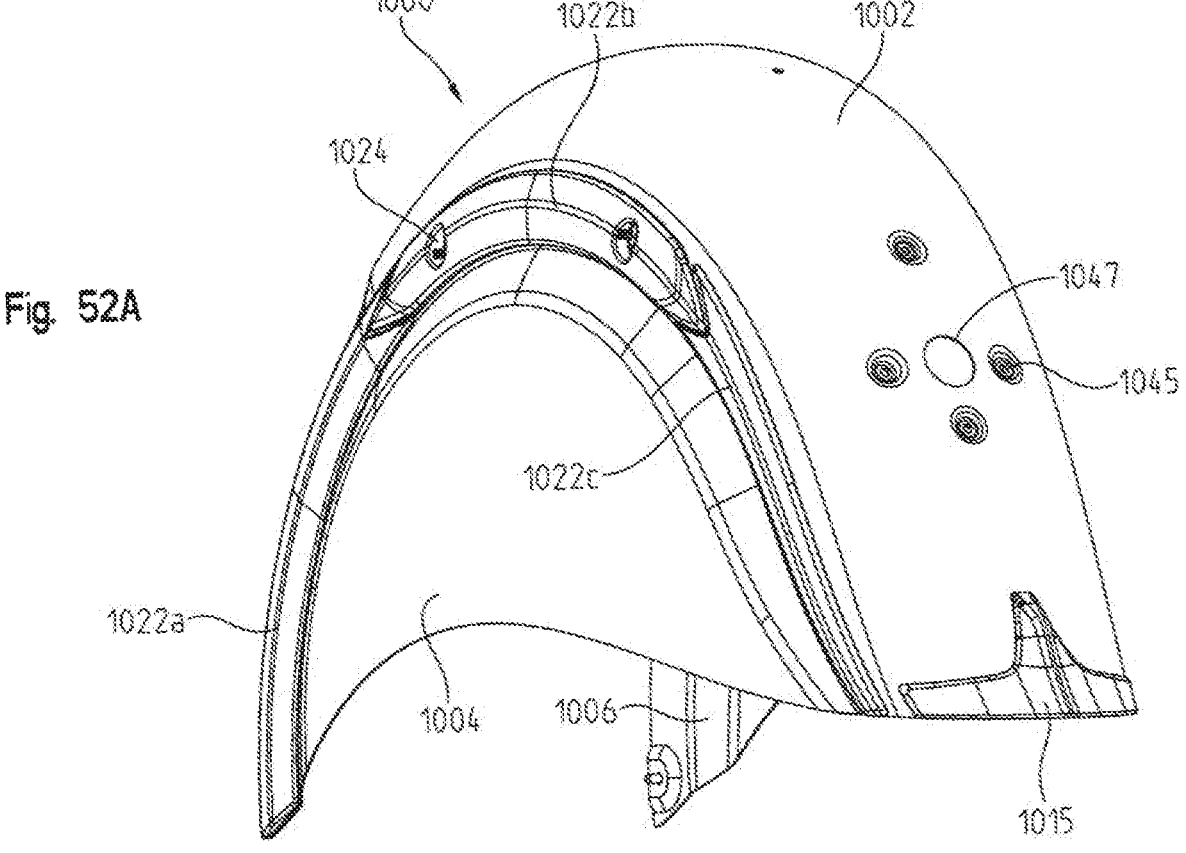
FIG. 52A is a rear perspective view of an alternative embodiment of the rear fender of FIG. 52.

Referring to FIGS. 49-53, a rear fender 1000 is coupled to rear frame portion 548 and extends around a top portion of rear wheel 8. Illustratively, as shown in FIG. 1, rear fender 1000 may extend around more than half of rear wheel 8. As shown in FIGS. 49-51, rear fender 1000 extends rearwardly from rear frame portion 548 and is positioned above a cross member 549, illustratively a mustache bar. Rear fender 1000 may be comprised of metallic and/or polymeric materials and may increase the structural integrity of frame 4. Rear fender 1000 includes a top member 1002, a first side member 1004, and a second side member 1006. Illustratively, rear fender 1000 is a skirted fender. Top member 1002 includes side surfaces 1008 having a plurality of recessed openings 1010. Recessed openings 1010 may be configured to receive mechanical fasteners, such as fasteners 1020, for coupling top member 1002 to side members 1004, 1006 and rear frame portion 548 through apertures 692. Alternatively, top member 1002 may be welded to rear frame portion 548 and/or side members 1004, 1006. Side surfaces 1008 also include a plurality of apertures 1012 for coupling side members 1004, 1006 to top member 1002. Additionally, a front end of top member 1002 includes at least one aperture 1014 which may be used to couple rear fender 1000 to rear frame portion 548. An alternative embodiment of front fender 1000 may include a fender tip 1015 coupled to a rear end of top member 1002, as shown in FIG. 52A.

First and second side members 1004, 1006 each include a flange 1016 having recessed openings 1018 that align with recessed openings 1010 of top member 1002 and apertures 692 of rear frame portion 548. Recessed openings 1010, 1018 and apertures 692 may be configured to receive fasteners 1020, such as bolts, welds, rivets, or screws (FIG. 52), as is further detailed herein. Flanges 1016 may include additional openings and/or grooves, such as openings 1032, for assembling rear fender 1000 and/or coupling rear fender 1000 to rear frame portion 548 and additional components of motorcycle 2 (FIG. 51). For example, fasteners 1034 may be received through openings 1032 in order to further couple rear fender 1000 to rear frame portion 548. Side members 1004, 1006 extend outwardly from flanges 1016, as shown best in FIG. 52.

Side members 1004, 1006 each may include a protrusion 1036 extending inwardly for further coupling rear fender 1000 to rear frame portion 548. Protrusions 1036 include a plurality of U-shaped slots 1038 that mate with projections or fasteners 1040 on rear frame portion 548. As shown best in FIGS. 51 and 52, slots 1038 are received over fasteners 1040 on bracket 704 of rear frame portion 548 to couple the lower portion of rear fender 1000 thereto. It may be appreciated that the front of rear fender 1000 may be coupled to rear frame portion 548 at aperture 1014, the sides of rear fender 1000 are coupled to rear frame at apertures 692 of rear frame portion 548, and the lower portion of rear fender is coupled to rear frame portion 548 via protrusions 1036 and bracket 704 of rear frame portion 548. As such, rear fender 1000 forms a box-like structure to add structural integrity, strength, and stiffness to rear frame portion 548. Additionally, various components of frame 4 may be lighter weight because rear fender 1000 may function as a shear panel in the fore and aft direction and prevents deformation in a diagonal direction.

Rear fender 1000 further includes trim members 1022 having portions 1022a, 1022b, and 1022c. Portions 1022a, 1022b, and 1022c may be integral with each other or, alternatively, may be separate components coupled together with conventional means, such as bolts, screws, welds, rivets, and adhesive. Illustratively, portion 1022b includes a plurality of recessed openings 1024 which align with recessed openings 1018 of side members 1004, 1006, recessed openings 1010 of top member 1002, and apertures 692 of rear frame portion 548. As such, trim members 1022 may be coupled to side members 1004, 1006, top member 1002, and rear frame portion 548 with mechanical fasteners (e.g., fasteners 1020) or, alternatively, may be welded there to side members 1004, 1006.

Referring to FIGS. 50 and 51, trim portion 1022a coupled to side member 1006 may be smaller than portion 1022a coupled to side member 1004. Illustratively, portion 1022a of side member 1006 includes a plurality of apertures 1026 for receiving fasteners 1028 (FIG. 52). Fasteners 1028 and apertures 1026 align with apertures 1030 on flange 1016 of side member 1006 in order to couple trim member 1022 to side member 1006.

Additionally, side member 1006 may include a bent portion 1042 which aligns with the contour in a body panel of motorcycle 2. As such, the outer contour or aesthetic of motorcycle 2 is continuous. An outer wall 1044 of bent portion 1042 extends laterally outward from an inner wall 1046 of bent portion 1042. Outer and inner walls 1044, 1046 may be generally parallel to each other. Fasteners 1034 extend through both outer and inner wall 1044, 1046 for coupling rear fender 1000 to rear frame portion 548. Alternatively, inner wall 1046 may be eliminated in order to accommodate other components of motorcycle 2, for example a timing belt, which would interfere with side member 1006.

Figure 53:
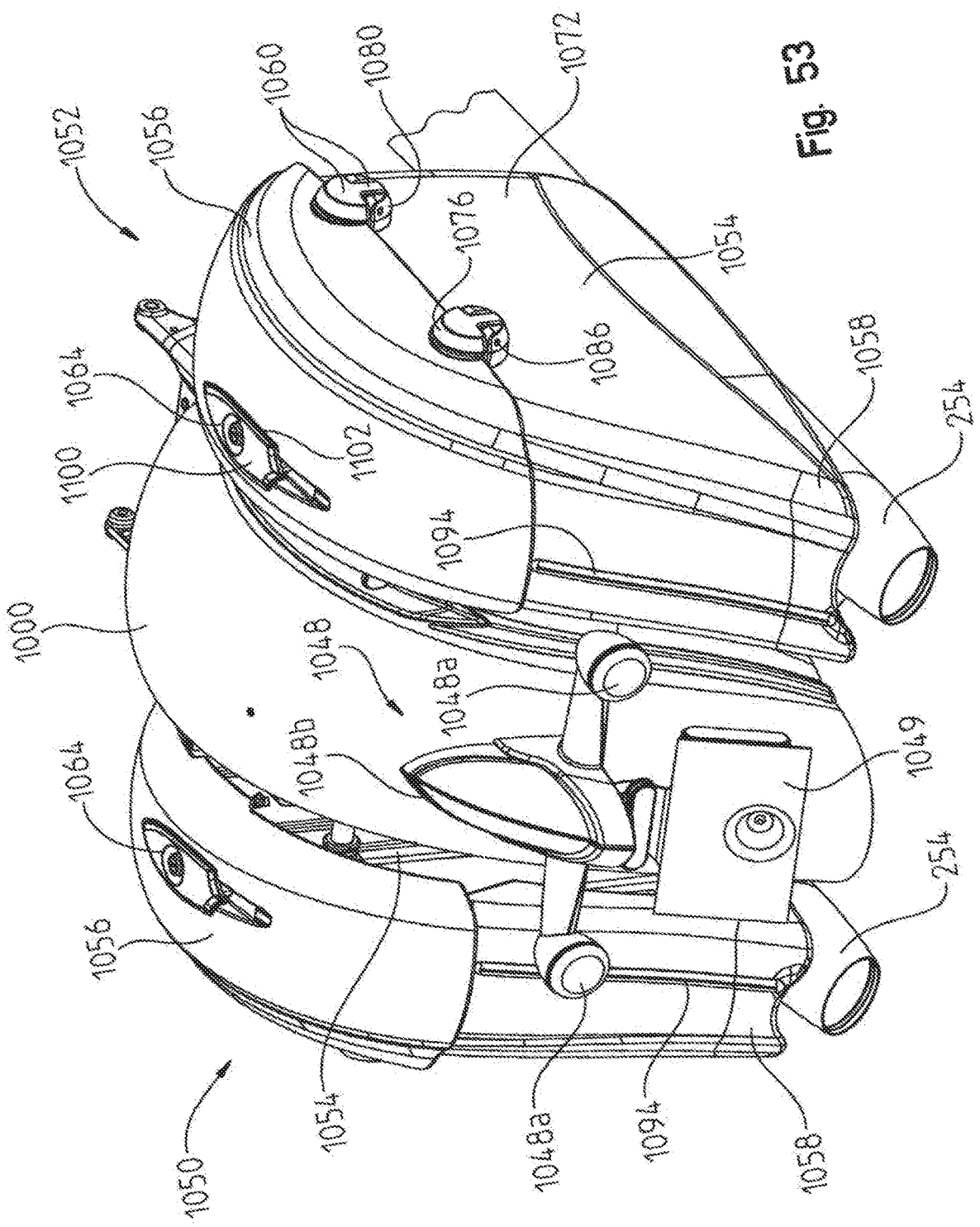
FIG. 53 is a rear perspective view of the rear fender of FIG. 49 coupled to saddle bags.

As shown in FIG. 53, rear fender 1000 also includes a rear light assembly 1048, which illustratively includes three lights 1048a, 1048b, 1048c. Additionally, a license plate holder 1049 may be positioned on rear fender 1000 below light assembly 1048. Additional lights or reflectors may be provided on rear fender to illuminate a license plate, rear fender 1000, rear wheel 8, etc. Light assembly 1048 may be secured to rear fender 1000 with couplers received through apertures 1045 in rear fender. Similarly, license plate holder 1049 may be coupled to rear fender 1000 with couplers received through opening 1047. Light assembly 1048 may be formed in different shapes or designs (e.g., a dream catcher). Additionally, rear light assembly 1048 may configured to increase or decrease the intensity of the light output. For example, light assembly 1048 may increase the intensity of the light output in response to braking.

Referring to FIGS. 53-61, rear fender 1000 may be configured to accommodate a storage or cargo area, illustratively saddlebag assembly 54 having a removable first saddle bag 1050 and a second removable saddle bag 1052. Alternatively, the cargo area may include a trunk, a carrying tray, and/or other saddle bag configurations. First saddle bag 1050 extends laterally outward from rear wheel 8 and rear fender 1000 and is adjacent first side member 1004. Second saddle bag 1052 also extends laterally outward from rear wheel 8 and rear fender 1000 and is adjacent second side member 1006. Saddle bags 1050, 1052 are illustratively positioned above exhaust pipes 254. The construction and arrangement of rear fender 1000 may assist in supporting a portion of the load carried by saddle bags 1050, 1052 and a passenger, and/or may assist in transmitting a portion of the load to frame 4. Saddle bags 1050, 1052 may be comprised of a rigid material (e.g., a polymeric material and/or a metallic material) or, alternatively, may be comprised of a flexible material (e.g., soft materials, such as leather and/or some polymeric materials). Saddle bags 1050, 1052 may include fringe.

Figure 54:
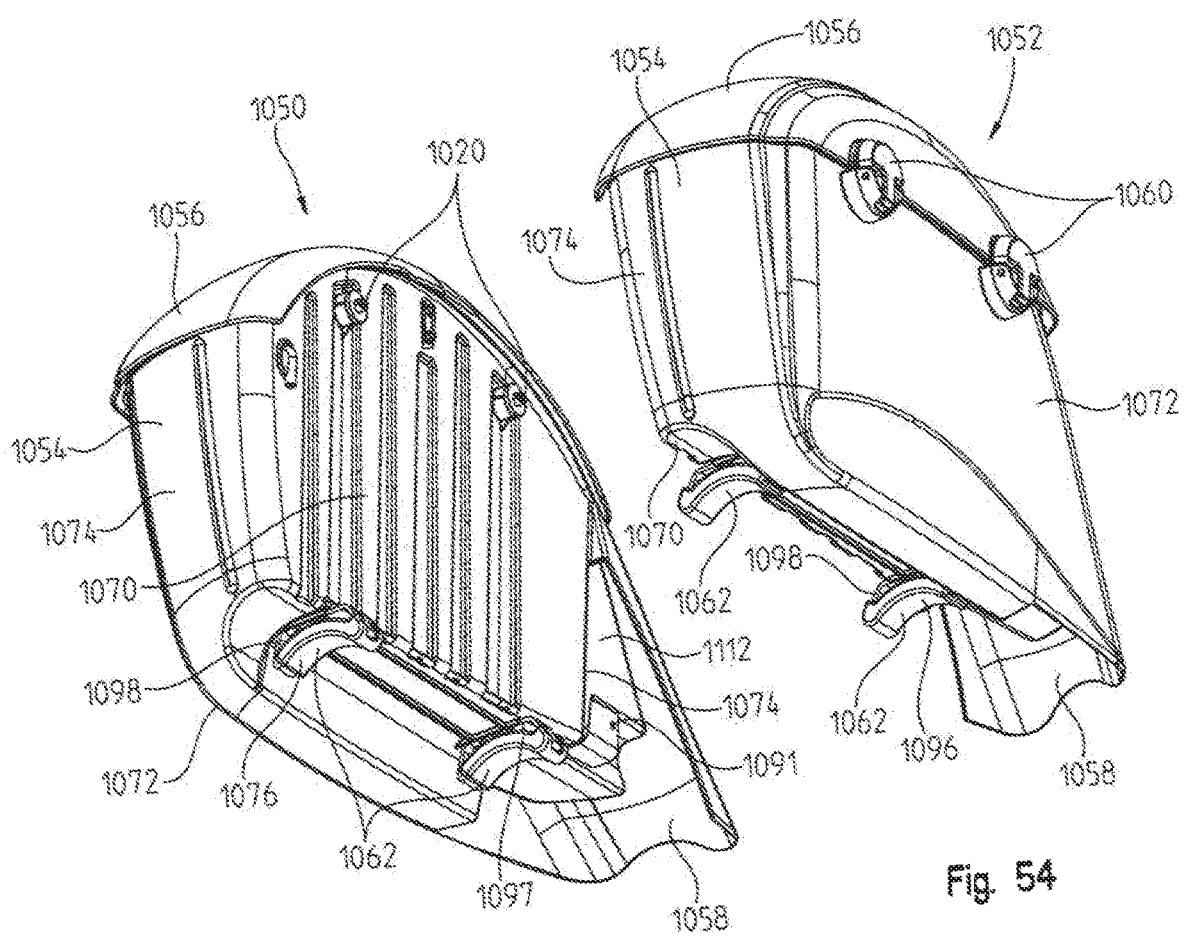
FIG. 54 is a front perspective view of the saddle bags of FIG. 53 with the rear fender removed.

Saddle bags 1050, 1052 each include a cargo portion 1054, a cover or lid 1056, an outer flap 1058, hinges 1060, brackets 1062, a latch assembly 1064, and a mounting assembly 1066. Saddle bags 1050, 1052 are coupled to rear fender 1000 through mounting assembly 1066, as is detailed further herein. Saddle bags 1050, 1052 also are coupled to bracket 704 of cross member 549. In particular and as shown in FIG. 54, fasteners are received through an aperture 1091 on cargo portion 1054 and apertures 706 on bracket 704 of cross member 549 in order to couple saddle bags 1050, 1052 to rear frame portion 548. As such, the inner surfaces of saddle bags 1050, 1052 are coupled to rear frame portion 548 and bracket 704 and cross member 549 are concealed by saddle bags 1050, 1052.

Additionally, saddle bags 1050, 1052 are configured to rest atop exhaust pipes 254 via brackets 1062. As shown in FIGS. 53-56, brackets 1062 include an outer layer 1096 comprised of a polymeric material (e.g., high-temperature silicone or rubber). Outer layer 1096 generally surrounds a brace 1098 comprised of a metallic or polymeric material. Brace 1098 is coupled to cargo portion 1054 with fasteners 1099 (FIG. 56) and is received within a channel 1097 on the bottom surface of cargo portion 1054. Alternatively, braces 1098 may be glued or adhered to cargo portion 1054 with adhesive. Brackets 1062 are shaped to rest atop exhaust pipes 254, however, brackets 1062 are not fixed thereto. Rather, brackets 1062 are coupled to cargo portion 1054 via fasteners 1099. As such, if saddle bags 1050, 1052 are removed from rear fender 1000, brackets 1062 are removed with saddle bags 1050, 1052. Brackets 1062 do not remain on exhaust pipes 254 when saddle bags 1050, 1052 are removed from motorcycle 2. It may be appreciated that the polymeric material comprising outer layer 1096 of brackets 1062 absorbs vibration from exhaust pipes 254. As such, brackets 1062 do not rattle against exhaust pipes 254.

Figure 55:
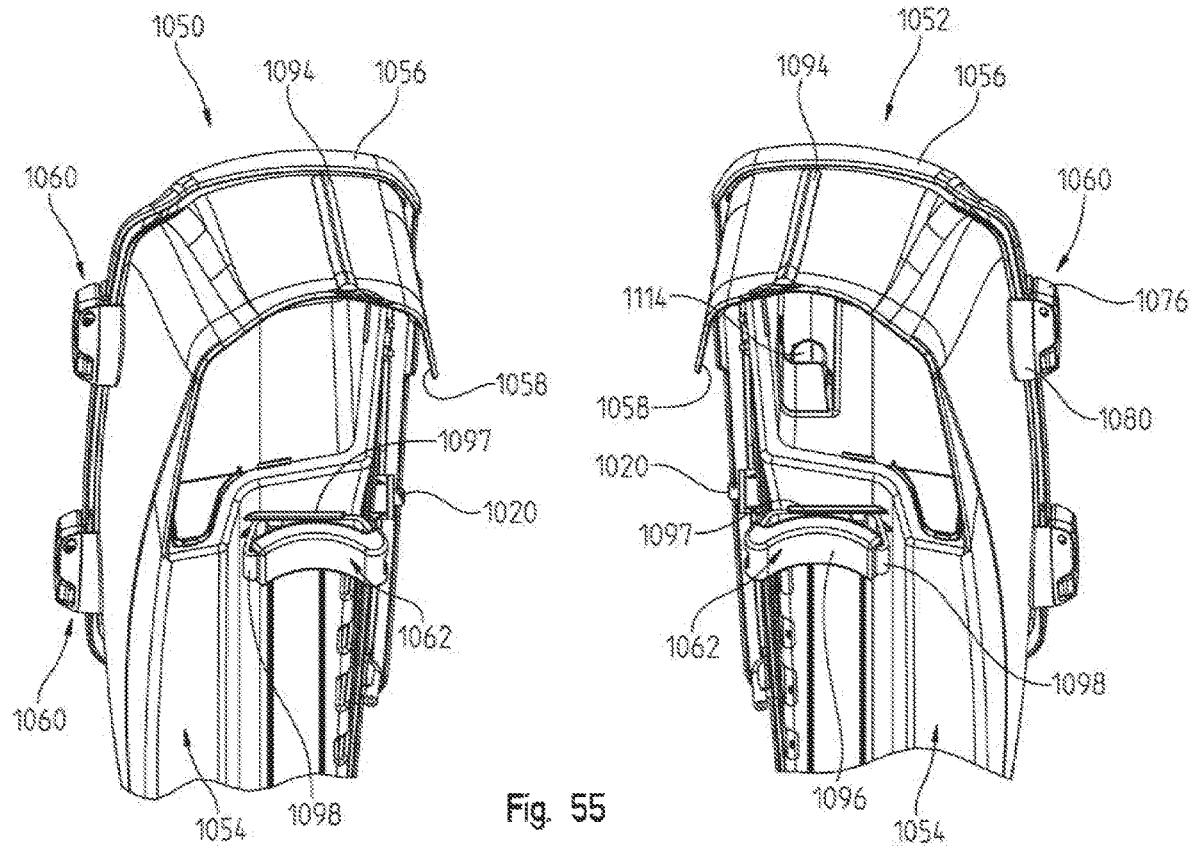
FIG. 55 is a bottom perspective view of the saddle bags of FIG. 54.
Figure 56:
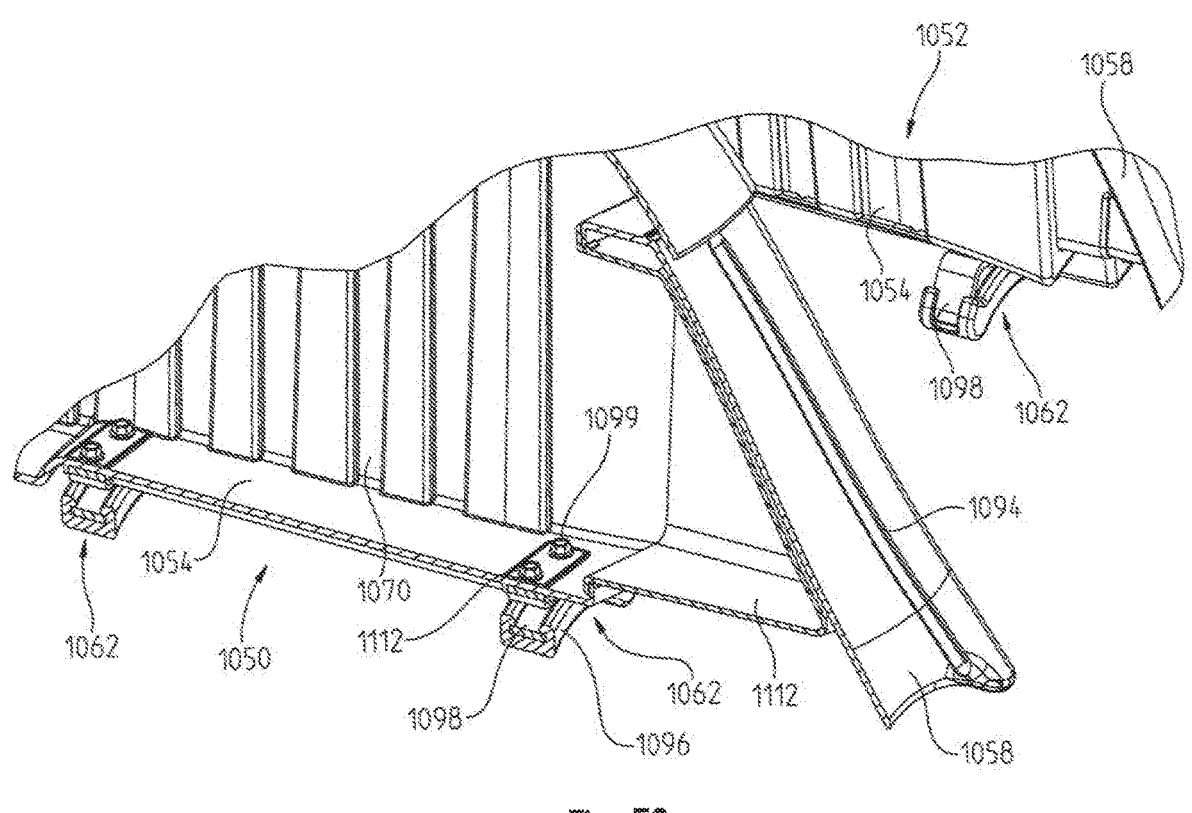
FIG. 56 is a cross-sectional view of the saddle bags of FIG. 54.

Cargo portion 1054 includes an inner wall 1070, an outer wall 1072, and side walls 1074 which define a cargo volume therebetween. The cargo volume of cargo portion 1054 may be increased by including extension cover 1112, as shown in FIGS. 54-56. Extension cover 1112 is positioned between outer flaps 1058 and cargo portion 1054 to allow additional cargo space adjacent outer flaps 1058. Extension cover 1112 may be coupled to cargo portion and/or outer flap 1058 with conventional fasteners, such as bolts, screws, welds, rivets, and/or adhesive. Additionally, extension cover 1112 may support an electrical connector 1114 (FIG. 55) or other accessories. Electrical connector 1114 is electrically coupled to electrical system 1800 and also is electrically coupled to electrical accessories within cargo portion 1054, for example a phone charger, adapter, GPS device, etc. Additionally, an access panel or door may be included on extension cover 1112 in order to access cargo or accessories positioned therein.

Outer flaps 1058 extend from outer wall 1072 and extend around the rear side wall 1074. Outer flaps 1058 may be molded with cargo portion 1054 or, alternatively, may be molded separately from cargo portion 1054 and subsequently attached thereto. When outer flaps 1058 are molded, a seam or parting line may be visible. A trim member 1094 may be molded, adhered, fixed, or otherwise coupled to outer flaps 1058 to conceal the parting line. Exemplary trim member 1094 may be weatherstripping, a chrome cover piece, or a molded component that may include reflective materials or other accessories.

Figure 58:
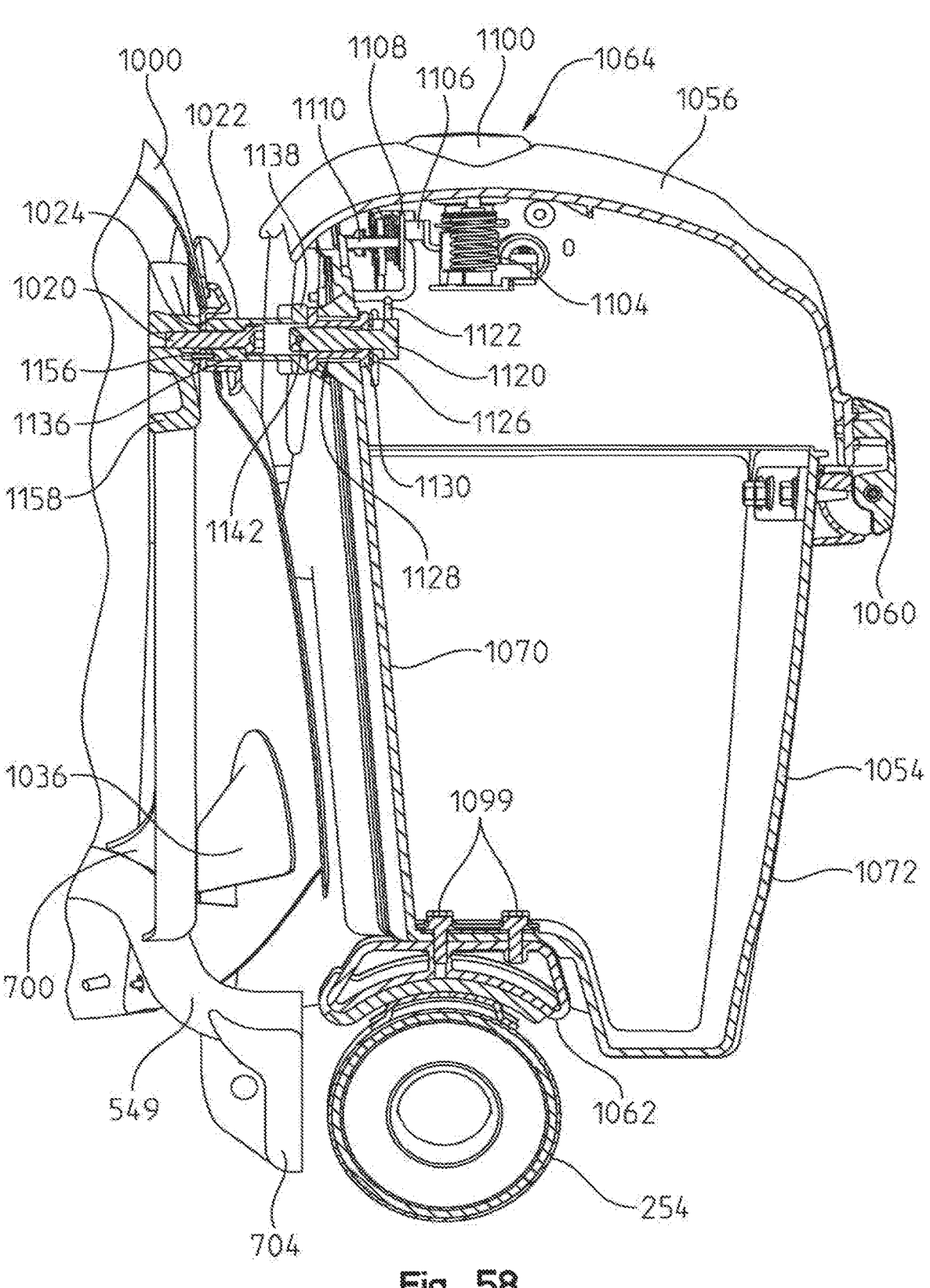
FIG. 58 is a rear cross-sectional view of the saddle bags of FIG. 53 coupled to the rear fender with a mounting assembly.

Lid 1056 is positioned above cargo portion 1054 to enclose cargo portion 1054 and secure any cargo therein during operation of motorcycle 2. As shown in FIG. 58, lid 1056 supports latch assembly 1064, which illustratively includes a latch 1100, a lock 1102 (FIG. 53), a spring 1104, a lever 1106, a latching arm 1108, and a pin 1110. Latch 1100, lock 1102, spring 1104, lever 1106, and latching arm 1108 are coupled to the underside of lid 1056. Pin 1110 is coupled to inner wall 1070 of cargo portion 1054. As such, latch assembly 1064 is positioned within saddle bags 1050, 1052, rather than on the outside of saddle bags 1050, 1052. Latch assembly 1064 may be mechanically locked by inserting a key or tool into lock 1102 in order to lock latch 1100. Lock 1102 also may be a power lock or an electronic lock in electrical communication with electrical system 1800. For example, electrical system 1800 may automatically lock saddle bags 1050, 1052 during operation of motorcycle 2 or may be configured to indicate when saddle bags 1050, 1052 are not locked or are not properly attached to rear fender 1000. Additionally, lock 1102 may be configured to receive a code or other identified that is recognized by electrical system 1800 in order to lock and unlock latch assembly 1064. When latch 1100 is locked, latching arm 1108 is coupled to pin 1110 and, as such, latch 1100 is prevented from moving or otherwise operating to open lid 1056 of saddle bags 1050, 1052, as shown in FIG. 58.

When lock 1102 is in the open position, lid 1056 may open when latch 1100 is actuated. Illustratively, when latch 1100 is actuated, for example by depressing, sliding, or rotating latch 1100, latch 1100 cooperates with spring 1104 to move lever 1106. The movement of lever 1106 causes latching arm 1108 to release pin 1110. As such, lid 1056 may be pivoted to the open position. It may be appreciated that latch 1100, lock 1102, spring 1104, lever 1106, and latching arm 1108 are coupled to lid 1056 when lid 1056 is in the open or closed position. However, pin 1110 remains coupled to cargo portion 1054. Therefore, when latching arm 1108 is spaced apart from pin 1110, lid 1056 may be opened.

Figures 57A, 57B:
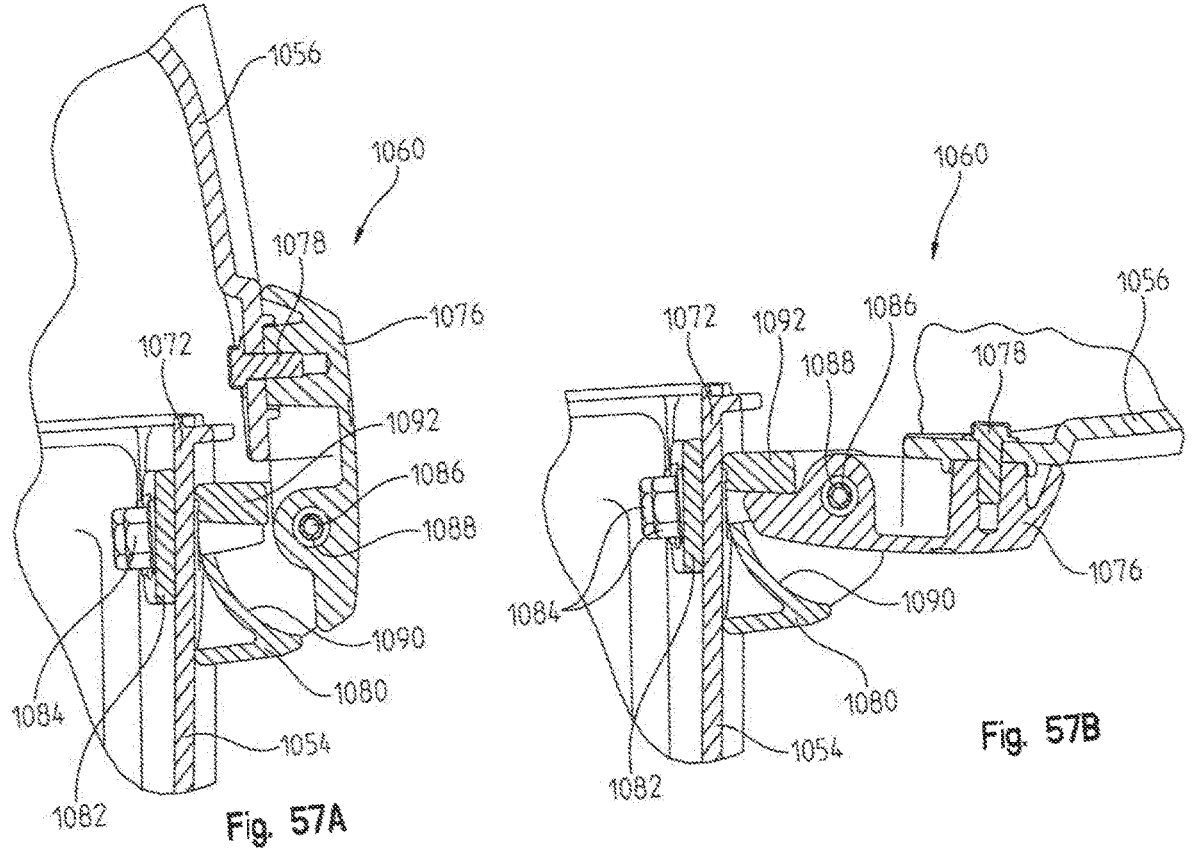
FIG. 57A is a cross-sectional view of a hinge assembly of the saddle bags of FIG. 54 in a closed position.
FIG. 57B is a cross-section view of the hinge assembly of FIG. 56 in an open position.

As shown in FIGS. 53-55, 57A, and 578, lid 1056 is operably coupled to cargo portion 1054 via hinges 1060. An upper hinge member 1076 is coupled to lid 1056 via a fastener 1078 (FIGS. 57A and 578). A lower hinge member 1080 is coupled to outer wall 1072 via a bracket 1082 and fasteners 1084. As shown in FIGS. 57A and 578, outer wall 1072 is intermediate bracket 1082 and lower hinge member 1080. Upper and lower hinge members 1076, 1080 may be coupled together with a pivot pin 1088 and are configured to rotate about a pivot axis 1086. More particularly, hinges 1060 pivot between an open position and a closed position, thereby allowing saddle bags 1050, 1052 to pivot between an open position and a closed position.

In operation, saddle bags 1050, 1052 may be closed when hinges 1060 are in the closed position shown in FIG. 57A. As shown therein, upper hinge member 1076 and lid 1056 are generally upright with respect to outer wall 1072. Additionally, upper hinge member 1076 is spaced apart from a pivot surface 1090 on lower hinge member 1080. When saddle bags 1050, 1052 are closed, the cargo therein is secured and is not accessible. However, when saddle bags 1050, 1052 are in the open position shown in FIG. 57B, the cargo in saddle bags 1050, 1052 is accessible. More particularly, to open saddle bags 1050, 1052, lid 1056 is pivoted outwardly from rear fender 1000 and cargo portion 1054 and upper hinge member 1076 rotates about pivot axis 1086. Upper hinge member 1076 slides along pivot surface 1090 of lower hinge member 1080 until contacting a stop surface 1092. Stop surface 1092 prevents hinges 1060 controls the position of lid 1056 when in the open position. As shown in FIG. 57B, when saddle bags 1050, 1052 are opened, lid 1056 and upper hinge member 1076 extend laterally outward from lower hinge member 1080 and outer wall 1072. In particular, lid 1056 and upper hinge member 1076 are generally perpendicular to lower hinge member 1080 and outer wall 1072.

Figure 59:
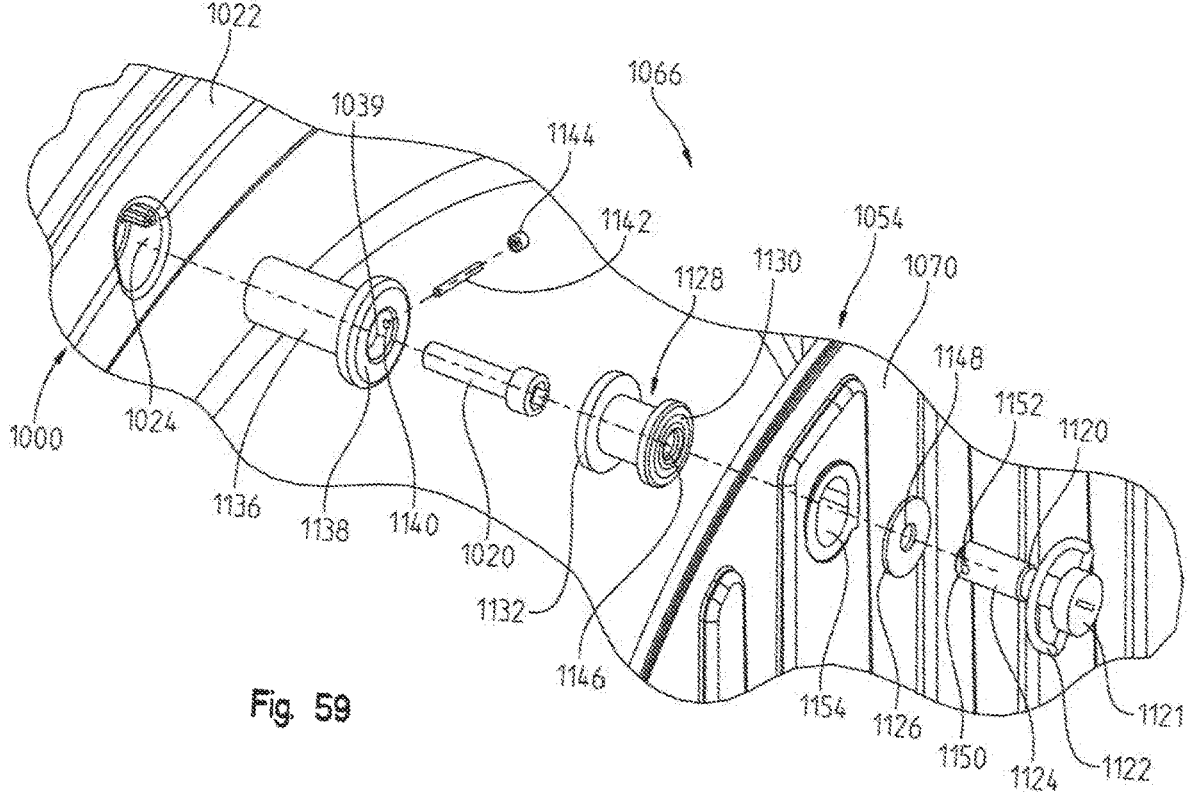
FIG. 59 is an exploded view of the saddle bag mounting assembly of FIG. 58.

As detailed above, saddle bags 1050, 1052 are coupled to bracket 704 of cross member 549. Saddle bags 1050, 1052 also are coupled to rear fender 1000 through mounting assembly 1066. Referring to FIGS. 58 and 59, mounting assembly 1066 includes a pin 1120, a washer 1126, a grommet 1128, fastener 1020, a boss 1136, a post 1142, and a plug 1144. Pin 1120 includes a head 1121, a handle 1122, and a body portion 1124. Body portion 1124 has an aperture 1150 and a generally curved channel 1152 extending therefrom. Grommet 1128 has an outer flange 1130 and an inner flange 1132. An opening 1146 extends through grommet 1128. Boss 1136 also includes a flange 1138 and an opening 1139. Additionally, an aperture 1140 of boss 1136 is configured to receive post 1142. Plug 1144 retains post 1142 within boss 1136.

Mounting assembly 1066 is assembled by positioning grommet 1128 through an aperture 1154 in inner wall 1070 of cargo portion 1054. As such, grommet 1128 is retained on saddle bags 1050, 1052. More particularly, outer flange 1130 is positioned within cargo portion 1054, however, inner flange 1132 is outward from cargo portion 1054 and is intermediate saddle bags 1050, 1052 and rear fender 1000.

Boss 1136 is spaced apart from saddle bags 1050, 1052 and, unlike grommet 1128, is coupled to rear fender 1000. Boss 1136 extends from recessed opening 1024 of trim portion 1022 on rear fender 1000 and is retained on rear fender 1000 with fastener 1020. A locating pin 1156 (FIG. 58) may be used to position and retain boss 1136 on rear fender 1000. Additionally, a nut, bracket, or other coupling device 1158 (FIG. 58) is coupled to fastener 1020 to further retain boss 1136 and fastener 1020 on rear fender 1000.

When saddle bags 1050, 1052 are coupled to rear fender 1000, inner flange 1132 of grommet 1128 is aligned with flange 1138 of boss 1136. Inner flange 1132 of grommet 1128 may be generally the same size as flange 1138 of boss 1136. When aligning flanges 1132 and 1138, opening 1146 also will align with opening 1139 of boss 1136. When openings 1146 and 1139 are aligned, body portion 1124 of pin 1120 is received through an aperture 1148 on washer 1126, through opening 1146, and into opening 1139. Head 1121 of pin 1120, handle 1122, and washer 1126 are positioned within cargo portion 1054 and prevent pin 1120 from extending further into opening 1139. When body portion 1124 of pin 1120 is positioned within opening 1139, pin 1120 may be rotated such that channel 1152 contacts post 1142. For example, pin 1120 may be rotated through an approximate ¾-turn such that post 1142 slides along channel 1152 and is secured within aperture 1150. As such, saddle bags 1050, 1052 are secured to rear fender using mounting assembly 1066. It may be appreciated that tools are not necessary for securing saddle bags 1050, 1052 to rear fender 1000.

Pin 1120 may be rotated in the reverse direction to release post 1142 from channel 1152 in order to remove saddle bags 1050, 1052 from rear fender 1000. When saddle bags 1050, 1052 are removed from rear fender 1000, grommet 1128, washer 1126, and pin 1120 also are removed. However, boss 1136, pin 1142, and fastener 1020 remain coupled to rear fender 1000.

Figure 60A:
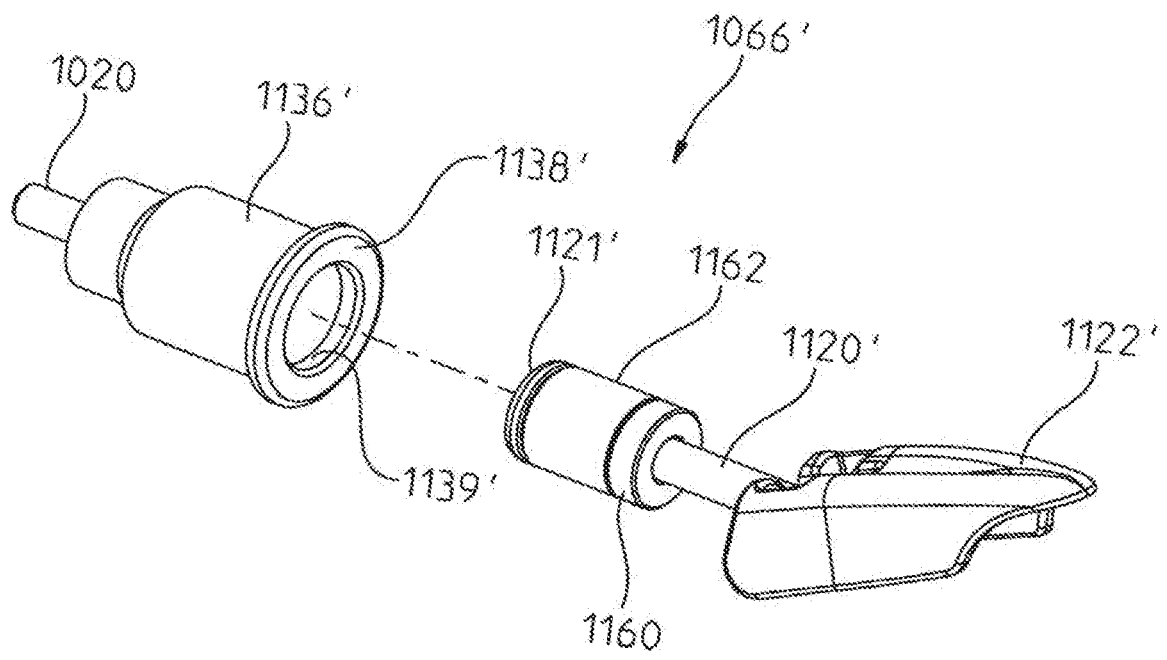
FIG. 60A is an exploded view of an alternative embodiment of the saddle bag mounting assembly of FIG. 59.
Figure 61:
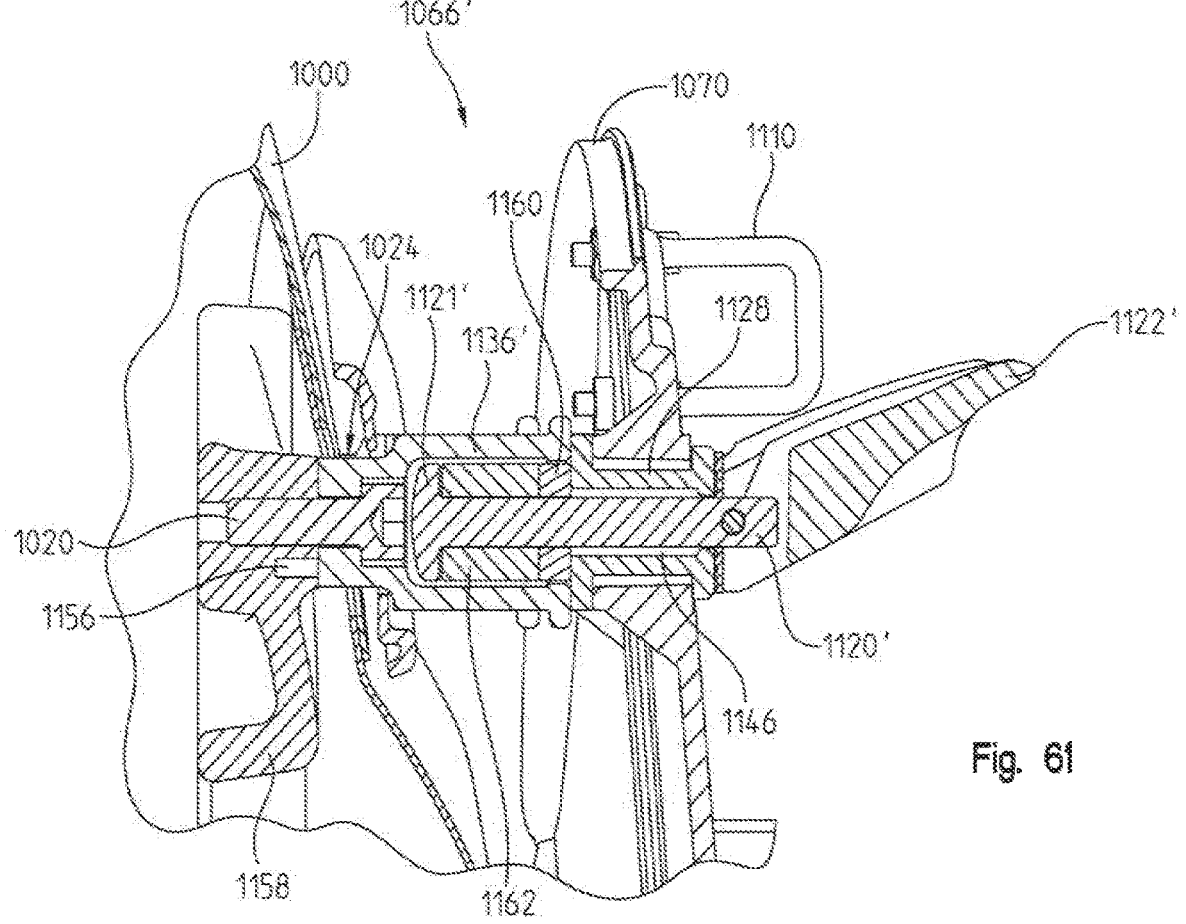
FIG. 61 is a cross-sectional view of the saddle bag mounting assembly of FIG. 60B.

Alternatively, a mounting assembly 1066' may be used to removably couple saddle bags 1050, 1052 to rear fender 1000. Referring to FIGS. 60A, 608, and 61, mounting assembly 1066' includes a pin 1120', a handle 1122', a washer 1126', a spacer 1160, a compressible grommet 1162, a boss 1136', and fastener 1020. As shown in FIG. 608, an opening 1139' of boss 1136' is configured to receive a head 1121' of pin 1120', compressible grommet 1162, and spacer 1160. When compressible grommet 1162 is inserted into opening 1139' of boss 1136', washer 1126' is adjacent a flange 1138' of boss 1136'.

Referring to FIG. 61, in assembly, pin 1120' is coupled to inner wall 1070 of cargo portion 1054 of saddle bags 1050, 1052. As such, when saddle bags 1050, 1052 are removed from rear fender 1000, pin 1120', compressible grommet 1162, spacer 1160, handle 1122', and grommet 1128 also are removed therefrom. More particularly, grommet 1128 is positioned within aperture 1154 of inner wall 1070. Pin 1120' is assembled with grommet 1128 such that head 1121', compressible grommet 1162, spacer 1160, and washer 1126' are positioned outside of cargo portion 1054 and handle 1122' is positioned within cargo portion 1054.

Boss 1136' is spaced apart from saddle bags 1050, 1052 and, unlike grommet 1128, is coupled to rear fender 1000. Boss 1136' extends from recessed opening 1024 of trim portion 1022 on rear fender 1000 and is retained on rear fender 1000 with fastener 1020. Locating pin 1156 may be used to position and retain boss 1136' on rear fender 1000.

Additionally, coupling device 1158 is coupled to fastener 1020 to further retain boss 1136' and fastener 1020 on rear fender 1000. As such, when saddle bags 1050, 1052 are removed from rear fender 1000, boss 1136, fastener 1020, coupling device 1158, and locating pin 1156 are retained on rear fender 1000 and are not removed with saddle bags 1050, 1052.

In operation, mounting assembly 1066' is configured to removably couple saddle bags 1050, 1052 to rear fender 1000. It may be appreciated that mounting assembly 1066' is generally concealed when saddle bags 1050, 1052 are coupled to rear fender 1000. To couple saddle bags 1050, 1052 to rear fender 1000, pin 1120', compressible grommet 1162, and spacer 1160 are positioned within opening 1139 of boss 1136'. As such, flange 1138' of boss 1136' is generally aligned and in contact with inner flange 1132 of grommet 1128. Handle 1122' is rotated upwardly relative to pin 1120' and inner wall 1070 of cargo portion 1054. To lock mounting assembly 1066' and secure saddle bags 1050, 1052 to rear fender 1000, handle 1122' is rotated downwardly such that handle 1122' may be generally parallel to, or adjacent with, inner wall 1070. By rotating handle 1122' downwardly, head 1121' of pin 1120' is pulled or moved toward handle 1122'. As head 1121' moves toward handle 1122', compressible grommet 1162 compresses and pushes against spacer 1160 and washer 1126'. The compression frictionally retains compressible grommet 1162 within opening 1139' of boss 1136' in order to retain saddle bags 1050, 1052 on rear fender 1000.

Figure 62:
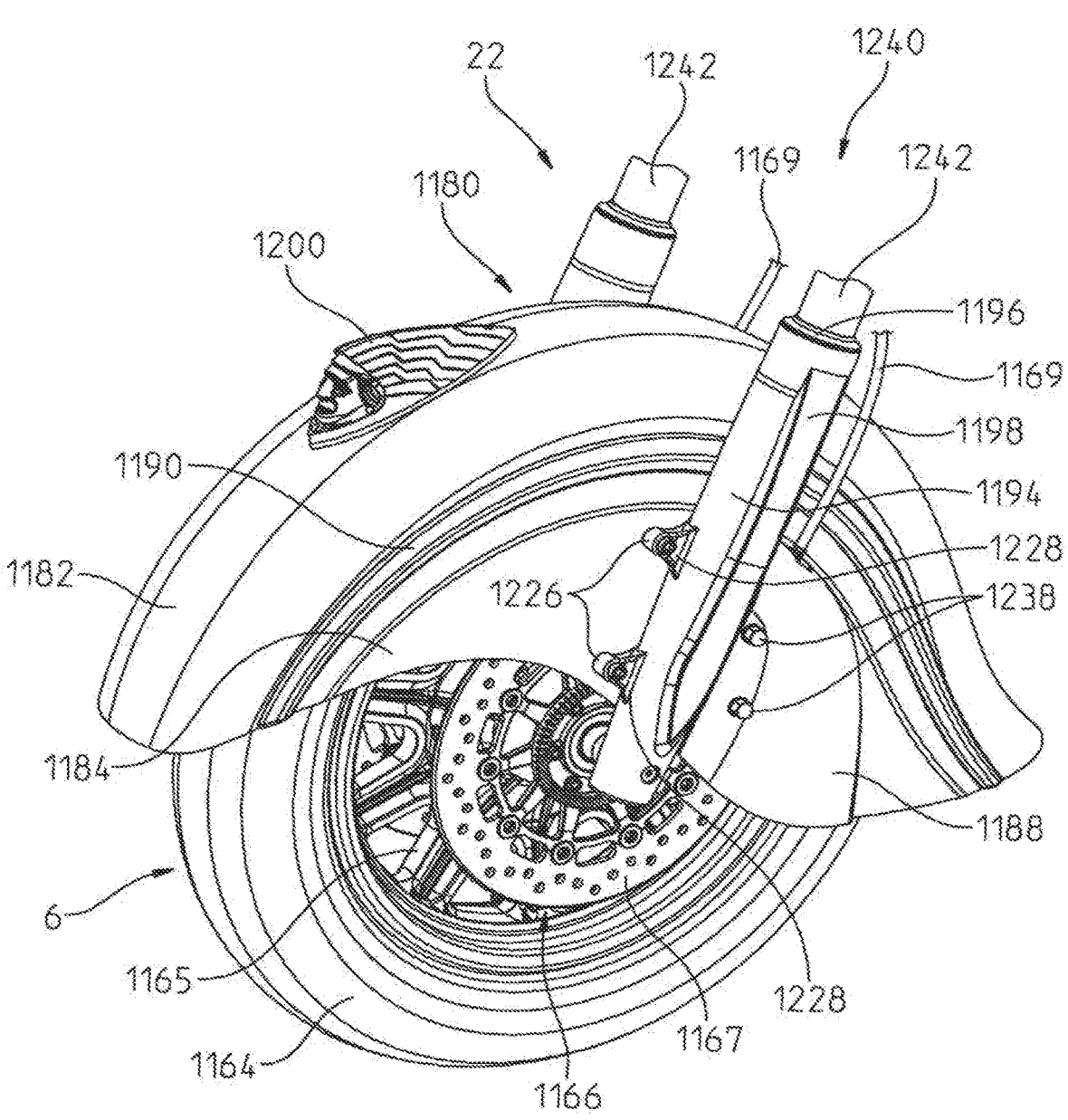
FIG. 62 is a front perspective view of a front wheel and front fender of the illustrative vehicle.

Referring to FIG. 62, a front fender 1180 is positioned generally opposite rear fender 1000 at the front end of motorcycle 2. Front fender 1180 is positioned above and generally around a portion of front wheel 6. As shown in FIG. 62, illustrative front fender 1180 generally surrounds approximately the upper half of front wheel 6. Front wheel 6 includes a tire 1164 and a rim 1165. Illustratively, rim 1165 is a cast rim, however, rim 1165 may include spokes. Front wheel 6 is operably coupled to brake assembly 42, which includes a front brake assembly 1166 and a rear brake assembly 1163. Front brake assembly 1166 includes a front brake disc 1167, a front brake caliper 1168, and front brake lines 1169.

Figure 63:
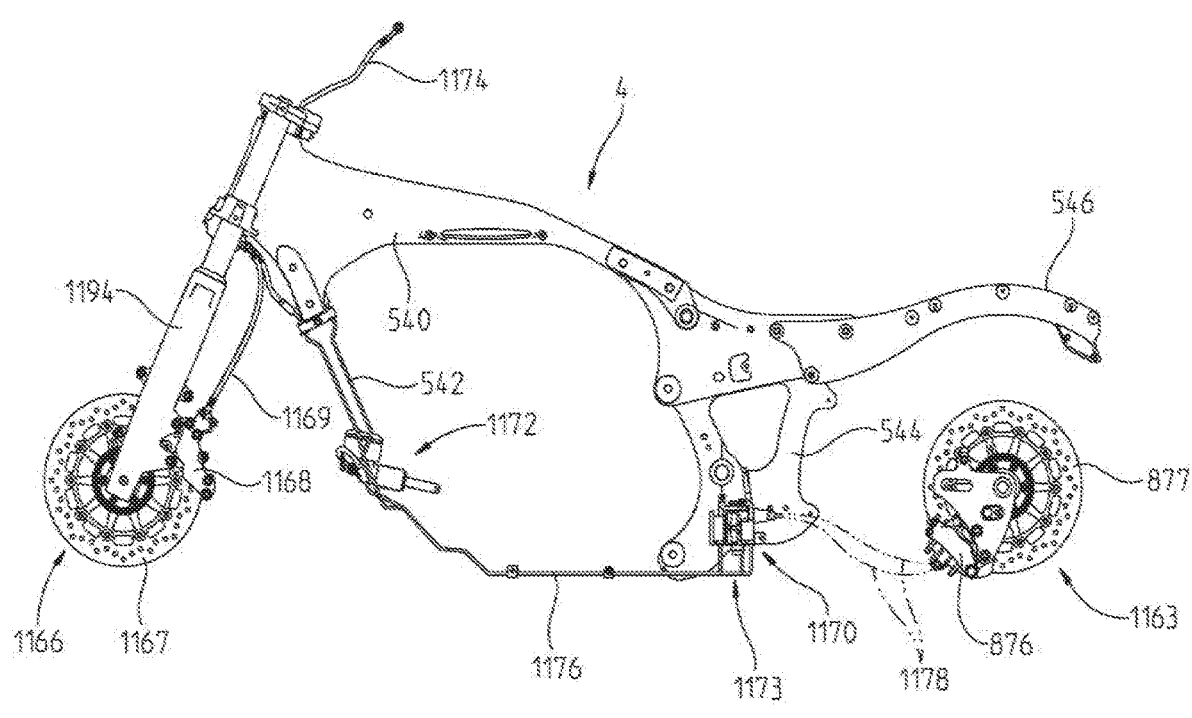
FIG. 63 is a side view of a front brake assembly, a rear brake assembly, and an anti-lock brake system of the illustrative vehicle.

As shown in FIG. 63, front brake assembly 1166 and rear brake assembly 1163 are coupled to an anti-lock brake system ("ABS") 1170 and a brake master cylinder 1172. Illustratively, a pressure sensor 1173 is positioned on ABS 1170 rather than on brake master cylinder 1172. ABS 1170, and therefore, brake sensor 1173, is positioned generally along the centerline of the vehicle is adjacent side frame 544. More particularly, ABS 1170 and pressure sensor 1173 are intermediate side frame members 544 and generally below swing arm 820. Illustratively, ABS 1170 is positioned closer to rear wheel 8 than front wheel 6. As such, the weight of pressure sensor 1173 is positioned lower on frame 4 and is positioned away from the front of motorcycle 2, which supports the weight of a portion of power train 10, fuel tank 35, and other components of motorcycle 2. Conversely, brake master cylinder 1172 is positioned closer to front wheel 6 than rear wheel 8. More particularly, brake master cylinder 1172 is positioned below mainframe tube 540 and is intermediate front frame tubes 542. ABS 1170 is operably coupled to brake master cylinder 1172 via lines 1176.

Referring still to FIG. 63, front brake caliper 1168 is coupled to front brake disc 1167 and front brake lines 1169. Front brake lines 1169 also are fluidly coupled to a brake lever line 1174, which is coupled to a brake lever 1410 on handlebars 28 (FIG. 74) and brake master cylinder 1172.

Brake lever 1410 is operably coupled to handlebars 28 on the right side of motorcycle 2, wherein the right side is understood to be the side corresponding to the right hand of the operator when seated on seat 26. Similarly, rear brake caliper 876 is coupled to a rear brake disc 877 and rear brake lines 1178. Rear brake lines 1178 also are fluidly coupled to a foot brake lever on the right-side of motorcycle 2.

In operation, when the operator actuates brake lever 1410 to actuate front brake assembly 1166 and/or the foot brake to actuate rear brake assembly 1165, a brake pressure is transmitted from brake lever line 1174 and/or lines 1176 to ABS 1170 and brake master cylinder 1172. ABS 1170 and brake master cylinder 1172 transmit a brake pressure to front brake assembly 1166 via front brake lines 1169 and/or to rear brake assembly 1165 via rear brake lines 1178. If front wheel 6 and/or rear wheel 8 begin to slide (e.g., on a slippery surface), ABS 1170 is actuated to prevent wheels 6 and 8 from sliding.

Referring to FIGS. 62 and 64-67, front fender 1180 is a skirted fender and is coupled to a front suspension assembly 1192. Front suspension assembly 1192 is coupled to a front fork assembly 1240. Front suspension assembly 1192 includes front shocks 1194 and seal members 1196. Front shocks 1194 may be air or gas shocks. Front shocks 1194 are operably coupled to front wheel 6 and front fork members 1242 of front fork assembly 1240. More particularly, front shocks 1194 are coupled to each other and front wheel 6 through a front wheel axis (not shown). Front shocks 1194 are illustratively larger than front fork members 1242 and receive front fork members 1242 therein, as is further detailed herein. Front shocks 1194 include an outer surface 1198 which may be generally flat or planar. As such, a light, reflective surface, or other accessory may be coupled thereto.

In operation, front fork members 1242 are configured to move or telescope within front shocks 1194 as front wheel 6 moves along a surface. Shocks 1194 respond to the movement of front fork members 1194 and may increase or decrease the suspension pressure for the comfort of the operator. Front fork members 1242 are exposed during operation of motorcycle 2 and, therefore, dirt, debris, and other matter may accumulate on front fork members 1242. However, as front fork members 1242 telescope within front shocks 1194, seal members 1196 prevent the debris on front fork members 1242 front entering front shocks 1194.

Figure 64:
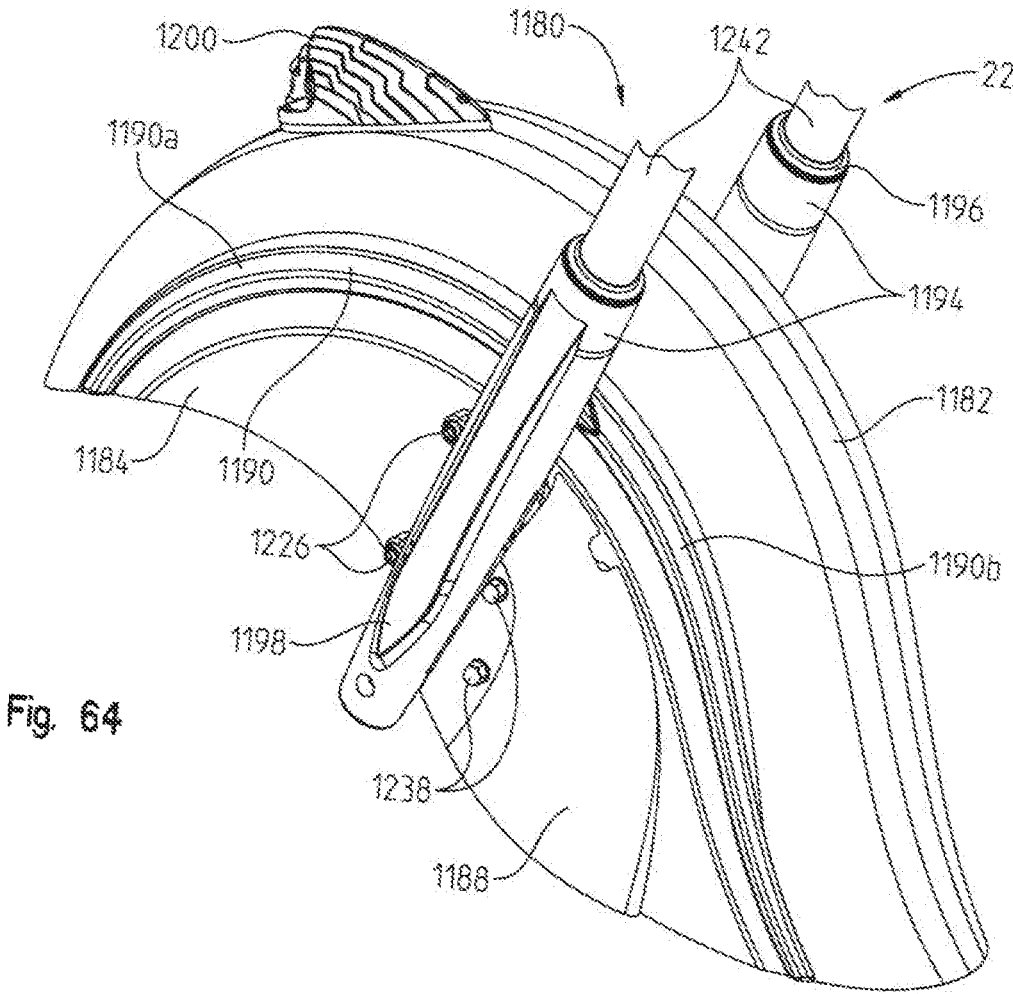
FIG. 64 is a side perspective view of the front fender of FIG. 62.
Figure 65:
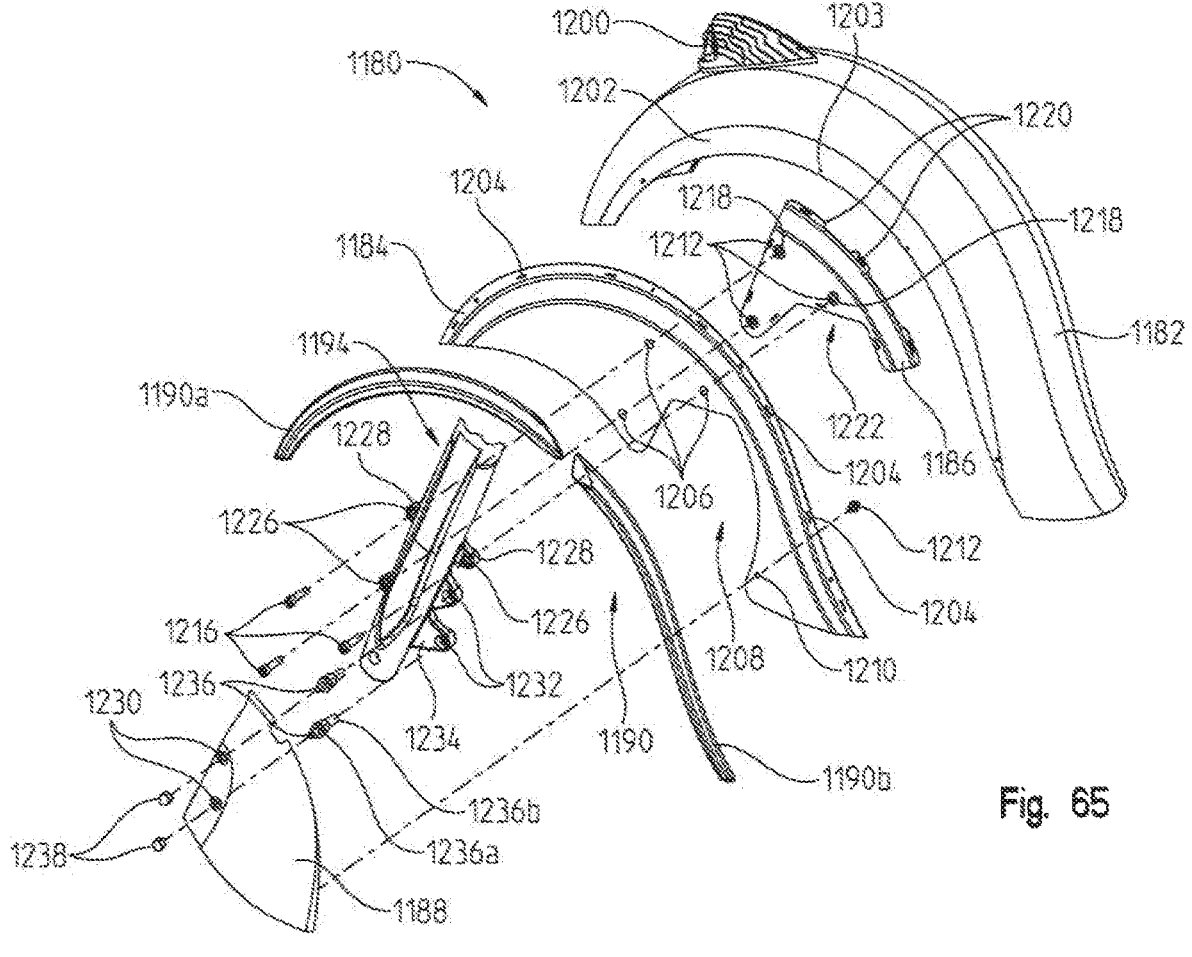
FIG. 65 is an exploded view of the front fender of FIG. 64.

As shown in FIGS. 64 and 65, front fender 1180 includes a top member 1182, a side member 1184, a panel 1186, a removable cover 1188, and a trim portion 1190. Top member 1182 is generally rounded and defines the skirted fender. A light 1200 is coupled to a front or top surface of top member 1182 of front fender 1180. Light 1200 may be a position light and/or an ornamental light and, illustratively, is shaped as a war bonnet and includes a head or face projecting forward from top member 1182. Positioned below light 1200 may be a fender tip 1183. As shown in FIG. 66A, an alternative embodiment of front fender 1180 includes fender tip 1183 coupled to a front end of top member 1182. Additionally, top member 1182 includes side flanges 1202 extending downwardly. Side flanges 1202 include apertures 1203.

Side flanges 1202 are coupled to side member 1184 at apertures 1204. Apertures 1204 align with apertures 1203 of top member 1182 and both apertures 1203, 1204 are configured to receive conventional fasteners, for example bolts, screws, welds, etc. Illustratively, side member 1184 is positioned outwardly front top member 1182. Side member 1186 also includes cut-out portion 120B, as is detailed further herein. Additionally, side member 1184 includes aperture

1210 which is configured to receive a fastener 1212 for coupling to a bracket 1211 (FIG. 66) on removable cover 1188. Side member 1184 also includes openings 1206 for coupling with panel 1186. Exemplary side member 1184 includes three openings 1206. Openings 1206 are configured to receive fasteners 1224.

Panel 1186 is positioned intermediate side member 1184 and top member 1182. Panel member 1186 includes openings 1214, for example three openings 1214 that align with openings 1206 on side member 1184. Panel 1186 is coupled to side member 1184 with fasteners 1216 that are received through both openings 1206 and 1214. Illustratively, fasteners 1216 are bolts that couple with nuts 1218 attached to panel 1186. As shown in FIG. 65, nuts 1218 are positioned at openings 1212. Fasteners 1216 also are received through apertures 1226 of brackets 1228 on front shocks 1194. The exemplary embodiment of front shocks 1194 include two brackets 1228 extending forward from shocks 1194 and one bracket 1228 extending rearwardly from shocks 1194. As such, fasteners 1216 couple together front shocks 1194, side member 1184, and panel 1186.

Panel 1186 also includes apertures 1220 which align with apertures 1204 on side member 1184 and apertures 1203 on top member 1182. As such, panel 1186 is coupled to side member 1184 and top member 1182 with conventional fasteners (not shown) received through apertures 1220, 1204, and 1203, respectively. Panel 1186 also includes a cut-out portion 1222 which aligns with cut-out portion 120B of side member 1184.

Figure 67:
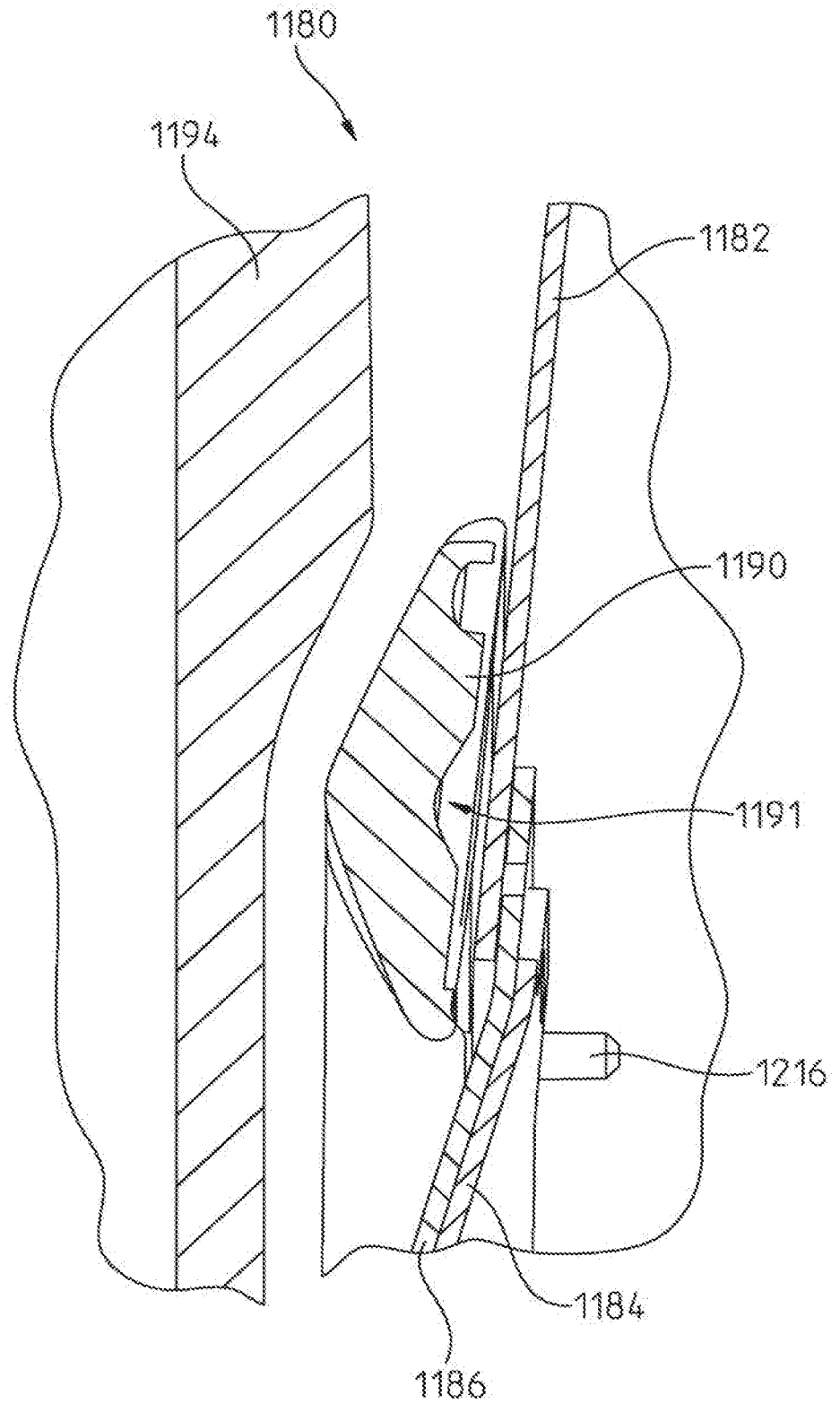
FIG. 67 is a cross-sectional view of the front fender of FIG. 64.
Figure 68:
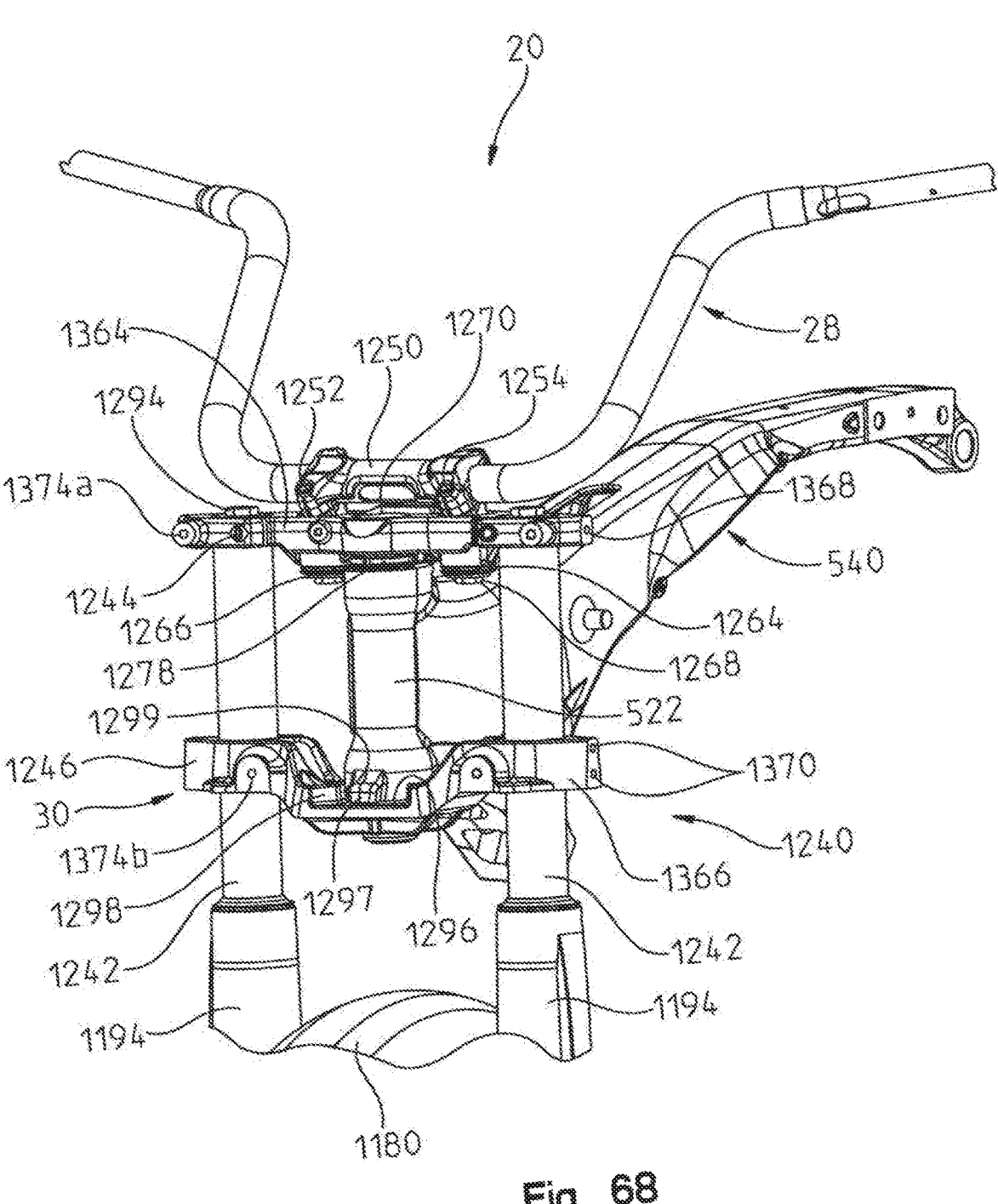
FIG. 68 is a front perspective view of a steering assembly of the illustrative vehicle.
Figure 69:
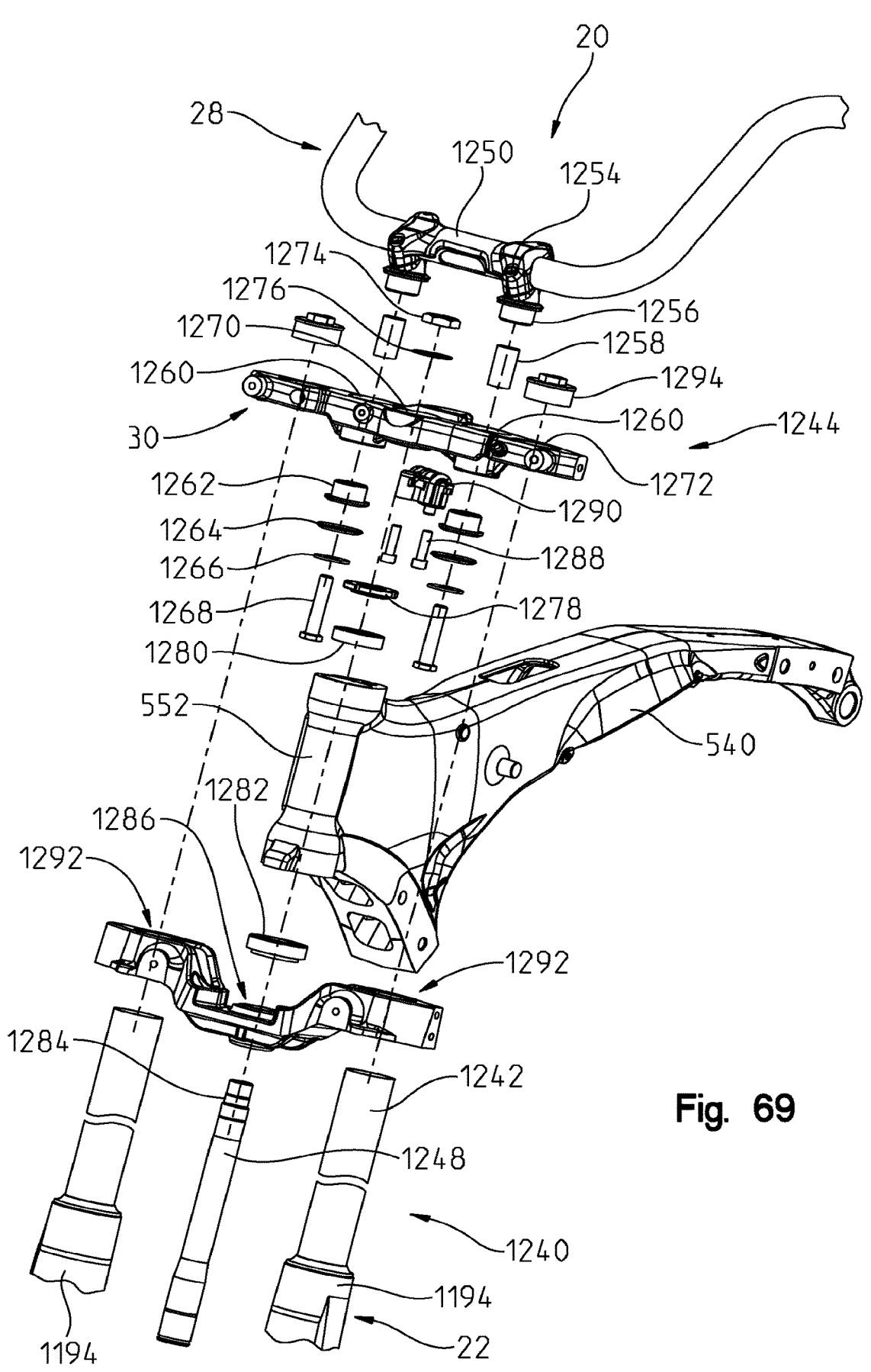
FIG. 69 is an exploded view of the steering assembly of FIG. 68.

Trim portion 1190 is coupled to side member 1184. Illustrative trim portion 1190 includes portions 1190a and 1190b which are separate from each other. Alternatively, portions 1190a, 1190b may be integral with each other such that trim portion 1190 is a single component. Trim portion 1190 positioned outwardly of apertures 1204 of side member 1184. Therefore, trim portion 1190 conceals the fasteners (not shown) received through apertures 1204, 1220, and 1203 for coupling together side member 1184, panel 1186, and top member 1182, respectively. Alternatively, side member 1184, panel 1186, top member 1182, and/or front shocks 1194 may be welded, riveted, or otherwise coupled together. As shown in FIG. 67, trim members 1190a, 1190b include a recessed channel 1191 so as to not interfere with the fasteners, welds, or rivets used to couple together side member 1184 and panel 1186. Additionally, FIG. 67 shows that front shocks 1194 may be tapered. As such, front shocks 1194 do not interfere with front fender 1180.

Removable cover 1188 is positioned outwardly from side member 1184. Removable cover 1188 includes apertures 1230 which align with apertures 1232 on tabs 1234 of front shocks 1194. Illustratively, two tabs 1234 extend rearwardly from front shocks 1194. Fasteners 1236 are received through apertures 1230 of removable cover 1188 and apertures 1232 of front shocks 1194. Fasteners 1236 are double-threaded bolts having a first threaded portion 1236a and a second threaded portion 1236b. First threaded portion 1236a extend through apertures 1230 on removable cover 1188 and are secured thereto with nuts 1238, which illustratively are acorn nuts. Second threaded portion 1236b are received through apertures 1232 on tabs 1234. Apertures 1232 may be threaded to secure fasteners 1236 to front shocks 1194 or, alternatively, additional couplers, such as nuts, may be threadedly coupled to second threaded portion 1236b of fasteners 1236.

Figure 66:
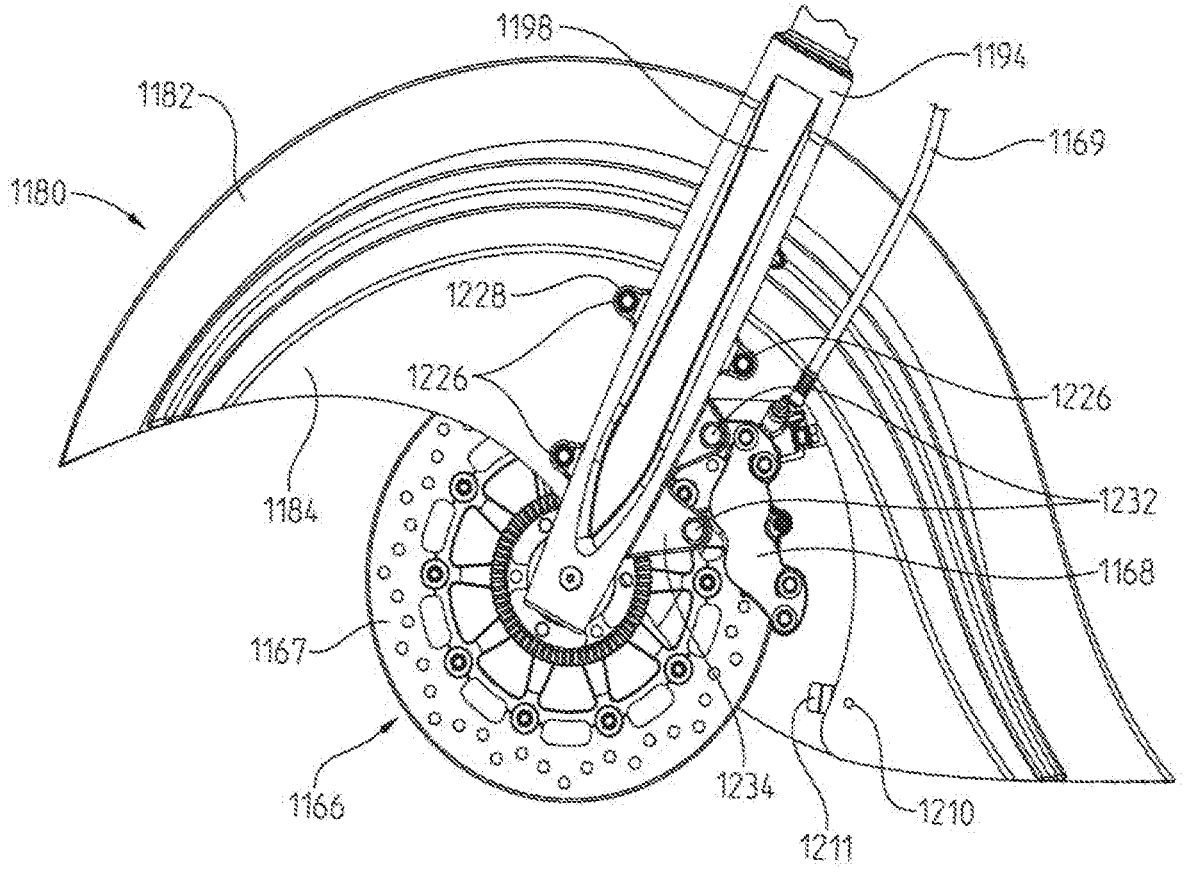
FIG. 66 is a side perspective view of the front fender of FIG. 64 with a panel removed to expose a brake assembly of the front wheel.
Figure 66A:
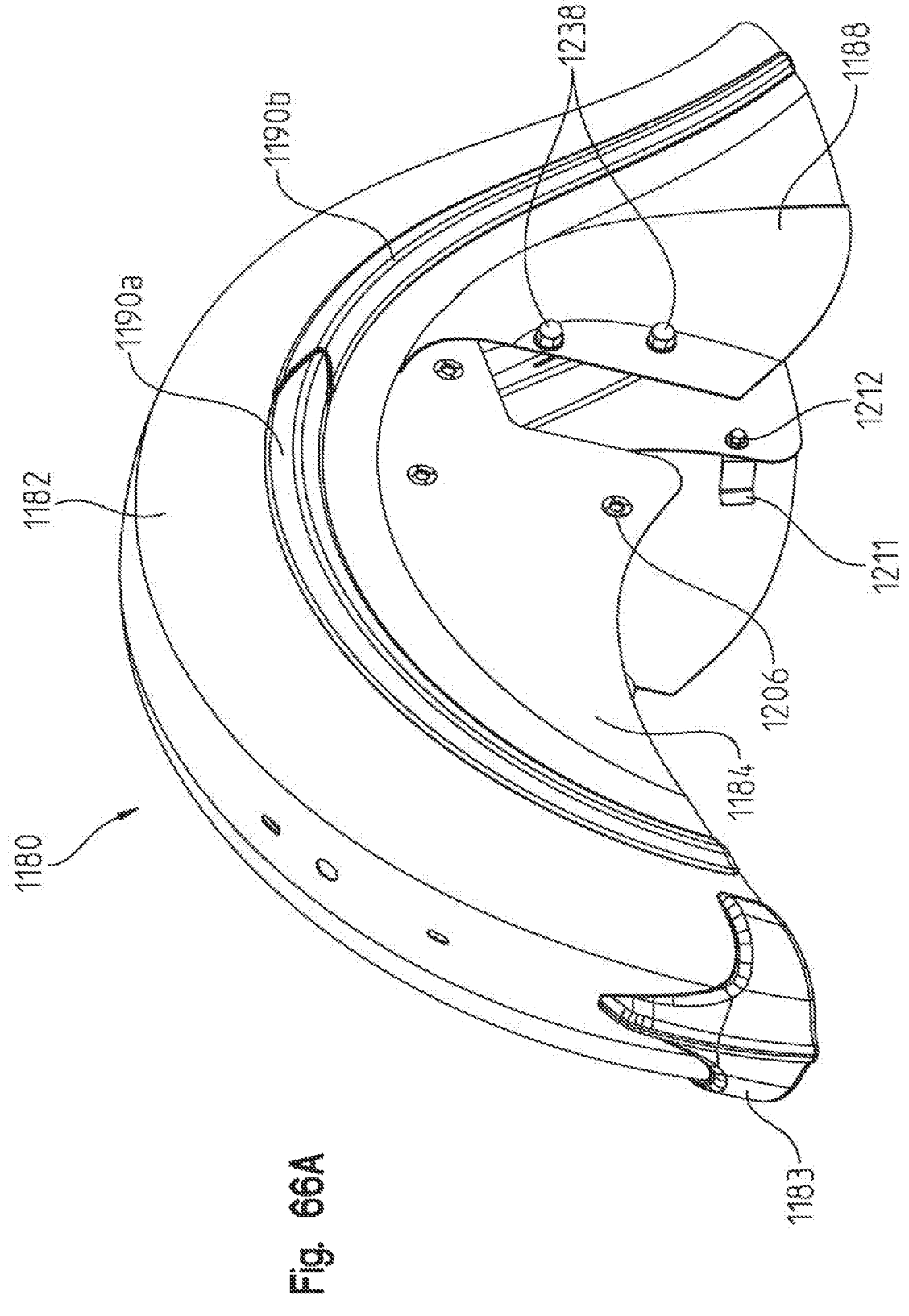
FIG. 66A is a front perspective view of an alternative embodiment of the front fender of FIG. 64.

As shown in FIGS. 64 and 66, removable cover 1188 conceals cut-out portions 120B and 1222 of side member 1184 and panel 1186, respectively. Cut-out portions 120B, 1222 generally expose brake caliper 1168. As such, when necessary to access front brake assembly 1166, including brake disc 1167 and/or brake caliper 1168, removable cover 1188 may be removed by removing nuts 1238 front first threaded portion 1236a of fasteners 1236, as shown in FIG. 66. As such, rather than removing front fender 1180 entirely, removable cover 1188 may be removed from front fender 1180 in order to service, clean, or repair brake disc 1167, brake caliper 1168 and/or brake lines 1169, or to bleed brake lines 1169. It may be appreciated that fasteners 1236 remain coupled to front shocks 1194 through second threaded portion 1236b. Therefore, it is less likely that fasteners 1236 are misplaced when servicing front brake assembly 1166. Additionally, removable cover 1188 may include a bracket 1211 (FIG. 66) for coupling with fastener 1212 when attaching to front fender 1180.

Referring to FIGS. 68-72, a steering assembly 20 is shown. Steering assembly 20 includes front fork assembly 1240 having front fork members 1242 operably coupled to handlebars 28 and triple clamp assembly 30. The outer diameter of front fork members 1242 is smaller than the inner diameter of front shocks 1194 and, as such, front fork members 1242 are received within front shocks 1194 and telescope or move relative thereto as front wheel 6 moves along a surface.

Front fork members 1242 are coupled together through the front wheel axis and triple clamp assembly 30. As such, front fork members 1242 move together when the operator is steering motorcycle 2 with handlebars 28. Triple clamp assembly 30 includes an upper clamp member 1244 and a lower clamp member 1246. Lower clamp member 1246 is positioned between front shocks 1194 and upper clamp member 1244. Upper clamp member 1244 is positioned below handlebars 28.

Handlebars 28 include a bracket 1250 which is coupled to handlebars 28 with fasteners 1252. Bracket 1250 has tubes 1254 extending downwardly therefrom and, illustratively, include two tubes 1254. Tubes 1254 may include a seal or flange 1256 extending generally around tubes 1254 and projecting radially outwardly therefrom. Tubes 1254 are configured to receive shafts 1258 therein. More particularly, the outer diameter of shafts 1258 is smaller than the inner diameter of tubes 1254. As such, shafts 1258 extend within tubes 1254. Tubes 1254 and shafts 1258 secure handlebars 28 to triple clamp assembly 30. Tubes 1254 are received within openings 1260 of upper clamp member 1244. Tubes 1254 extend within openings 1260 until flanges 1256 contact the top surface of upper clamp member 1244. Shafts 1258 are secured to tubes 1254 and upper clamp member 1244 with bearings 1262, spacers 1264, washers 1266, and fasteners 126B. Illustratively, fasteners 126B are bolts. Handlebars 28 and/or bracket 1250 may include vibration isolating members in order to dampen the vibration from motorcycle 2 felt by the operator.

Upper clamp member 1244 also includes a central opening 1270 and outer openings 1272. Central opening 1270 is positioned between openings 1260 and outer openings are positioned outward from openings 1260. As such, openings 1260 are positioned between central opening 1270 and outer openings 1272. Central opening is configured to secure a steering shaft 1248 of steering assembly 20 to triple clamp assembly 30.

Steering shaft 1248 is positioned between upper and lower clamp members 1244, 1246. More particularly, steering shaft 1248 is positioned within head tube 552 of mainframe tube 540. Steering shaft 1248 is configured to rotate within head tube 552 to transmit motion from handlebars 28 to triple clamp assembly 30. Steering shaft 1248 is angled at the same rake angle as head tube 552. Steering shaft 1248 is coupled to head tube 552 and triple clamp assembly 30 with a bearing 1274, a washer 1276, a nut 1278, a bearing 1280, and a bearing 1282. Bearing 1274 may be a flat bearing and bearing 1282 may be a taper bearing. Bearing 1282 may allow steering shaft 1248 to be adjusted within head tube 552 in order to adjust the "feel" or characteristics of steering assembly 20.

In assembly, bearing 1280 is received within head tube 552 until bearing 1280 abuts shoulder 576. Additionally, bearing 1282 is received within head tube 552 until bearing 1282 abuts shoulder 578. Steering shaft 1248 extends through a central opening 1286 of lower clamp member 1246, through bearing 1282 and head tube 552, and through bearing 1280. Steering shaft 1248 also extends through nut 1278 and a threaded portion 1284 of steering shaft 1248 may be coupled thereto. Alternatively, steering shaft 1248 may be threaded or otherwise coupled to bearing 1274 and/or central opening 1270 of upper clamp member 1244.

Figure 60B:
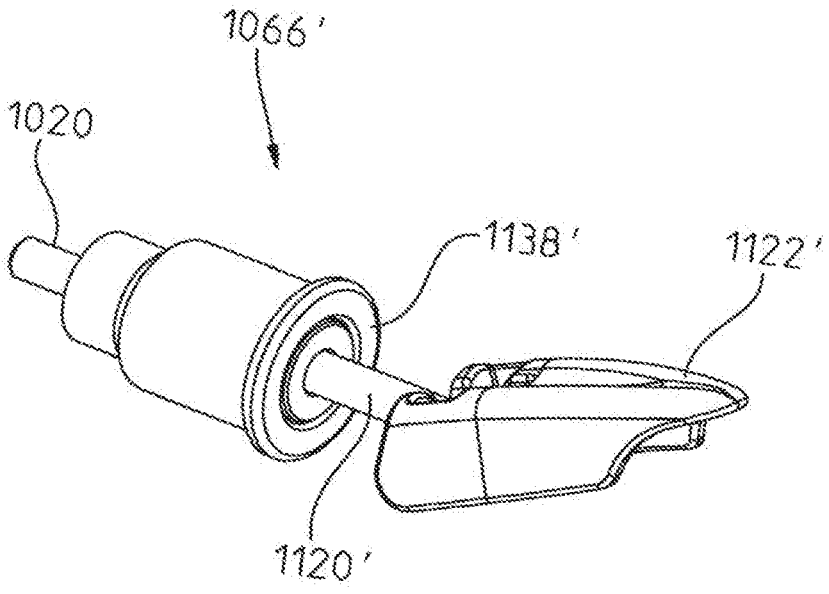
FIG. 60B is a side perspective view of the alternative embodiment saddle bag mounting assembly of FIG. 60A.
Figure 71:
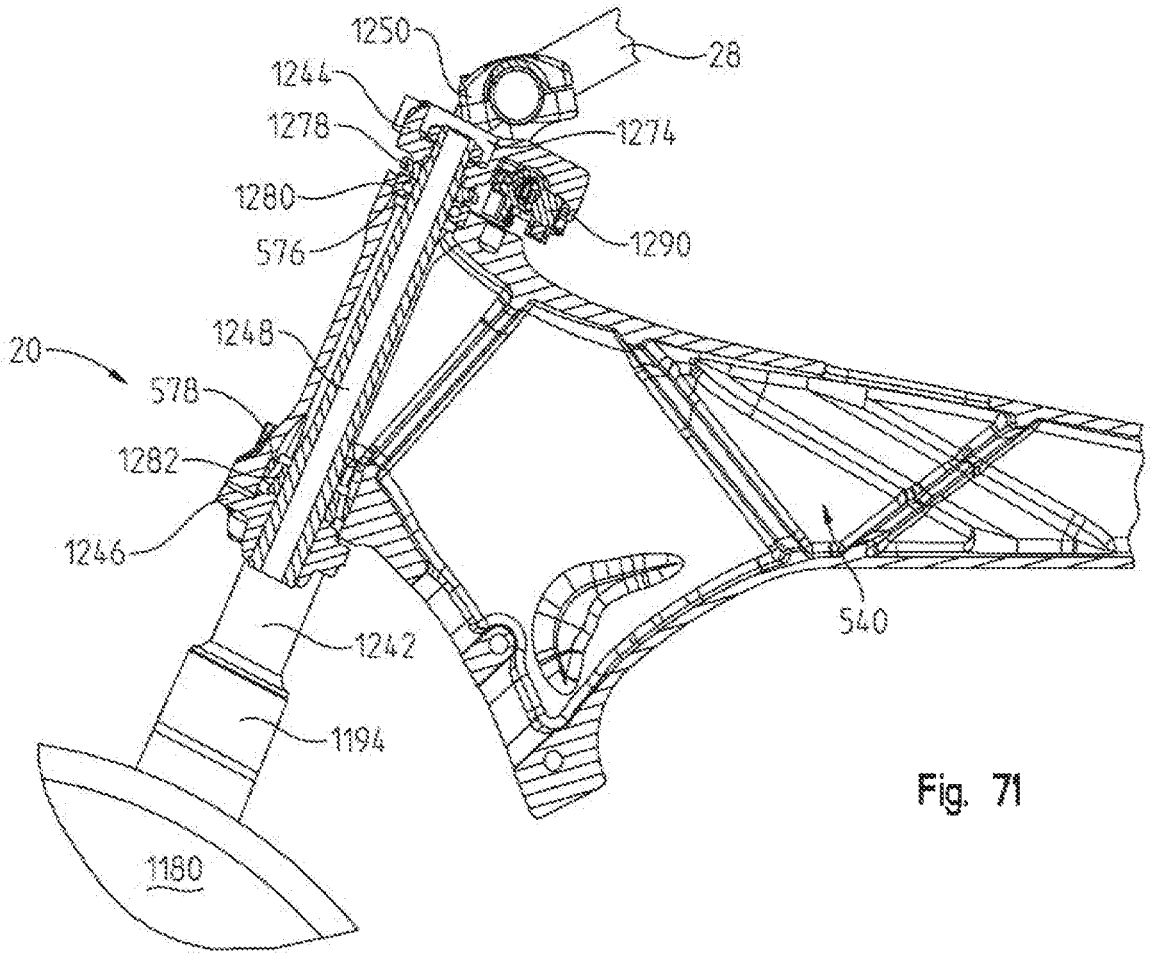
FIG. 71 is a side cross-sectional view of the steering assembly of FIG. 68.

Referring to FIGS. 60 and 71, upper clamp member 1244 also may support a handlebar lock member 1290. Handlebar lock member 1290 is coupled to upper clamp member 1244 with fasteners 1288 and is positioned rearward of steering shaft 1248, as shown best in FIG. 71. Handlebar lock member 1290 is configured to lock the position of handlebars 28. As such, if motorcycle 2 is stolen or accessed by an unauthorized user, handlebars 28 will not move to steering motorcycle 2 when lock member 1290 is in the lock position.

Outer openings 1272 of upper clamp member 1244 are configured to secure front fork members 1242 to triple clamp assembly 30. More particularly, front fork members 1242 are received through outer openings 1292 of lower clamp member 1246 and extend toward upper clamp member 1244. The top ends of front fork members 1242 are positioned within outer openings 1272 of upper clamp member 1244 and are secured thereto with couplers 1294.

Lower clamp member 1246 includes a U-shaped channel 1296 having a first side surface 1298 and a second side surface 1299. Channel 1296 receives a tab 1297 on head tube 552. Tab 1297 is positioned intermediate first and second side surfaces 1298, 1299. Tab 1297 and side surfaces 1298, 1299 function as a hard or positive stop for steering assembly 20. More particularly, as the operator turns handlebars 28 to the right, tab 1297 rotates within channel 1296 until contacting first side surface 1298. First side surface 1298 prevents handlebars 28 from rotating any further to the right. Similarly, as the operator turns handlebars 28 to the left, tab 1297 rotates within channel 1296 until contacting second side surface 1299. As such, second side surface 1299 prevents handlebars 28 from rotating any further to the left.

In operation, steering assembly 20 is controlled by the operator via handlebars 28. As the operator moves handlebars 28, front fork assembly 1240 moves as a unit in a similar manner. As such, handlebars 28 rotate steering shaft 1248 and both front fork members 1242 which then moves front wheel 6.

Referring to FIGS. 72-77, front fairing 50 covers a portion of steering assembly 20, including a portion of front fork members 1242, triple clamp assembly 30, and handlebars 28. Front fairing 50 includes an outer panel 1302, an inner panel 1304, a support bracket 1306, and an intermediate panel 1308. Outer panel 1302 may be comprised of a polymeric and/or metallic material. As shown best in FIG. 76, outer panel 1302 includes a plurality of openings for receiving accessories, such as lighting units. For example, outer panel 1302 includes an opening 1310 for a headlight unit 1316, openings 1312 for secondary lighting units 1318, and openings 1314 for turn signal lighting units 1320. Lighting units 1316, 1318, and 1320 are generally flush with outer panel 1302 such that lighting units 1316, 1318, and 1320 are generally integral with outer panel 1302 and do not protrude outwardly therefrom.

Any of lighting units 1316, 1318, and 1320 may be halogen lights, light-emitting diode ("LED") lights, incandescent lights, High Intensity Discharge ("HID") lights, or any other type of light available for motorcycle 2. Additionally, lighting units 1316, 1318, and 1320 may be configured to emit a pulsing or flashing output or a solid output, as is further detailed herein. Lighting units 1316, 1318, and 1320 also may be configured to signal when a lighting unit is no longer outputting light. Other lighting units may compensate, for example, if a low-beam light output is no longer operating, a high-beam output may be continuously pulsed in order to simulate a low-beam output. Additionally, outer panel 1302 may support other lighting units, such as hazard lights and/or running lights.

Figure 72:
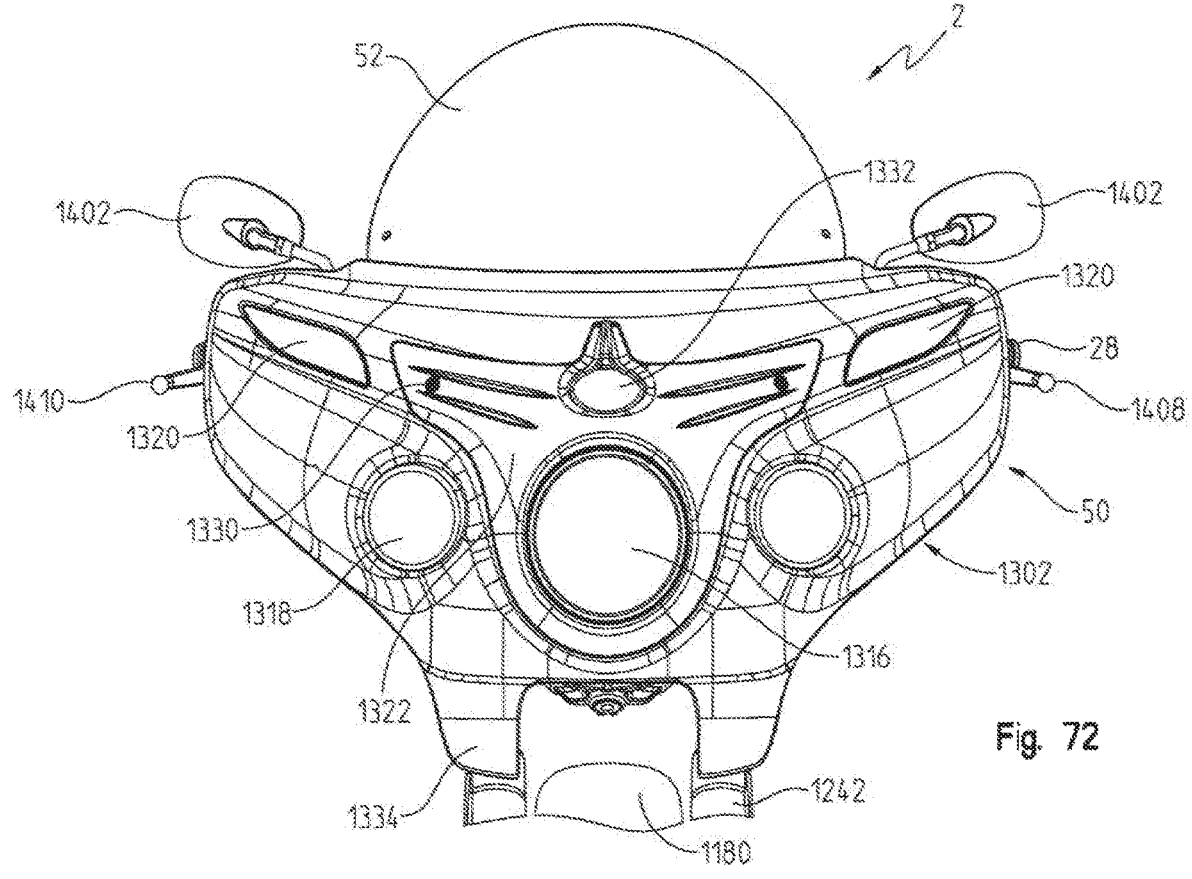
FIG. 72 is a front view of a front fairing and a windshield assembly.
Figure 73:
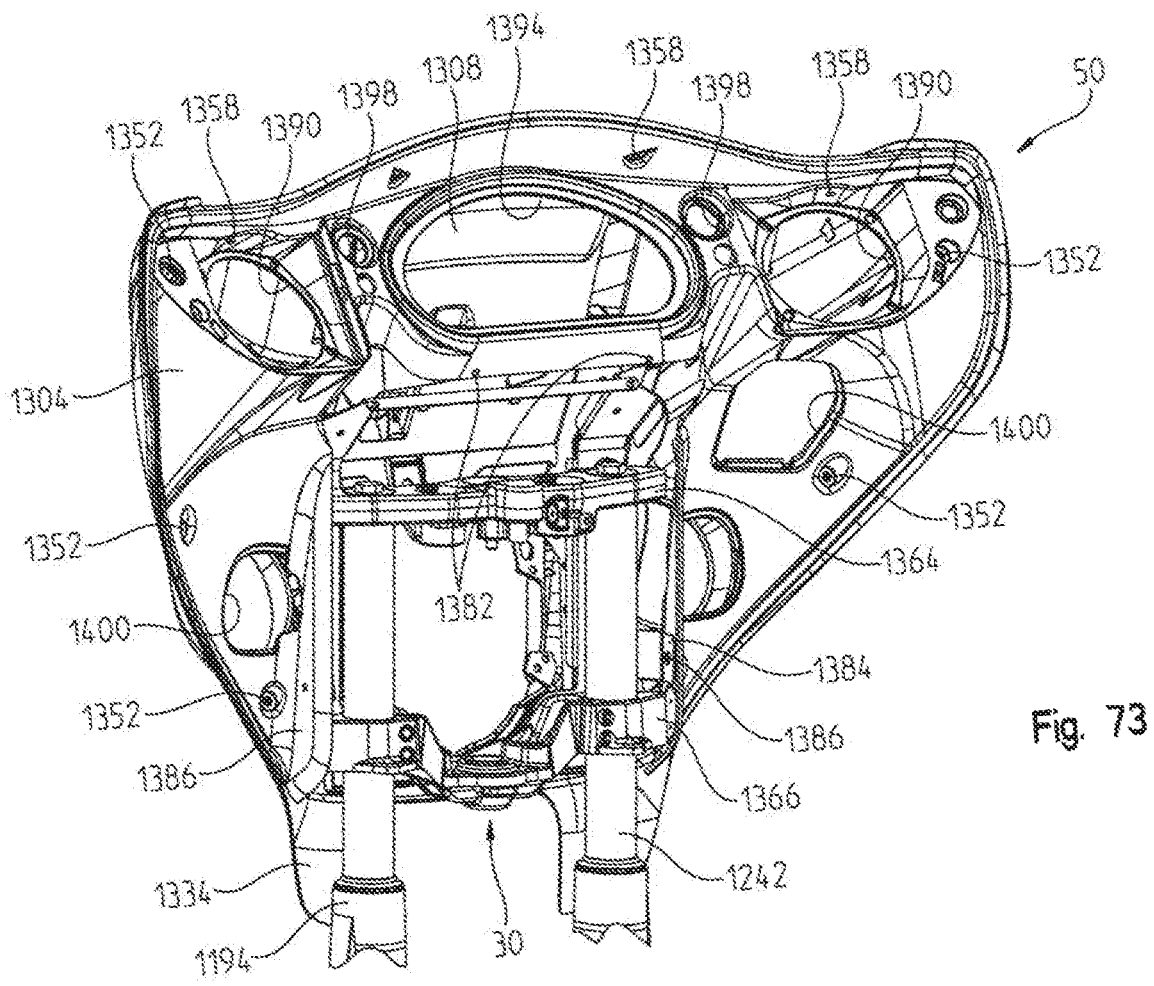
FIG. 73 is a rear perspective view of the front fairing of FIG. 72.

Outer panel 1302 also is configured to support a cover member 1322 which, as shown in FIG. 72, supports headlight unit 1316. Cover member 1322 is secured to outer panel 1302 with lower brackets 1324 and at least one upper bracket 1326. Outer panel 1302 also includes tabs 1325 for further supporting cover member 1322 thereon. Additionally, apertures 1328 of outer panel 1302 receive fasteners 1330 which extend through cover member 1322 for coupling cover member 1322 to outer panel 1302. Cover member 1322 may include additionally accessories, for example, cover member 1322 includes a logo, sign, indicia, marking, or other emblem, illustratively an "Indian" logo 1332.

Outer panel 1302 also includes protectors 1334 which extend downwardly from outer panel 1302 and are positioned below lighting units 1316, 1318, and 1320. Protectors 1334 cover a portion of front fork members 1242 to prevent dirt, dust, debris, or other matter from accumulating on front fork members 1242. In addition to seal members 1196, protectors 1334 also prevent matter from entering front shocks 1194 when front fork members 1242 move within front shocks 1194.

Figure 76:
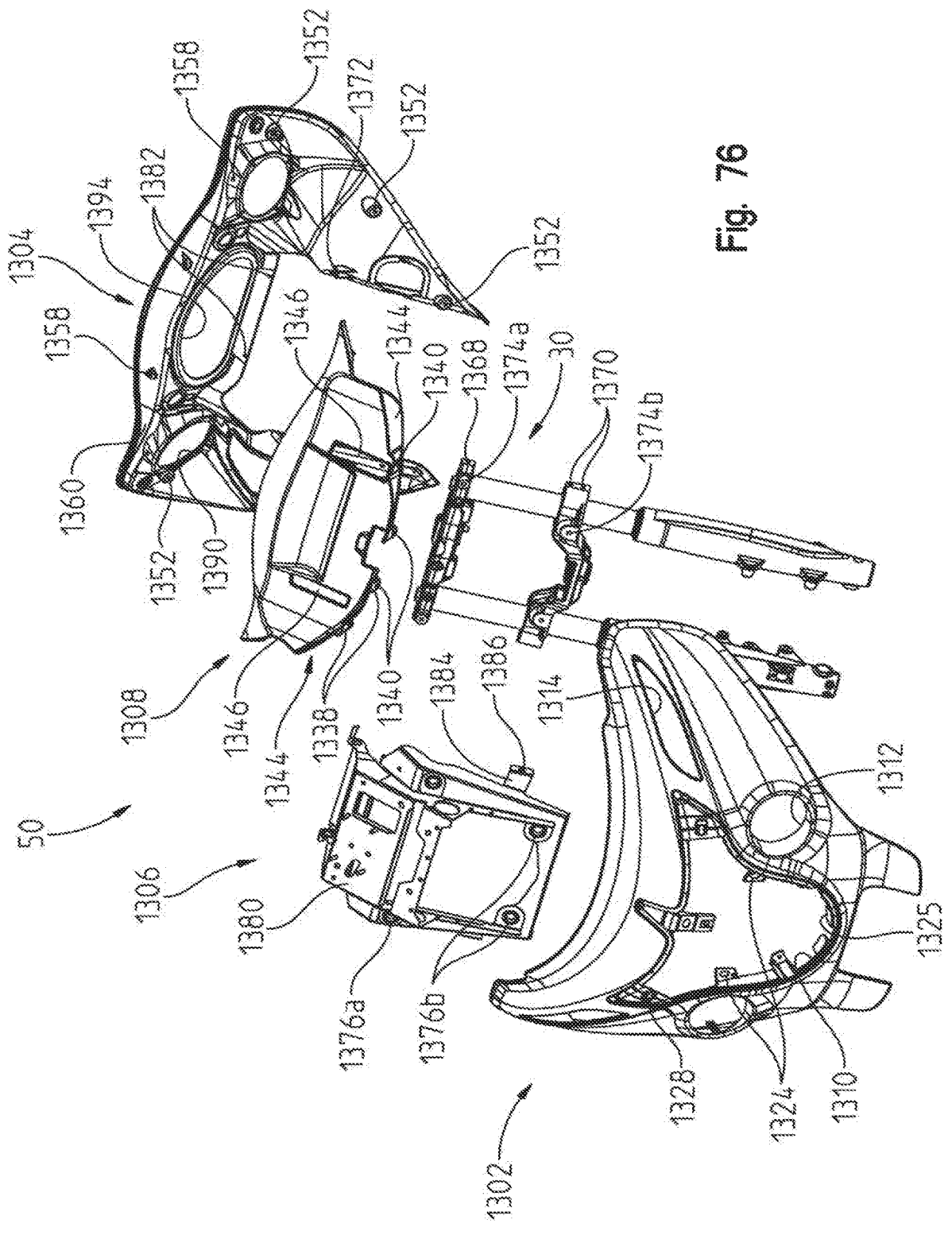
FIG. 76 is a front exploded view of the front fairing assembly of FIG. 72.
Figure 77:
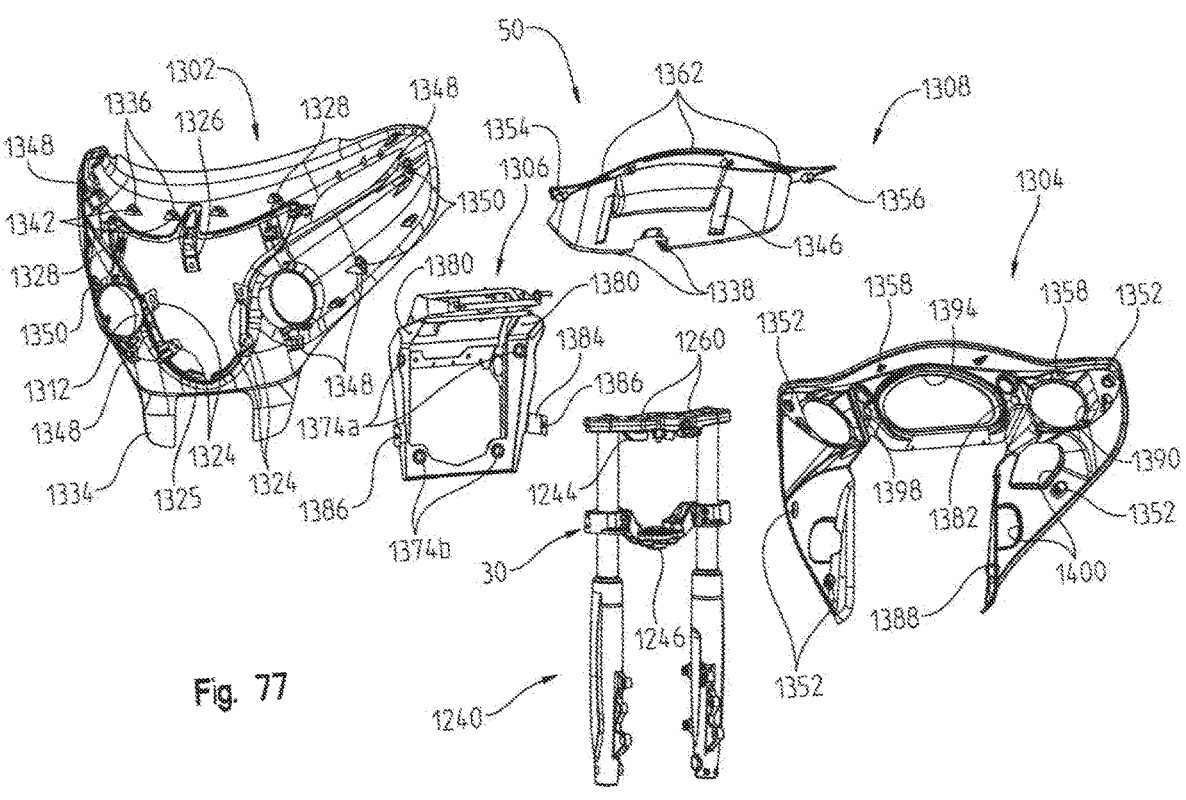
FIG. 77 is a rear exploded view of the front fairing assembly of FIG. 76.

Outer panel 1302 is coupled directly to intermediate panel 1308 via apertures 1342 on tabs 1336 positioned on the rear surface of outer panel 1302. As shown best in FIG. 77, illustrative outer panel 1302 includes four tabs 1336, each having an aperture 1342 corresponding to an aperture 1340 on tabs 1338 of intermediate panel 1308 (FIG. 76). Tabs 1340 extend downwardly from a bottom shelf 1344 of intermediate panel 1308. Apertures 1342 of outer panel 1302 and apertures 1340 of intermediate panel 1308 are configured to receive conventional fasteners for coupling outer panel 1302 to intermediate panel 1308. Intermediate panel 1308 also may be comprised of a polymeric and/or metallic material. Intermediate panel 1308 includes slots 1346, as is further detailed herein.

Outer panel 1302 also is coupled to inner panel 1304. As such, inner panel 1304 and intermediate panel 1308 support the load of outer panel 1302 because outer panel 1302 is not coupled to support bracket 1306 or triple clamp assembly 30. Referring to FIG. 77, the rear surface of outer panel 1302 also includes tabs 1348, each of which includes an aperture 1350 for coupling outer panel 1302 to inner panel 1304. Illustratively, outer panel 1302 includes six tabs 1348 and six apertures 1350. Apertures 1350 generally correspond to apertures 1352 on inner panel 1304. Apertures 1350 are aligned with apertures 1352 in order to receive conventional fasteners therethrough for coupling outer panel 1302 to inner panel 1304.

Inner panel 1304 also is coupled to intermediate panel 1308. As shown in FIG. 77, intermediate panel 1308 includes brackets 1354, each of which has an aperture 1356. Illustratively, intermediate panel 1308 includes four brackets 1354 and four apertures 1356. Apertures 1356 align with apertures 1358 at an upper end of inner panel 1304. Apertures 1356 and 1358 receive conventional fasteners for coupling intermediate panel 1308 to inner panel 1304. Inner panel 1304 is further coupled to intermediate panel 1308 through a plurality of tongue-and-groove connections. More particularly, and as shown in FIG. 76, inner panel 1304 includes a plurality of tongues 1360 at the upper end. Illustratively, inner panel 1304 includes three tongues 1360. Tongues 1360 are configured to slide within a plurality of grooves 1362 at an upper end of intermediate panel 1308 (FIG. 77). As such, inner panel 1304 and intermediate panel 1308 are coupled together with conventional fasteners at aperture 1356 and 1358, and also are coupled together when tongues 1360 are received within grooves 1362.

Figure 70:
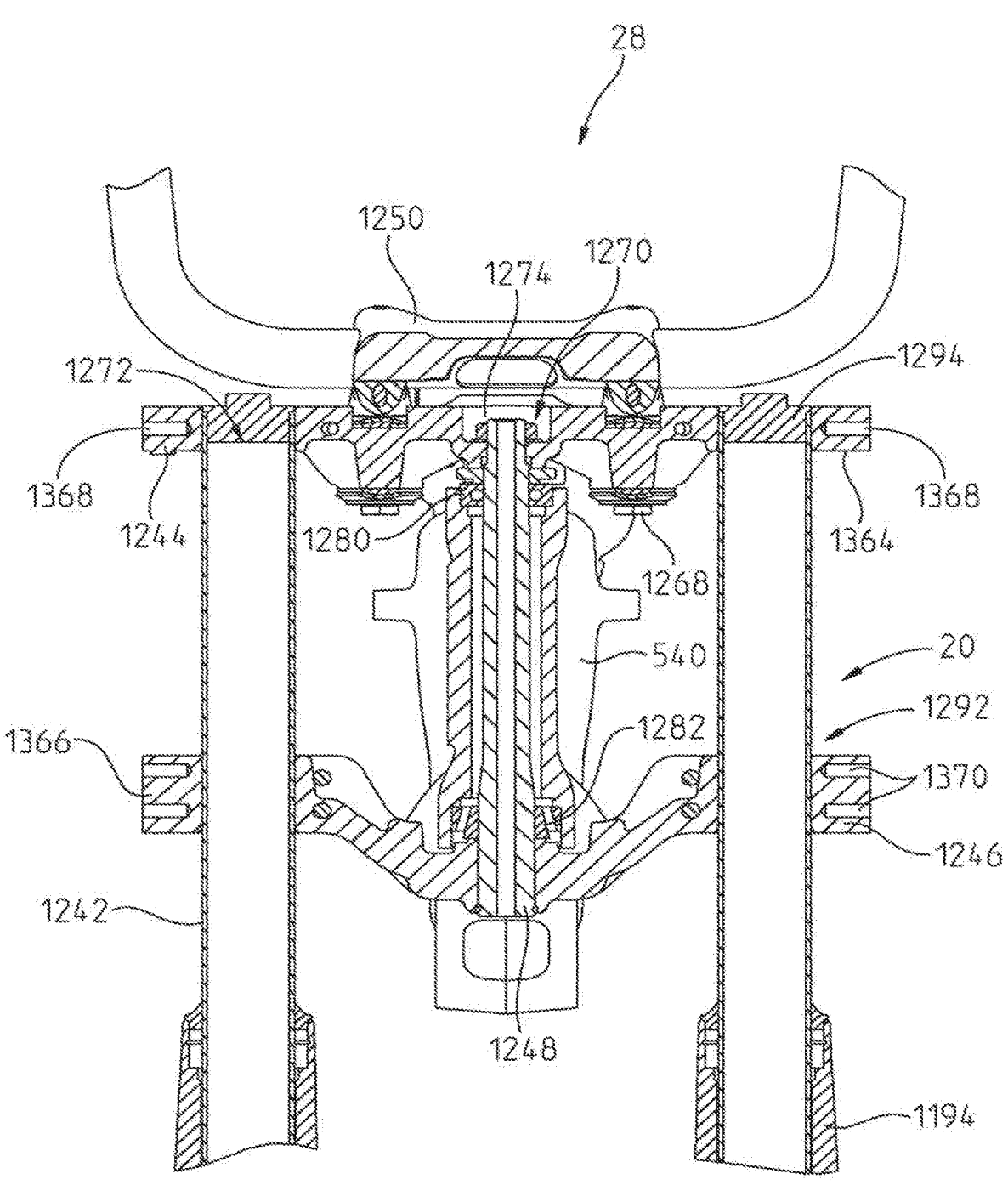
FIG. 70 is a front cross-sectional view of the steering assembly of FIG. 68.

Inner panel 1304 also may be coupled to triple clamp assembly 30 through brackets 1364 on upper clamp member 1244 and brackets 1366 on lower clamp member 1246. As shown in FIG. 70, brackets 1364 on upper clamp member 1244 may include at least one aperture 1368. Similarly, brackets 1366 on lower clamp member 1246 may include at least one aperture 1370. Inner panel 1304 may include at least one aperture 1372 (FIG. 76) that align with apertures 1368, 1370 in order to coupler inner panel 1304 to triple clamp assembly 30.

Figure 78:
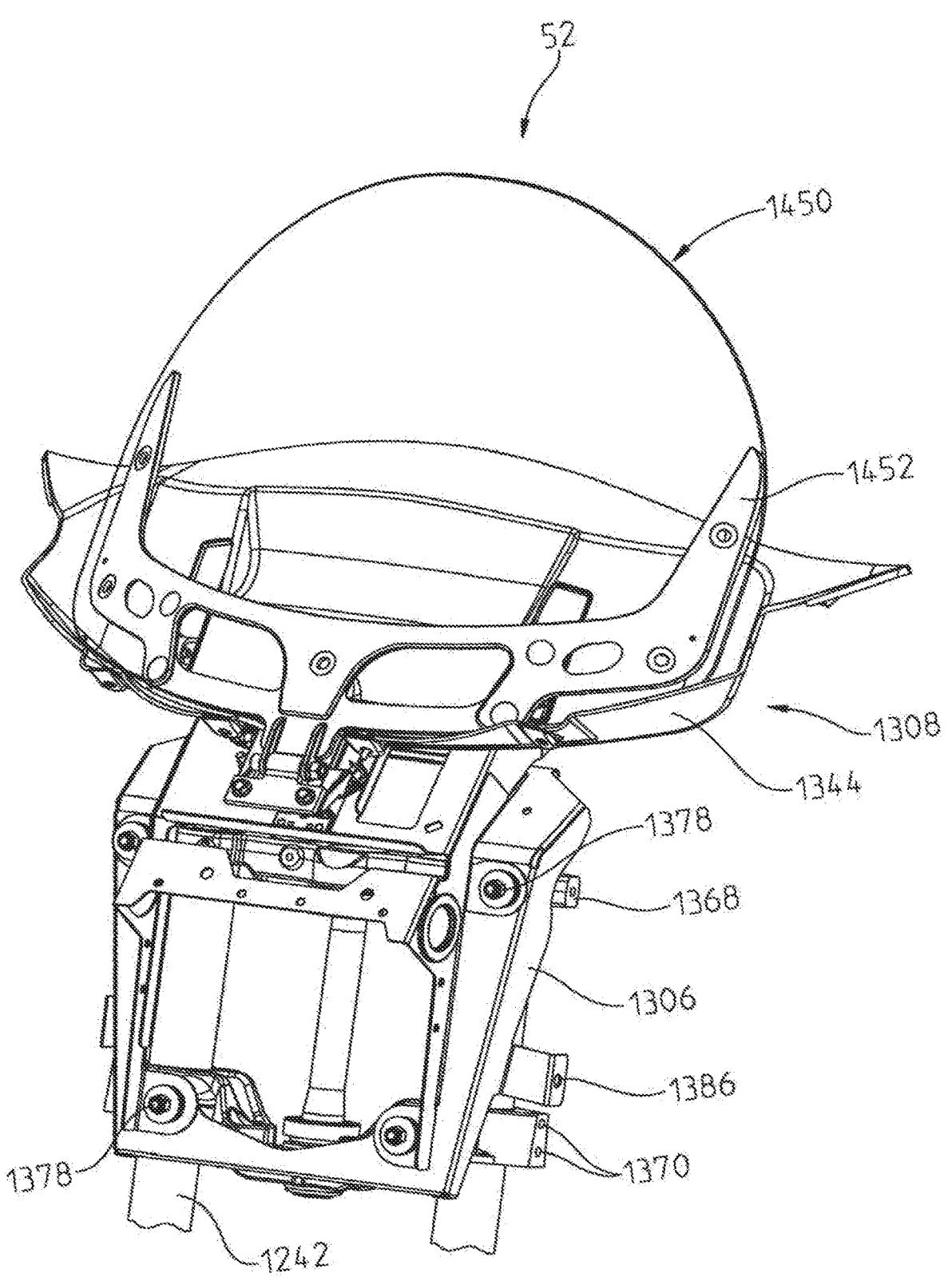
FIG. 78 is a front perspective view of the windshield assembly of FIG. 72.

Support bracket 1306 couples with triple clamp assembly 30. As shown in FIGS. 68-77, triple clamp assembly 30 includes apertures 1374 and, illustratively, includes four apertures 1374, for coupling triple clamp assembly 30 to support bracket 1306. More particularly, upper clamp member 1244 includes two apertures 1374a and lower clamp member 1246 includes two apertures 1374b. Support bracket 1306 includes apertures 1376 and, more particularly, includes four apertures 1376. Illustratively, support bracket includes upper apertures 1376a that align with apertures 1374a, and lower apertures 1376b that align with apertures 1374b. Conventional fasteners 1378 (FIG. 78) are received through apertures 1374, 1376 for coupling support bracket 1306 to triple clamp assembly 30.

Additionally, inner panel 1304 is coupled to support bracket 1306. Support bracket 1306 includes upper apertures 1380 that align with apertures 1382 on inner panel 1304. Conventional fasteners are received through aperture 1380, 1382 for coupling inner panel 1304 to support bracket 1306. Additionally, support bracket 1306 includes tabs 1384 having apertures 1386 that align with apertures 1388 on inner panel 1304. Conventional fasteners are received through apertures 1386, 1388 in order to couple inner panel 1304 with support bracket 1306.

Front fairing 50 is configured to support a plurality of accessories and controls. For example, as shown in FIGS. 72-77 and shown best in FIG. 73, inner panel 1304 includes openings or cut-out portions 1390 for speakers 1392 (FIG. 74), openings 1394 for gauges and/or display screens 1396, openings 1398 for various controls, openings 1400 for additional accessories or components, and windshield assembly 52 of motorcycle 2. Additional controls and accessories may be positioned on handlebars 28, which extend rearwardly from inner panel 1304. For example, handlebars 28 may include mirrors 1402. Illustratively, a right-side handlebar 1404 supports a mirror 1402 and a left-side handlebar 1406 supports a mirror 1402. Additionally, right-side and left-side handlebars 1404 and 1406 may support additional speed controls 40 or other accessories or controls for motorcycle 2. For example, controls for a cruise control function may be supported on handlebars 28. Also, a clutch lever 1408 is positioned at left-side handlebar 1406 and brake lever 1410 is positioned at right-side handlebar 1404. As such, the various controls for operating motorcycle 2 are easily accessible to the operator.

Figure 75:
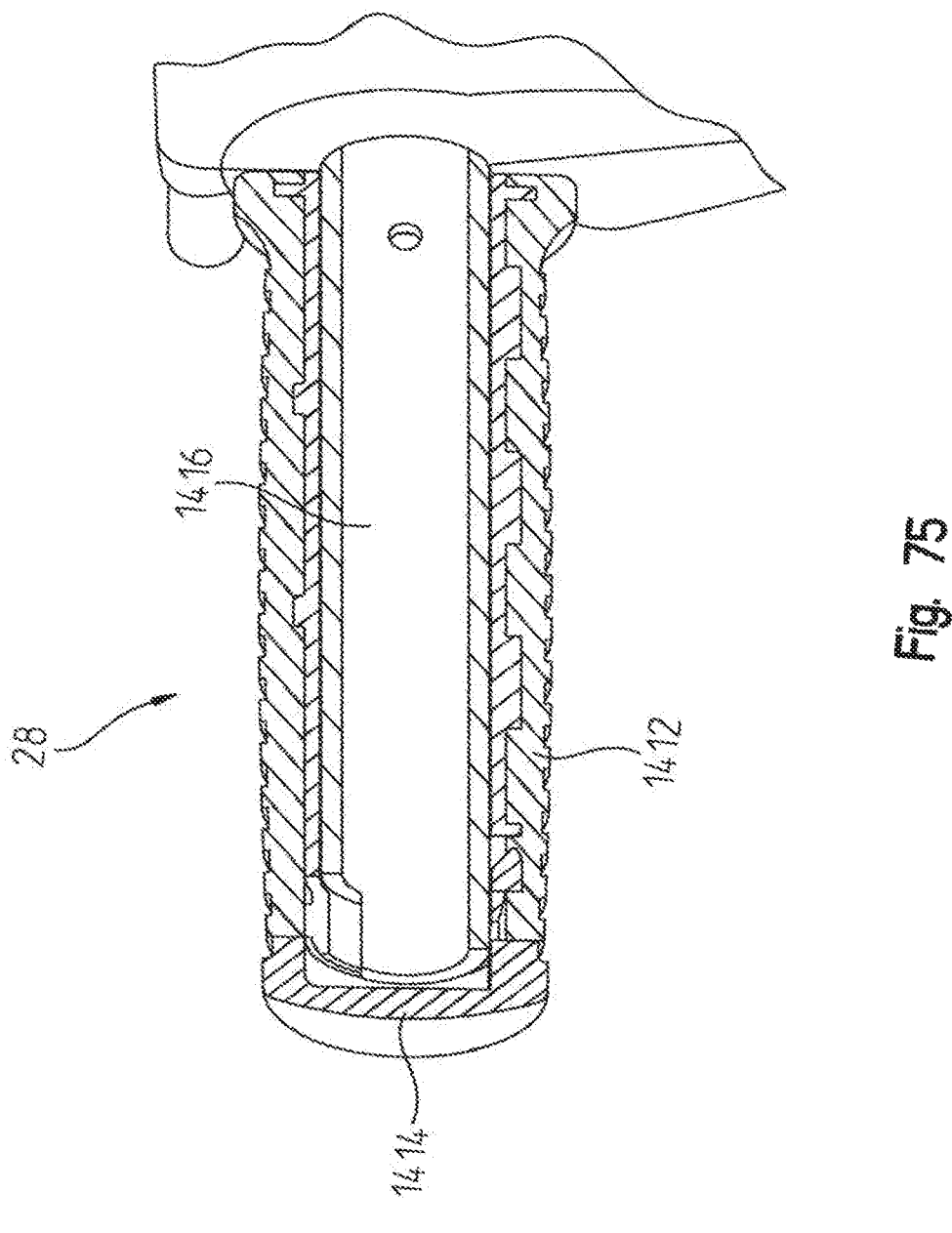
FIG. 75 is a cross-sectional view of a grip of the handlebars.

Both right-side and left-side handlebars 1404 and 1406 include grips 1412. Grips 1412 may be comprised of a polymeric material to dampen vibration from motorcycle 2. As shown in FIG. 75, grips 1412 extend generally out the outer portion of right-side and left-side handlebars 1404 and 1406. A cap 1414 may be positioned at the outer ends of handlebars 1404 and 1406 to enclose an internal channel 1416 of handlebars 1404 and 1406. Cap 1414 also may be comprised of a polymeric material to further dampen vibrations. Wires or other lines or hoses may be positioned within channel 1416 of right-side and left-side handlebars 1404 and 1406 to support the controls on handlebars 1404 and 1406. Additionally, the wires or lines within channel 1416 of handlebars 1404 and 1406 may allow for heating handlebars 1404 and 1406.

Referring to FIGS. 78-87, windshield assembly 52 includes a windshield 1450 mounted to a support bracket 1452. In one embodiment, windshield 1450 is made from generally transparent material, for example glass or plastic. Additionally, alternative embodiments of windshield assembly 52 may include windshields 1450 with different shapes and sizes. As such, the operator may customize the look and function of windshield assembly 52. Windshield assembly 52 is configured to move between a "down" position and an "up" position in order to allow a precise amount of wind and/or rain protection to the operator. Windshield 1450 moves between the up and down positions by an electric or power motor assembly 1454 but also may be configured for manual adjustment through controls accessible to the operator during operation of motorcycle 2. Additionally, the position of windshield 1450 may be automatically adjusted by electrical system 1800 of motorcycle 2, as is detailed further herein. Electrical system 1800 may adjust the position of windshield 1450 prior to motorcycle 2 moving and also is configured for "on the fly" adjustments while motorcycle 2 is moving. Additional details of windshield assembly 52 may be disclosed in U.S. Pat. No. 7,748,746, issued on Jul. 6, 2010, the complete disclosure of which is expressly incorporated by reference herein. Windshield 1450 directs air flow away from an operator during operation of motorcycle 2.

Windshield 1450 and support bracket 1452 are coupled to intermediate panel 1308 and, more particularly, are secured on bottom shelf 1344. Windshield 1450, support bracket 1452, and intermediate panel 1308 are coupled together with conventional fasteners. Alternatively, windshield 1450 and support bracket 1452 may be coupled to intermediate panel with quick-release couplings, such that windshield 1450 may be removed from motorcycle 2. As such, it may be appreciated that windshield 1450 may be coupled to, or removed from, motorcycle 2 without tools.

Windshield assembly 52 further includes a mounting bracket 1460 for securing support bracket 1452 to a plate 1498 of support bracket 1306. Mounting bracket 1460 is coupled to plate 1498 with fasteners 1472. Mounting bracket 1460 is coupled to support bracket 1452 at links 1462 on support bracket 1452. Links 1462 align with an aperture

1466 on mounting bracket 1460 and both links 1462 and aperture 1466 are configured to receive a fastener 1468. Fastener 1468 may be secured within aperture 1466 with couplers 1470.

Figure 79:
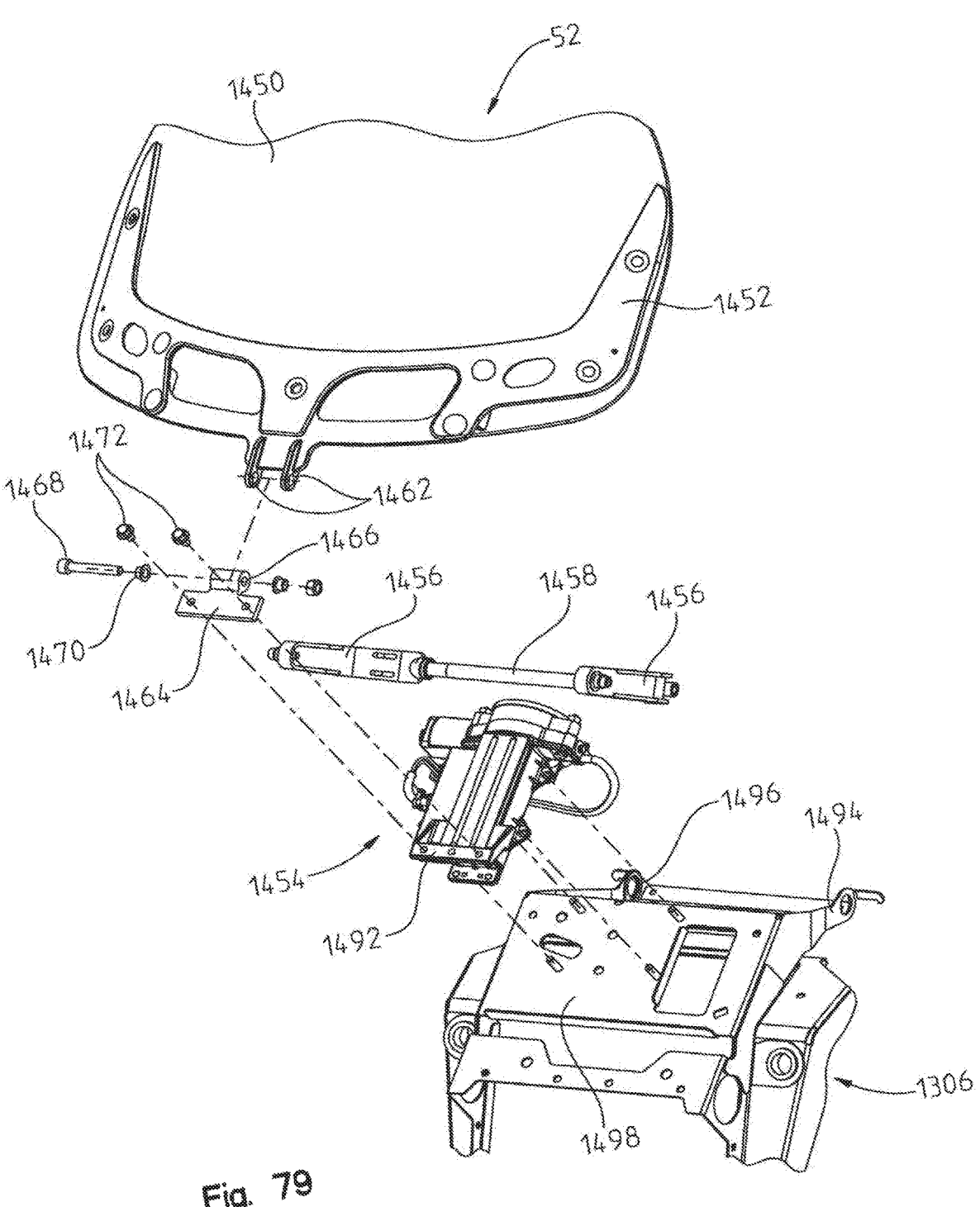
FIG. 79 is a front exploded view of the windshield assembly of FIG. 78.
Figure 80:
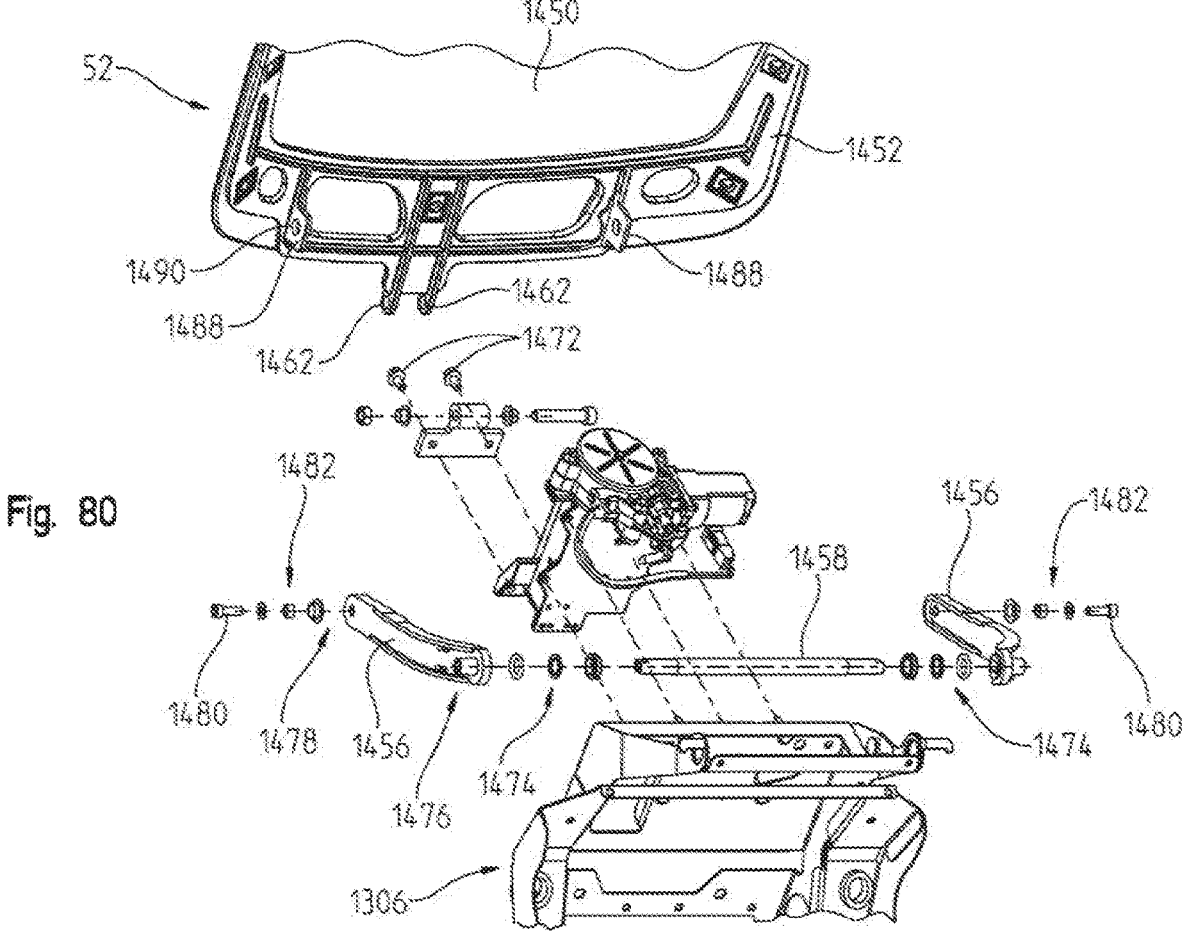
FIG. 80 is a rear exploded view of the windshield assembly of FIG. 78.
Figure 81:
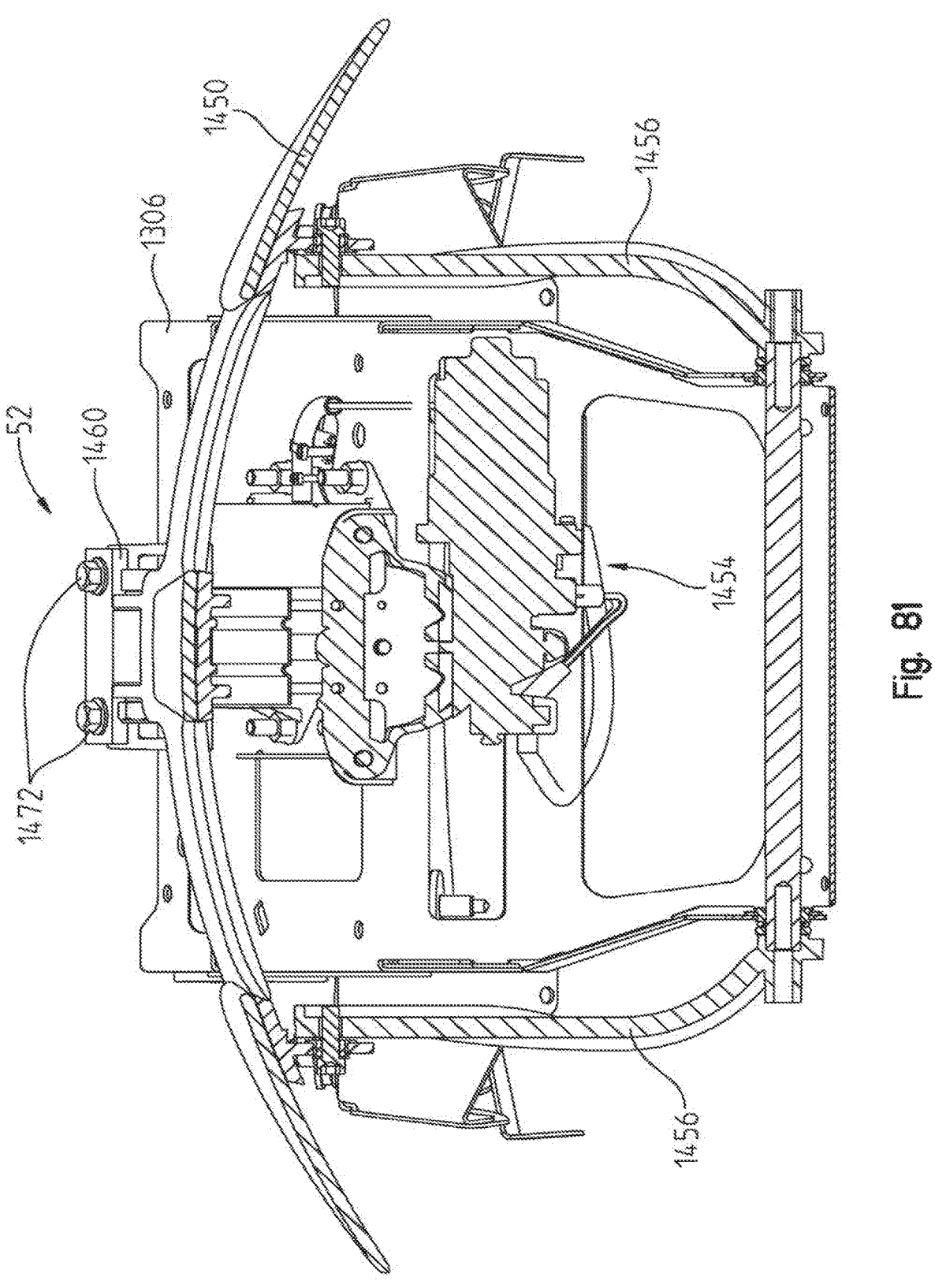
FIG. 81 is a top view of the windshield assembly of FIG. 78.

Referring to FIGS. 79 and 80, windshield assembly 52 further includes a rod 1458 extending between linkage arms 1456. Rod 1458 is received within apertures 1496 of brackets 1494 on support bracket 1306. A plurality of couplers 1474 further secure rod 1458 to brackets 1494. Couplers 1474 may be bearings, washers, isolators, spacers, nuts, or other types of couplers. Couplers 1474 also secure rod 1458 to linkage arms 1456 at a first end 1476. A second end 1478 of linkage arms 1456 are coupled to brackets 1488 on support bracket 1452. Brackets 1488 include apertures 1490 which receive a plurality of couplers 1482 and a fastener 1480 for securing second end 1478 of linkage arms 1456 to support bracket 1452.

Motor assembly 1454 is coupled to plate 1498 of support bracket 1306 with conventional fasteners. Motor assembly 1454 includes a lever arm 1492 coupled to support bracket 1452 with a fastener 1500. In operation, lever arm 1492 is configured to raise and lower windshield 1450 between the up and down positions.

Figure 82:
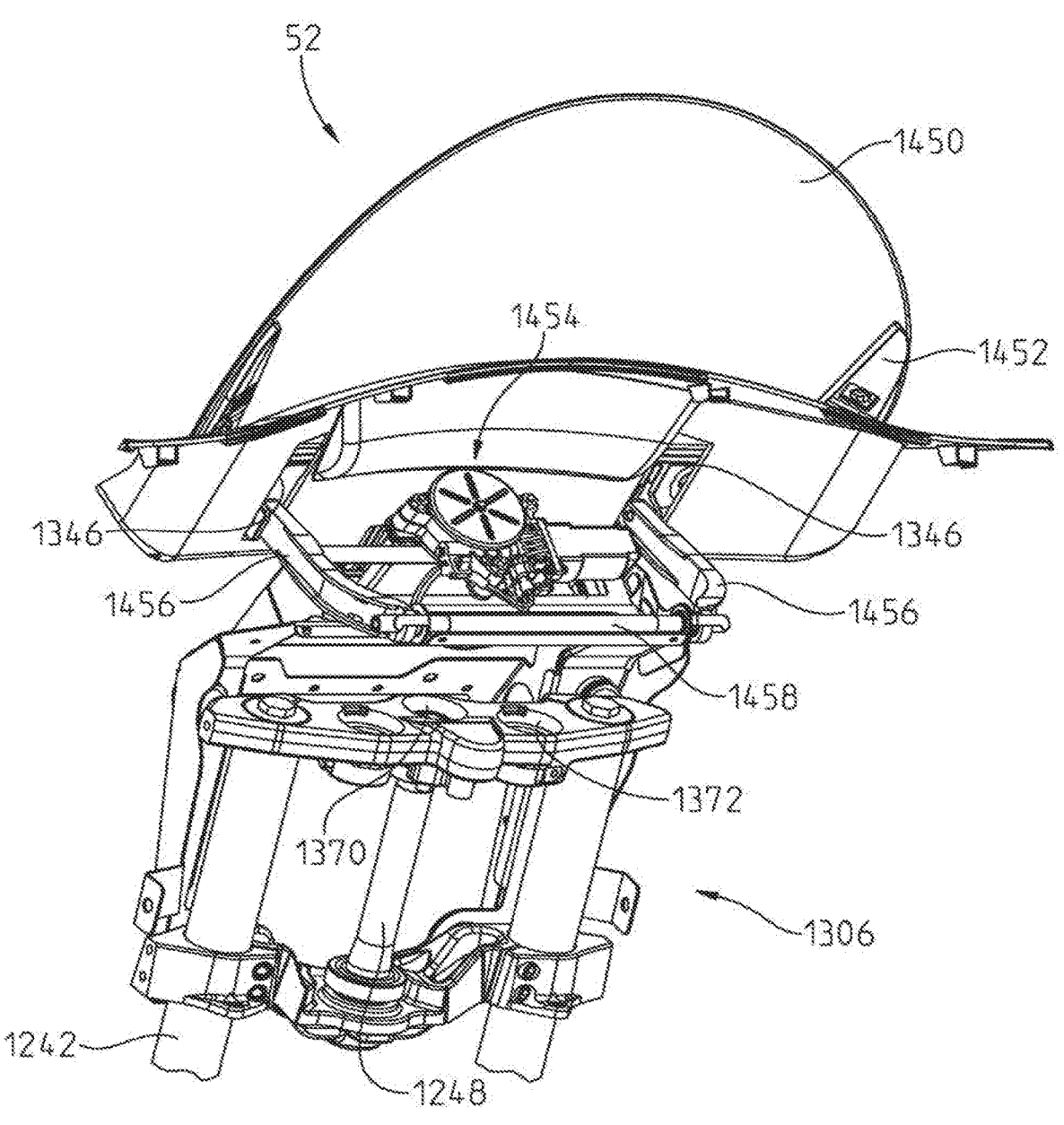
FIG. 82 is a rear perspective view of the windshield assembly in a down position.
Figure 83:
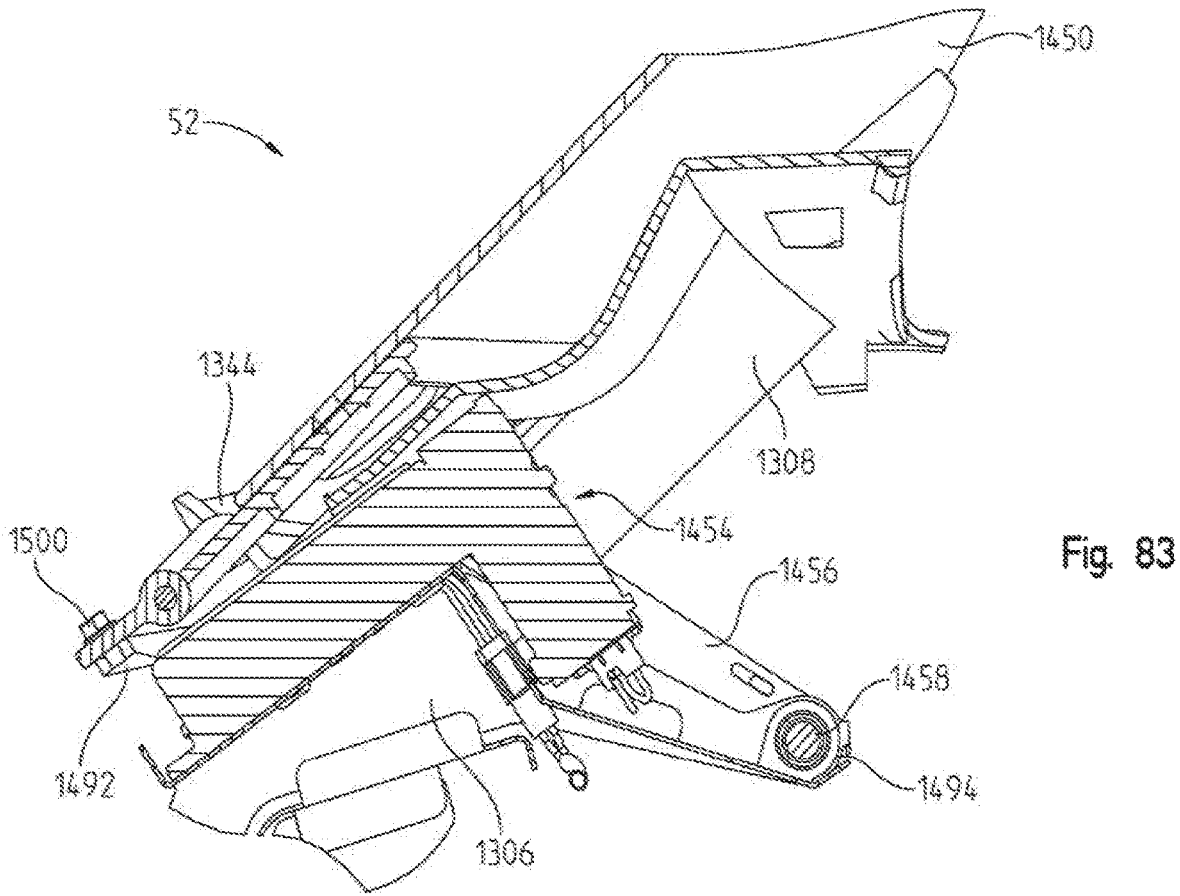
FIG. 83 is a cross-sectional view of the windshield assembly in the down position.
Figure 84:
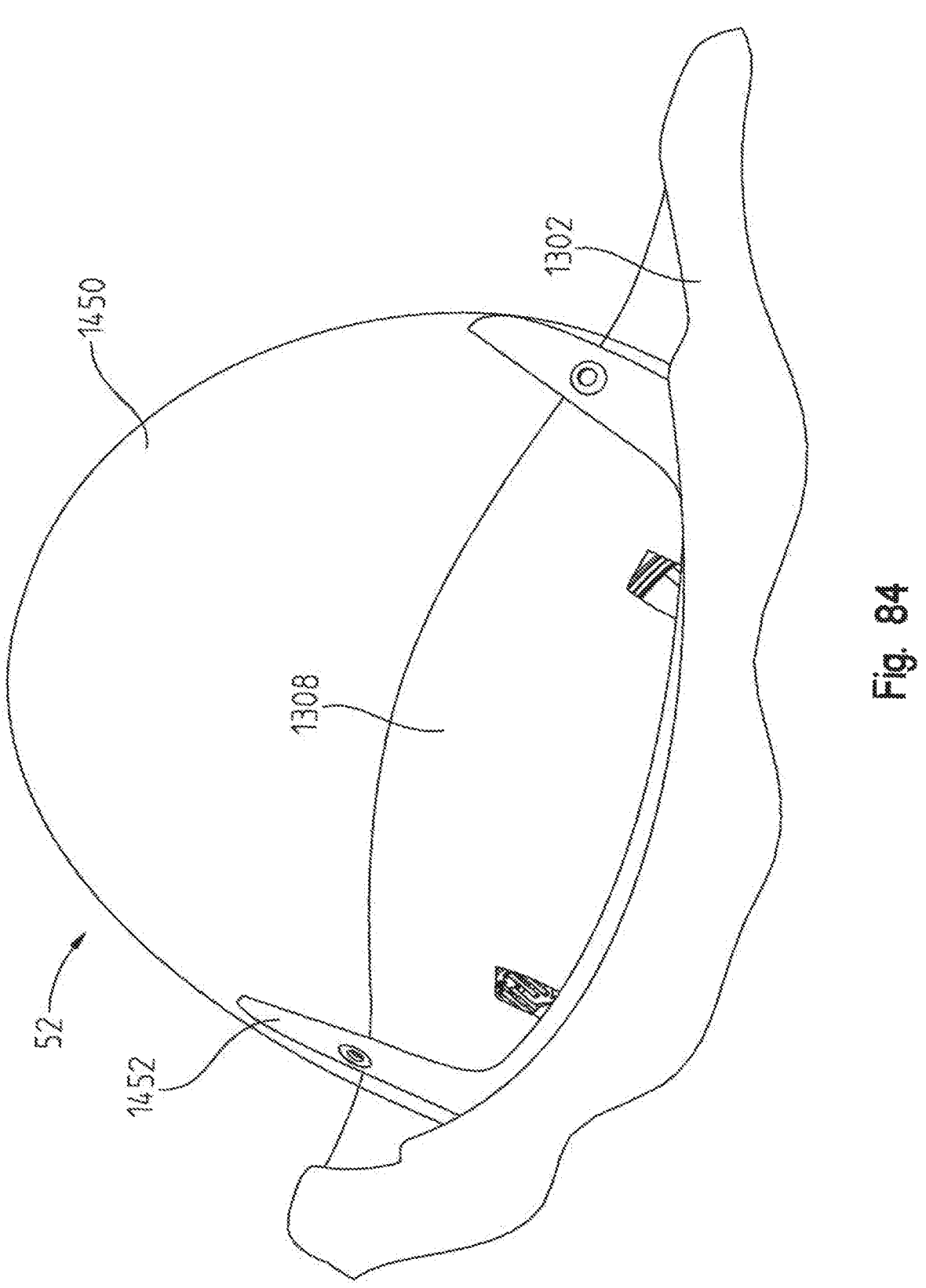
FIG. 84 is a front perspective view of the windshield assembly in the position.

As shown in FIGS. 82-87, in operation, windshield assembly 52 moves relative to intermediate panel 1308 in order to raise and lower windshield 1450 between the up and down positions. As such, the operator is able to control the amount of wind and rain protection provided by windshield assembly 52. When windshield assembly 52 is in the down position, as shown in FIGS. 82-84, second end 1478 of linkage arms 1456 are adjacent the bottom of slots 1346 of intermediate panel 1308. Additionally, linkage arms 1476 are adjacent brackets 1494 of support bracket 1306. Windshield 1450 and support bracket 1452 rest atop bottom shelf 1344 of intermediate panel 1308 when windshield assembly 52 is in the down position. As shown in FIG. 84, when windshield assembly 52 is in the down position, support bracket 1452 is positioned below front fairing 50.

Figure 85:
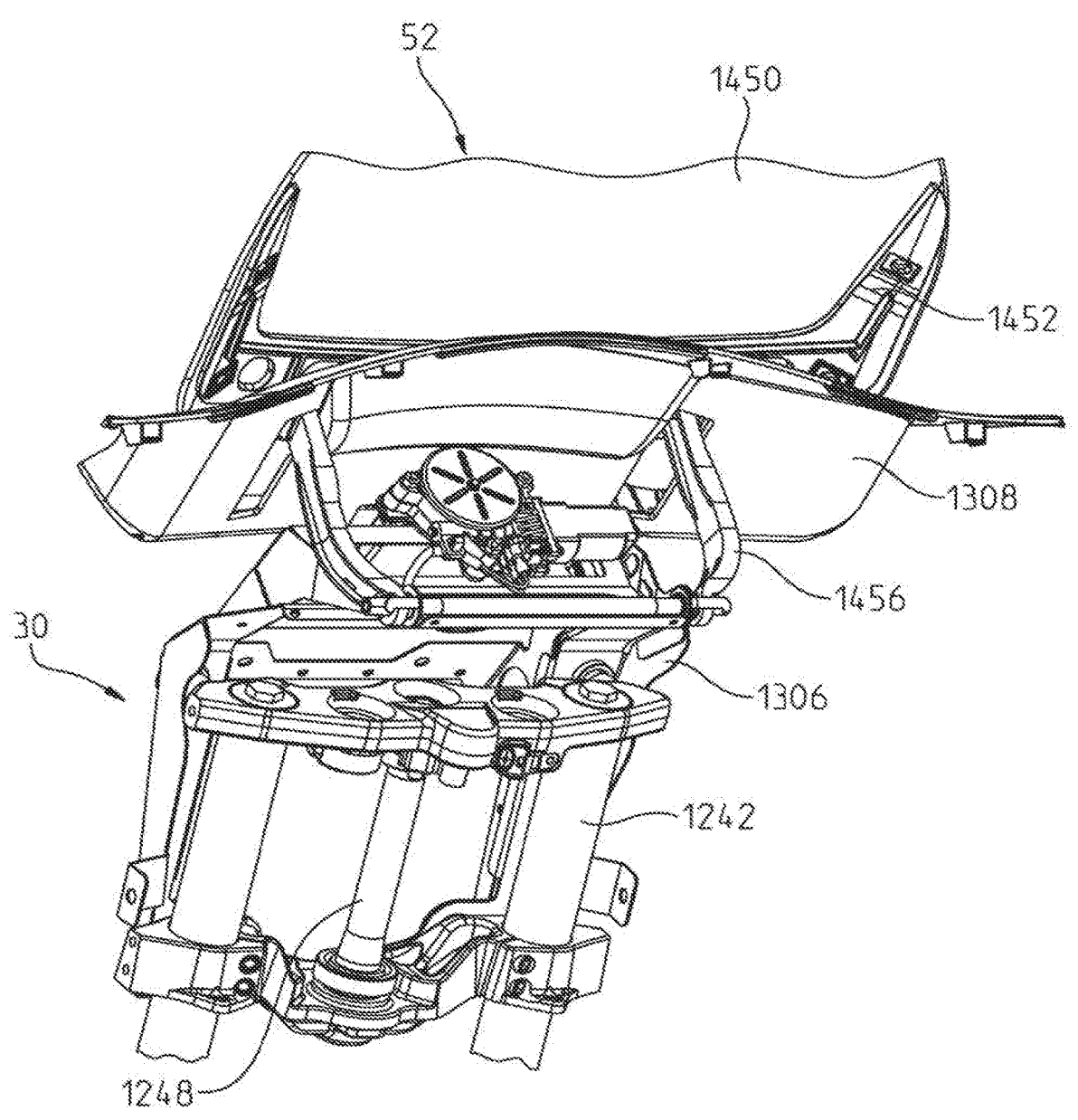
FIG. 85 is a rear perspective view of the windshield assembly in an up position.
Figure 86:
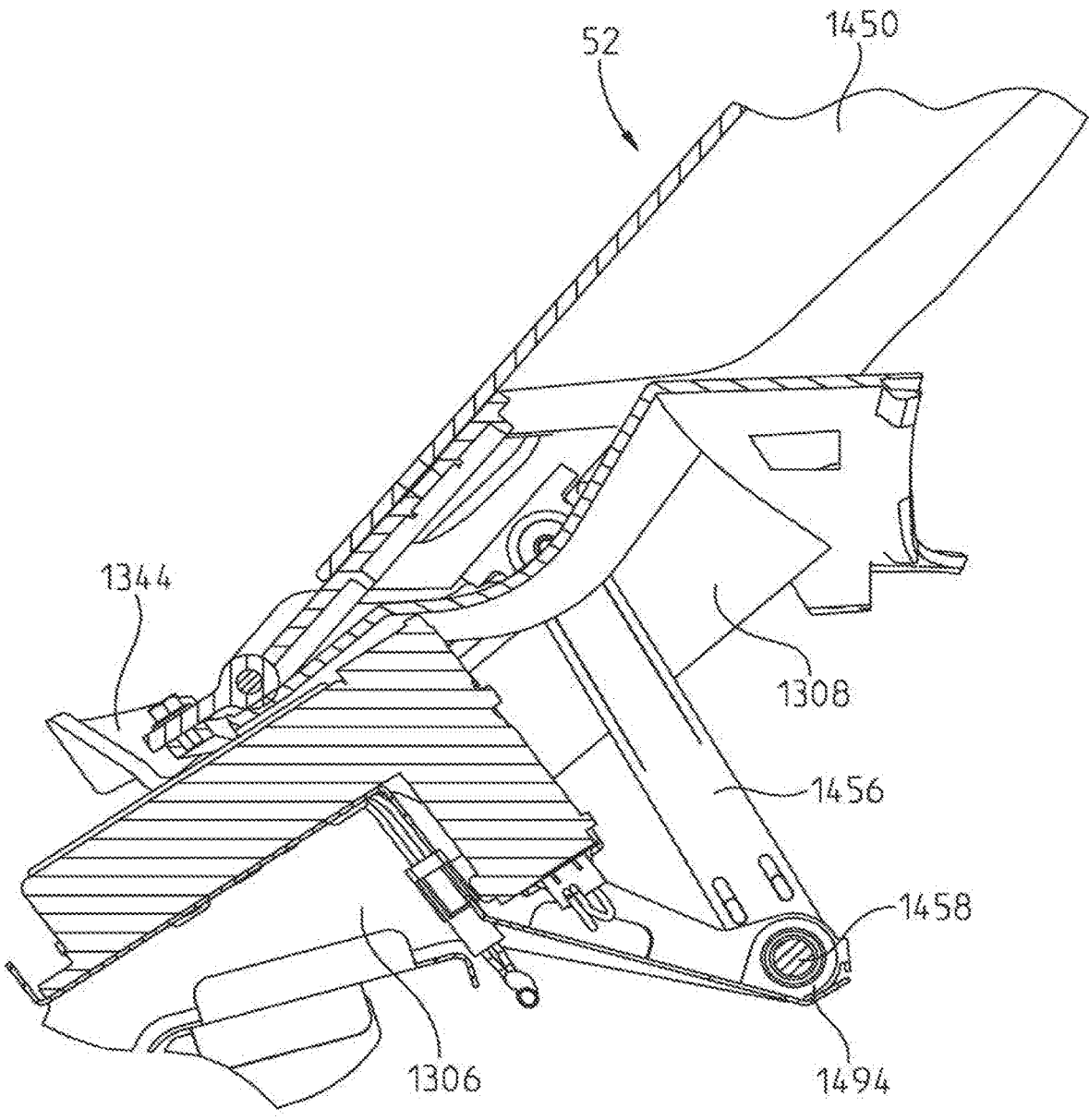
FIG. 86 is a cross-sectional view of the windshield assembly in an up position.
Figure 87:
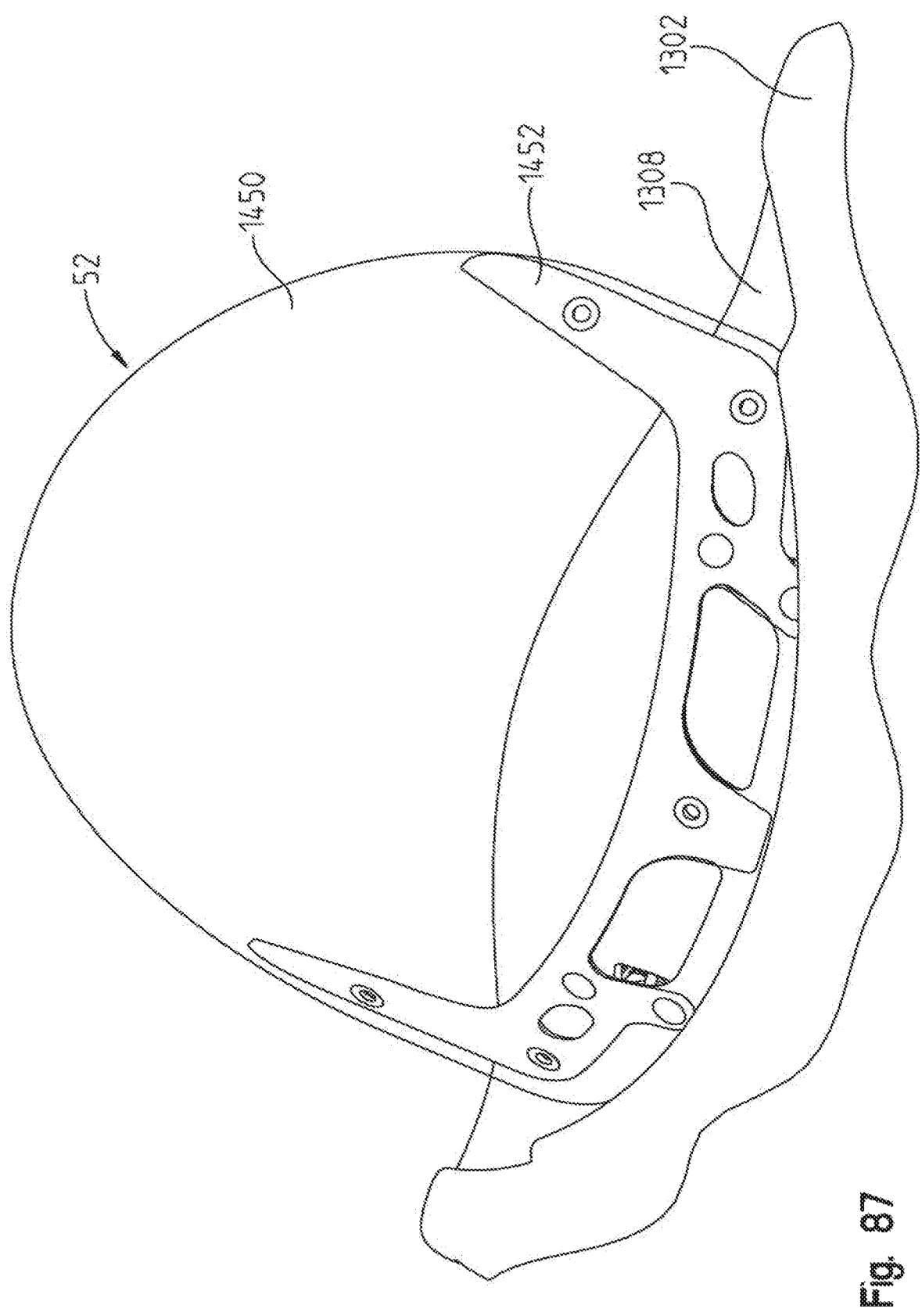
FIG. 87 is a front perspective view of the windshield assembly in the up position.

However, as shown in FIGS. 85-87, when motor assembly 1454 is actuated by either the operator or electrical system 1800, a threaded post within motor assembly 1454 moves lever arm 1492 upwardly to raise windshield 1450 and support bracket 1452. To further move windshield assembly 52 to the up position, linkage arms 1456 slide within slots 1346 of intermediate panel 1308 until second end 1478 is adjacent the upper end of slots 1346. As such, support bracket 1452 is positioned generally above front fairing 50.

Windshield assembly 52 may be coupled to support bracket 1306 and intermediate panel 1308 with vibration isolators. For example, grommets or other generally polymeric members may be included to prevent vibration from motorcycle 2 being transmitted to windshield assembly 52.

An alternative embodiment motorcycle 2' is shown in FIGS. 88-97. The alternative embodiment motorcycle 2' may include many similar to motorcycle 2, as detailed above, wherein like reference numbers identify similar components. Motorcycle 2' is a "cruiser" embodiment of motorcycle 2. Motorcycle 2' includes a frame 4', a front wheel 6', a rear wheel 8', power train 10, seat 26, a handlebar assembly 28', a fuel tank 35', front fender 1180, rear fender 1000, and saddle bags 1050 and 1052. Power train 10 is operably coupled to fuel tank 35' to operate motorcycle 2'. Fuel tank 35' may be configured to support a plurality of gauges or display screens 1394' and/or speed controls 40'.

Figure 88:
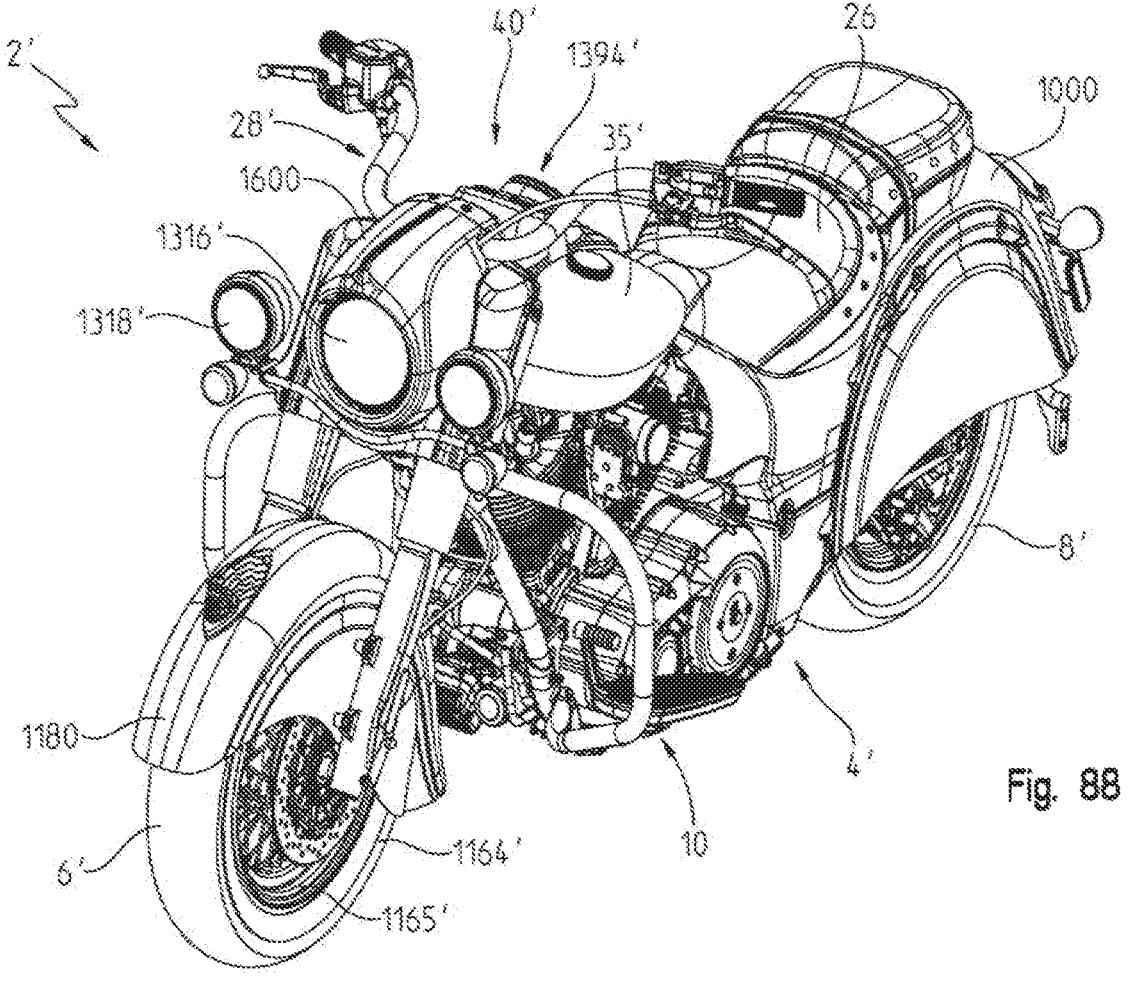
FIG. 88 is a front perspective view of an alternative embodiment of the illustrative vehicle.
Figure 89:
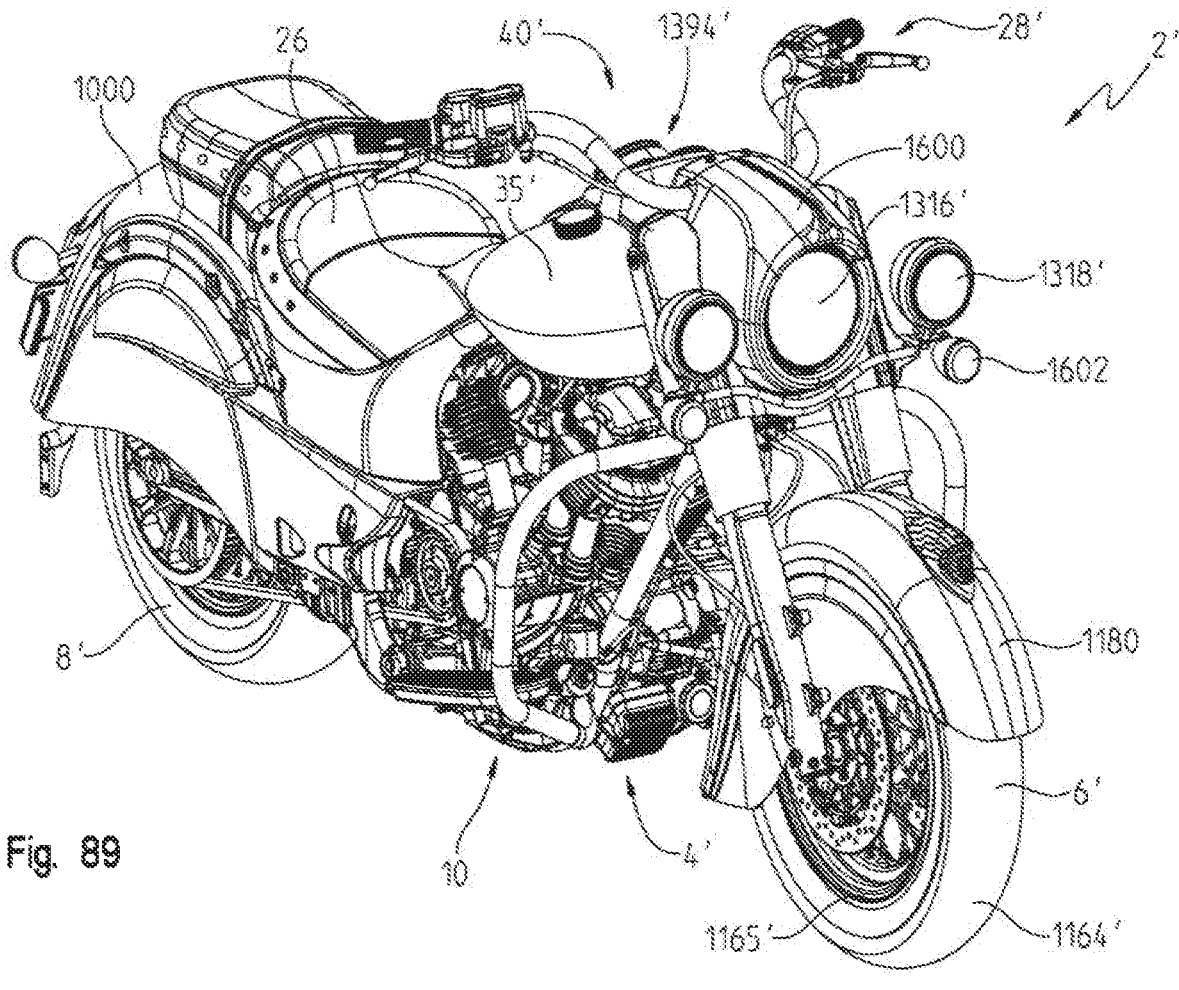
FIG. 89 is a front perspective view of an alternative embodiment of the illustrative vehicle.
Figure 90:
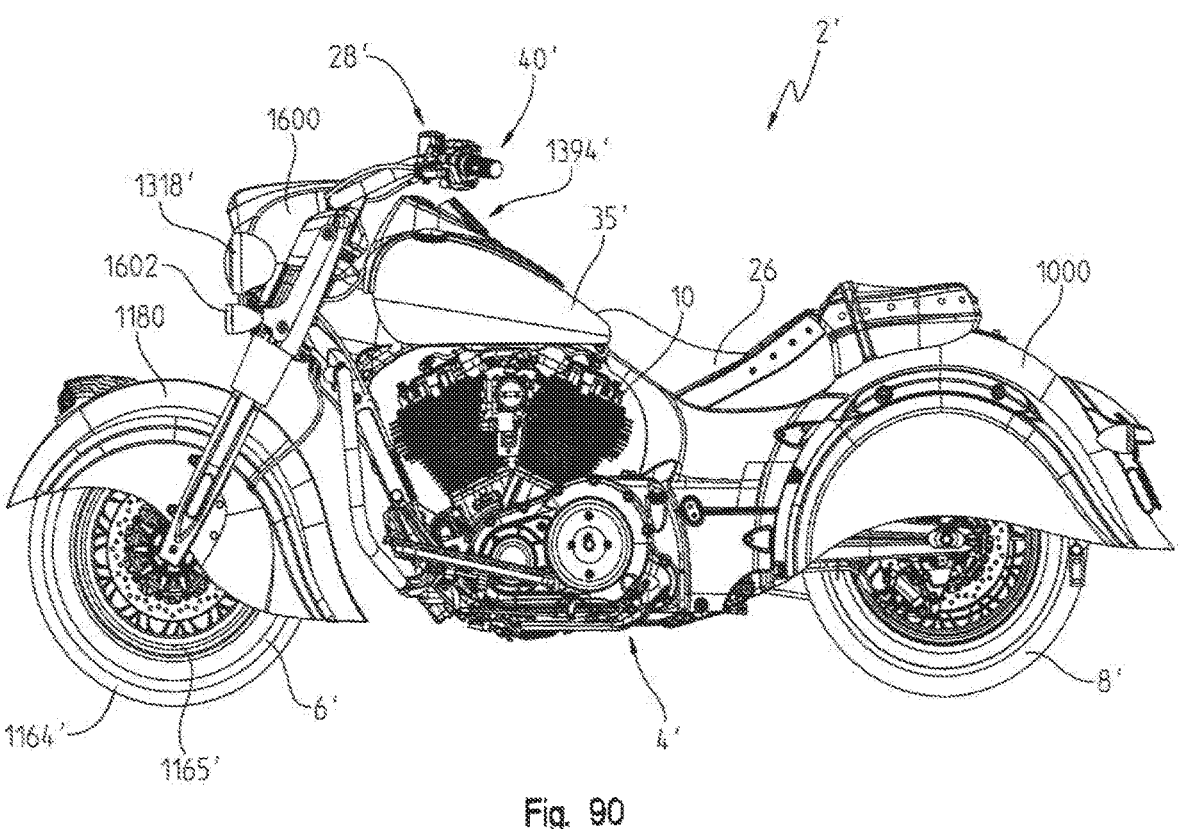
FIG. 90 is a side view of the vehicle of FIG. 89.
Figure 91:
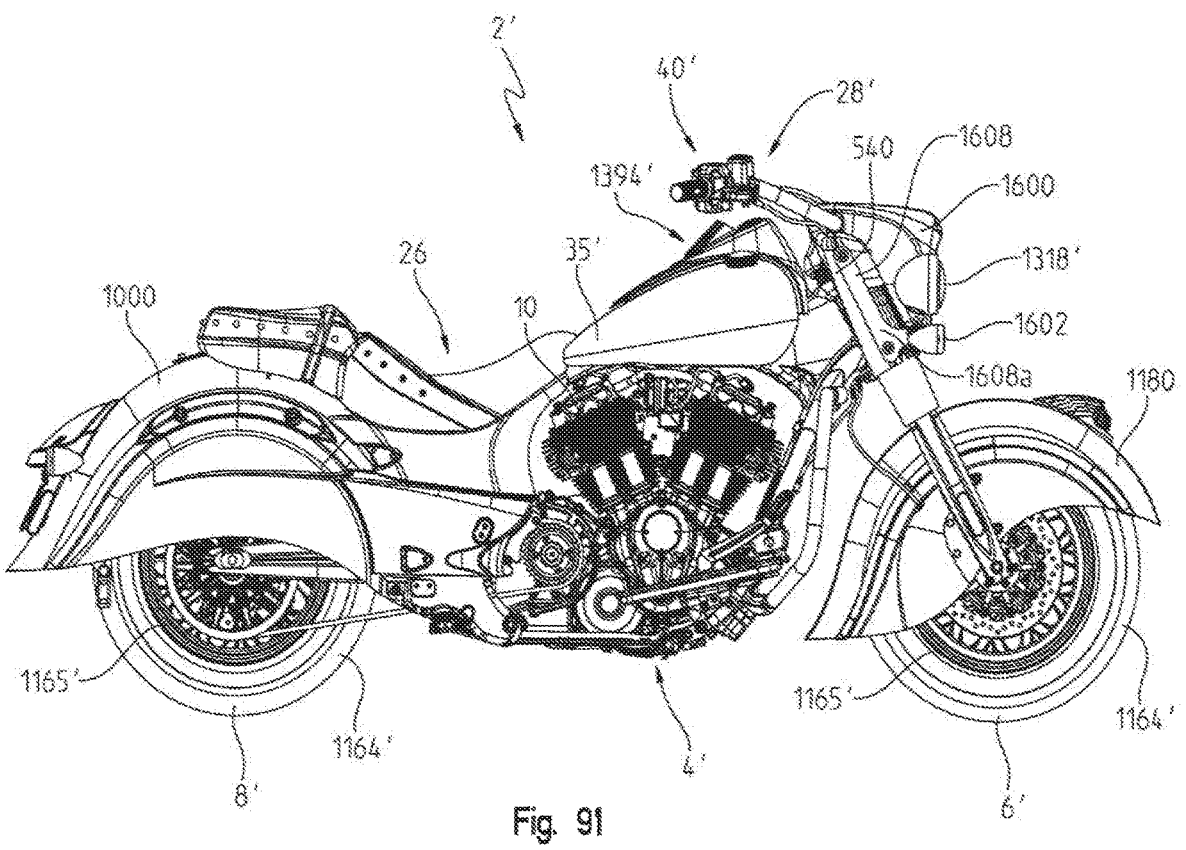
FIG. 91 is a further side of view of the vehicle of FIG. 90.
Figure 92:
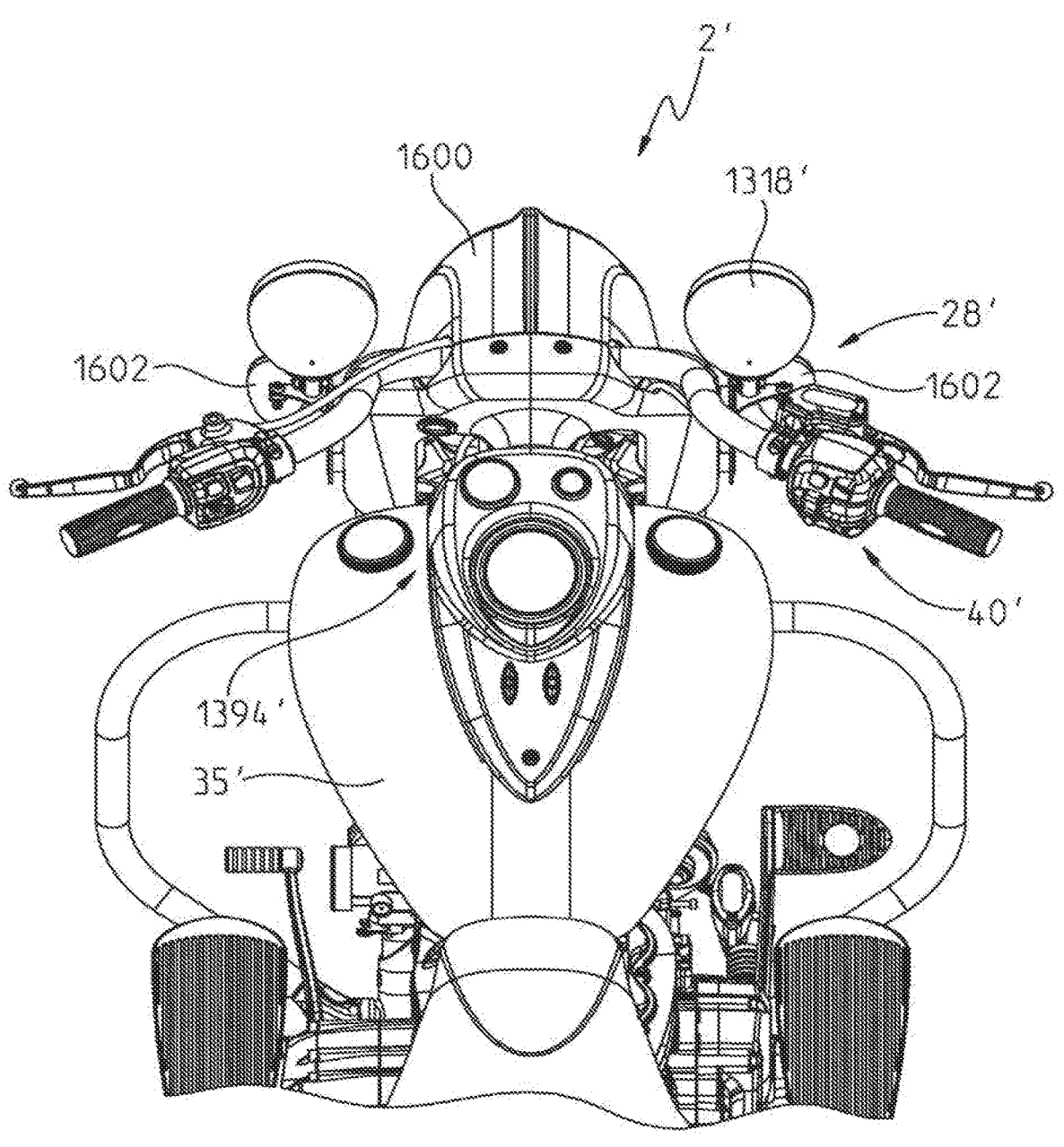
FIG. 92 is a top view of the vehicle on FIG. 91.
Figure 93:
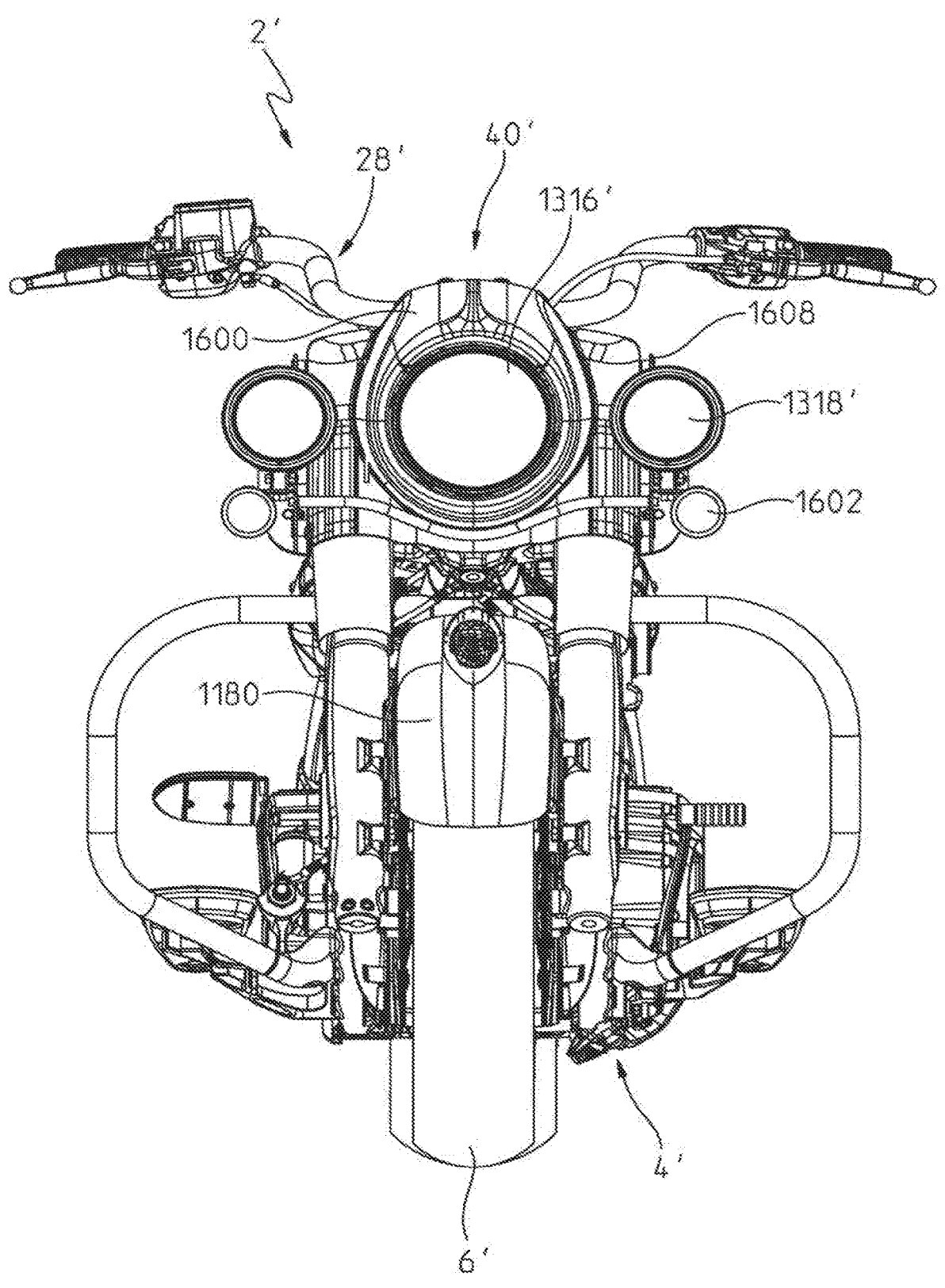
FIG. 93 is a front view of the vehicle of FIG. 92.
Figure 94:
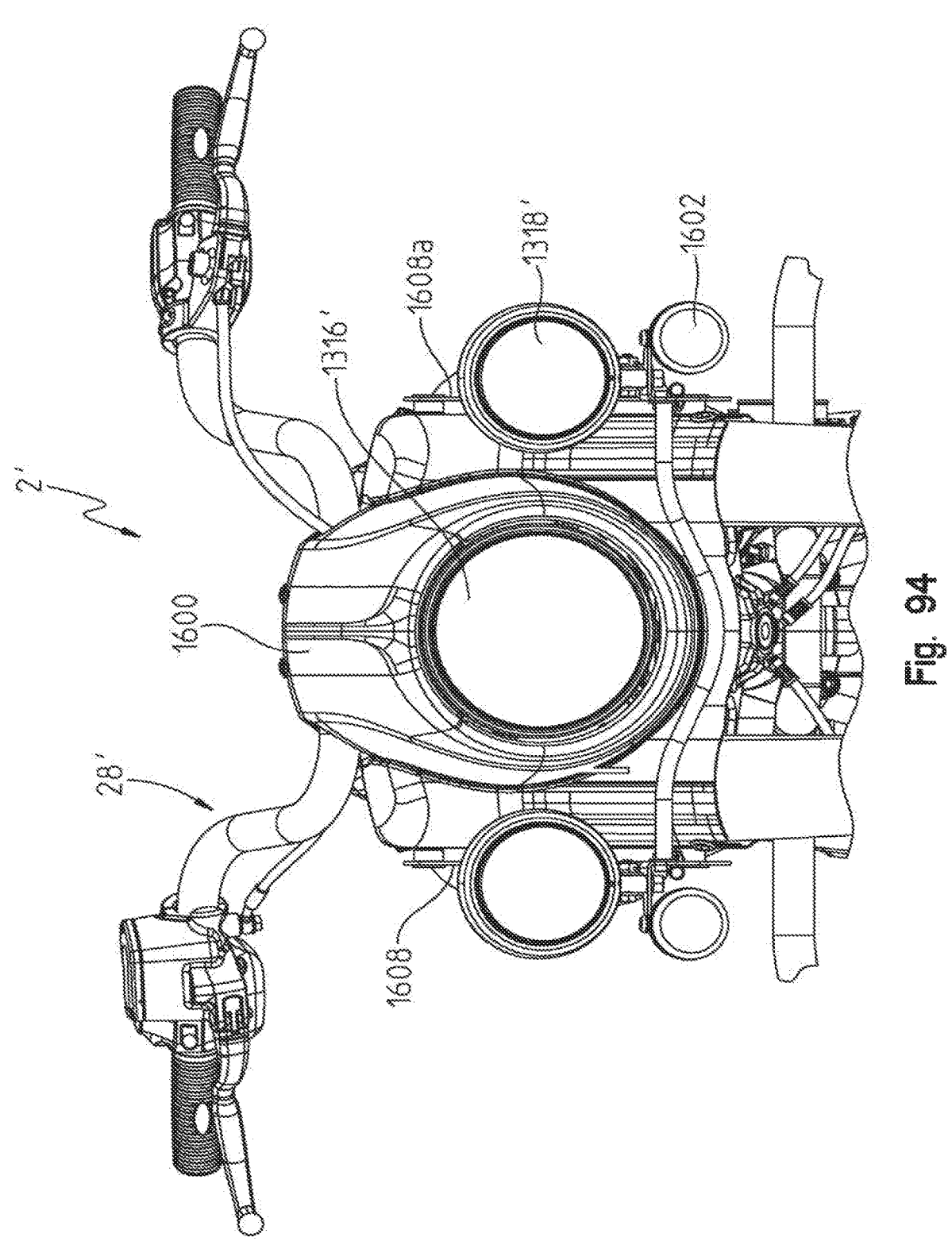
FIG. 94 is a further front view of the vehicle of FIG. 93.
Figure 95:
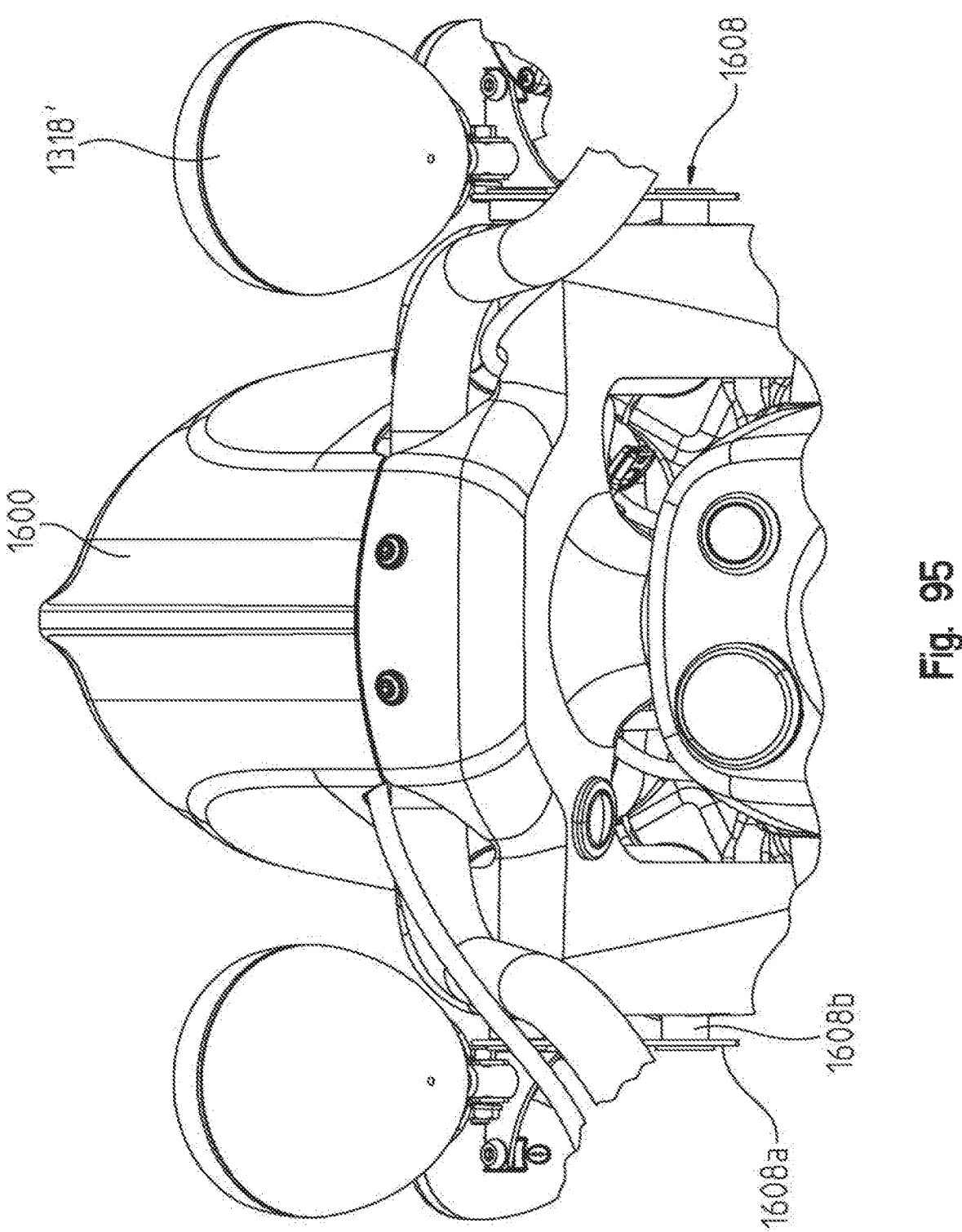
FIG. 95 is a further top view of a front end of the vehicle of FIG. 92.
Figure 96:
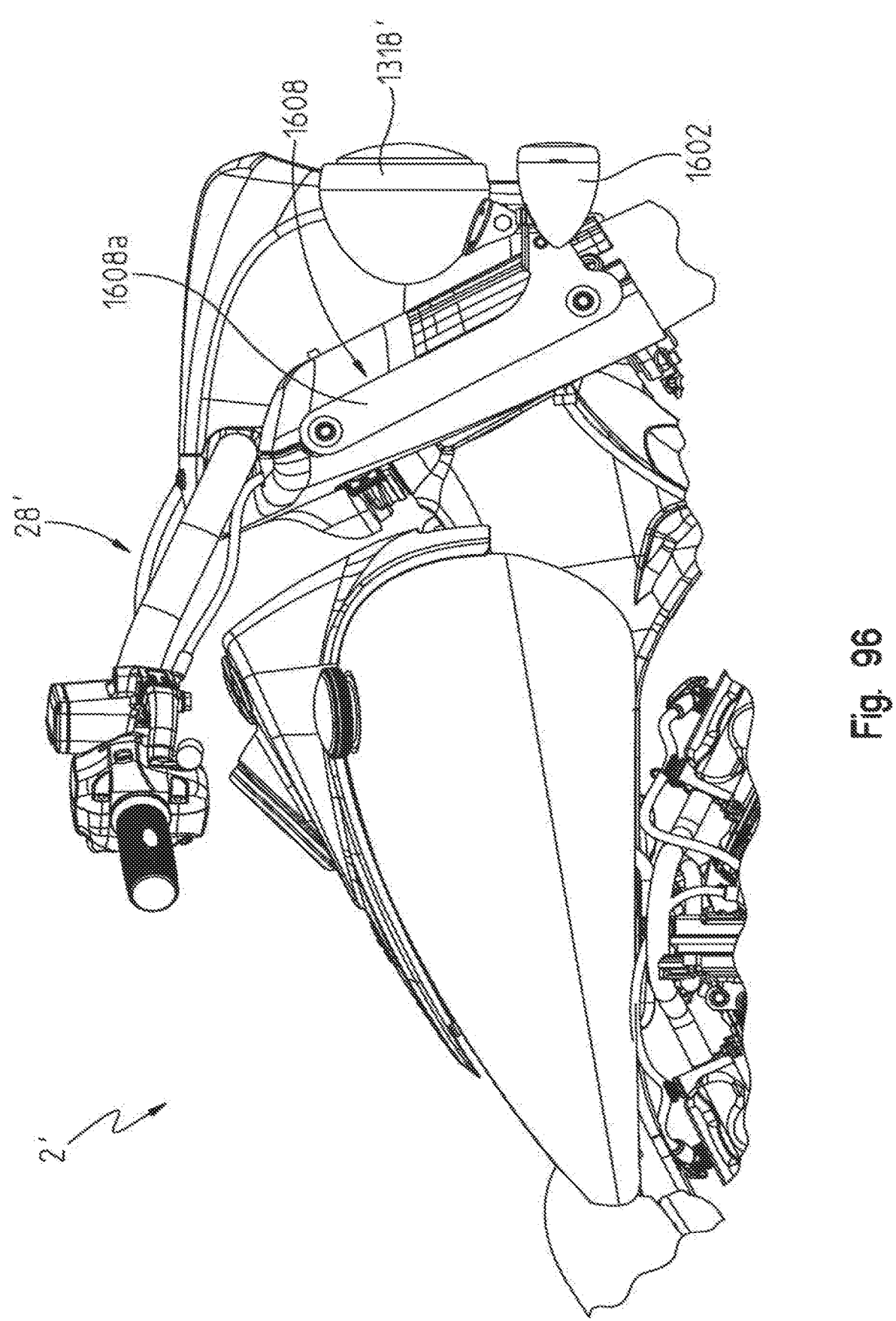
FIG. 96 is a further side view of the front end of the vehicle of FIG. 91.
Figure 97:
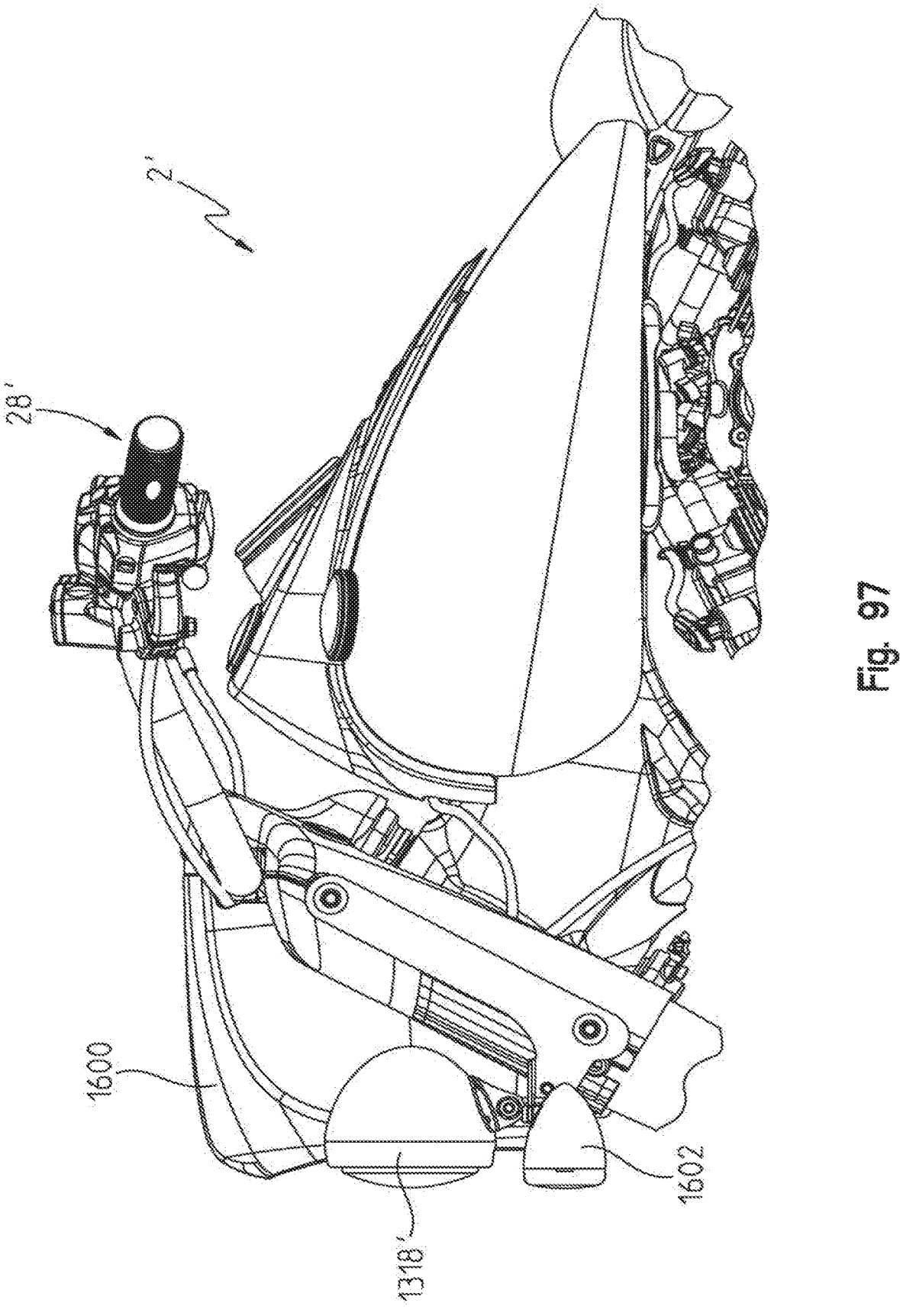
FIG. 97 is a further side view of the front end of the vehicle of FIG. 96.

Front and rear wheels 6' and 8' include a rim 1165' and a tire 1164'. As shown in FIGS. 88, 90, and 91, rims 1165' may include a plurality of spokes. Tire 1164' extends around rim 1165'. Front fender 1180 is positioned generally above and around a top portion of front wheel 6' and, similarly, rear fender 1000 is positioned generally above and around a top portion of rear wheel 8'.

Saddlebags 1050, 1052 extend laterally outward from rear fender 1000. Saddlebags 1050, 1052 may be comprised of a rigid material or a flexible material. For example, illustrative saddlebags 1050, 1052 of motorcycle 2' may be comprised of a leather material.

As shown, handlebars 28' are operably coupled to front wheel 6' and extend upwardly from a bezel 1600. Handlebars 28' may be angled upwardly relative to handlebars 28 of motorcycle 2. Because handlebars 28' are angled upwardly, the head tube of mainframe portion 540' also is angled relative to head tube 552 of mainframe tube 540. More particularly, the rake angle of the head tube of mainframe portion 540' is not the same as the rake angle of head tube 552 of motorcycle 2. Additionally, the steering shaft of motorcycle 2' is angled relative to steering shaft 1248 of motorcycle 2 due to the different rake angle of the head tube of mainframe portion 540'. Due to the configuration of handlebars 28', the triple clamp assembly of motorcycle 2' may be oriented and arranged differently from triple clamp assembly 30 of motorcycle 2.

Referring to FIGS. 91, 93, 94, 96, and 97, motorcycle 2' includes bezel 1600 rather than fairing 50. Bezel 1600 extends around a headlight unit 1316' and further supports secondary lighting units 1318'. More particularly, bezel 1600 support a bracket 1608 which includes support arms 1608a and a lower brace member 1608b. Brace member 1608b extends between support arms 1608a. Bracket 1608 extends outwardly from bezel 1600 and headlight unit 1316' and, as such, secondary lighting units 1318' extend outwardly from headlight unit 1316' and bezel 1600. Bracket 1608 extends generally around bezel 1600 and further supports lower lighting units 1602. Support arms 1608a are coupled to secondary lighting units 1318'. Secondary lighting units 1318' may support lower lighting units 1602. The wires, lines, and cables for lighting units 1316', 1318', and 1602 may be concealed within bezel 1600.

Figure 98:
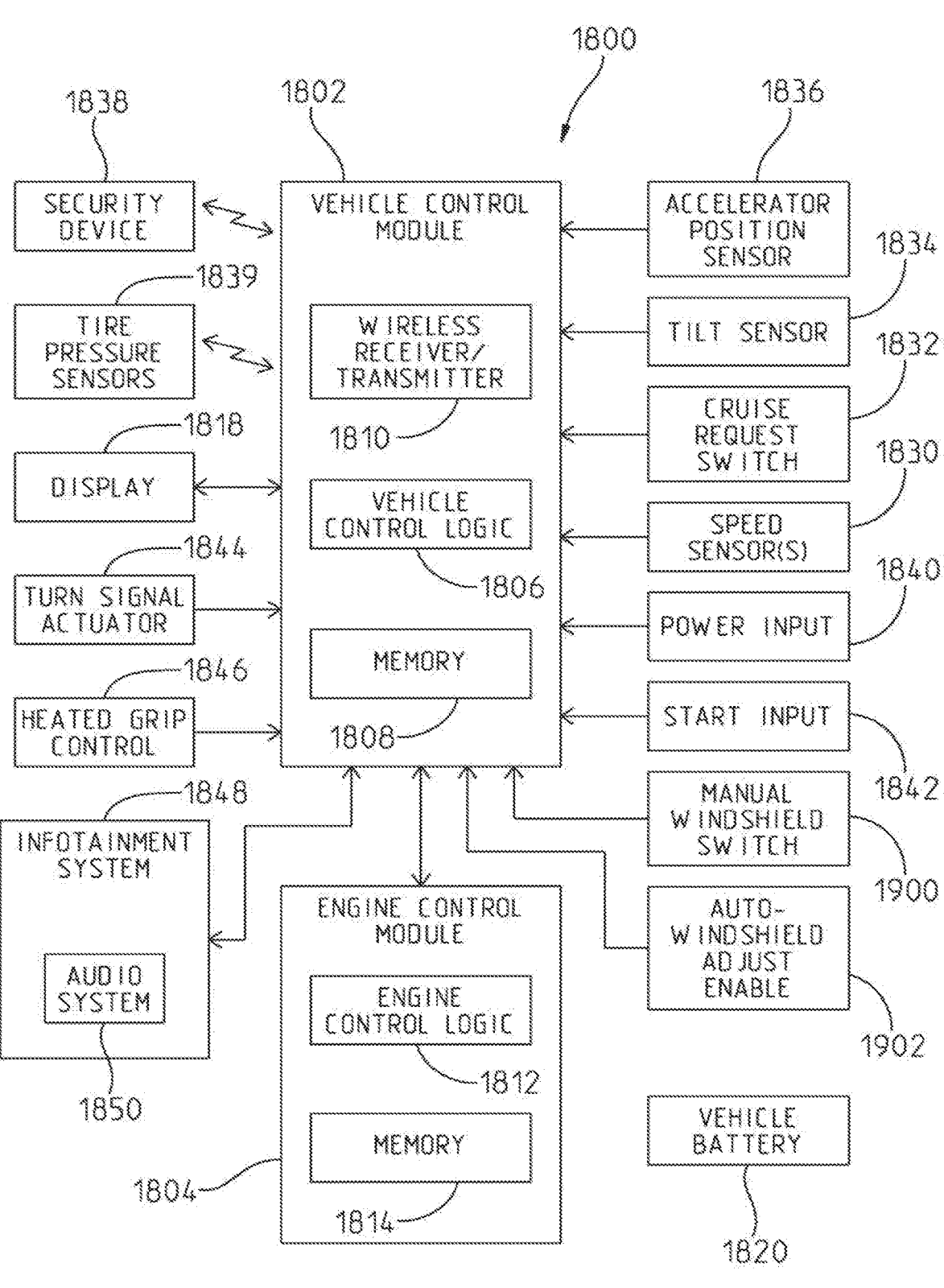
FIG. 98 is a block diagram illustrating an exemplary electrical system of the illustrative vehicle.

Referring to FIG. 98, an exemplary electrical system 1800 of motorcycle 2 is illustrated. Electrical system 1800 illustratively includes a vehicle control module (VCM) 1802 in communication with an engine control module (ECM) 1804. VCM 1802 and ECM 1804 each include one or more processors that execute software and/or firmware code stored at the respective internal or external memory 1808, 1814 to perform the functions described herein. In particular, VCM 1802 includes vehicle control logic 1806 that controls various electrical components and subsystems of motorcycle 2, and ECM 1804 includes engine control logic 1812 that controls the operation of engine 12. VCM 1802 and/or ECM 1804 may alternatively include one or more application-specific integrated circuits (ASICs), field-programmable gate arrays (FPGAs), digital signal processors (DSPs), hard-wired logic, or combinations thereof. The functionality of VCM 1802 and ECM 1804 may alternatively be integrated into a single control module that provides both vehicle and engine control. Electrical system 1800 further includes at least one vehicle battery 1820 (e.g., 12 VDC) for providing power to the electrical components of motorcycle 2, including VCM 1802, ECM 1804, sensors, switches, lighting, ignition, accessory outlets, and other powered components. In one embodiment, VCM 1802 communicates over a controller area network (CAN) bus network with ECM 1804 and with various sensors and components of electrical system 1800, although another suitable communication network or hard-wired communication may be provided.

Electrical system 1800 includes several sensors in communication with VCM 1802. One or more speed sensors 1830 provide speed feedback to VCM 1802, such as engine speed, vehicle speed, and/or other driveline speeds. A tilt sensor 1834, such as an accelerometer, provides a signal to VCM 1802 indicative of the tilt or lean of the motorcycle 2. Tilt sensor 1834 is also operative to detect movement of motorcycle 2 based on the detected acceleration. An accelerator position sensor 1836 (e.g., potentiometer) detects the position of the vehicle accelerator, e.g., the rotatable handgrip, and VCM 1802 or ECM 1804 determines the throttle demand based on the detected accelerator position for controlling the engine throttle 304. A cruise request switch 1832 in communication with VCM 1802 is actuated by an operator to set and implement the cruise speed. In the illustrated embodiment, the operator engages a power input 1840 to power up electrical system 1800 of motorcycle 2 and a start input 1842 to start engine 12 of motorcycle 2, as described below. The sensors and other electrical devices illustratively routed to VCM 1802 alternatively may be routed to ECM 1804, such as the accelerator position sensor 1836 and speeds sensors 1830, for example, and VCM 1802 may obtain the corresponding sensor data from ECM 1804. In one embodiment, wiring to the sensors and electrical devices mounted on handlebars 28 is routed through the internal opening 1416 in handlebars 28 (see FIG. 75) from the VCM 1802 to thereby hide and protect the wiring.

VCM 1802 illustratively further includes a wireless receiver/transmitter 1810 for receiving and transmitting wireless communications to/from one or more vehicle sensors. In the illustrated embodiment, receiver/transmitter 1810 is a radio frequency (RF) transceiver 1810 operative to receive RF communications from a security device 1838 and tire pressure sensors 1839. Each tire pressure sensor 1839 monitors the tire pressure of a corresponding wheel 6, 8 and provides the pressure data to VCM 1802, thereby providing real-time monitoring of the tire pressure. In one embodiment, tire pressure sensors 1839 send tire pressure data to VCM 1802 at regular time intervals (e.g., every ten seconds) and upon a detected change in the tire pressure exceeding a threshold rate of change. Upon detection of the tire pressure decreasing to a low threshold value, VCM 1802 issues a warning to the operator by sending a warning message to display 1818 and/or by issuing an audio warning.

Figure 74:
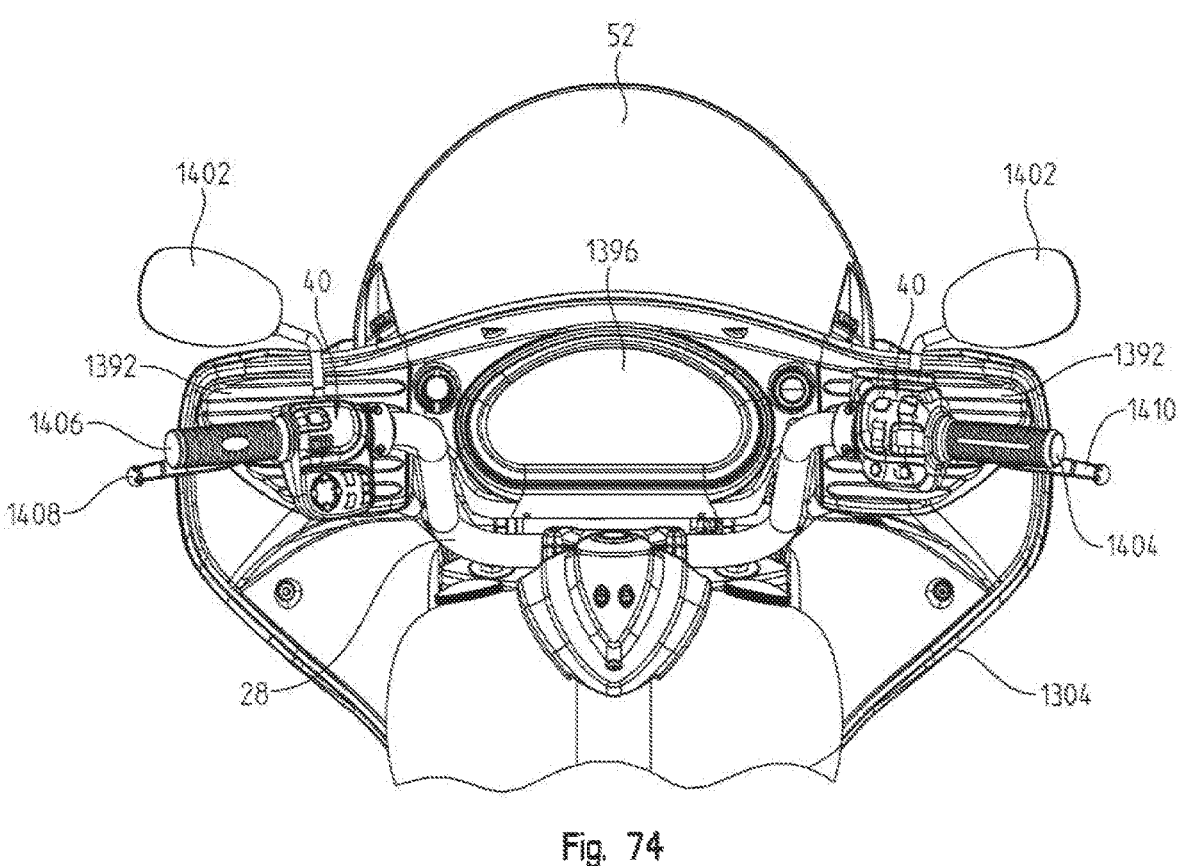
FIG. 74 is a further rear perspective view of the front fairing and the windshield assembly of FIG. 72.

Motorcycle 2 includes heated handle grips 1412 (FIG. 75) coupled to right and left side handlebars 1404, 1406 (FIG. 74). In one embodiment, a heating element positioned within each handlebar 1404, 1406 is controlled by VCM 1802 based on control input 1846 to heat the handlebar grips 1412. In one embodiment, heated grip control input 1846 allows an operator to select between a plurality of heat levels, such as up to ten heat levels having varying intensity, for example, for heating the handle grips 1412. Control input 1846 may include a multi-position switch that allows an operator to increase the heat level/intensity, to decrease the heat level/intensity, and to turn the heat on/off. In one embodiment, a heating element is positioned within or below seat 26 of motorcycle 2, and VCM 1802 controls the heating element to heat seat 26. In one embodiment, heat to seat 26 is automatically activated by VCM 1802 at a substantially constant intensity level upon engine 12 running, although the heat intensity of the heated seat 26 may also be selectable by an operator with a control input. In one embodiment, heating the grips 1412 and seat 26 is enabled by VCM 1802 only if engine 12 is running.

ECM 1804 electronically controls the throttle 304 of engine 12 based on at least the detected vehicle speed and throttle demand detected with accelerator position sensor 1836. The electronic throttle control provided with ECM 1804 is further described in U.S. patent application Ser. No. 13/152,981, filed on Jun. 3, 2011 and entitled "Electronic Throttle Control," the disclosure of which is incorporated herein by reference. VCM 1802 and/or ECM 1804 are operative to provide cruise control for motorcycle 2 such that motorcycle 2 operates at a substantially constant vehicle speed. Cruise request switch 1832 coupled to and in communication with VCM 1802 is actuated or engaged by an operator to initiate the cruise control function of motorcycle 2. Cruise request switch 1832, which includes a pushbutton, lever, or any other suitable input device, may be provided with the operator controls on the handlebar 28 of motorcycle 2. Upon detection of cruise request switch 1832 being engaged, VCM 1802 instructs ECM 1804 to maintain a constant vehicle speed using closed loop control based on the detected vehicle speed.

In the illustrated embodiment, security device 1838 of FIG. 98 is a key fob or other hardware security token device carried by an operator that enables operation of motorcycle 2 and of vehicle functions provided with VCM 1802 and ECM 1804. VCM 1802 is operative to detect security device 1838 within a particular range of motorcycle 2, such as within several feet or another suitable distance. Security device 1838 includes an identifier, such as an identification number or code stored in a memory of device 1838, for example that is detected by VCM 1802. VCM 1802 compares the identifier of security device 1838 to an identifier stored in memory 1808 to validate security device 1838 for allowing motorcycle operation. Upon confirmation that security device 1838 is valid, VCM 1802 is programmed to enable one or more vehicle functions. When security device 1838 is out of range of motorcycle 2, VCM 1802 serves to immobilize motorcycle 2.

In one embodiment, VCM 1802 and ECM 1804 are both locked out when security device 1838 is not present, i.e., when security device 1838 is not located within the detectable range of motorcycle 2 or has an invalid identifier. When power button 1840 or start button 1842 is pressed by an operator, VCM 1802 checks for the presence of security device 1838. In one embodiment, VCM 1802 checks for security device 1838 by transmitting an RF signal to activate the security device 1838 and receiving a return signal from device 1838 with the associated identifier. With security device 1838 within range, VCM 1802 allows motorcycle 2 to be powered on and the engine 12 to be started by the operator. In particular, upon engagement of power button 1840 by the operator, VCM 1802 determines whether security device 1838 is present. If security device 1838 is present, VCM 1802 is unlocked and electrical system 1800 is powered on; if security device 1838 is not present, VCM 1802 and ECM 1804 remain locked out and motorcycle 2 is not powered on. When motorcycle 2 is powered on but engine 12 is not running, an operator engages start button 1842 to start engine 12. VCM 1802 instructs ECM 1804 to start engine 12 upon actuation of start button 1842 when security device 1838 is present. When motorcycle 2 is not moving (zero speed) or if engine 12 is off, actuation of power button 1840 by the operator causes VCM 1802 to power down the electrical system 1800 and to shut down engine 12 if engine 12 is running. Motorcycle 2 may further include a run/stop switch that is used to kill the engine 12 upon an operator moving the switch to the "stop" position.

When both electrical system 1800 and engine 12 are off, VCM 1802 also provides a one-touch start feature. With this feature, when start button 1842 is held longer than a threshold time (e.g., two seconds) and security device 1838 is present, VCM 1802 powers on both electrical system 1800 and engine 12. As such, the operator may choose to start engine 12 immediately with this feature rather than use the two-step process described above of first powering on electrical system 1800 with power button 1840 and then starting engine 12 with start button 1842.

VCM 1802 monitors the presence of security device 1838 when motorcycle 2 is powered on. Upon VCM 1802 detecting that security device 1838 is no longer present and motorcycle 2 is powered on but not moving, VCM 1802 shuts down engine 12 and/or powers down the electrical system 1800 after a predetermined delay, such as about 20 seconds or another suitable delay. In one embodiment, VCM 1802 shuts down engine 12 and electrical system 1800 after the predetermined delay only when motorcycle 2 is not in gear, i.e., when transmission 14 is in neutral gear or park. In one embodiment, VCM 1802 shuts down engine 12 after a first predetermined delay and powers down electrical system 1800 after a second predetermined delay, and the first predetermined delay is shorter than the second predetermined delay. Upon automatically shutting down electrical system 1800 and engine 12 when security device 1838 is not present for the predetermined time (and when motorcycle 2 is not moving and/or is not in gear), VCM 1802 and ECM 1804 are locked out and an operator must initiate one of the start sequences described herein to restart motorcycle 2.

In one embodiment, an operator may unlock the VCM 1802 and/or ECM 1804 with or without the security device 1838 by inputting a personal identification number (PIN) to VCM 1802. Upon detection of the PIN entered by the user, VCM 1802 enables electrical operation such that electrical system 1800 may be powered on and engine 12 may be started. The PIN may include any suitable number of digits, such as four digits, for example. In one exemplary embodiment, the PIN is entered by actuating a turn signal switch or lever 1844 of motorcycle 2 in a particular sequence. In particular, turn signal lever 1844 is moved to the position corresponding to the left turn signal or the right turn signal to cycle through and select the numbers of the PIN. Another input, such as a button on the turn signal lever 1844, for example, may be used to enter the number selected by lever 1844 such that VCM 1802 receives the entered numbers of the PIN. In one embodiment, two PINs are stored in VCM 1802 for enabling motorcycle 2—one PIN set by the operator and one PIN that is factory set. Once one of the PINs is properly entered, VCM 1802 unlocks vehicle operation, and VCM 1802 sends a signal to ECM 1804 to unlock ECM 1804.

In one embodiment, security device 1838 includes one or more buttons/inputs for locking and unlocking various compartments or devices of motorcycle 2. Security device 1838 includes a transmitter operative to transmit an RF signal to VCM 1802 upon actuation of one of the buttons of security device 1838, and VCM 1802 engages or disengages a controllable lock of the corresponding vehicle compartment upon receipt of the signal regardless of whether motorcycle 2 is powered on. In one embodiment, actuation of the lock or unlock button is operative to cause VCM 1802 to lock/ unlock the saddlebags 54 and/or other compartments of motorcycle 2. In one embodiment, saddlebags 54 and other compartments are automatically locked by VCM 1802 following a predetermined delay if the saddlebags 54 or other compartments are not opened after being unlocked with device 1838. Other suitable vehicle features or operations may be locked and unlocked with buttons of security device 1838, such as ECM 1804 or VCM 1802, vehicle lights, display 1818, the infotainment system, etc. In one embodiment, security device 1838 includes a transceiver to provide bi-directional communication with VCM 1802. In one exemplary embodiment, security device 1838 transmits data at about 433 megahertz (MHz) and receives data at about 125 kilohertz (kHz). In another embodiment, security device 1838 communicates at about 2.4 gigahertz (GHz). Other suitable transmission frequencies may be used.

Figure 99:
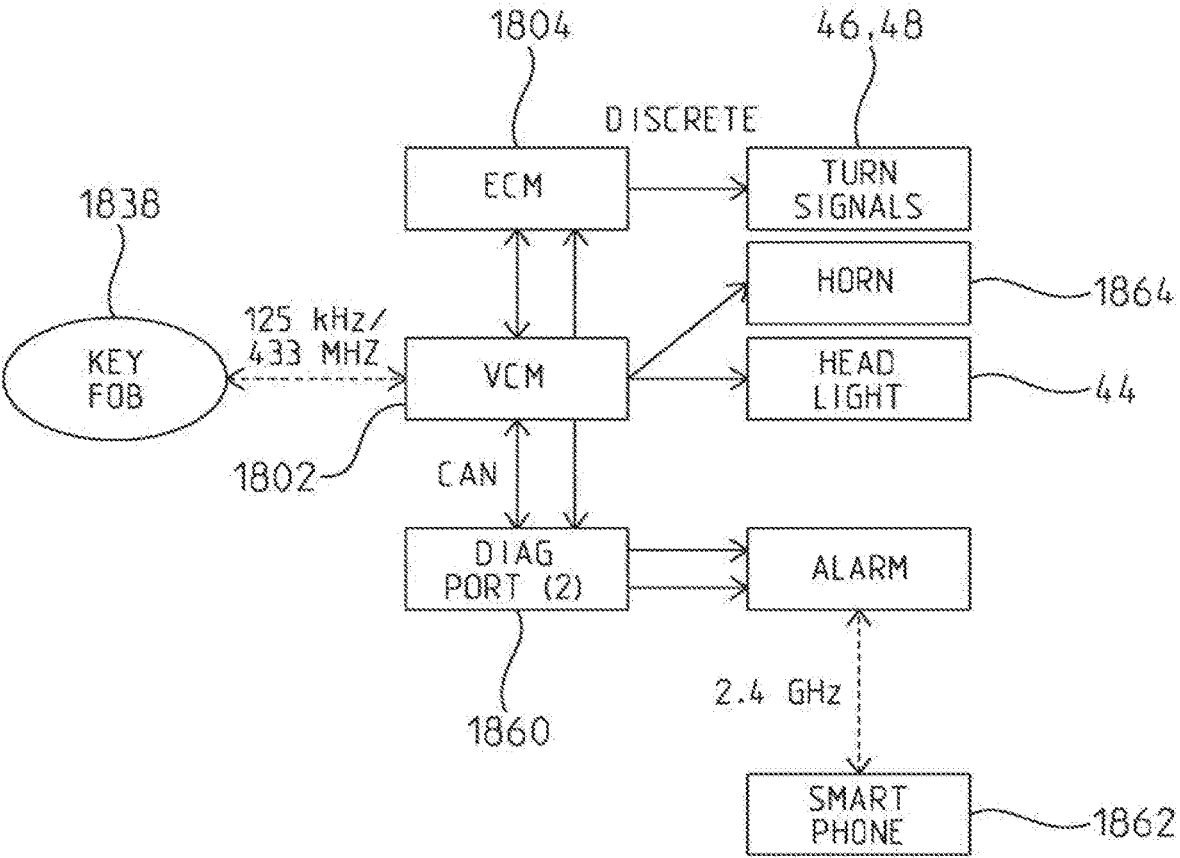
FIG. 99 is a block diagram illustrating an exemplary alarm system of the illustrative vehicle.

VCM 1802 further provides a security feature that triggers an alarm condition or theft alert upon detection of motorcycle 2 moving while motorcycle 2 is powered down and/or while engine 12 is shut down. In particular, an accelerometer (e.g., tilt sensor 1834 or another suitable accelerometer) is operative to detect movement of motorcycle 2 when motorcycle 2 is powered down and/or when engine 12 is off. The accelerometer may draw a small amount of power from vehicle battery 1820 (FIG. 98) when motorcycle 2 is powered down such that the accelerometer is operational to detect movement of motorcycle 2. Based on the detected vehicle movement with the accelerometer, VCM 1802 triggers an alarm state. The security feature may be disabled by the operator. Referring to the exemplary alarm system of FIG. 99, VCM 1802 is operative to sound a horn 1864 and/or flash the front light 44 in the alarm state. In one exemplary embodiment of FIG. 99, VCM 1802 is operative to instruct ECM 1804 to flash the turn signals 46, 48 in the alarm state. In one embodiment, VCM 1802 is further operative to communicate an alarm message (e.g., text message, other suitable message) to an operator's smartphone 1862 via a communication module 1860 of VCM 1802 to alert the operator that motorcycle 2 is being tampered with.

VCM 1802 further activates one or more hazard functions upon detection of motorcycle 2 tipping over or being in a non-vertical orientation. VCM 1802 illustratively detects a tip-over condition of motorcycle 2 based on the tilt angle signal provided with tilt sensor 1834, although other suitable sensors may be used to determine a tip-over condition. For example, VCM 1802 determines motorcycle 2 is not upright based on the measured tilt angle of motorcycle 2 exceeding a maximum threshold angle. Detection of the tip-over condition or other non-operational orientation of motorcycle 2 may be further based on vehicle speed and/or vehicle deceleration. For example, the maximum threshold angle may be increased for a faster vehicle speed. Upon detection of vehicle tipping over, VCM 1802 generates one or more control signals to shut down the fuel supply to engine 12 and to disable the engine ignition. In addition, VCM 1802 activates the vehicle hazard lights (e.g., turn signals 46, 48, front lights 44, and/or rear lights) upon detecting the tip-over condition. In one embodiment, tilt sensor 1834 is external to VCM 1802, although tilt sensor 1834 may alternatively be integrated into VCM 1802. In an alternative embodiment, tilt sensor 1834 provides a tilt signal to ECM 1804 rather than to VCM 1802, and ECM 1804 activates the hazard or marker lights of motorcycle 2 and initiates the other hazard functions. Automatic activation of hazard lights upon vehicle tip-over serves to increase the likelihood of alerting passers-by of the tipped over motorcycle 2 and the operator. In one embodiment, VCM 1802 is further operative to activate the hazard lights upon the automatic braking system 1170 (FIG. 63) being activated, i.e., when vehicle loses traction.

Motorcycle 2 further includes low beam and high beam headlights (e.g., lights 44 of FIG. 99) that are selectively turned on based on operator input, such as a light switch. VCM 1802 is operative to detect when light bulbs fail or burn out based on, for example, current draw or electrical resistance of the light bulbs. Upon detection of a failed low beam headlight, VCM 1802 is operative to pulse the high beam headlight such that the light intensity from the pulsed high beam light is substantially the same as the light intensity of a properly functioning low beam light.

Referring to FIG. 98, motorcycle 2 further includes an infotainment system 1848 including an audio system 1850. Audio system 1850 includes a radio/receiver and speakers each mounted inside the front fairing 50 and enclosed to be weather resistant. Audio system 1850 automatically controls the volume based on the detected speed of motorcycle 2 provided with VCM 1802 or ECM 1804. In particular, audio system 1850 increases the volume as the detected vehicle speed increases, thereby increasing the likelihood of sound from speakers of audio system 150 being audible and clear at high vehicle speeds. Such volume adjustment may be continuous based on vehicle speed, or the volume may be adjusted between a plurality of discrete levels based on vehicle speed. The audio volume is further manually adjustable by the operator with volume control inputs. A wireless communication protocol (e.g., Bluetooth) and/or USB connections are integrated in infotainment system 1848 to stream audio, video, voice (phone) data, or other data from an external device, such as smart phone 1862 of FIG. 99. Infotainment system 1848 also displays video/graphical data such as text messages, caller 10, phone book, audio data, pictures, and smart phone data on display 1818 upon the smart phone 1862 being linked to the infotainment system 1848. In one embodiment, controls for infotainment system 1848 are mounted to handlebars 28 proximate the operator's hands. Exemplary controls includes volume control, power on/off, tuner up/down, seek/scan, song selector up/down, source selection (e.g., AM/FM, AUX, XM, etc.), toggle off speakers, and other suitable controls.

Figure 100:
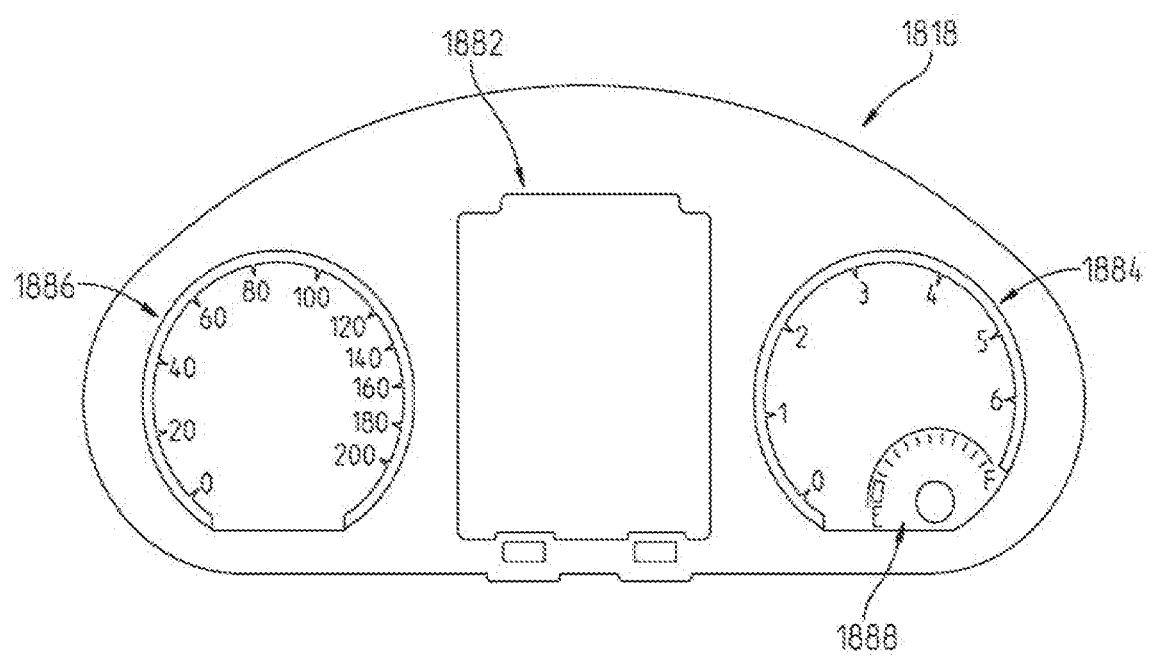
FIG. 100 is an exemplary display interface of the illustrative vehicle including a display screen.

FIG. 100 illustrates an exemplary display 1818 of motorcycle 2 including a display screen 1882, a tachometer gauge 1884, and a speedometer gauge 1886. A fuel level indicator 1888 is illustratively integrated within tachometer gauge 1884. Exemplary information displayed on screen 1882 includes calculated fuel economy, fuel range, tire pressure, battery voltage, oil life, odometer, average speed, and other metrics calculated by VCM 1802, as well as the infotainment display data described above.

As described herein, windshield 1452 of FIGS. 78-87 is adjustable with motor assembly 1454. Motor assembly 1454 is controlled by a switch 1900 (FIG. 98) or other suitable input control device that is actuated by a user to manually adjust the position of windshield 1450. Electric motor 1454 provides a range of adjustments of windshield 1450 between a fully lowered position (FIG. 84) and a fully raised position (FIG. 87). In one embodiment, motor assembly 1454 includes a servo motor, although other suitable motor types may be provided. Switch 1900 is positioned on or near the handlebars 28 to provide easy access for the operator. In the illustrated embodiment, switch 1900 is routed to VCM 1802 such that VCM 1802 controls the actuation of motor assembly 1454 based on the operator demand from switch 1900. Switch 1900 may alternatively be routed directly to a motor controller of motor assembly 1454 for controlling the windshield height. The operator may set the orientation of the windshield 1450 to a desired position with switch 1900. For example, a lower windshield position may provide more airflow to the operator during motorcycle operation, and a higher windshield position may provide additional protection against the elements, e.g., precipitation, air, dust, etc.

Windshield 1450 is also automatically adjustable based on at least one operating condition of motorcycle 2. In one embodiment, windshield 1450 is automatically adjusted by motor 1454 based on the current gear position of transmission 14. In particular, for each transmission gear, motor 1454 moves windshield 1450 to a corresponding discrete position. In one exemplary embodiment, windshield 1450 is fully down or is in a lowest discrete position when transmission 14 is in a first gear, windshield 1450 is moved to a higher discrete position when transmission 14 is shifted into second gear, windshield 1450 is moved to a next higher discrete position when transmission 14 is shifted into third gear, and so on for each transmission gear. Windshield 1450 is moved to a fully up position (FIG. 87), or a highest discrete position, when transmission 14 is shifted into the highest gear (e.g., fifth or sixth gear). Other suitable discrete positions of windshield 1450 may correspond to the different transmission gears. An enable switch 1902 (FIG. 98) is provided on motorcycle 2 to enable the automatic windshield adjustment functionality. In one embodiment, with automatic windshield adjustment enabled with enable switch 1902, manual adjustment of windshield 1450 with switch 1900 is disabled. Alternatively, switch 1900 may be used by an operator to further adjust the position of windshield 1450 when automatic adjustment is enabled. In the illustrated embodiment, upon enable switch 1902 being selected, VCM 1802 is operative to detect the transmission gear and to control the motor assembly 1454 to move windshield 1450 to the appropriate discrete position. Alternatively, a motor controller of motor assembly 1454 may be operative to read the gear position of transmission 14 and to control the motor to move the windshield 1450 to the corresponding discrete position without use of VCM 1802.

In another embodiment, windshield 1450 is automatically adjusted by motor 1454 based on detected vehicle speed. In particular, VCM 1802 controls motor assembly 1454 to move windshield 1450 to a higher position as the detected vehicle speed increases. In one embodiment, both transmission gear position and vehicle speed are variables used in the automatic adjustment of windshield 1450.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

Figure 101:
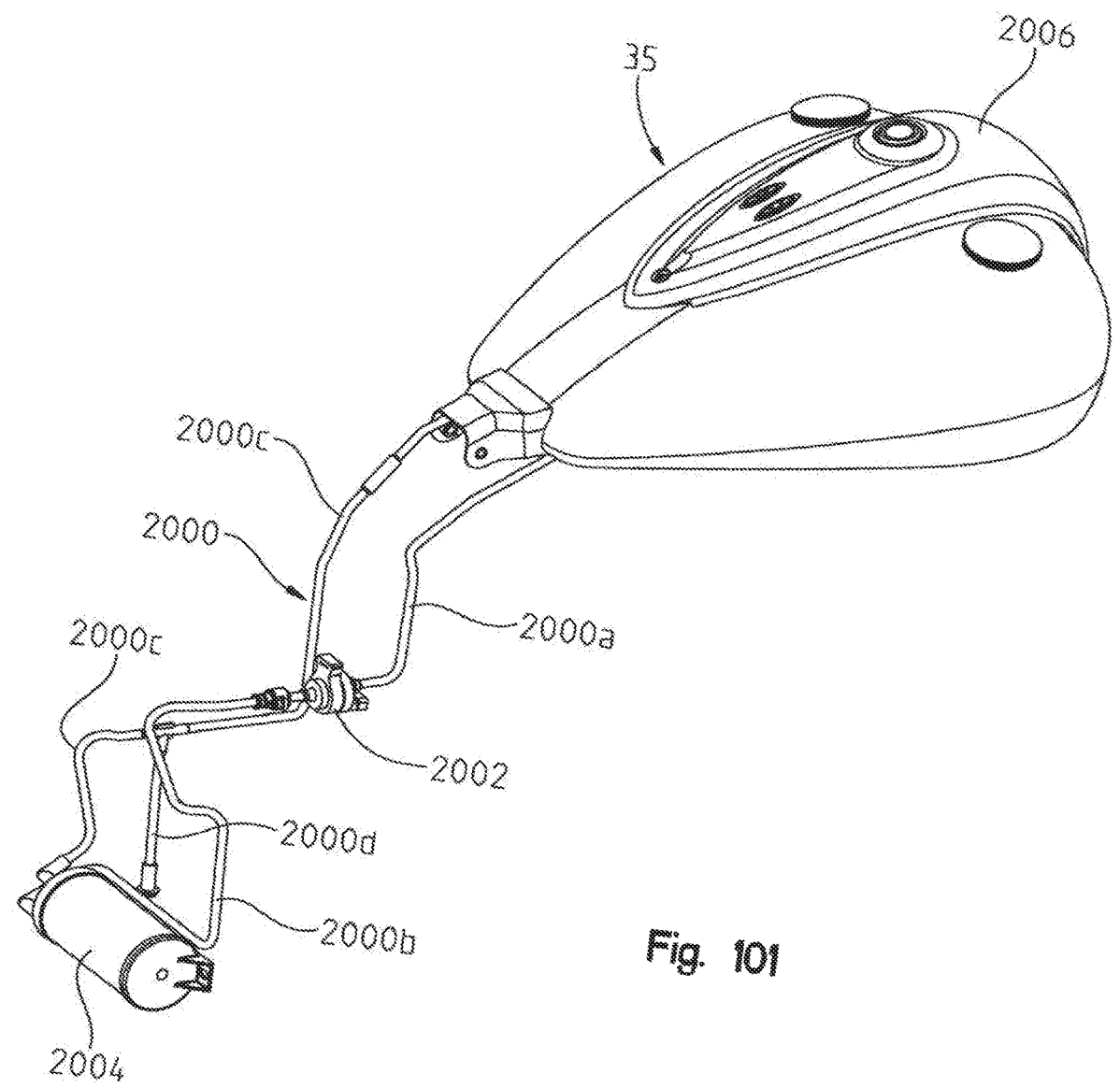
FIG. 101 is a rear perspective view of the fuel tank of FIG. 32.
Figure 102A:
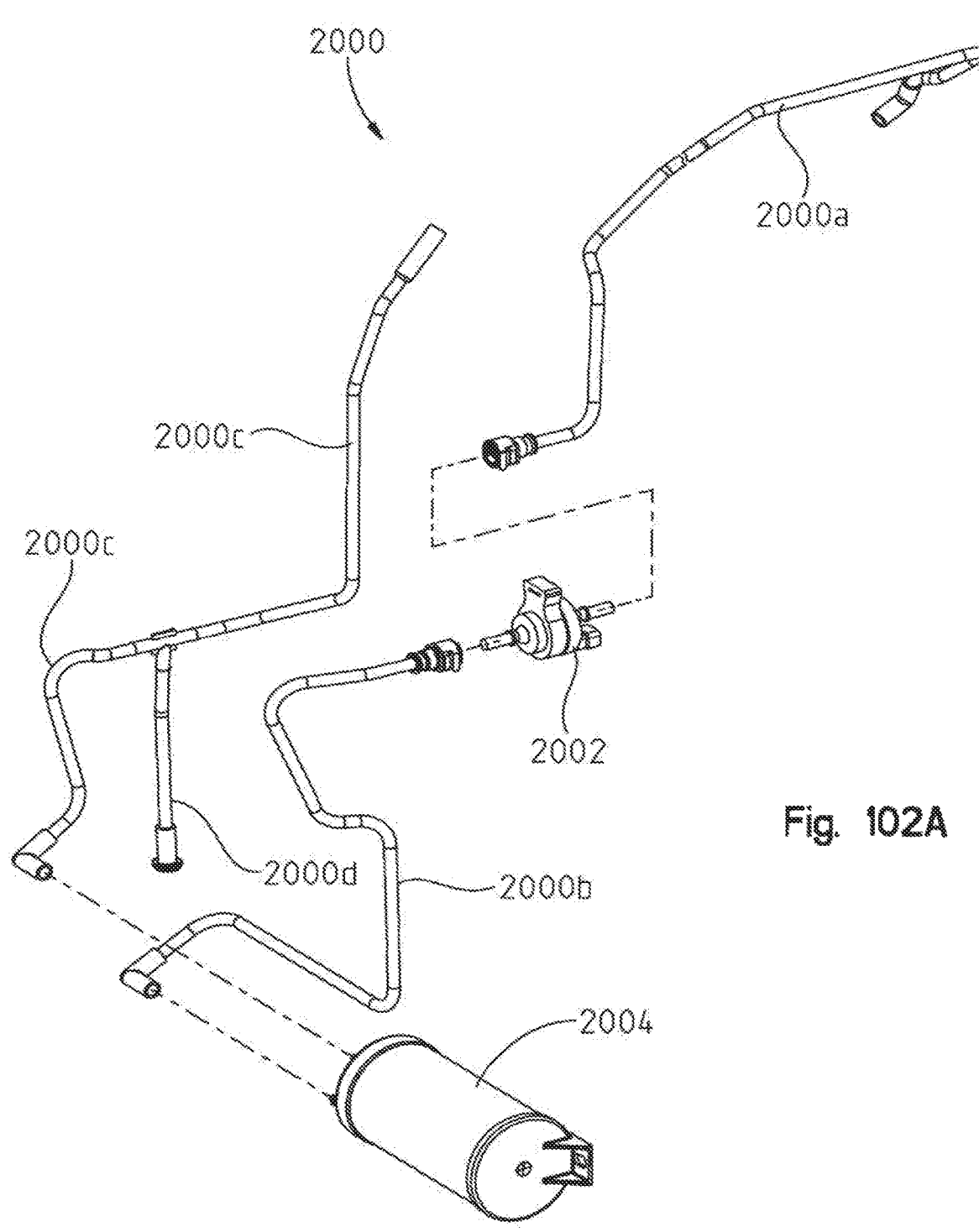
FIG. 102A is an exploded view of a portion of the fuel tank of FIG. 101.
Figure 102B:
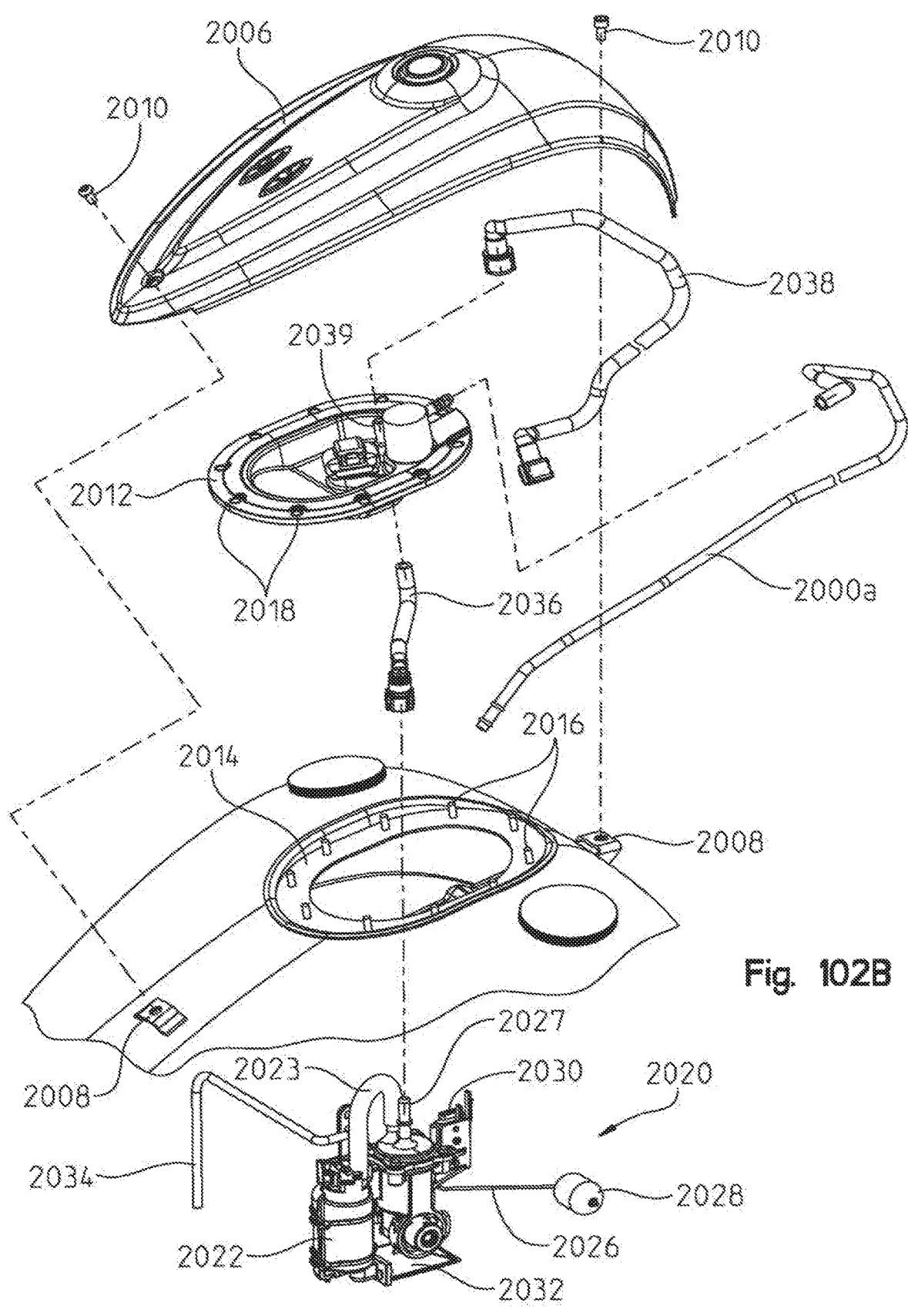
FIG. 102B is a further exploded view of an additional portion of the fuel tank of FIG. 101.

Referring to FIGS. 101-1028, fuel tank 35 is described herein in further detail. As shown in FIGS. 101 and 102A, fuel tank 35 is fluidly coupled to a recirculation system 2000 which includes recirculation lines 2000a, 2000b, 2000c, and 2000d. Lines 2000a, 2000b, 2000c, and 2000d allow excess fuel from engine 12 to flow back to fuel tank 35. Lines 2000a and 2000b are coupled to a purge valve 2002. Lines 2000b and 2000c are fluidly coupled to an evaporator 2004.

Figure 103:
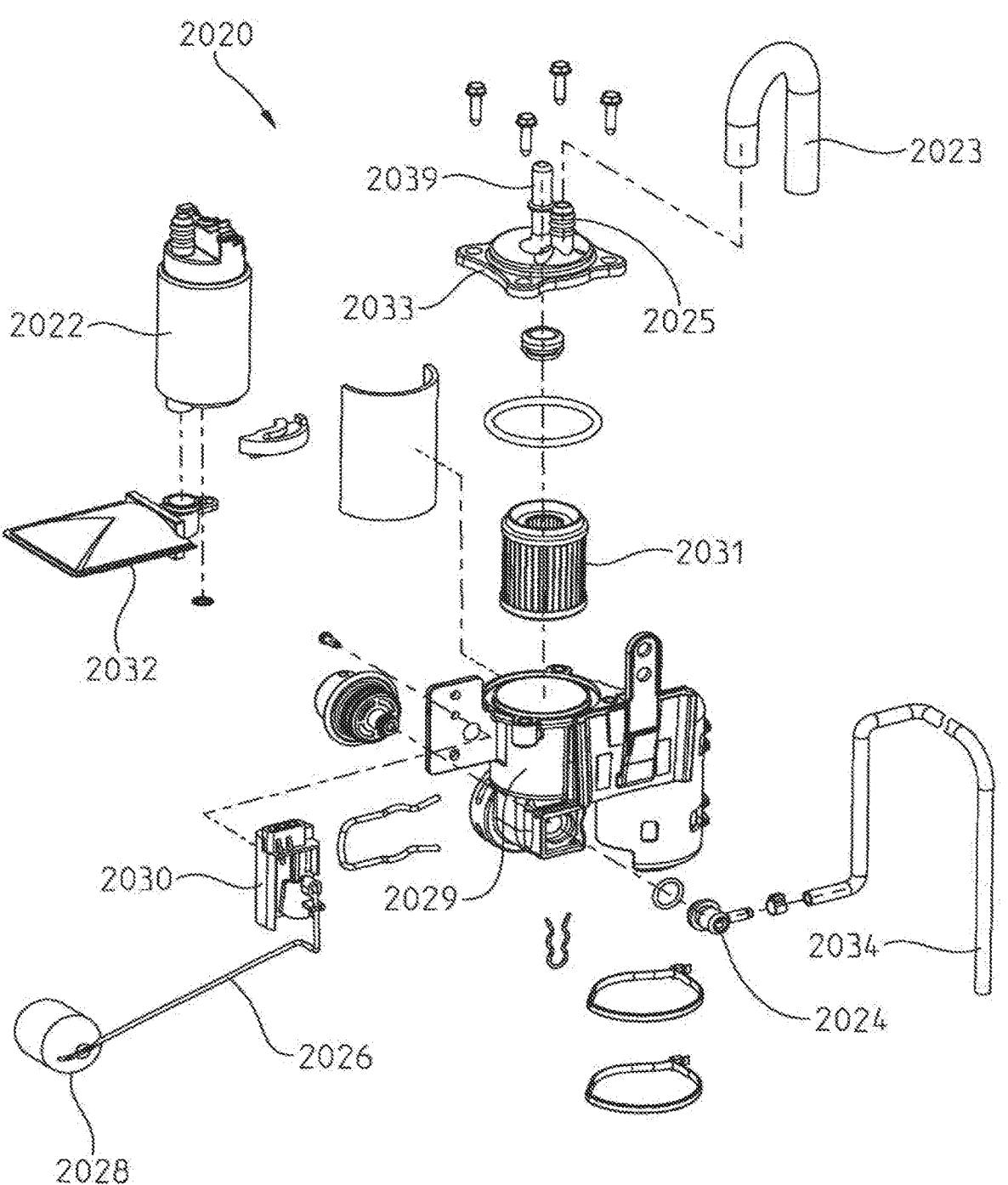
FIG. 103 is a rear exploded view of a fuel pump assembly of the fuel tank.

As shown in FIGS. 1028 and 103, fuel tank 35 includes a center cover 2006 which is coupled to fuel tank 35 through brackets 2008 and fasteners 2010. Center cover 2006 conceals a fuel pump assembly 2020, which includes a panel 2012 that couples with a recessed portion 2014 of fuel tank 35, a main pump 2022, a jet pump 2024 (FIG. 103), a float 2028, a level sensor 2030, and a pick-up line 2034. Illustratively, panel 2012 couples with recessed portion 2014 by placing fasteners 2016 of recessed portion 2014 through apertures 2018 of panel 2012.

Fuel pump assembly 2020 is positioned within fuel tank 35 and below panel 2012. Main pump 2022 is coupled to a fuel filter 2031 supported within a chamber 2029. A lid 2033 includes nozzles 2025 and 2039 and is positioned over chamber 2029 and fuel filter 2031. Lid 2033 is illustratively coupled to chamber 2029 with conventional fasteners. Main pump 2022 is coupled to fuel filter 2031 via a hose 2023 coupled to nozzle 2025.

Figure 104:
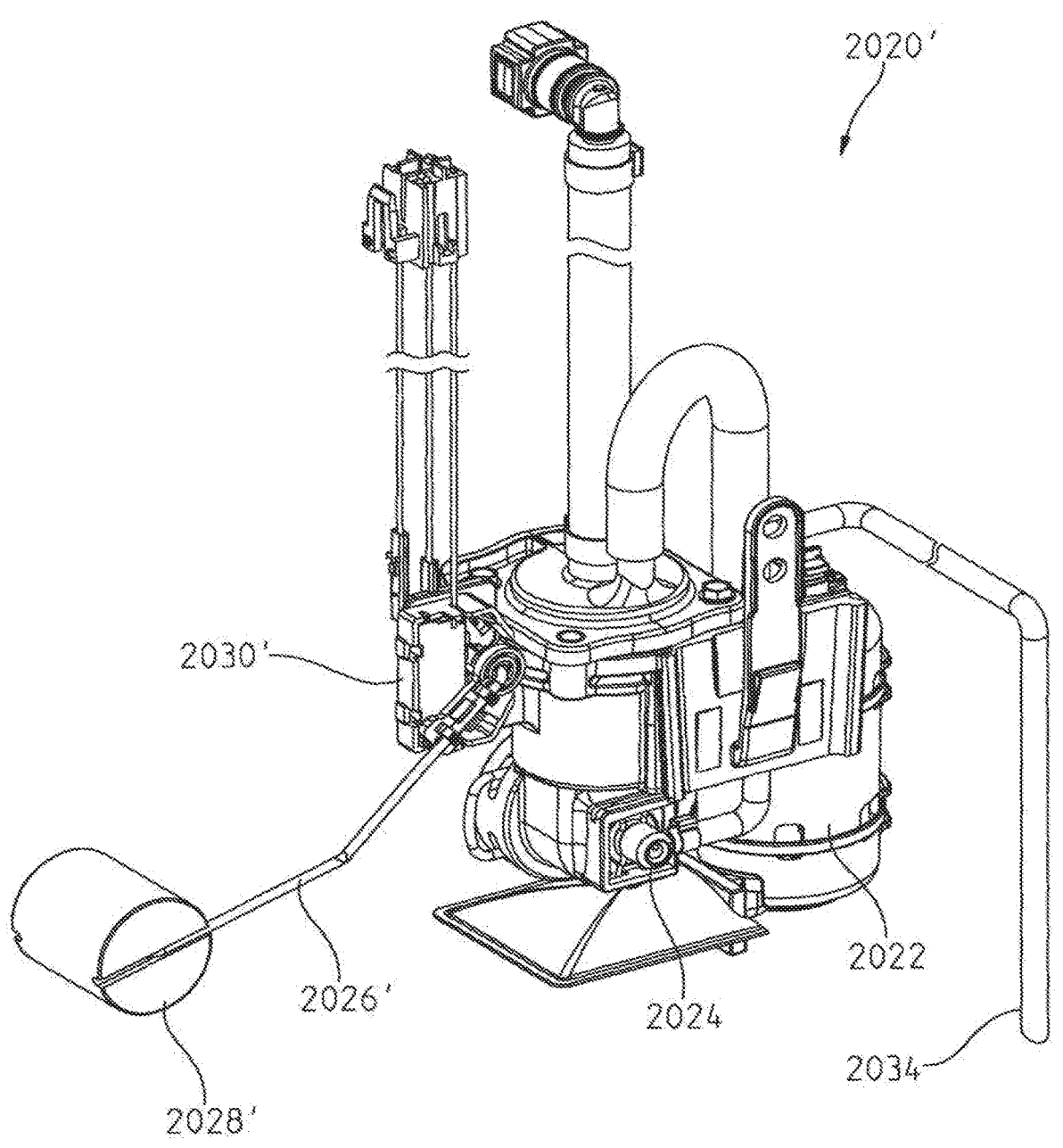
FIG. 104 is an alternative embodiment of the fuel pump of FIG. 103.

Main pump 2022 also is coupled to float 2028 with a float arm 2026. Level sensor 2030 is electrically coupled to float 2028 in order to determine the level of fuel within fuel tank 35. In one embodiment, an alternative float sensor 2028', float arm 2026', and level sensor 2030' may be included with fuel pump assembly 2020, as shown in FIG. 104. A screen filter 2032 is positioned below main pump 2022 in order to filter debris in fuel before the fuel flows into fuel pump assembly 2020.

Figure 105:
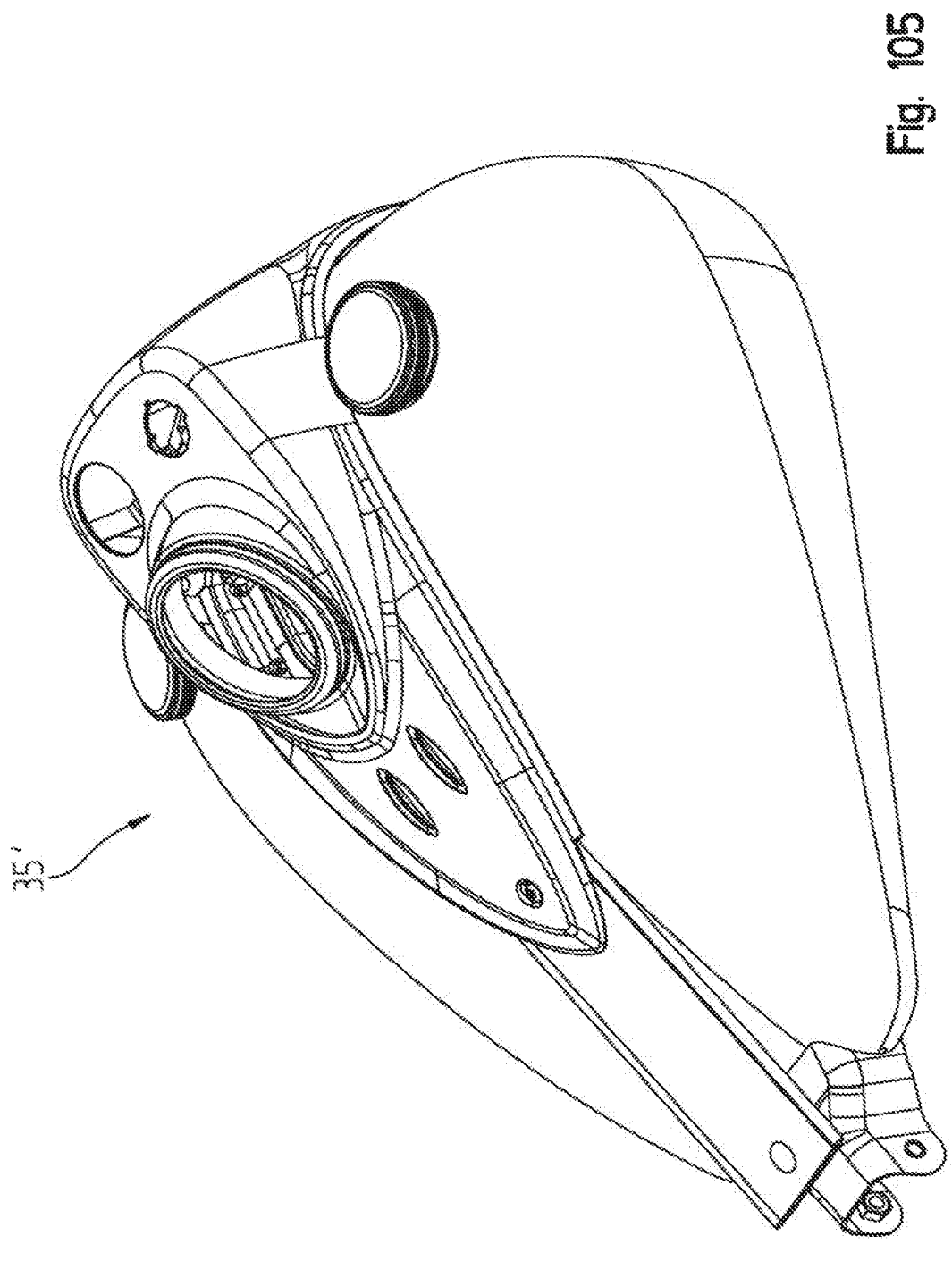
FIG. 105 is an alternative embodiment of the fuel tank of FIG. 101.

Jet pump 2024 cooperates with main pump 2022 to create a low-pressure, high-velocity flow, which suctions or pulls fuel into pick-up line 2034 in order to transfer fuel from one side of fuel tank 35 to the other side. Jet pump 2024 allows fuel to continuously flow to the opposite side of fuel tank 35, where fuel flows from main pump 2022 into a fuel line 2036. Fuel in line 2036 flows into an additional fuel line 2038 via a nozzle 2039. Fuel line 2038 is fluidly coupled to engine 12 in order to supply fuel thereto. In an alternative embodiment of vehicle 2, a fuel tank 35', shown in FIG. 105, may be included on vehicle 2.

Given that two-wheeled vehicles may lean to one side, both while operating and while parked, the measurement of the fuel supply in fuel tank 35 may be inaccurate. For example, if vehicle 2 is operating during heavy winds or around a turn, or is parked on a hill or otherwise supported on its side stand, the fuel within fuel tank 35 may pool to the downstream side of fuel tank 35. As such, the reading or measurement of fuel displayed on a fuel gauge or display screen of vehicle 2 may be inaccurate because float 2028 may indicate a change in fuel level due to the lean of vehicle 2.

Figure 106:
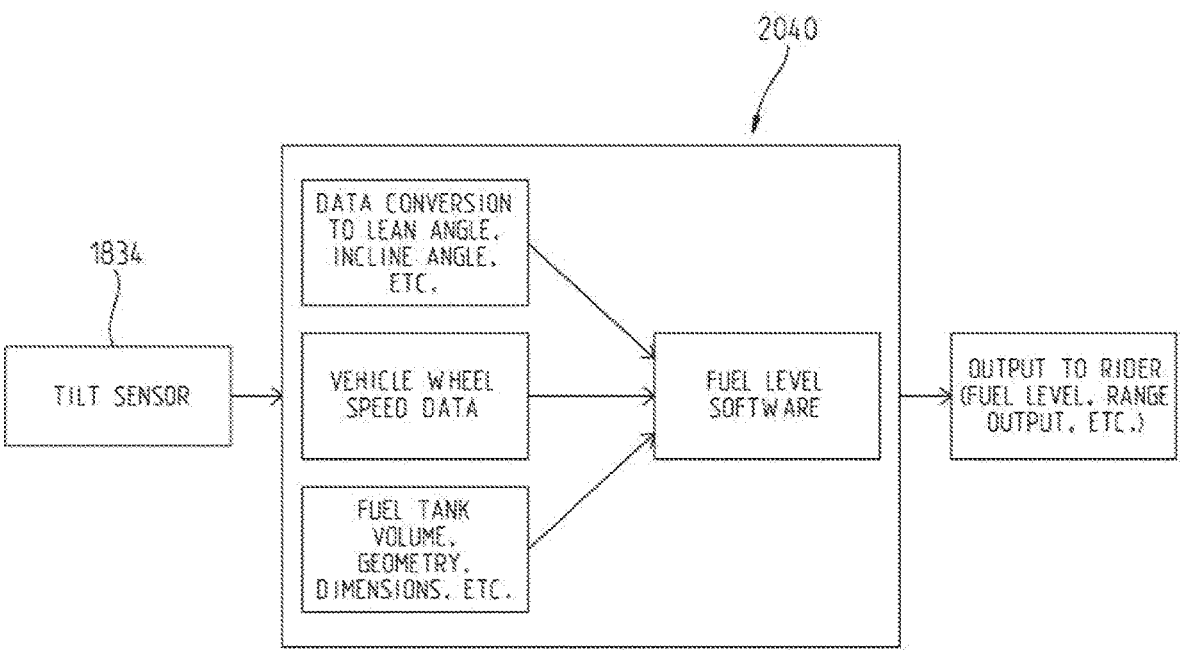
FIG. 106 is a flowchart of inputs and outputs to the fuel system.

However, lean angle data from tilt sensor 1834 may be used to adjust the fuel level signal from float 2028. More particularly, float 2028 and tilt sensor 1834 may be used to measure real-time fuel level data and tilt angle data, respectively. Referring to FIG. 106, in one embodiment, software configured to measure fuel level also analyzes the lean angle data to calculate the actual fuel level in tank 35. As such, the software may adjust the fuel level displayed to the rider when vehicle 2 is leaning. For example, the software may be part of internal software 2040 for either VCM 1802 and/or ECM 1804 and may be configured to determine the actual fuel level in tank 35 based on the geometry of fuel tank 35 and the speed of vehicle 2. In another embodiment, software 2040 may be configured to determine the actual fuel level in tank 35 based on the lean direction of vehicle 2 (i.e., based on the incline or decline direction of vehicle 2). By using vehicle speed data, lean angle data, lean direction data, and/or fuel tank geometry, the actual fuel level can be outputted to the rider without requiring additional level sensors or floats. The output to the rider may include the fuel level, as well as a driving range or other similar output information.

Figure 107:
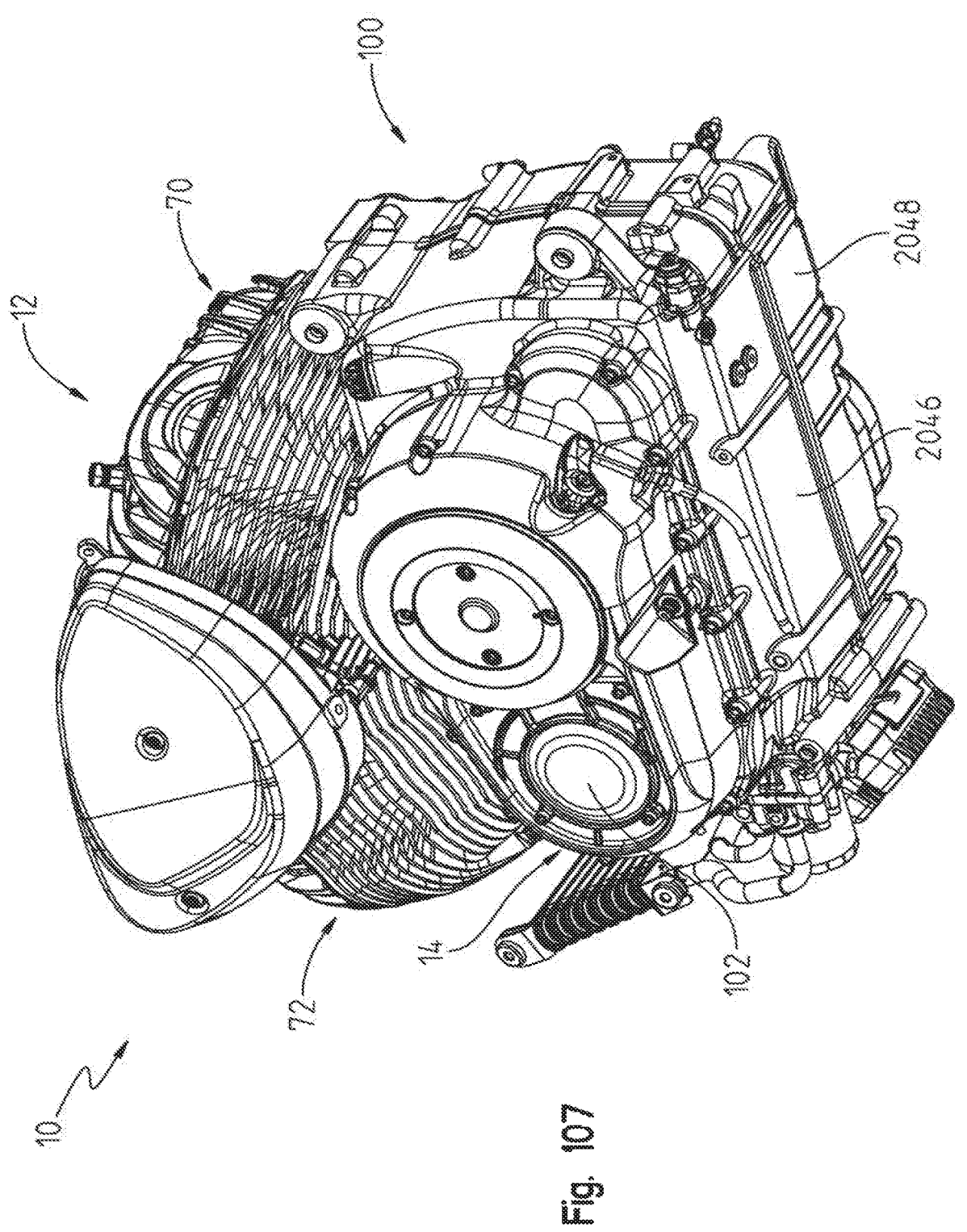
FIG. 107 is a rear perspective view of the power train assembly of FIG. 8.
Figure 108:
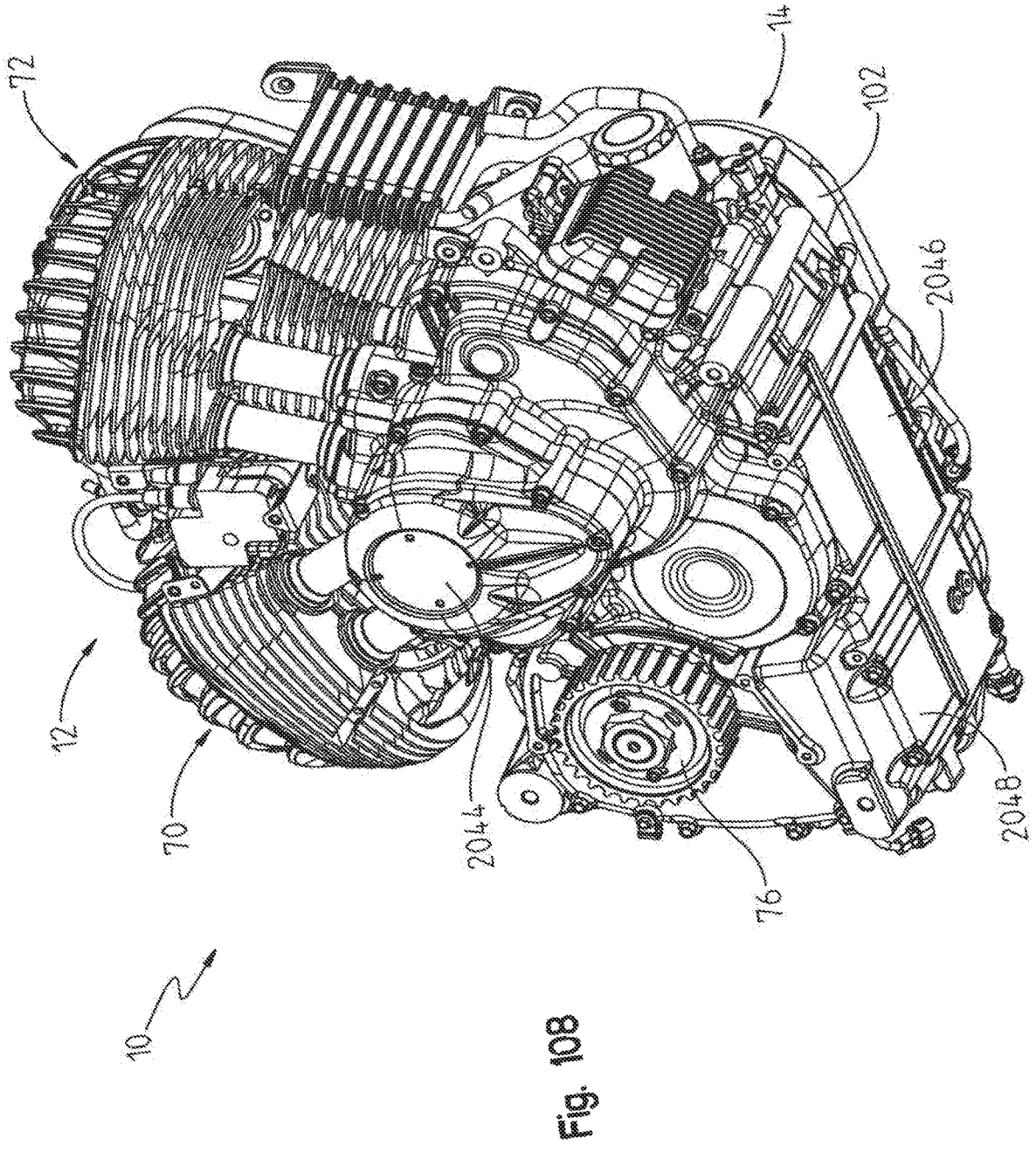
FIG. 108 is a front perspective view of the power train assembly of FIG. 107.

Referring now to FIGS. 107 and 108, engine 12 and transmission 14 are integrated together as a single power train assembly 10. Crankcase 100 is coupled to cylinders 70, 72 and includes a first side 2046 and a second side 2048.

First and second sides 2046, 2048 may be cast or drilled portions that are coupled together through conventional means, such as bolts, rivets, welds, or other similar fasteners. Illustratively, transmission 14 is concealed by transmission housing 102 (FIG. 107), which is coupled to first side 2046 of crankcase 100. A valve train assembly 2130 and other components of power train assembly 10 are concealed by a cover 2044 (FIG. 108) on second side 2048 of crankcase 100.

Figure 110:
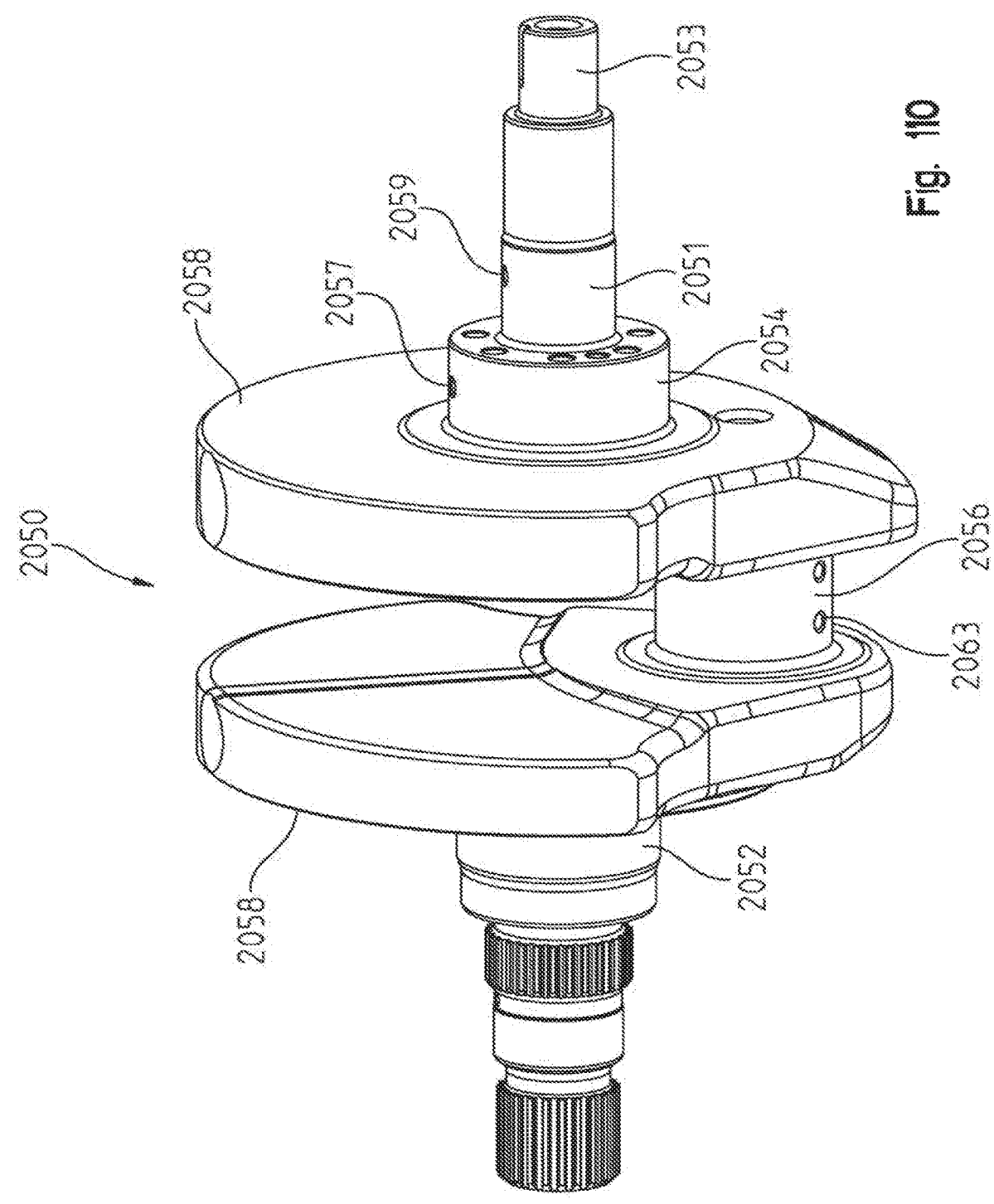
FIG. 110 is another front perspective view of the crankshaft of FIG. 109.

Crankcase 100 supports a crankshaft 2050, as shown in FIGS. 109 and 110. Crankshaft 2050 includes a first main bearing journal 2052, a second main bearing journal 2054, and a connecting rod journal 2056. Connecting rod journal 2056 is coupled with connecting rods 2500 (FIG. 148) of pistons 104 and is intermediate counterweights 2058. Connecting rods 2500 may be comprised of two pieces coupled together around connecting rod journal 2056. Connecting rod journal 2056 may include at least one oil port 2063, as is detailed further hereinafter. Crankshaft 2050 further includes a mounting surface 2051 adjacent second main bearing journal 2054 and a nose 2053 at an outer end of crankshaft 2050. Additionally, a mounting surface 2065 may be included adjacent first main bearing journal 2052 and may include an oil port 2061, as is detailed further hereinafter. First main bearing journal 2052, second main bearing journal 2054, and mounting surface 2051 each may include an oil port 2055, 2057, 2059, respectively, as is further detailed hereinafter.

Figure 111:
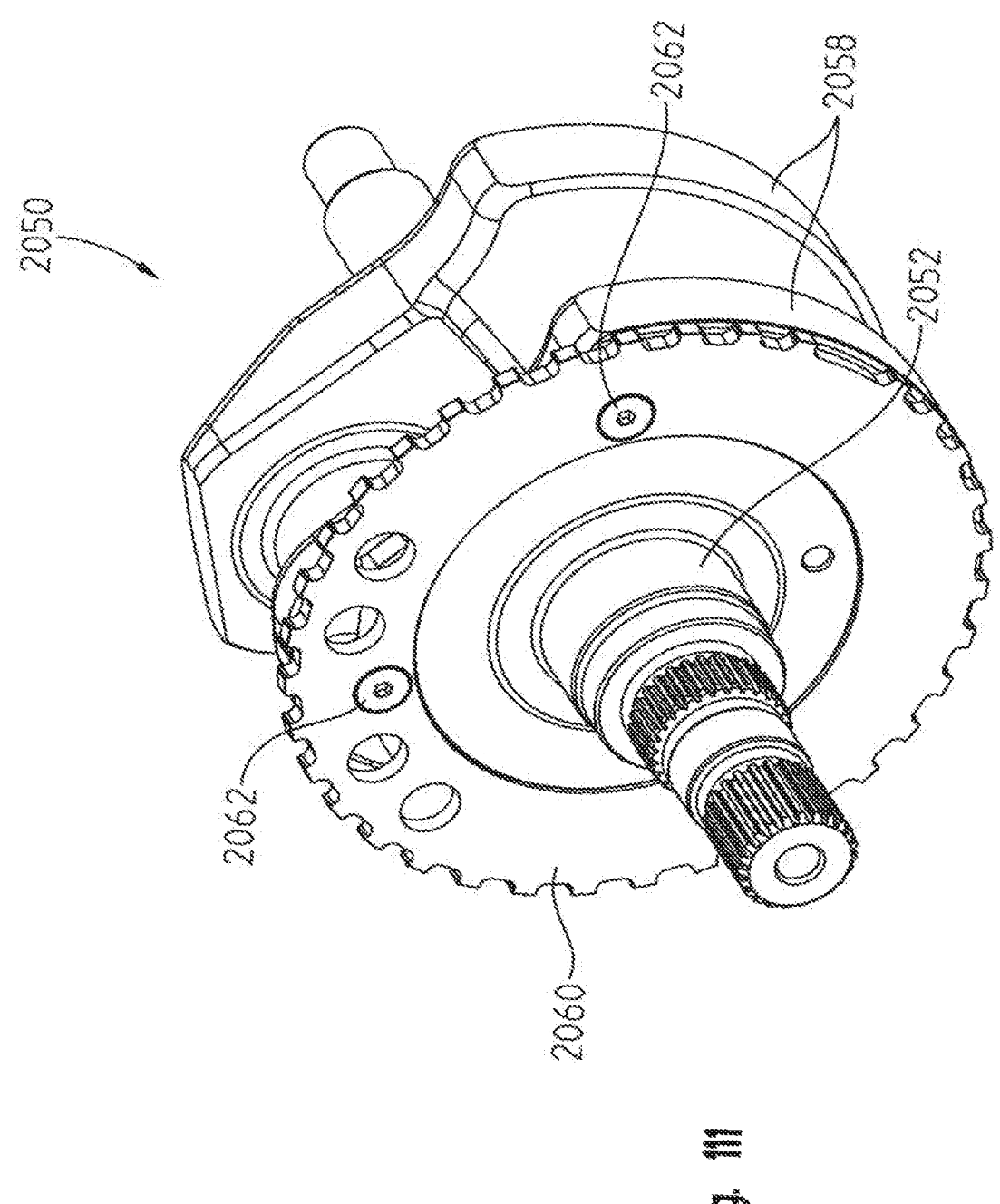
FIG. 111 is a side perspective view of the crankshaft of FIG. 110, including a timing disc.
Figure 112:
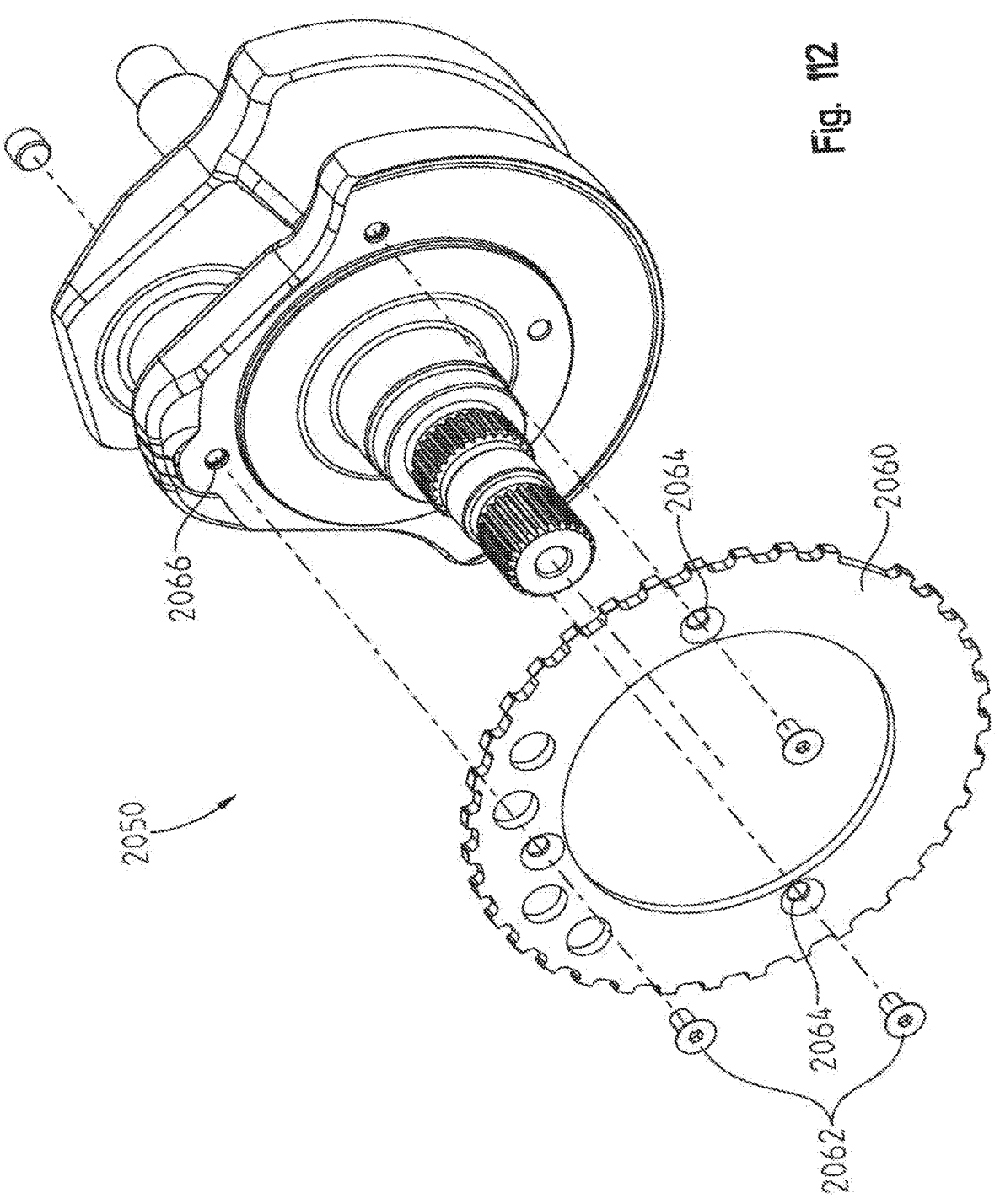
FIG. 112 is an exploded view of the timing disc and crankshaft of FIG. 111.

In one embodiment, crankshaft 2050 includes a timing disc 2060, as shown in FIGS. 111 and 112. Timing disc 2060 is coupled to one of counterweights 2058 with conventional fasteners 2062, which may be bolts, screws, rivets, or other similar coupling devices. As shown in FIG. 112, fasteners 2062 extend through apertures 2064 in timing disc 2060 and apertures 2066 of counterweight 2058. Crankshaft 2050 is supported at a low position within crankcase 100, which reduces the center of gravity of engine 12.

Figure 113:
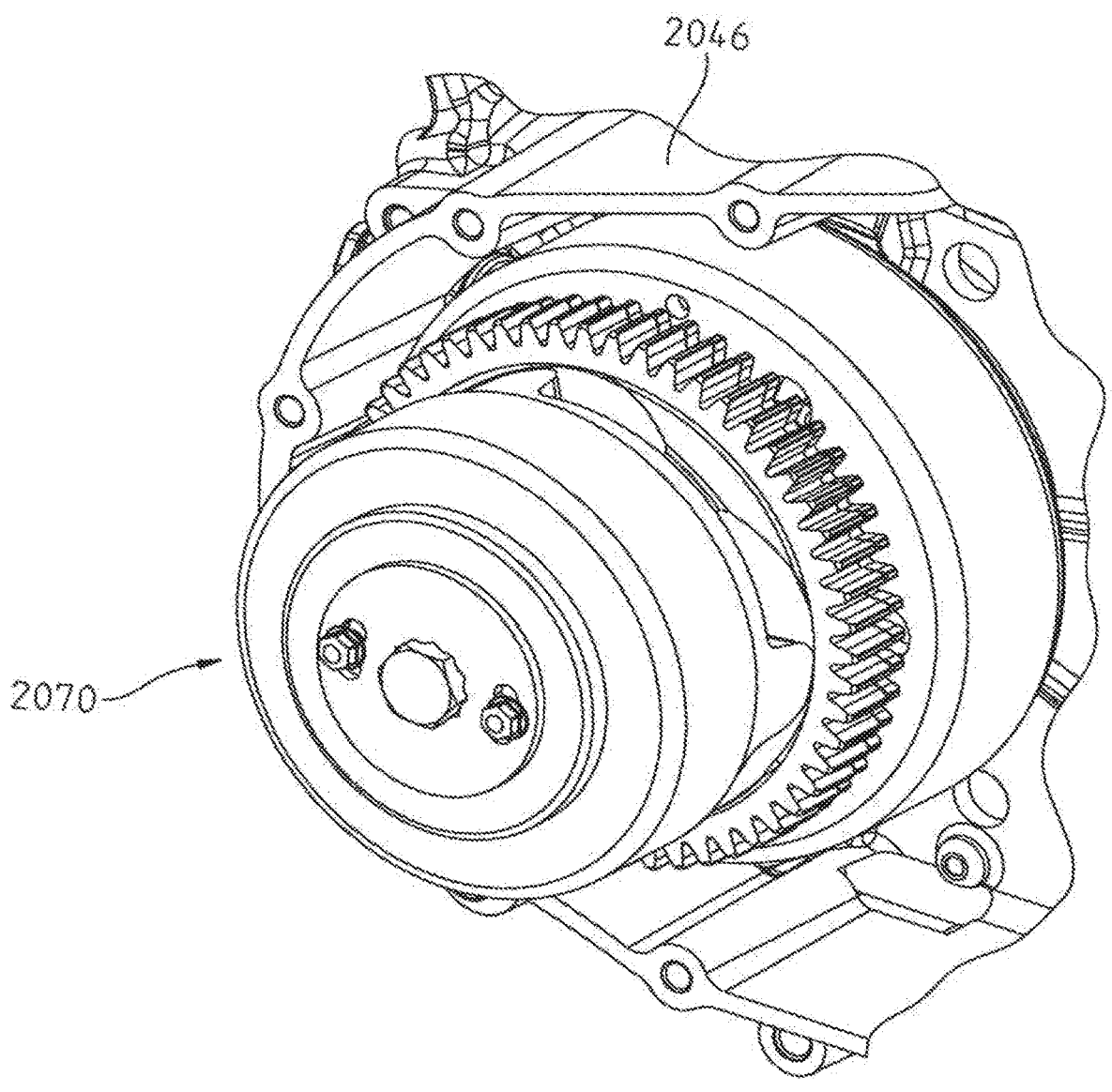
Figure 114:
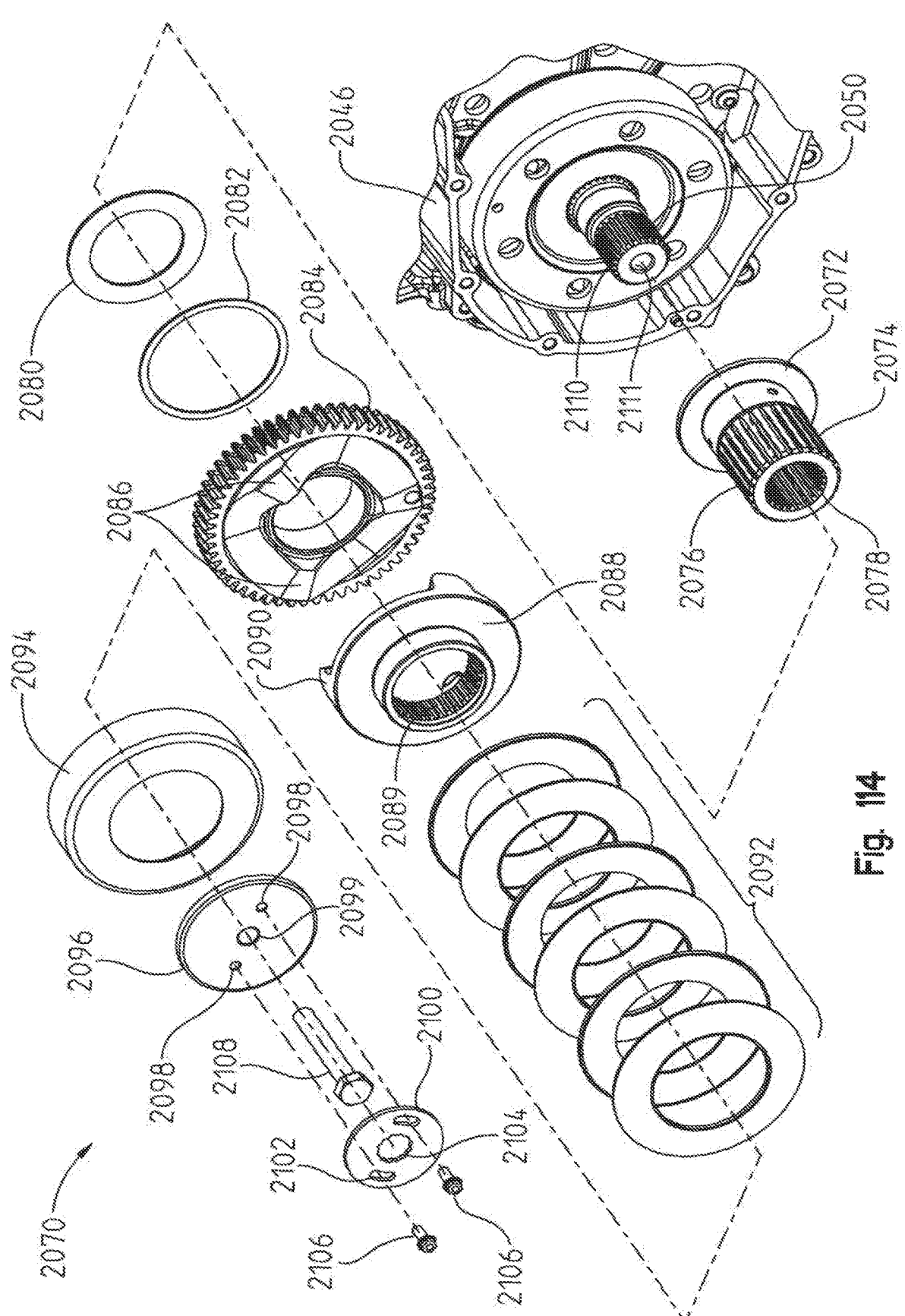
Figure 115:
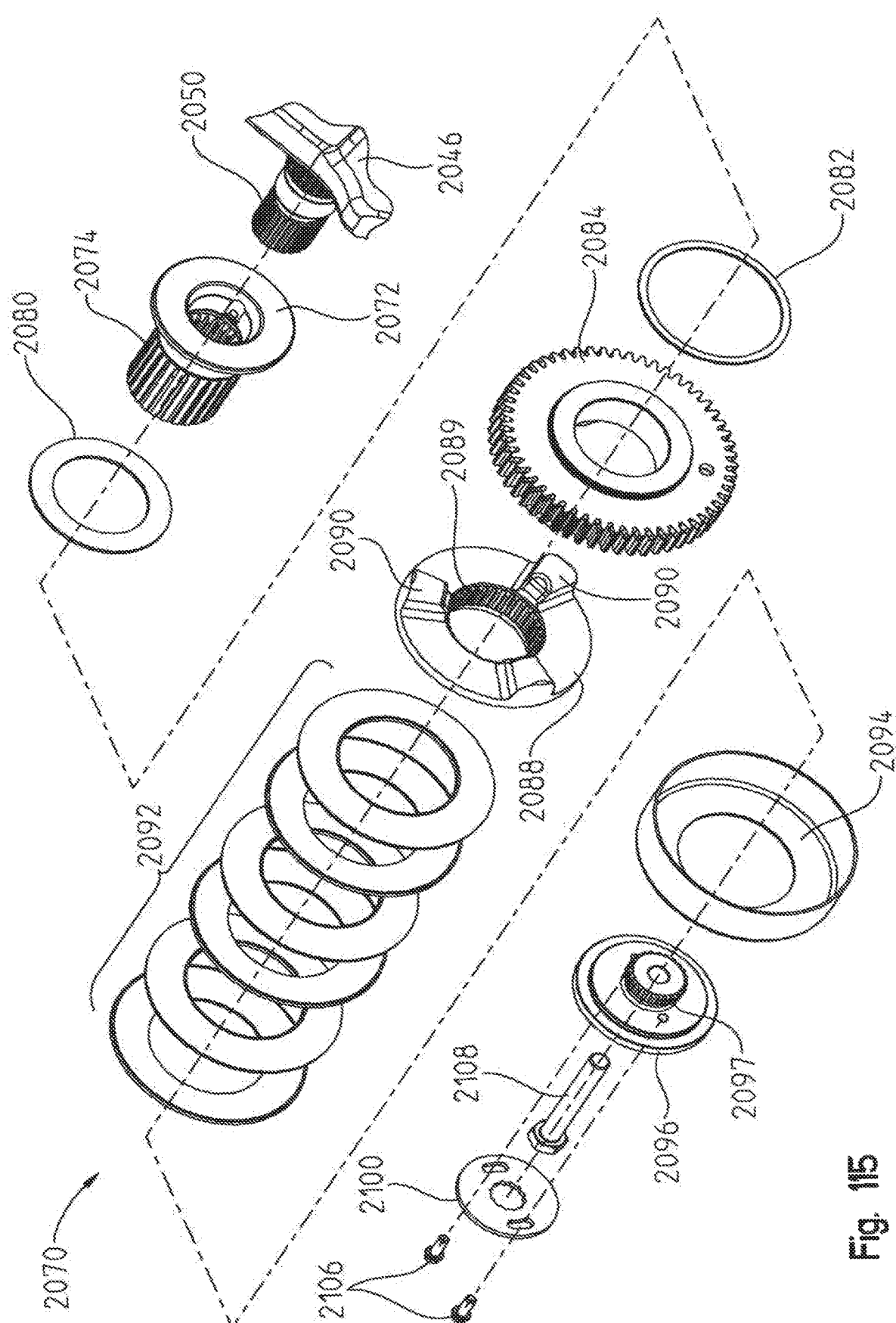

Referring to FIGS. 113-115, crankshaft 2050 also supports a compensator assembly 2070. Compensator assembly 2070 may be spring-loaded and lessens or "smooths" the torque output from engine 12. Additionally, compensator assembly 2070 couples transmission 14 to crankshaft 2050, as is further detailed herein.

As shown in FIG. 113, compensator assembly 2070 is on first side 2046 of crankcase 100. Compensator assembly 2070 includes a splined member 2074 having a flange 2072 coupled thereto, a first spacer member 2080, a second spacer member 2082, a compensating sprocket 2084 having a plurality of protrusions 2086, a sliding cam 2088, a plurality of shims 2092, a first cover member 1094, a second cover member 2096, and a mounting plate 2100. Splined member 2074 has an internally splined surface 2078 that couples with an externally splined surface 2110 of crankshaft 2050. Sliding cam 2088 includes an internally splined surface 2089 and plurality of projections 2090 that are positioned intermediate protrusions 2086 of compensating sprocket 2084. Internally splined surface 2089 of sliding cam 2088 couples with an externally splined surface 2076 of splined member 2074 such that compensating sprocket 2084 and first and second spacer members 2080, 2082 are positioned between flange 2072 and sliding cam 2088. Shims 2092 are positioned outward of sliding cam 2088 and are concealed by first cover member 1094. In one embodiment, shims 2092 may function as a wave spring. Second cover member 2096 is positioned intermediate first cover member 2094 and mounting plate 2100 and includes apertures 2098 for receiving fasteners 2106. As shown in FIG. 114, fasteners 2106 also are received through apertures 2102 of mounting plate 2100. A fastener 2108 extends through a center aperture 2104 of mounting plate 2100, a center aperture 2099 of second cover member 2096, and couples with a gear 2097 (FIG. 115) on an inner side of second cover member 2096 in order to assemble compensator assembly 2070.

Figure 116:
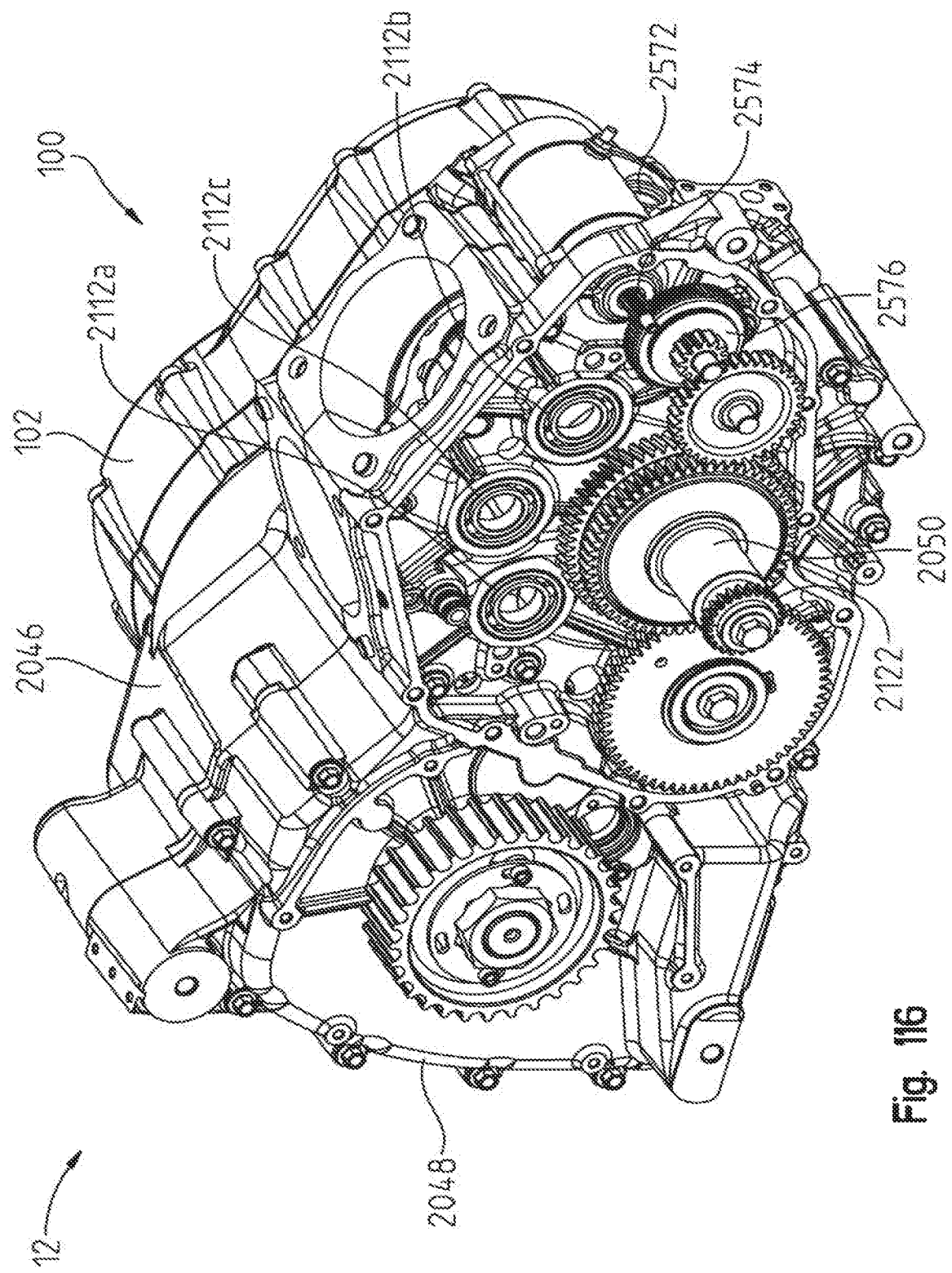
Figure 117:
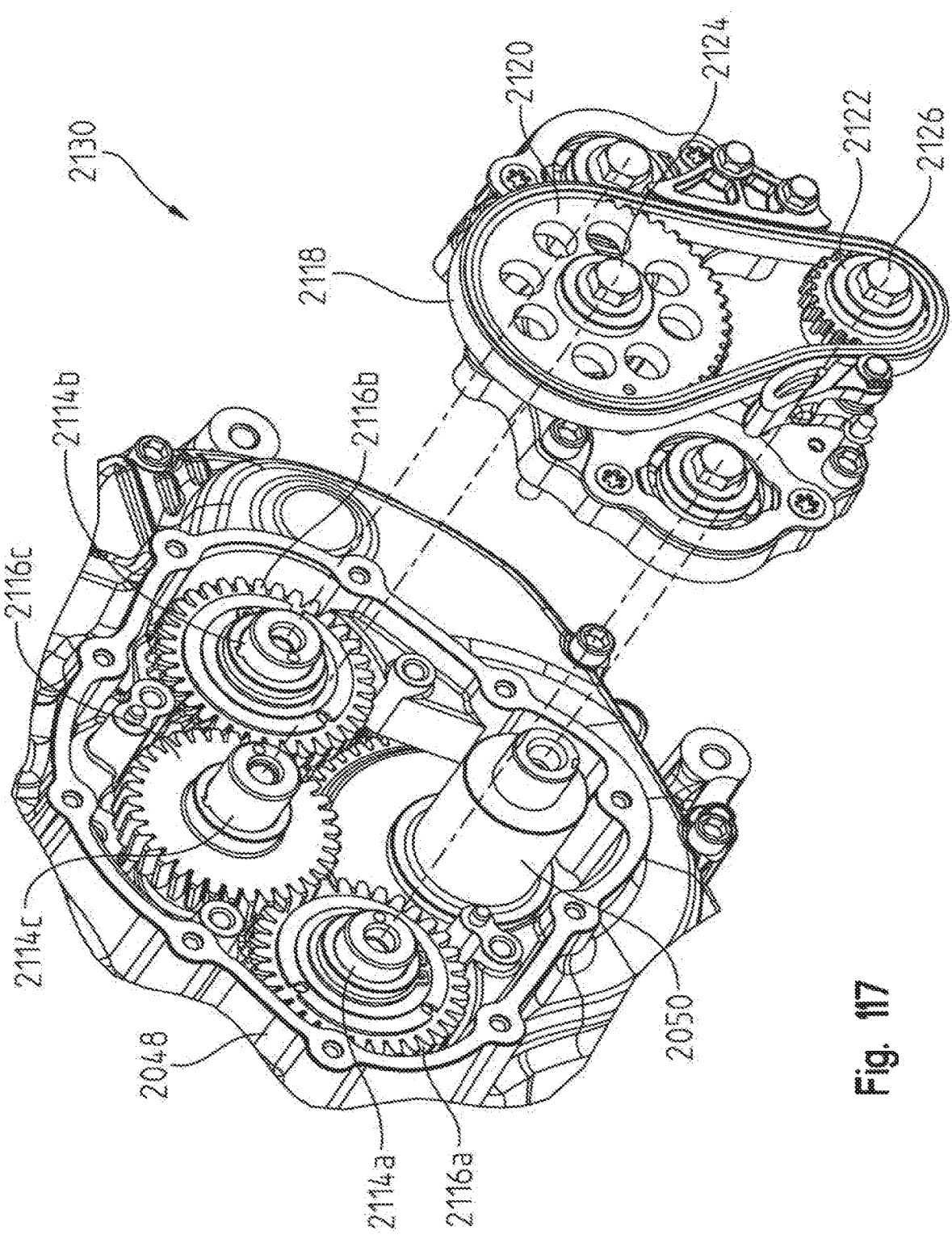
Figure 119:
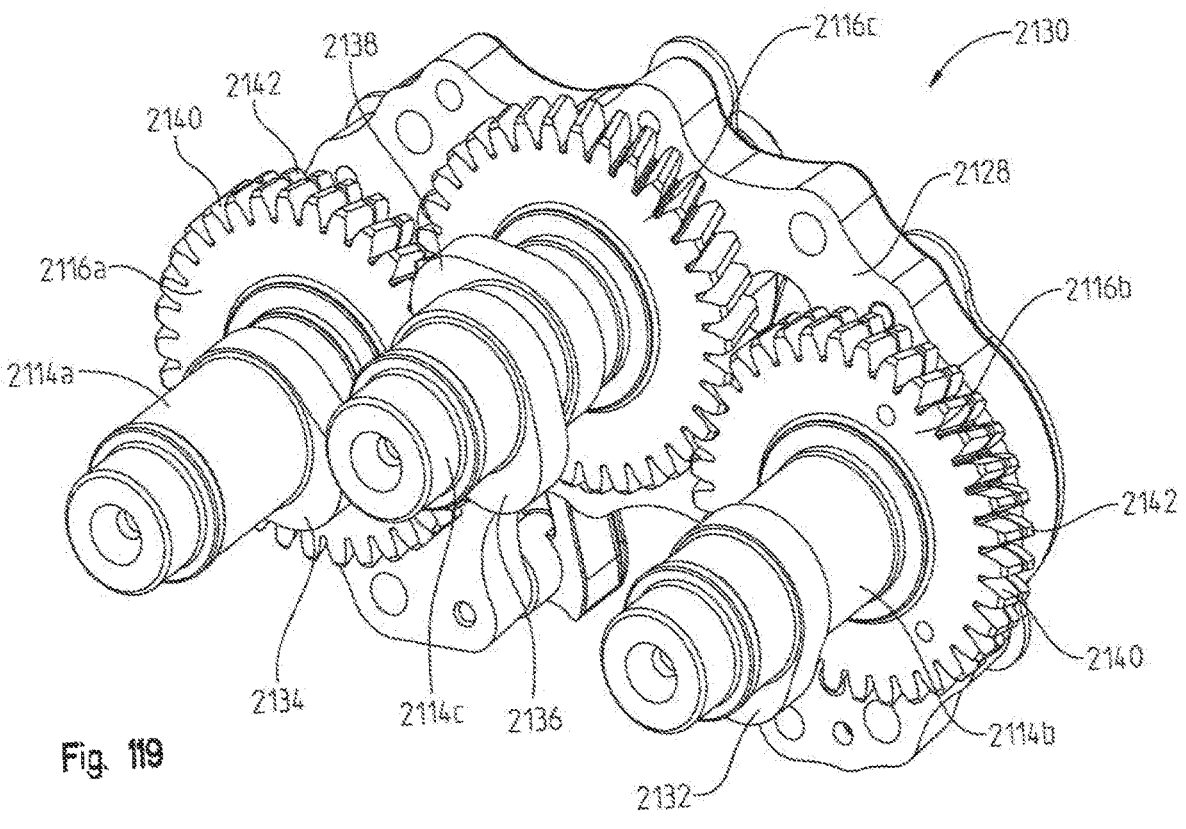

In addition to compensator assembly 2070, crankcase 100 also supports a valve train assembly 2130 which includes a plurality of bearings 2112a, 2112b, and 2112c, for example ball bearings, as shown in FIG. 116. Bearings 2112a, 2112b, and 2112c are positioned above crankshaft 2050 on second side 2048 of crankcase 100. Referring to FIG. 117, bearings 2112a, 2112b, and 2112c support and allow rotation of a respective camshaft 2114a, 2114b, and 2114c. More particularly, illustrative vehicle 2 includes three camshafts in which camshaft 2114c is an intake camshaft and camshafts 2114a and 2114b are exhaust camshafts. Camshafts 2114a, 2114b, and 2114c include gears 2116a, 2116b, and 2116c, respectively. Gears 2116a, 2116b, 2116c may be spring-loaded split gears, as shown in FIG. 119, which may reduce backlash. As shown in FIG. 119, gears 2116a, 2116b each include a first portion 2140 and a second portion 2142.

Figure 118:
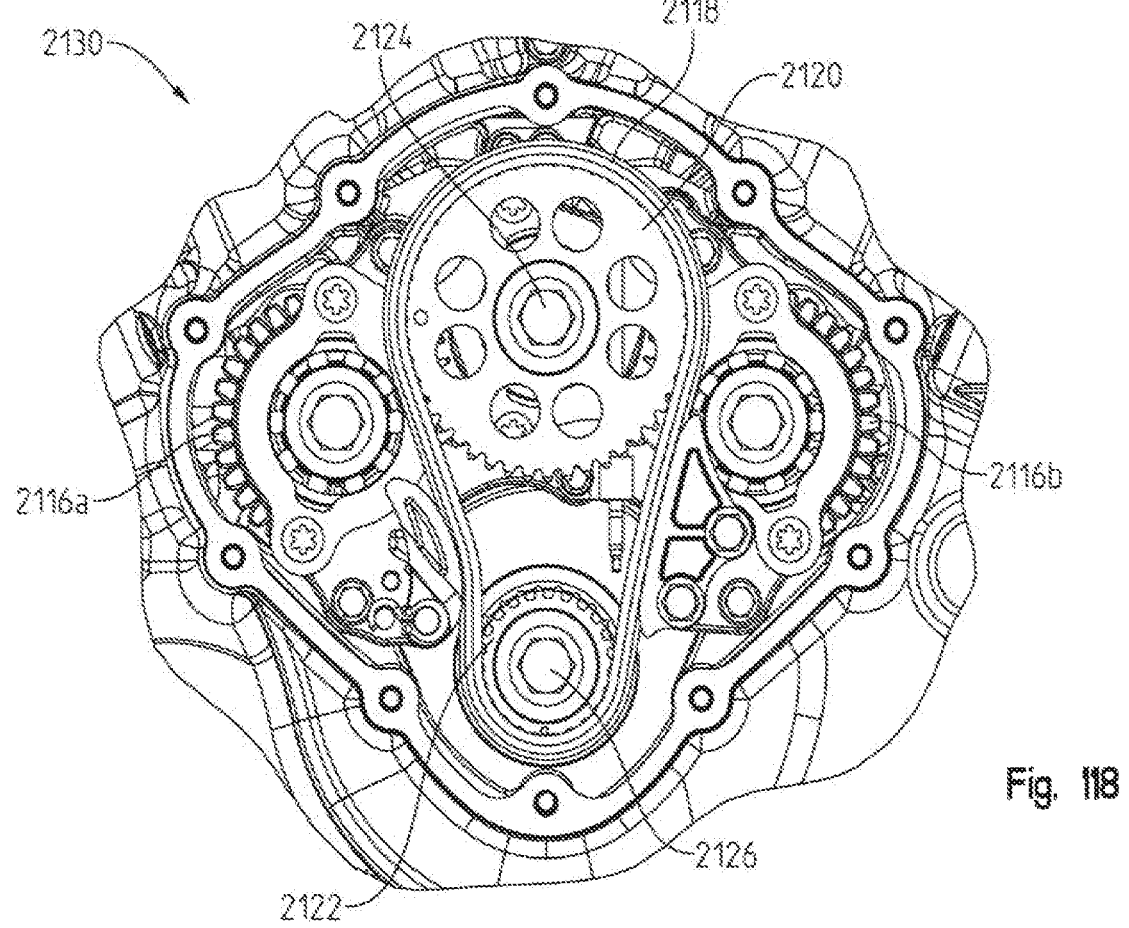

Illustratively, intake camshaft 2114c is coupled to a belt 2118. Alternatively, intake camshaft 2114c may be coupled to a chain or other drive member. As shown in FIGS. 117-118, gear 2116c on intake camshaft 2114c may drive gears 2116a, 2116b on exhaust camshafts 2114a, 2114b. Belt 2118 rotates about, and is tensioned by, pulleys 2120 and 2122. Pulley 2122 is coupled to crankshaft 2050 with a fastener 2126. Pulley 2120 is coupled to intake camshaft 2114c with a fastener 2124. In one embodiment, belt 2118 is the only belt included on engine 12.

Referring to FIG. 119, camshafts 2114a, 2114b, and 2114c may be coupled to a plate 2128 to maintain the alignment, position, and configuration of camshafts 2114a, 2114b, 2114c. Exhaust camshaft 2114b includes a lobe 2132 for reciprocating exhaust push rod 126 of cylinder 70. Similarly, exhaust camshaft 2114a includes a lobe 2134 for reciprocating exhaust push rod 126 of cylinder 72. Intake camshaft 2114c includes a first lobe 2136 and a second lobe 2138 for reciprocating intake push rod 124 of cylinder 70 and intake push rod 124 of cylinder 72, respectively. First lobe 2136 is outward of second lobe 2138 by a distance approximately equal to the offset between intake push rods 124 of cylinders 70 and 72.

As shown in FIGS. 120A and 120B, push rods 124 and 126 (FIG. 13A) include followers 2144 and 2146. Followers 2144 corresponding to exhaust push rods 126 and followers 2146 correspond to intake push rods 124. Followers 2144, 2146 may include respective dowels 2145, 2147 to prevent followers 2144, 2146 from rotating, twisting, or otherwise becoming misaligned. Additionally, a plate 2149 may be used to maintain the spacing between followers 2144, 2146. As shown in FIG. 120B, plate 2149 is coupled to crankcase 100 with a fastener 2141 that extends into an opening 2143 of crankcase 100.

In operation, camshaft 2114a and lobe 2134 rotate to reciprocate follower 2144 and, therefore, exhaust pushrod 126 of cylinder 72. Similarly, camshaft 2114b and lobe 2132 rotate to reciprocate follower 2144 and, therefore, exhaust push rod 126 of cylinder 70. Camshaft 2114c and lobe 2136 rotate to reciprocate follower 2146 and, therefore, intake push rod 124 of cylinder 70. Lobe 2138 rotates to reciprocate follower 2146 and, therefore, intake push rod 124 of cylinder 72.

Figure 121:
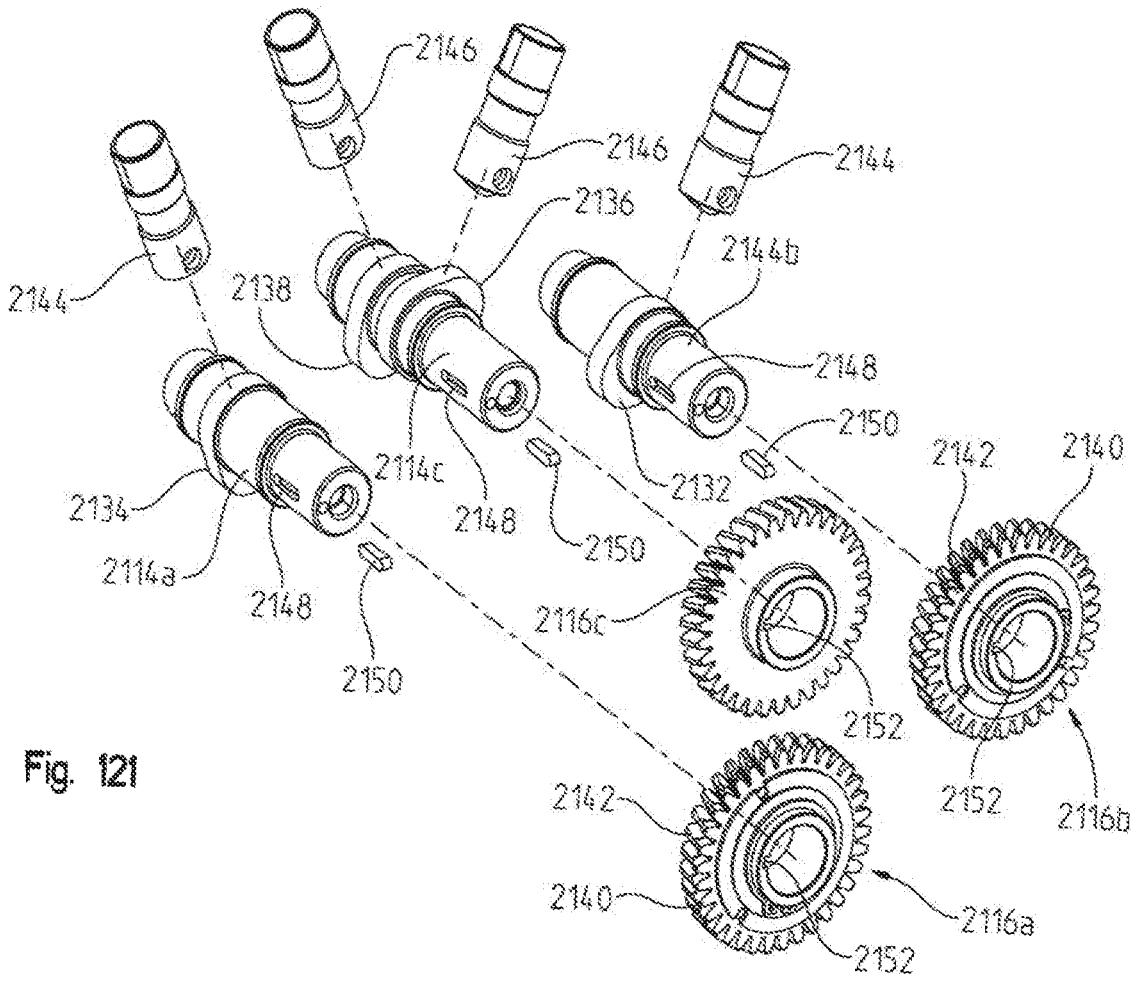

Referring to FIG. 121, camshafts 2114a, 2114b, 2114c may include locating members. Illustratively, locating members include a slot 2148 on camshafts 2114a, 2114b, 2114c and a slot on gears 2116a, 2116b, 2116c for receiving a key 2150 that locates camshafts 2114a, 2114b, 2114c on camshaft gears 2116a, 2116b, 2116c. Illustratively, slots 2152 are on the inner diameter of each camshaft gear 2116a, 2116b, 2116c. In one embodiment, slots 2148, 2152 and keys 2150 are on a rearward side of camshafts 2114a, 2114b, 2114c, as shown in FIG. 121. Alternatively, at least one of slots 2148, 2152 and keys 2150 may be positioned on the opposing side of any of camshafts 2114a, 2114b, 2114c, such that at least one of slots 2148, 2152 and keys 2150 is on a forward side of camshafts 2114a, 2114b, 2114c (i.e., are approximately 180 degrees from the position shown in FIG. 121).

Figure 122:
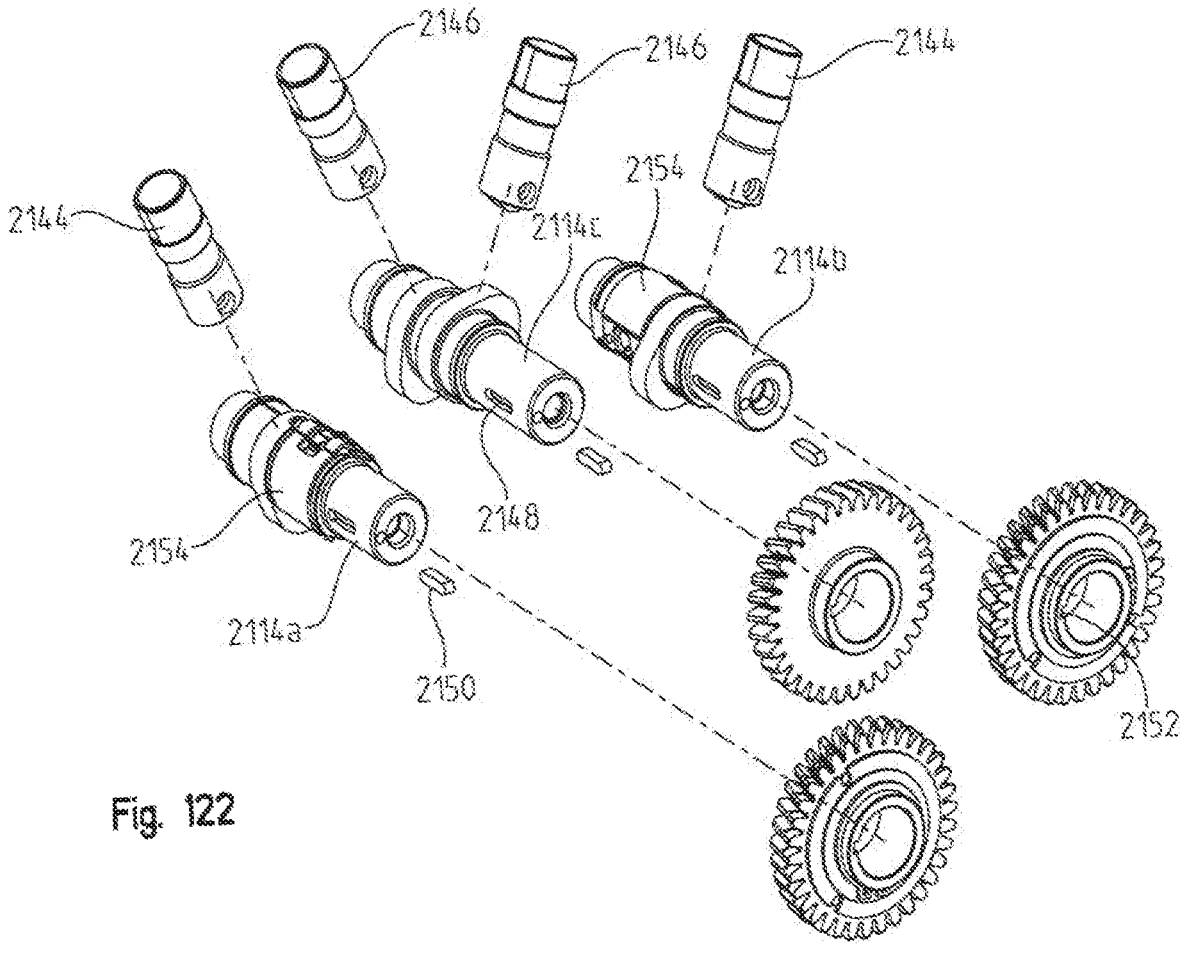

Referring to FIGS. 122 and 123, exhaust camshafts 2114a, 2114b each may include a decompression system 2154. Decompression systems 2154 are configured to slightly open exhaust valves 172 (FIG. 14) during the compression stroke of piston 104 in order to make engine 12 easier to crank during starting (e.g., approximately 250 rpm). However, decompression systems 2154 also are configured to deactivate when engine 12 achieves a normal idle speed (e.g., approximately 800 rpm). If decompression systems 2154 do not engage when engine 12 achieves a normal idle speed, engine 12 will not idle properly.

As shown in FIGS. 124 and 125, decompression systems 2154 of the present disclosure include a body member 2180, a rotatable pin 2156 positioned within a recess 2178 of body member 2180, a lift arm 2158 positioned over pin 2156, a spring 2166 coupled to lift arm 2158, and a retaining member 2170 which is coupled to body member 2180 with fasteners 2174. More particularly, retaining member 2170 has a generally "C" shape and includes apertures 2172 for receiving fasteners 2174. Fasteners 2174 also extend into openings 2176 of body member 2180 in order to secure retaining member 2170 to body member 2180. Fasteners 2174 may be bolts, screws, rivets, welds, or other similar fastening means. As shown best in FIG. 124, both retaining member 2170 and lift arm 2158 are positioned over pin 2156.

Spring 2166 is a tension spring and is coupled to both lift arm 2158 and body member 2180, as shown in FIG. 124. Illustratively, an upper portion 2169 of spring 2166 extends through a first opening 2164 and hooks into, or is otherwise secured within, a second opening 2162 of lift arm 2158. Additionally, a lower portion 2168 of spring 2166 extends around a tab 2182 of body member 2180 to further secure spring 2166 to body member 2180. Spring 2166 is positioned within a cylindrical opening 2184 of body member.

Referring to FIGS. 126A and 126B, in operation, decompression systems 2154 are configured to rotate pin 2156 such that lift arm 2158 moves between a closed, or engaged, state and an open, or disengaged, state. In particular, when lift arm 2158 is engaged, or closed, as shown in FIG. 126A, pin 2156 rotates or moves to a raise positioned within body member 2180. As such, decompression systems 2154 push exhaust followers 2144 in a slightly upward direction (shown by the arrow of FIG. 126A), thereby slightly pushing exhaust push rods 126 upwardly and slightly opening exhaust valves 172 in cylinders 70 and 72. As such, exhaust valves 172 are slightly opened and it may be easier to crank engine 12 during starting.

Conversely, when exhaust push rods 126 and exhaust followers 2144 move in a downward direction (shown by the arrow in FIG. 126B), exhaust valves 172 close and the centrifugal force from the rotation of camshafts 2114a, 2114b causes lift arm 2158 to disengage from body member

2180 and open, as shown in FIG. 126B. When lift arm 2158 is in the disengaged state, pin 2156 moves or rotates to a lower position within recess 2178 and, therefore, exhaust followers 2144 are no longer pushed in an upward direction. As such, exhaust valves 172 are not open. Lift arm 2158 may rotate until a stop member 2160 of lift arm 2158 contacts a stop recess 2179 of body member 2180.

As shown in FIGS. 126A and 126B, when lift arm 2158 is engaged (FIG. 126A), followers 2144 are positioned further to lobes 2132 and 2134 of camshafts 2114a and 2114b, respectively. More particularly, when lift arm 2158 is engaged (i.e., closed), a length L1, between a center point P1 of lobes 2132, 2134 and a center point P2 of the lower portion of followers 2144 is greater than a length L2 between center point P1 and center point P2 defined when lift arm 2158 is disengaged (i.e., opened).

Decompression systems 2154 of the present disclosure are configured to engage when the cams rotate at approximately 125 rpm in order to assist engine cranking during starting. Additionally, decompression systems 2154 are configured to disengage when the cams rotate at approximately 400 rpm in order for engine 12 to idle properly. It may be appreciated that decompression system 2154 overcomes both gravitation force and the force of spring 2166 when opening lift arm 2158 and moving to the disengaged state. Additionally, spring 2166 is pre-loaded to a minimum amount that allows disengagement at approximately 400 rpm. Because spring 2166 is only pre-loaded to the minimum amount needed to properly disengage at 400 rpm, the amount of time needed for decompression system 2154 to move between the disengaged state and the engaged state decreases. For example, spring 2166 may be pre-loaded to 0.1-0.15 N and may have an outer coil diameter of less than approximately 6 mm. Cylindrical opening 2184 may have a diameter of approximately 6.5 mm.

Referring now to FIG. 127, crankcase 100 also supports oil pump assembly 2190 therein. Illustratively, crankcase 100 includes a wet chamber 2194, which supports at least oil pump assembly 2190, and a dry or scavenge chamber 2196, which supports at least crankshaft 2050 and other moving and rotating component of power train assembly 10. Wet chamber 2194 is supported at a rear end of crankcase 100 and is sealed from dry chamber 2196 by a structural rib 2198. As shown in FIG. 127, dry chamber 2196 is positioned forward of wet chamber 2194 and comprises a larger portion of crankcase 100 than does wet chamber 2194. Wet chamber 2194 may be filled with oil up to a marking 2212 on a dipstick 2210 (FIG. 130). By separating the oil from the moving components of power train assembly 10, the likelihood of adding air to the main oil volume decreases.

As shown in FIGS. 127-131, oil pump assembly 2190 is configured for lubricating, cooling, and pressurizing portions of power train assembly 10 and includes a pump member 2200, a scavenge pick-up tube 2192, and an inlet 2202. In one embodiment, oil pump assembly 2190 also includes a second inlet. Pump member 2200 is configured with a pressure system to pump oil from sump 2204 to power train assembly 10 and a scavenge system to bring excess oil from dry chamber 2196 back to wet chamber 2194. Additionally, pump member 2200 may include a check valve to prevent oil in wet chamber 2194 from accidentally draining into dry chamber 2196. Scavenge system may use gravitational force to assist in drawing oil from dry chamber 2196 back to wet chamber 2194. Inlet 2202 may include a screen to filter debris from the oil in sump 2204 before the oil flows to engine 12. In one embodiment, pump member 2200 includes a first rotor for scavenging oil and a second rotor for pressurizing oil. For example, as shown in FIG. 128, pump member 2200 may include a positive displacement gerotor pressure section 2580 and a scavenge gerotor section 2582. In one embodiment, pressure section 2580 may be approximately 15 mm wide and scavenge section 2582 may be approximately 30 mm wide. As such, pump member 2200 operates under approximately a 2:1 ratio. In a further embodiment, pump member 2200 is configured to change this ratio in order optimize oil circulation and limit the amount of aeration. Pump member 2200 may be manufactured by Trico Corp. of Pewaukee, WI Referring to FIG. 128, oil pump assembly 2190 also includes a gear 2206 for operating pump member 2200. Gear 2206 may be an idler gear driven by the output shaft of a driveline assembly 2320 of power train assembly 10. In one embodiment, the ratio for driving gear 2206 is approximately 1:1.59. Gear 2206 may be plastic in order to dampen the vibrations of power train assembly 10. Oil pump assembly 2190 continuously cycles oil to power train assembly 10 and continuously receives oil via the scavenge system.

In operation, as shown by the arrows indicating the direction of oil flow in FIGS. 127-142, pump member 2200 draws oil from sump 2204 into inlet 2202. The oil drawn into pump member 2200 may be filtered by the screen, mesh, or other filter member within inlet 2202. Illustrative inlet 2202 may be comprised of a plastic injection molded portion that is ultrasonically welded with a stainless steel screen.

In one embodiment, oil also may be drawn into pump member 2200 through the second inlet. The oil drawn into pump member 2200 flows into a passageway 2212 which intersects a passageway 2214 extending upwardly and a passageway 2216 extending downwardly. Illustrative passageways 2212, 2214, and 2216 are cast into first side 2046 of crankcase 100. Alternatively, passageways 2212, 2214, and 2216 may be drilled into crankcase 100. As shown best in FIG. 128, passageway 2214 includes a pressure member 2218 in order to pressurize oil as it flows toward a bearing 2220 of an output shaft 2324 of driveline assembly 2320. Bearing 2222 is supported on first side 2046 of crankcase 100. Illustratively, pressure member 2218 is a flow restrictor but pressure member 2218 may be other devices configured to pressurize oil. As the oil flows toward bearing 2220, oil enters a circular channel 2222 positioned around bearing 2220. The oil in passageway 2214 lubricates bearing 2222 such that output shaft 2324 rotates on a layer of oil. It may be appreciated that the oil lubricating bearing 2222 may be filtered within pump member 2200 but may not enter oil filter 422 (FIGS. 20 and 21).

As oil flows into passageway 2214, oil also simultaneously flows into passageway 2216, as shown best in FIG. 129. Passageway 2216 is laterally offset from passageway 2214. Illustratively, passageway 2216 is inward of passageway 2214. The oil in passageway 2216 flows into a first longitudinally-extending passageway 2224. As shown in FIGS. 129 and 130, first longitudinally-extending passageway 2224 is part of the pressure system of oil pump assembly 2190 and is adjacent a second longitudinally-extending passageway 2226, which is part of the scavenge system of oil pump assembly 2190. Therefore, first longitudinally-extending passageway 2224 pumps oil to engine 23 and second longitudinally-extending passageway 2226 allows oil to flow from dry chamber 2196 back to wet chamber 2194, as is further detailed hereinafter. In one embodiment, first longitudinally-extending passageway 2224 is outward of second longitudinally-extending passageway 2226. Both first and second longitudinally-extending passageways 2224 and 2226 may be cast into first side 2046 of crankcase 100. Alternatively, passageways 2224 and 2226 may be drilled into crankcase 100.

Referring to FIG. 130, first and second longitudinally-extending passageways 2224 and 2226 extend between wet chamber 2194 and dry chamber 2196 on first side 2046 of crankcase 100. Oil in first longitudinally-extending passageway 2224 may be pressurized in order to efficiently flow towards wet chamber 2194. Pressure sensor 2228 may be coupled to first longitudinally-extending passageway 2224 in order to measure the pressure of the oil therein.

As shown in FIG. 131, the oil in first longitudinally-extending passageway 2224 flows into dry chamber 2196 in order to lubricate crankshaft 2050 (FIGS. 109 and 110). More particularly, the oil in first longitudinally-extending passageway 2224 flows into oil filter 422 through port 490 in oil adapter 420 (FIGS. 20 and 21) before flowing toward crankshaft 2050. The oil also may flow through oil cooler 424 before flowing toward crankshaft 2050.

Referring still to FIG. 131, after the oil from first longitudinally-extending passageway 2224 flows through oil filter 422 and/or oil cooler 424, the oil enters a passageway 2230 that extends from first side 2046 to second side 2048 of crankcase 100. It may be appreciated that, unlike the oil in passageway 2214 for lubricating bearing 2222, the oil in passageway 2230 has been filtered through oil filter 422. The filtered oil in passageway 2230 simultaneously flows toward a first upwardly-extending passageway 2232 and a second upwardly-extending passageway 2234. Passageways 2230, 2232, and 2234 may be cast into crankcase 100. Alternatively, passageways 2230, 2232, and 2234 may be drilled into crankcase 100.

The oil entering first upwardly-extending passageway 2232 flows toward a first bearing 2238 for crankshaft 2050. Illustratively, both first upwardly-extending passageway 2232 and first bearing 2238 are supported on first side 2046 of crankcase 100. The oil flows into a circular channel 2236 extending around first bearing 2238. Additionally, first bearing 2238 may include at least one port 2240 (FIG. 141) through which at least a portion of the oil in channel 2236 flows. The oil that flows through port 2240 flows in a circular channel 2239 on first bearing 2238 in order to lubricate other components of power train assembly 10, as if further detailed hereinafter. As shown in FIG. 131, circular channel 2236 is concentric with circular channel 2239 of first bearing 2238.

As oil flows through passageway 2232 toward first bearing 2238 of crankshaft 2050, oil also simultaneously flows through second upwardly-extending passageway 2234 on second side 2048 of crankcase 100. The oil in second upwardly-extending passageway 2234 flows into a circular channel 2242 extending around a second bearing 2244 of crankshaft 2050. Additionally, second bearing 2244 may include at least one port 2246 (FIG. 141) through which at least a portion of the oil in channel 2242 flows. The oil that flows through port 2246 flows in a circular channel 2245 on second bearing 2244 in order to lubricate other components of power train assembly 10, as if further detailed hereinafter. As shown in FIG. 131, circular channel 2242 is concentric with circular channel 2245 of second bearing 2244.

Oil flowing through channel 2242 and around second bearing 2244 flows in various directions. For example, as detailed above, the oil flows around channel 2242 to lubricate bearing 2244. The oil in channel 2242 also may flow into port 2246 to lubricate portions of power train assembly 10. Additionally, the oil in channel 2242 may continue to flow upwardly toward an oil jacket or casing 2248, as is detailed further herein.

Referring to FIGS. 132 and 133, oil casing 2248 is coupled to second side 2048 of crankcase 100 with conventional fasteners. Oil casing 2248 allows oil to flow toward camshafts 2114a, 2114b, 2114c, crankshaft 2050, push rods 124, 126, and other components of valve train assembly 2130.

Referring to FIG. 134, a third upwardly-extending passageway 2250 is positioned above second bearing 2244 on second side 2048 of crankcase 100. Third upwardly-extending passageway 2250 is in fluid communication with circular channel 2242 and allows oil to flow toward oil casing 2248. As shown in FIGS. 134 and 135, when the oil flows to the upper portion of third upwardly-extending passageway 2050, the oil separates into various other passageways to flow oil to other portions of valve train assembly 2130. Illustratively, the oil enters an upper port 2252, which divides into two flows of oil in order to lubricate cylinders 70 and 72. More particularly, the oil at port 2252 travels through an oil conduit 2254 to a first lower port 2256 (FIG. 134) in order to lubricate cylinder 70 with a pressure member 2262 (FIG. 139). Additionally, the oil entering upper port 2252 travels through an oil conduit 2264 to a second lower port 2260 (FIG. 135) in order to lubricate cylinder 72 with a pressure member 2266 (FIG. 139). As shown in FIG. 135, pressure members 2262, 2266 may be spray nozzles or any other pressure devices configured to pressurize the oil in an upward direction. Oil casing 2248 includes recesses 2249 for receiving components such as oil conduit 2254. In one embodiment, pressure members 2262, 2266 are configured to open at a predetermined pressure.

Referring to FIG. 134, as the oil enters upper port 2252, oil in third upwardly-extending passageway 2250 also may simultaneously enter a lower port 2268 and a passageway 2270. The oil entering passageway 2270 flows through oil casing 2248 toward a port 2272. More particularly, the oil flowing through passageway 2270 flows in an outward direction from port 2268 because the oil in passageway 2270 lubricates cylinder 70, which is laterally outward of cylinder 72. When the oil in passageway 2270 reaches port 2272, the oil flows in a plurality of directions. For example, as shown in FIG. 134, the oil flows into an oil conduit 2274 having a pressure member 2276 positioned above crankshaft 2050. Illustratively, pressure member 2276 is a nozzle that may pressurize the oil and spray oil onto crankshaft 2050. Additionally, the oil at port 2272 flows in a forward direction toward cylinder 70 in order to lubricate push rods 124 and 126.

As shown best in FIG. 137, the oil from port 2272 flows into a first push rod passageway 2278 toward an opening 2280 for intake push rod 124 and an opening 2282 for exhaust push rod 126. Because the oil in first push rod passageway 2278 is pressurized, the oil flows in both an upward and downward direction at openings 2280, 2282. For example, the oil at openings 2280, 2282 flows downward to lubricate camshafts 2114c, 2114b, respectively. Additionally, the oil at openings 2280, 2282 flows upwardly due to the pressure in order to enter push rods 124, 126, respectively, and lubricate cylinder head 142.

Referring to FIGS. 137-140, in order to lubricate cylinder heads 140, 142, pressurized oil flows upward toward followers 2144, 2146 (FIG. 138). The oil enters an opening 2284 on a roller 2286 coupled to intake push rod 124. The oil from opening 2284 flows into an opening 2292 of intake push rod 124. Similarly, oil enters an opening 2288 on a roller 2290 coupled to exhaust push rod 126. The oil from opening 2288 flows into an opening 2294 of exhaust push rod 126. As shown in FIG. 139, the oil in push rods 124, 126 flows up to cylinder head 142 of cylinder 70 in order to lubricate intake valve 176 and exhaust valve 172. Crankcase 100 may include a check valve for limiting when the oil flows into cylinder heads 140, 142. For example, the check valve may be configured to allow oil to flow only at higher engine speeds.

As shown in FIG. 140, when the oil in openings 2292, 2294 flows to the upper portion of respective push rods 124, 126, the oil exits through respective ports 2296, 2298. The pressurized oil exits ports 2296, 2298 and contacts a deflection member 2300 positioned above ports 2296, 2298. As such, the oil no longer flows in an upward direction, but rather, flows outwardly toward intake and exhaust valves 176, 172, respectively, for lubrication.

Referring now to FIG. 141, as the oil from third upwardly-extending passageway 2250 flows toward passageway 2270 and port 2272, oil also simultaneously flows through lower port 2268. From lower port 2268, the oil flows through a passageway 2302 toward bearing 2244 for crankshaft 2050. In addition to the oil from second upwardly-extending passageway 2234, the oil from passageway 2302 lubricates bearing 2244 and other components of power train assembly 10.

Additionally, the oil at lower port 2268 simultaneously flows into a second push rod passageway 2304, as shown in FIG. 136. More particularly, as with cylinder 70, cylinder 72 is lubricated with oil flowing through second push rod passageway 2304 toward an opening 2306 for intake push rod 124 and an opening 2308 for exhaust push rod 126. Because the oil in second push rod passageway 2304 is pressurized, the oil flows in both an upward and downward direction at openings 2306, 2308. For example, the oil at openings 2306, 2308 flows downward to lubricate camshafts 2114c, 2114a, respectively. Additionally, the oil at openings 2306, 2308 flows upwardly due to the pressure in order to enter push rods 124, 126, respectively, and lubricate cylinder head 140 in the same manner illustrated in FIGS. 138-140 for cylinder 70. Illustratively, intake and exhaust valves 176 and 172 are lubricated when the oil in push rods 124 and 126 exits ports 2296 and 2298 and contacts deflection member 2300.

In addition to lubricating engine 12, the oil also lubricates driveline assembly 2320. More particularly, in addition to feeding second pressure member 2262, the oil at second lower port 2260 also simultaneously flows through an oil conduit 2312 to a driveline port 2314, as shown in FIGS. 141 and 142. Driveline port 2314 delivers oil to driveline assembly 2320 of power train assembly 10. As shown in FIGS. 143-146, driveline assembly 2320 includes an input shaft 2322, an output shaft 2324, a shift drum member 2326, a shifter assembly 2328, and a plurality of gears (e.g., helical gears). Shift drum member 2326 is coupled to an input rod 2330 and an output rod 2334. Input rod 2330 is coupled to a first shift fork 2332 in order to engage specific gears, as is detailed further hereinafter. Output rod is coupled to a second shift fork 2336 and a third shift fork 2338 in order to engage other gears, as is detailed further hereinafter.

Referring to FIG. 145, input shaft 2322 includes a first end 2340 adjacent a first splined portion 2344 and a second end 2342 adjacent a second splined portion 2346. Intermediate first and second splined portions 2344, 2346 are gears 2348 and 2350, as is detailed further hereinafter. Adjacent gear 2348 is a gear member, illustratively fifth gear 2352. A bearing member 2354 may be positioned between input shaft 2322 and fifth gear 2352 to allow rotation of fifth gear 2352 relative to input shaft 2322. A first clutch member 2356, illustratively a sliding dog clutch, is positioned adjacent fifth gear 2352 and is not fixed to input shaft 2322. An internal splined surface 2358 of first clutch member 2356 engages an external splined surface 2364 of a bearing 2360. An internal splined surface 2362 of bearing 2360 engages first splined portion 2344 of input shaft 2322. Another gear member, illustratively sixth gear 2366, is positioned adjacent first clutch member 2356 on input shaft. An center opening of sixth gear 2366 engages a bearing 2368, which includes an internal splined surface 2370 for engaging first splined portion 2344 of input shaft 2322. Adjacent sixth gear 2366 is a further gear 2372 which includes an internal splined surface 2374 for engaging first splined portion 2344. A gear 2376 is positioned at first end 2340 of input shaft 2322 and is coupled thereto with a fastener 2378.

Referring to FIG. 146, input shaft 2322 is coupled to output shaft 2324 via gears 2348, 2350, 2352, 2360, 2372, and 2376. Output shaft 2324 includes a first end 2380 having a first splined portion 2384 and a second end 2382 having a second splined portion 2386. A flange 2388 is positioned intermediate first and second splined portions 2386, 2388. A gear member, illustratively second gear 2392, is coupled to output shaft 2324 with a bearing 2390. Adjacent second gear 2392 is a second clutch member 2400, illustratively a sliding dog clutch, which is coupled to output shaft 2324 via a bearing 2394 and is not fixed to output shaft 2324. Bearing 2394 has an external splined surface 2398 for engaging an internal splined surface 2402 of second clutch member 2400. Bearing 2394 also has an internal splined surface 2396 for engaging second splined portion 2386 of output shaft 2324. An additional gear member, illustratively fourth gear 2408, is positioned adjacent second clutch member 2400. Fourth gear 2408 engages with second splined portion 2386 through a bearing 2404, which includes an internal splined surface 2406. A gear 2410 is adjacent fourth gear 2408 and engages second splined portion 2386 via an internal splined surface 2412. Additionally, a further gear 2414 is positioned adjacent gear 2410 and engages second splined portion 2386 via an internal splined surface 2416. Another gear member, illustratively third gear 2422, engages second splined portion 2386 via a bearing 2418, which includes an internal splined surface 2420. Third gear 2422 is adjacent a third clutch member 2424, illustratively a sliding dog clutch, which is not fixed to output shaft 2324. An internal splined surface 2426 of third clutch member 2424 engages an external splined surface 2432 of a bearing 2428. An internal splined surface 2430 of bearing 2428 engages second splined portion 2386. Output shaft 2324 also includes a first gear 2436 adjacent third clutch member 2424. First gear 2436 may rotate relative to output shaft 2324 via a bearing 2434. A bearing 2438 is secured to second end 2382 of output shaft 2324 with a fastener 2440.

As shown in FIG. 147, first side 2340 of input shaft 2322 receives oil from driveline port 2314 into an internal conduit 2442. The oil flows through internal conduit in the direction of the arrows in FIG. 147. A portion of the oil flows through an outlet 2444 in order to lubricate bearing 2368. More particularly, the oil flows through outlet 2444 and enters a channel 2446 of bearing 2368. A portion of the oil in channel 2446 also may exit channel 2446 through openings 2369 of bearing 2368 (FIG. 145) in order to lubricate the internal surface of sixth gear 2366.

Similarly, a portion of the oil flowing through conduit 2442 flows through an outlet 2448 in order to lubricate bearing 2354. The oil enters a channel 2450 of bearing 2354 and a portion may exit channel 2450 via openings 2353 (FIG. 145) in order to lubricate the internal surface of fifth gear 2352.

The oil that remains in conduit 2442 continues to flow toward second end 2342 of input shaft 2322. At second end 2342, a portion of the oil flows through an outlet 2452 in order to lubricate and cool a portion of a charging assembly (not shown). Additionally, the remaining portion of oil in conduit 2442 flows through a pressure member 2454, illustratively a spray nozzle, and exits conduit 2442 at second end 2342 in order to cool and lubricate a stator member (not shown) of the charging assembly. The charging assembly may be an ACG charging assembly.

As with input shaft 2322, oil also enters output shaft 2324 in order to lubricate portions of driveline assembly 2320. Referring still to FIG. 147, oil enters an internal conduit 2456 of output shaft 2324 from passageway 2214. As such, passageway 2214 supplies oil to both bearing 2220 and internal conduit 2456 of output shaft 2324. Oil flows through output shaft 2324 in the direction of the arrows in FIG. 147. A portion of the oil flowing through conduit 2456 may flow through an outlet 2458 in order to lubricate bearing 2434. The oil enters a channel 2460 of bearing 2434 and a portion may exit channel 2460 via openings 2433 (FIG. 146) in order to lubricate the internal surface of first gear 2436.

A portion of the oil remaining in conduit 2456 also flows through an outlet 2462 in order to lubricate bearing 2418. The oil enters a channel 2464 and may exit channel 2464 via openings 2419 (FIG. 146) in order to lubricate the internal surface of third gear 2422.

Additionally, a portion of the oil remaining in conduit 2456 flows through an outlet 2468 in order to lubricate bearing 2404. The oil enters a channel 2470 and a portion may exit channel 2470 via openings 2405 (FIG. 146) in order to lubricate the internal surface of fourth gear 2408.

The remaining portion of oil in conduit 2456 flows through an outlet 2472 in order to lubricate bearing 2390. The oil enters a channel 2474 and a portion may exit channel 2474 via openings 2391 (FIG. 146) in order to lubricate the internal surface of second gear 2392. As such, it may be appreciated that one embodiment of driveline assembly 2320 operates on a layer of oil rather than needle bearings.

Referring now to FIGS. 148 and 149, when oil flows to crankshaft 2050 via first and second upwardly-extending passageways 2232, 2234, a portion of the oil enters bearings 2236, 2242 through ports 2240, 2246 in order to flow within channels 2239, 2245, respectively. A portion of the oil in channels 2239 and 2245 enters crankshaft 2050. More particularly, a portion of the oil in channel 2239 enters port 2055 and flows into a conduit 2480. A portion of the oil continues flowing within conduit 2480 toward a conduit 2486 in order to flow through ports 2063 and lubricate connecting rods 2500. The remaining portion of the oil in conduit 2480 flows into a conduit 2482 and exits conduit 2482 and crankshaft 2050 via port 2061. The oil exiting port 2061 lubricates a portion of power train assembly 10, for example compensator assembly 2070.

Similarly, a portion of the oil in channel 2245 enters port 2057 and flows into a conduit 2488. The oil flows into a conduit 2490 and exits conduit 2490 via a conduit 2492 and port 2059 in order to lubricate additional components of power train assembly 10. Additionally, oil is supplied to portions of crankshaft 2050 via conduit 2274 (FIG. 132).

Because oil from wet chamber 2194 has entered dry chamber 2196, the scavenge system of oil pump assembly 2190 scavenges oil from dry chamber 2196 and returns the oil to sump 2204 of wet chamber 2194. As such, the scavenge system of oil pump assembly 2190 prevents excess oil within dry chamber 2196, which may increase the longevity of the components of power train assembly 10 and oil pump assembly 2190 and also may reduce parasitic drag on components of power train assembly 10. In one embodiment, as shown in FIG. 130, the scavenge system of oil pump assembly 2190 drains oil from dry chamber 2196 into a filter member 2494, as shown in FIG. 130. Filter member 2494 is positioned within a conduit 2496 which intersects with second longitudinally-extending passageway 2226. Filter member 2494 and conduit 2496 are positioned below crankshaft 2050, as shown in FIG. 135. After flowing through filter member 2494, the oil from dry chamber 2196 flows through second longitudinally-extending passageway 2226 and into a port 2498 in order to flow back into pump member 2200 in wet chamber 2194, as shown in FIG. 150. When the oil from dry chamber 2196 enters pump member 2200, the oil may be filtered through a pick-up screen and air may be settled out of the oil. The oil then recirculates through oil pump assembly 2190.

Additionally, and referring to FIG. 128, any oil within housing 102 may flow into dry chamber 2196 via a port 2502 on first side 2046 of crankcase 100. As such, scavenge system also prevents excess oil in housing 102. As shown in FIG. 135, oil scavenged from housing 102 may pass by or under a plate or scraper member 2506 and enter a conduit 2504 coupled to filter member 2494. Also, a cast or drilled opening 2508 may be provided for scavenging oil from dry chamber 2196.

Referring to FIG. 151, when oil is supplied thereto, driveline assembly 2320 is properly operated through its connection to crankshaft 2050. An output gear 2518 of crankshaft 2050 is coupled to an input gear 2520 of input shaft 2322. Additionally, crankshaft 2050 is coupled to a counterweight gear 2510 via a gear 2512. As shown in FIG. 151, counterweight gear 2510 is coupled to a counterweight 2516 on shaft 2514.

As shown best in FIG. 147, input and output shafts 2322, 2324 operate together as crankshaft 2050 rotates. More particularly, first shift fork 2332 cooperates with shift drum member 2326 in order to move first clutch member 2356 between fifth gear 2352 and sixth gear 2366 when fifth or sixth gear is selected by the rider. As such, when first clutch member 2356 is engaged with fifth gear 2352, vehicle 2 is "in fifth gear" such that fifth gear 2352 rotates at the speed of input shaft 2322. Fifth gear 2352 rotates with gear 2414 on output shaft 2324. Similarly, when first clutch member 2356 is engaged with sixth gear 2366, vehicle 2 is "in sixth gear" such that sixth gear 2366 rotates with input shaft 2322. Sixth gear 2366 rotates with gear 2410 on output shaft 2324. However, when first clutch member 2356 is not engaged with fifth gear 2352 and/or sixth gear 2366, fifth gear 2352 and/or sixth gear 2366 are configured to "free wheel" or rotate about input shaft 2322 at a speed other than that of input shaft 2322.

Additionally, second and third shift forks 2336 and 2338 on output shaft 2324 cooperate with shift drum member 2326 in order to move third clutch member 2424 between first gear 2436 and third gear 2422 when first or third gear is selected by the rider, and to move second clutch member 2400 between second gear 2392 and fourth gear 2408 when second or fourth gear is selected by the rider. As such, when third clutch member 2424 is engaged with first gear 2436, vehicle 2 is "in first gear" such that first gear 2436 rotates with output shaft 2324. First gear 2436 rotates with gear 2350 on input shaft 2322. Additionally, when third clutch member 2424 engages third gear 2422, vehicle 2 is "in third gear" such that third gear 2422 rotates with output shaft 2324. Third gear 2422 rotates with gear 2348 on input shaft 2322. However, if third clutch member 2424 is not engaged with first gear 2436 and/or third gear 2422, then first gear 2436 and/or third gear 2422 are configured to free wheel about output shaft 2324.

Similarly, when second clutch member 2400 engages fourth gear 2408, vehicle 2 is "in fourth gear" such that fourth gear 2408 rotates with output shaft 2324. Fourth gear 2408 rotates with gear 2372 on input shaft 2322. When second clutch member 2400 engages second gear 2392, vehicle 2 is "in second gear" such that second gear 2392 rotates with output shaft 2324. Second gear 2392 rotates with gear 2376 on input shaft 2322.

Referring to FIGS. 152 and 153, shifter assembly 2328 allows first, second, and third shift forks 2332, 2336, and 2338 to move along shift drum member 2326 in order to move first, second, and third clutch members 2356, 2400, and 2424, respectively, and change gears during operation of vehicle 2. Shifter assembly 2328 includes a rocker arm 2530, a shaft 2532, a plate 2534, a bushing 2536, a first spring member 2538, a coupler 2540, a washer 2542, and a bearing 2544. As shown in FIG. 152, rocker arm 2530, shaft 2532, and plate 2534 are positioned below input shaft 2322 of driveline assembly 2320. Bushing 2536, first spring member 2538, washer 2542, and bearing 2544 are positioned inward of plate 2534. Rocker arm 2530 is coupled to plate 2534 with a fastener 2548.

Rocker arm 2530 is coupled at one end to a second spring member 2550, which is also coupled to plate 2534. Additionally, the opposing end of rocker arm 2530 engages with a cover member 2554 and a profiled member 2556. As shown in FIGS. 152 and 153, profiled member 2556 is positioned inward of cover member 2554. Rocker arm 2530 is positioned generally below profiled member 2556 and cover member 2554. Cover member 2554 and profiled member 2556 are coupled to crankcase 100 with a fastener 2552 and a fastener 2558.

Shifter assembly 2328 further includes an arm 2564, a spacer 2566, and a third spring member 2570. Arm 2564, spacer 2566, and third spring member 2570 are coupled to each other and crankcase 100 with fasteners 2562 and 2568.

In operation, as shown in FIG. 152, a rider may engage and move shaft 2532, which moves second spring member 2550 and, therefore, also moves rocker arm 2530. Rocker arm 2530 is configured to move or rotate about a post 2560, cover member 2554 and profiled member 2556. A pin 2546 extends at least partially through an opening in plate 2534 and contacts plate 2534 to prevent the rider from shifting through multiple gears.

Referring to FIG. 116, in one embodiment, power train assembly 10 further includes a starter motor 2572. Starter motor 2572 is positioned on a front portion of crankcase 100. Starter motor 2572 includes a splined end 2574 which drives a backlash gear 2576. Backlash gear 2576 is spring-loaded to prevent vibrations in lower train assembly 10 from transferring to other portions of power train assembly 10. Backlash gear 2576 is configured to fail if a backfire occurs in order to save engine 12.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A two-wheeled vehicle including:
   a frame;
   a front ground-engaging member and a rear ground-engaging member each supporting the frame;
   a straddle-type seat;
   a handlebar for steering the vehicle;
   an engine supported by the frame and operably coupled to the ground-engaging members;
   a fuel tank containing fuel for use by the engine;
   a fuel level sensor coupled to the fuel tank;
   a tilt sensor; and
   a vehicle control unit in communication with the fuel level sensor and the tilt sensor and operative to detect each of a tilt angle of the vehicle based on output from the tilt sensor and a fuel level in the fuel tank based on output from the fuel level sensor, the vehicle control unit being operative to calculate and output an adjusted fuel level value based on each of the detected fuel level and the detected tilt angle of the vehicle.

2. The vehicle of claim 1, further including a vehicle speed sensor in communication with the vehicle control unit, the vehicle control unit adjusting the detected fuel level further based on a detected speed of the vehicle.

3. The vehicle of claim 1, the vehicle control unit adjusting the detected fuel level further based on an internal geometry of the fuel tank.

4. The vehicle of claim 1, wherein the tilt sensor is an accelerometer.

5. The vehicle of claim 1, further including a float positioned in the fuel tank, the fuel level sensor outputting a signal representative of the fuel level based on a position of the float.

6. The vehicle of claim 1, wherein the vehicle control unit provides the adjusted fuel level for display on a display.

7. A method of determining a fuel level of a two-wheeled vehicle, the two-wheeled vehicle including a straddle seat, a handlebar, a front ground-engaging member, and a rear ground-engaging member, the method including:
   detecting a fuel level in a fuel tank of the vehicle based on output from a fuel level sensor;
   detecting a tilt angle of the vehicle based on output from a tilt sensor; and
   calculating and outputting an adjusted fuel level value based on each of the detected fuel level and the detected tilt angle of the vehicle.

8. The method of claim 7, further including detecting a speed of the vehicle based on output from a vehicle speed sensor, and adjusting the detected fuel level further based on the detected speed of the vehicle.

9. The method of claim 7, further including displaying the adjusted fuel level on a display of the vehicle.

* * * * *